United States Patent [19]
Hoskins et al.

[11] Patent Number: 6,108,662
[45] Date of Patent: Aug. 22, 2000

[54] SYSTEM METHOD AND ARTICLE OF MANUFACTURE FOR INTEGRATED ENTERPRISE-WIDE CONTROL

[75] Inventors: Josiah C. Hoskins, Austin, Tex.; Ruven E. Brooks, Shorewood, Wis.

[73] Assignee: Allen-Bradley Company, LLC, Milwaukee, Wis.

[21] Appl. No.: 09/075,349

[22] Filed: May 8, 1998

[51] Int. Cl.$^7$ ..................................................... G06F 17/30
[52] U.S. Cl. ........................ 707/102; 395/406; 395/674; 395/401
[58] Field of Search ........................... 707/102; 395/674, 395/406, 701

[56] References Cited

U.S. PATENT DOCUMENTS

| | | | |
|---|---|---|---|
| 5,420,977 | 5/1995 | Sztipanovits et al. | 395/356 |
| 5,796,986 | 8/1998 | Fuller | 395/500.02 |
| 5,878,431 | 3/1999 | Potterveld et al. | 707/103 |
| 5,931,911 | 8/1999 | Remy et al. | 709/223 |
| 5,940,293 | 8/1999 | Schwenke et al. | 700/61 |

OTHER PUBLICATIONS

Riyaz, S., "Coordination mechanisms for multi–agent manufacturing systems: Applications to integrated manufacturing scheduling", IEEE Trans. on Eng. Mgt. v 44 n2, May 1997, Abstract Only.

Lim, et al., "Myriad: design and implementation of a federated database protype ", Software–Practice and Experience, v 25, No. 5, May 1995, Abstract Only.

*Primary Examiner*—Jean R. Homere
*Attorney, Agent, or Firm*—John J. Horn; Alex M. Gerasimow; Keith Stephens

[57] ABSTRACT

A system software solution for controlling an enterprise comprising one or more components for controlling one or more aspects of an industrial environment with code that creates a database of components, each of the components containing control, diagnostic and resource information pertaining to enterprise resources utilized in the industrial environment. The system also generates code that controls resources comprising cognitive and timing information that synchronizes events throughout the enterprise. The database of components includes code that updates the database to reflect changes in the enterprise and integrates the new design, simulation, implementation and maintenance changes to optimize the manufacturing enterprise utilizing the database of components.

20 Claims, 72 Drawing Sheets

FIG. 22
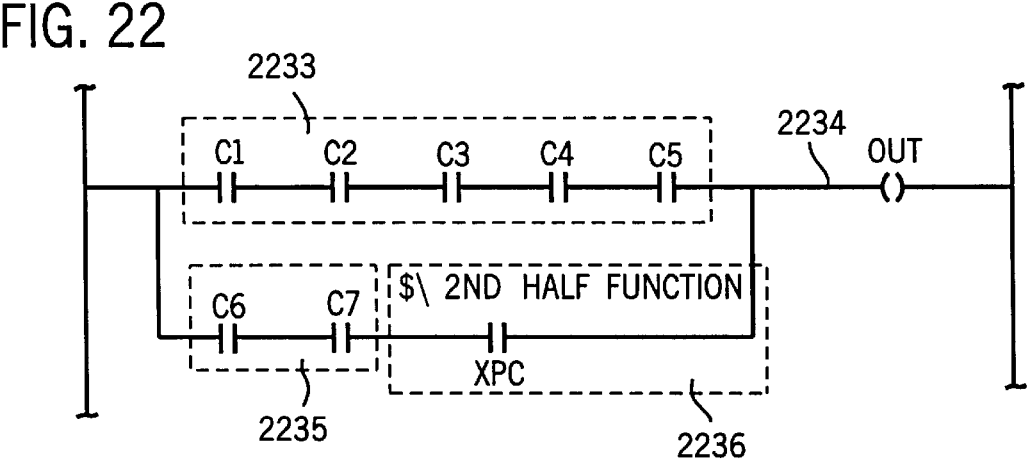
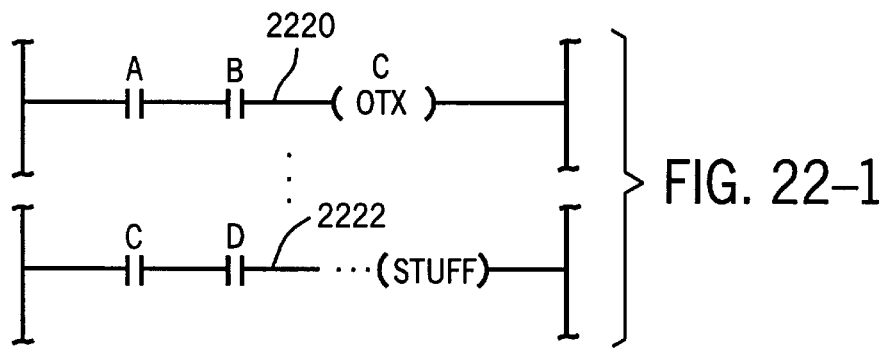
FIG. 22-1
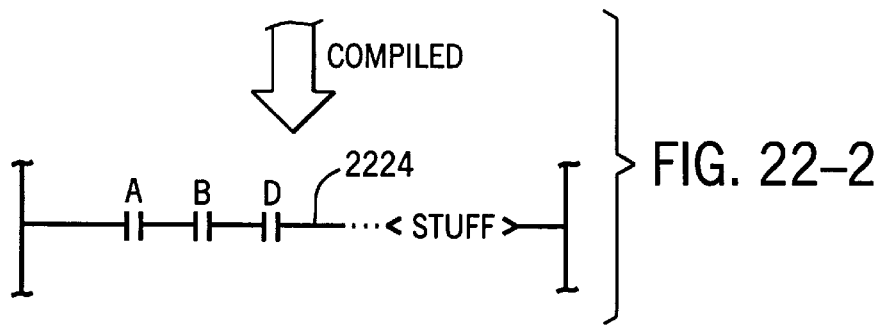
FIG. 22-2

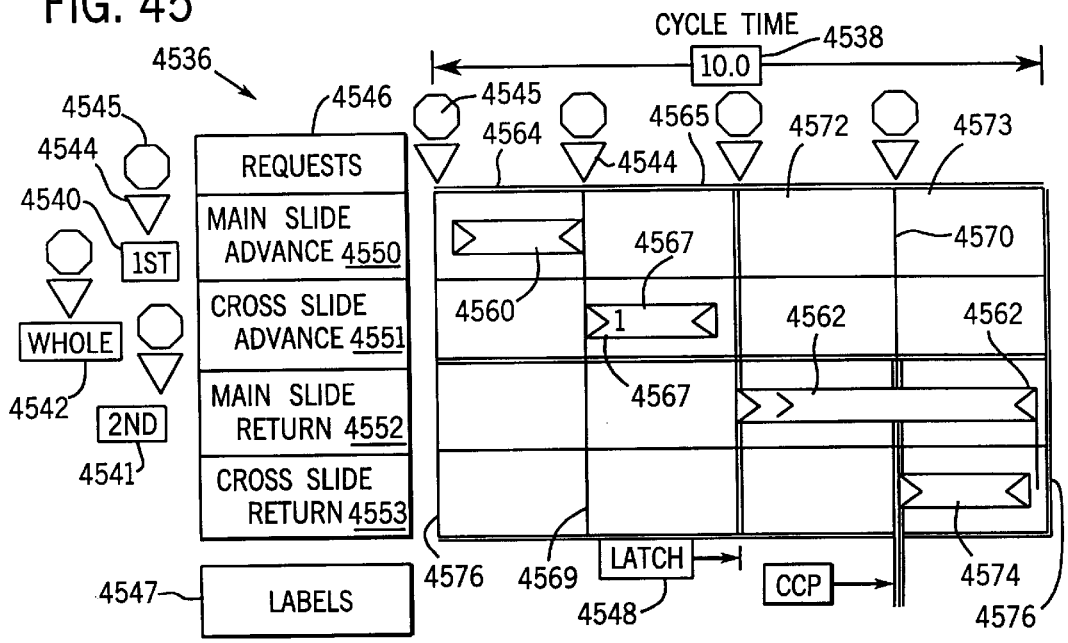
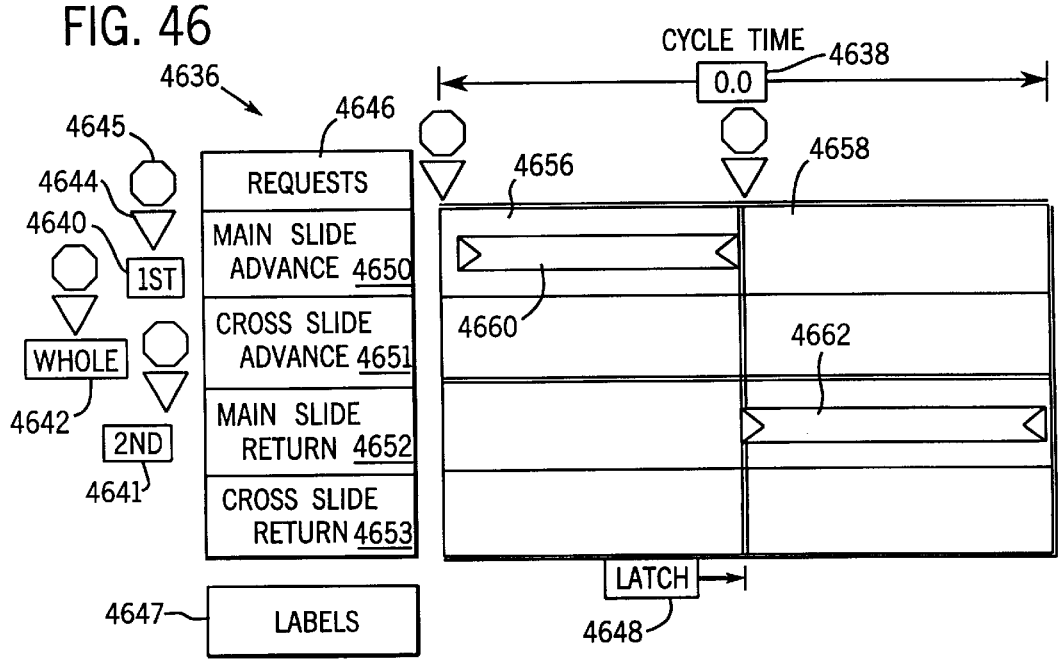

| ATTRIBUTES | A | B | C | D | E | F | G | H | I | J | K | L | M | N | O |
|---|---|---|---|---|---|---|---|---|---|---|---|---|---|---|---|
| STABLE | X | X | X | X | X | X | X | X | X | X | X | | | | |
| UNSTABLE | X | X | X | | | | | | | | | | | | |
| CANC BY OTHER | X | | | | X | X | X | | X | X | | | | | |
| CANC BY ME | | X | | | X | X | | X | X | | | | | | |
| MY HALF OF CYC | | | | | X | X | X | X | X | X | X | | | | |
| OTHER HALF | X | X | | | | | | | | | | | | | |
| POSITION | X | X | | | X | X | X | X | X | X | X | | | | |
| LATCH | | | | | | | | | | | | X | | | |
| MY START POS | | | | | | | | | | | | X | X | | |
| PUSH BUTTON | | | | | | | | | | | | | X | | |
| SAFETY | | | | | | | | | | | | | | | X |

FIG. 50

Enterprise Controls™
Designer Studio

This computer program is protected by
U.S. and International copyright laws as
described in Help About Copyright © 1998 Allen–Bradley Company

FIG. 54

SYSTEM METHOD AND ARTICLE OF MANUFACTURE FOR INTEGRATED ENTERPRISE-WIDE CONTROL

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

FIELD OF THE INVENTION

This invention generally relates to improvements in computer systems, and more particularly, to system software for managing the design, simulation, implementation and maintenance of a manufacturing enterprise.

BACKGROUND OF THE INVENTION

This invention relates to electronic programmable controllers for operating industrial equipment and visualizing the industrial environment being controlled. Electronic programmable controllers utilize a programming language to develop control programs to control industrial equipment.

Programmable controllers are well-known systems for operating industrial equipment, such as assembly lines and machine tools, in accordance with a stored program. In these controllers, a stored program is executed to examine the condition of specific sensing devices on the controlled equipment, and to energize or de-energize selected operating devices on that equipment contingent upon the status of one or more of the examined sensing devices. The program not only manipulates single-bit input and output data representing the state of the sensing and operating devices, but also performs arithmetic operations, timing and counting functions, and more complex processing operations.

One industry that extensively uses programmable controllers is the automotive industry. In the automotive industry, various automotive parts are conveyed along machine lines consisting of many consecutive workstations. Most workstations include at least one tool that performs some function to alter the characteristics of workpieces as they are delivered to the station. For example, an unfinished cast engine block that requires a plurality of holes, bores, and threads, as well as other metal-removing procedures, may be provided at the beginning of a machine line that produces finished engine blocks. The machine line may consist of any number of different stations, each station performing a different procedure on the unfinished block. An indexer in the form of a transfer bar can be arranged to move each block from one station to the next following a completed process. Typically, at each station the block would be clamped prior to any metal-removing operation.

In this type of system, a programmable controller would receive inputs from all of the various tools at all of the workstations and would provide activating output signals to synchronize machine operation. During metal-removing periods with the transfer bar out of the way, all of the tools would perform their functions. In between metal-removing periods during transfer periods, the tools would be parked, the clamps unclamped, and the transfer bar would advance workpieces from one station to the next. Industrial controllers are frequently programmed in Ladder Logic (LL) where instructions are represented graphically by "contacts" and "coils" of virtual relays connected and arranged in ladder-like rungs across power rails. LL, with its input contacts and output coils, reflects the emphasis in industrial control on the processing of large amounts of input and output data.

LL also reflects the fact that most industrial control is "real time"; that is, an ideal industrial controller behaves as if it were actually composed of multiple relays connected in parallel rungs to provide outputs in essentially instantaneous response to changing inputs. Present industrial controllers do not, in fact, employ separate parallel relay-like structures, but instead simulate the parallel operation of the relays by means of a conventional Harvard or Von Neumann-type computer processor which executes instructions one at a time, sequentially. The practical appearance of parallel operation is obtained by employing extremely fast processors in the execution of the sequential control program.

As each rung is executed, inputs represented by the contacts are read from memory (as obtained from inputs from the controlled process or the previous evaluation of coils of other rungs). These inputs are evaluated according to the logic reflected in the connection of the contacts into one or more branches within the rungs. Contacts in series across a rung represent boolean AND logic whereas contacts in different branches and thus in parallel across the rung represent boolean OR logic.

Typically a single output coil at the end of each rung is set or reset. Based on the evaluation of that rung, this setting or resetting is reflected in the writing to memory of a bit (which ultimately becomes an output to the industrial process or to another LL rung).

Once a given rung is evaluated the next rung is evaluated and so forth. In the simplest form of LL programming there are no jumps, i.e. all rungs are evaluated in a cycle or "scan" through the rungs. This is in contrast to conventional computer programming where branch and jump instructions cause later instructions or groups of instructions to be skipped, depending on the outcome of a test associated with those branch or jump instructions.

While LL is well suited for controlling industrial processes like those in the automotive industry, LL programming is not an intuitive process and, therefore, requires highly skilled programmers. Where hundreds of machine tool movements must be precisely synchronized to provide a machining process, programming in LL is extremely time-consuming. The time and relative skill associated with LL programming together account for an appreciable percentage of overall costs associated with a control system. In addition, the final step in LL programming is typically a lengthy debugging and reworking step that further adds to overall system costs.

One way to streamline any type of programming is to provide predefined language modules, expressed in a language such as LL, which can be used repetitively each time a specific function is required. Because of the similar types of tools and movements associated with different machine-line stations, industrial control would appear to be an ideal industry for such language modules.

The predefined logic module approach works quite well for certain applications, like small parts-material handling or simple machining. The reason for this is that the LL required for these applications tends to be very simple. In small parts material handling applications the I/O count is low and the interfaces between modules are minimal. In fact, the mechanisms are often independent units, decoupled from neighboring mechanisms by part buffers such that no signals are required to be exchanged between modules. These "loosely coupled" systems lend themselves to "cut and paste" programming solutions.

But the predefined, fixed logic module approach does not work well for other applications, for example metal-removing applications. There are two main reasons for this. First, there can be considerable variation in how components, such as sensors and actuators, combine to produce even simple mechanisms. Second, processes like metal removing normally requires tightly controlled interaction between many individual mechanisms. Exchanging signals called interlocks, between the control logic modules of the individual mechanism controls the interaction. The application of specific interlocks depends on knowledge of the process and the overall control strategy, information not generally needed, or knowable, when the control logic for each mechanism is defined.

For example, a drill is a typical metal-removing tool used in the automotive industry. In this example an ideal drill is mounted on a carriage that rides along a rail between two separate limiting positions on a linear axis, an advanced position and a returned position. Two limit switches, referred to herein as returned and advanced LSs, are positioned below the carriage and, when tripped, signal that the drill is in the returned and advanced positions, respectively. Two separate dogs (i.e. trigger extensions), an advanced dog and a returned dog, extend downwardly from the bottom of the carriage to trip the LSs when the advanced and returned positions are reached, respectively. In the ideal case, both LSs may be assumed to be wired in the same "normally opened" manner, so that electrically speaking they are open when released and closed when triggered. In this ideal case, where the physical characteristics of the switches are limited, a single LL logic rung can determine when the drill is in the returned position and another rung can determine when the drill is in the advanced position.

Unfortunately, in reality, there are electrically two types of LSs, one LS type being wired normally opened and the other type wired normally closed. Furthermore, any LS can be mechanically installed in a tripped-when-activated configuration, or a released-when-activated configuration. All combinations of these types are used for various types of applications. Thus, application requirements may demand control logic capable of handling any configuration of LS types.

Simple mathematics demonstrates that with two different electrical types of LSs and two mechanical configurations, there are sixteen possible configurations of a two-position linear slide. Consider the language modules required to implement position logic for all these configurations. To accommodate all sixteen-switch configurations, there could be sixteen different language modules, each containing fixed LL logic, and each named for the case it could handle. In this case, there would be duplicate logic under different names. Alternatively, four unique language modules could be provided, but then the user would have difficulty identifying which of the sixteen physical configurations that the four modules could handle.

Clearly, even for a simple drill mounted on a two position linear slide, application variables make it difficult to provide a workable library of fixed language modules. Adding more switches to the linear slide only increases, to an unmanageable level, the number of language modules required in the library.

Moreover, the contents of a complete language module for a drill must also consider other variables. These variables include, for example, the number and type of actuators required; the type of spindle, if any; whether or not a bushing plate is required; what type of conveyor is used; whether or not the drill will include an operator panel to enable local control. If an operator panel is included, what type of controls (i.e. buttons, switches and indicator lights) are required, just to name a few. Each tool variable increases the required number of unique LL modules by more than a factor of two, which makes it difficult at best to provide an LL library module for each possible drill configuration.

Taking into account the large number of different yet possible machine-line tools, each tool having its own set of variables, the task of providing an all-encompassing library of fixed language modules becomes impractical. Even if such a library could be fashioned, the task of choosing the correct module to control a given tool would probably be more difficult than programming the required LL logic from scratch.

For these reasons, although attempts have been made at providing comprehensive libraries of fixed language modules, none has proven particularly successful and much LL programming is done from scratch.

Manufacturing customers have long desired an integrated environment for generating an initial design schematic specifying a functional description of a manufacturing environment without the need for specifying product and manufacturing details. The system is provided with a designer studio that utilizes a common database of pre-architected modules to integrate a total system solution for the enterprise. The pieces of this system include design, simulation, implementation and maintenance information for both product and manufacturing.

SUMMARY OF THE INVENTION

The foregoing problems are overcome in an illustrative embodiment of the invention in which a system for designing, simulating, implementing and maintaining an enterprise solution for an enterprise is disclosed. The system includes software that controls an enterprise. The software includes one or more components for controlling one or more aspects of an industrial environment with code that creates a database of components, each of the components containing control, diagnostic and resource information pertaining to enterprise resources utilized in the industrial environment. The software system also generates code that controls resources comprising cognitive and timing information that synchronizes events throughout the enterprise. The database of components includes code that updates the database to reflect changes in the enterprise and integrates the new design, simulation, implementation and maintenance changes to optimize the manufacturing enterprise utilizing the database of components.

BRIEF DESCRIPTION OF THE DRAWINGS

The above and further advantages of the invention may be better understood by referring to the following description in conjunction with the accompanying drawings, in which:

FIG. 22 illustrates a required full set of conditions in accordance with a preferred embodiment;

FIGS. 45 & 46 illustrate bar chart images in accordance with a preferred embodiment;

FIG. 50 illustrates an attributes table in accordance with a preferred embodiment;

FIG. 54 is a splash screen in accordance with a preferred embodiment;

DETAILED DESCRIPTION

Figure 1A:
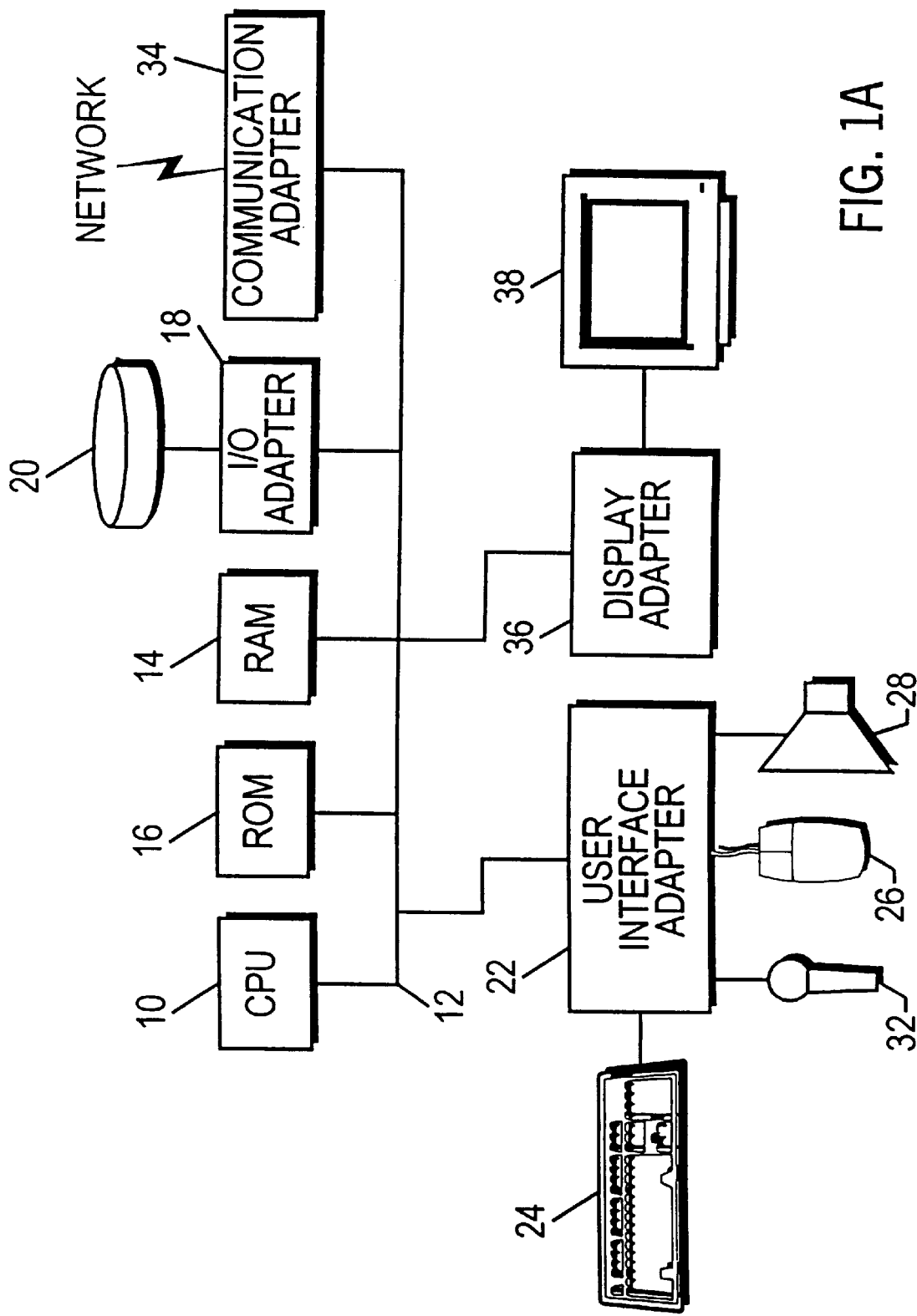
FIG. 1A is a block schematic diagram of a computer system for example, a personal computer system in accordance with a preferred embodiment.

A preferred embodiment of a system in accordance with the present invention is preferably practiced in the context of a personal computer such as an IBM, Apple Macintosh or UNIX based computer. A representative hardware environment is depicted in FIG. 1A, which illustrates a typical hardware configuration of a workstation in accordance with a preferred embodiment having a central processing unit 10, such as a microprocessor, and a number of other units interconnected via a system bus 12. The workstation shown in FIG. 1A includes a Random Access Memory (RAM) 14, Read Only Memory (ROM) 16, an I/O adapter 18 for connecting peripheral devices such as disk storage units 20 to the bus 12, a user interface adapter 22 for connecting a keyboard 24, a mouse 26, a speaker 28, a microphone 32, and/or other user interface devices such as a touch screen (not shown) to the bus 12, communication adapter 34 for connecting the workstation to a communication network (e.g., a data processing network) and a display adapter 36 for connecting the bus 12 to a display device 38. The workstation typically has resident thereon an operating system such as the Microsoft Win/95 NT Operating System (OS) or UNIX OS. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions will need to be adapted to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules that present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines will have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built, objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop that monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control. The programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows). Programmers use it by inheriting some of that default behavior and overriding other behavior so that the framework calls application code at the appropriate times. There are three main differences between frameworks and class libraries:

Behavior versus protocol. Class libraries are essentially collections of behaviors that you can call when you want those individual behaviors in your program. A framework on the other hand, provides not only behavior but also the protocol or set of rules that govern the ways in which behaviors can be combined, including rules for what a programmer is supposed to provide versus what the framework provides.

Call versus override. With a class library, the class member is used to instantiate objects and call their member functions. It is possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. HyperText Markup Language (HTML) is utilized to implement documents on the Internet together with a general-purpose secure communication protocol for a transport medium between the client and the merchant. HTML is a simple data format used to create HyperText documents that are portable from one platform to another. HTML documents are Standard Generalized Markup Language (SGML) documents with generic semantics that are appropriate for representing information from a wide range of domains. HTML has been in use by the World-Wide Web global information initiative since 1990. HTML is an application of ISO Standard 8879:1986 Information Processing Text and Office Systems; SGML.

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g. real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g. simple animations, page adornments, basic games, etc.). Applets execute within a Java-compatible browser (e.g. Netscape Navigator) by copying code from the server to client. From a language standpoint, Java's core feature set is based on C++. Sun's Java literature states that Java is basically "C++, with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in HyperText markup language (HTML) pages. ActiveX Controls work with a variety of programming languages including Microsoft Visual C++, Borland Delphi, Microsoft Visual Basic programming system and J++. ActiveX Technologies also includes ActiveX Server Framework, allowing developers to create server applications. One of ordinary skill in the art will readily recognize that ActiveX could be substituted for JAVA without undue experimentation to practice the invention.

Figure 1B:
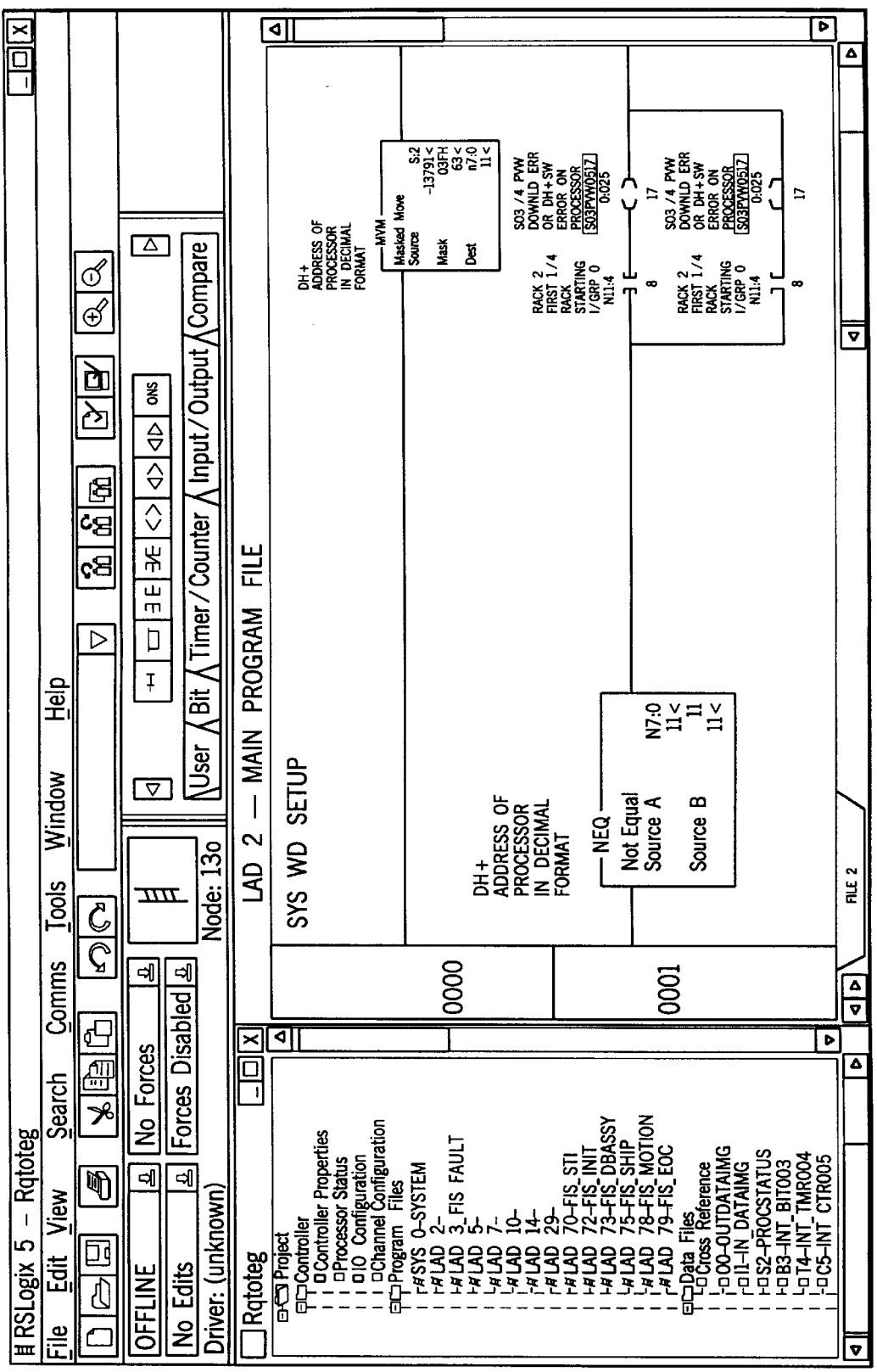
FIG. 1B provides a display of ladder logic in accordance with a preferred embodiment.

A ladder logic editor in accordance with a preferred embodiment allows a user to program and display a PLC's ladder program as illustrated in FIG. 1B. The program utilized is the RSLogix program manufactured and sold by the assignee of the subject patent. The programming tool provides a graphical user interface to facilitate rapid prototype and production of programs for execution in a PLC. Information is organized in rungs of sequential instructions organized in the shape of a ladder (ladder logic). The tool allows an operator to determine if a particular hardware entity is in a particular state and thereby allows the operator to exercise complete control over the environment. The RSLogix program tool supports traditional ladder logic and nontraditional control languages such as C, C++ and Java. It takes advantage of a current and future pool of developing control programmers and supports a large base of legacy applications. The emphasis of this tool is to improve a programmer's productivity in entering control code.

Although tools for programming a particular PLC to perform a particular task utilizing ladder logic exist, an integrated solution for designing, simulating, implementing and maintaining both product and manufacturing information across an enterprise has not existed until now. An enterprise wide solution is important to achieve important customer goals such as reducing commissioning time by allowing validation of the design before investing significant resources in implementing a design that may not address customer requirements. A preferred embodiment also provides consistent information across the enterprise without requiring redundant information. A single database is employed to capture and maintain design, simulation, implementation and maintenance information concerning the enterprise wide solution. The single database also facilitates consistent design and implementation details since changes in the product and process are stored as changes to the control are effected.

Another customer goal is to reduce downtime. This goal is addressed in accordance with a preferred embodiment by the architecture of the system. In accordance with a preferred embodiment, each component is designed with data and logic associated with various pieces of information that are critical to the operation of the component and the system. One set of information that is designed into each component is the logic and data for diagnosing problems with the component. Thus as models of the enterprise are built utilizing these components, the diagnostic system is automatically constructed based on carefully thought-out information for each of the components. Thus, as a sensor level measuring proper performance levels falls below an approved threshold, information about the particular component and the level is available with non-ambiguous data that can be communicated back to the operator to solve the problem.

Today, major manufacturers are digitally integrating their design, simulation, implementation and maintenance manually and also integrating their processes and the processes of their suppliers. They are being driven to a solution in accordance with a preferred embodiment because design and manufacturing processes of major manufacturers are complex and the scale of their operations is enormous. Complex, large scale integration requires that all design, simulation, implementation and maintenance information must be accessible digitally across an enterprise in a common format. Each enterprise design domain (e.g., part, machine, control, and diagnostic) must be modeled in a computer representation containing syntax (format of the domain representation) and semantics (meaning of the domain representation). Finally, an integrated data model in accordance with a preferred embodiment must be adhered to by the entire enterprise to establish mappings between the domains and their respective representations. The resultant solution eliminates the barriers that traditionally exist between the design and manufacturing domains.

Figure 2:
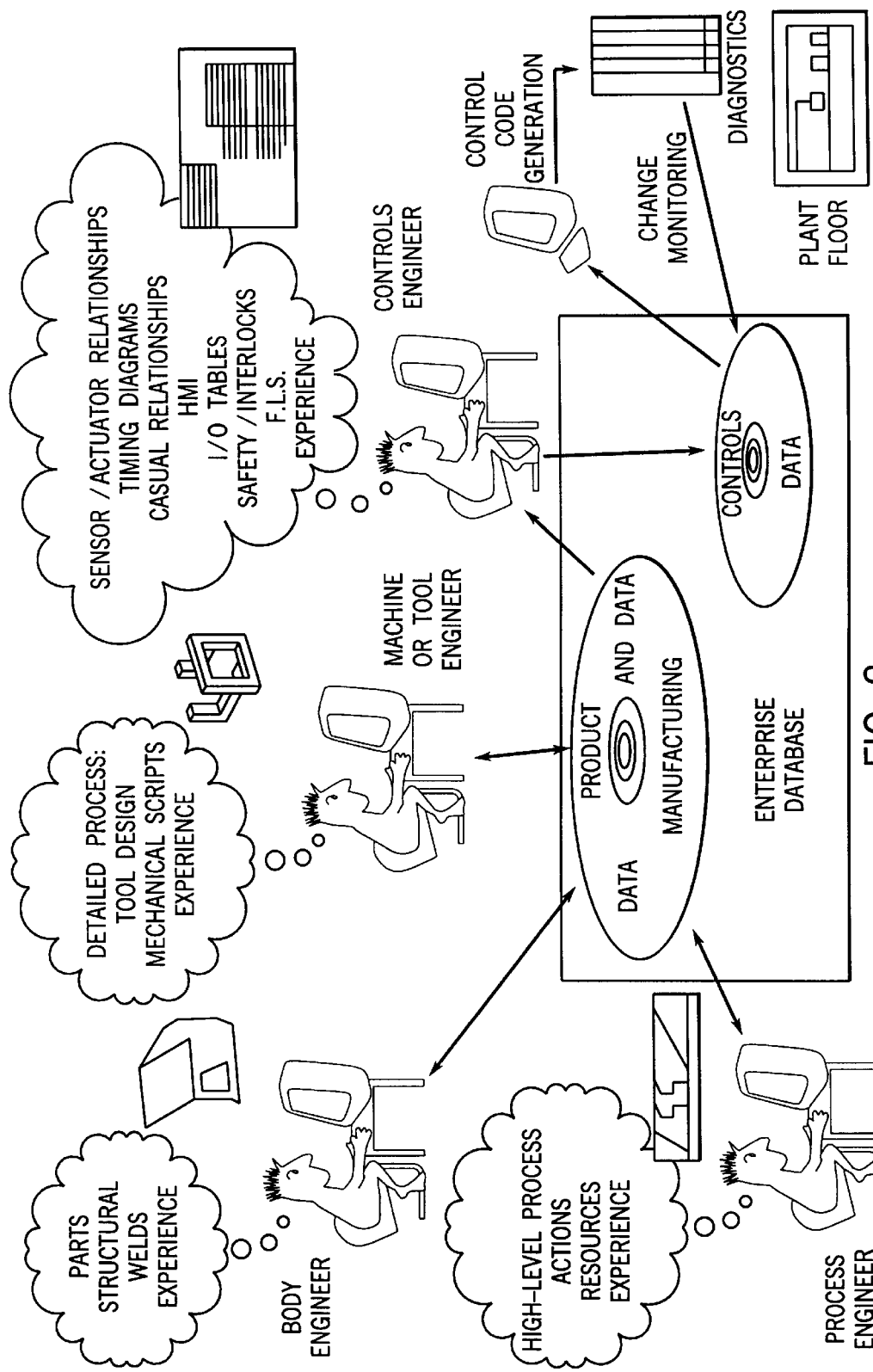
FIG. 2 illustrates an enterprise control system in accordance with a preferred embodiment.

FIG. 2 illustrates an enterprise solution in accordance with a preferred embodiment. In today's environment a body engineer designs a door assembly based on experience of parts, structural knowledge and welding information. This information is given to a machine or tool engineer to design a detailed process and tools for manufacturing the door based on other experience and existing manufacturing information. Then, the control engineer must design the sensor/actuator relationships to implement the manufacture of the door in an automated environment based on experience. Timing diagrams, causal relationships, a Human Machine Interface (HMI), input/output tables, safety and diagnostic information must be integrated into the design after the fact and control logic must be generated to execute on the PLCs to implement the manufacturing processes. Then the control environment including clamps, hydraulics, electrical, robots and transport systems must be integrated with the PLC to begin testing the feasibility of the architecture. Resultant changes and additional diagnostic information are cycled through as time marches on. Finally, the process engineer translates management numbers for finished goods into a high-level process of actions and resources based on acquired experience and provides raw materials and goals to drive the manufacturing process. Currently, without the subject invention, this process can literally take years.

Enterprise wide controls in accordance with a preferred embodiment are necessary to organize and manage the increasing amount of information necessary to facilitate effective control of machines, processes and products. Management of this information includes validation statistics for the manufacturing enterprise, diagnostics and an organizational structure that avoids redundancies to avoid storage and execution inefficiencies. Feedback of control information into the design system is also critical to maintain a current view of the enterprise at all times and to synchronize information so that all engineers are literally singing out of the same hymnal.

Enterprise wide controls construct a control system within an integrated, enterprise-wide model that reuses control assemblies from existing subscription libraries and linkages between products, processes, machine and control models. Controls, diagnostics and HMI code from the control system model database is systematic with full coverage diagnostics from the start of the process to completion. The code is always consistent with product, process, machine and control models. The enterprise wide control system generates code that is utilized to animate simulation and subsequent production displays with a graphical depiction at various levels of hierarchical detail of the enterprise. An operator can zoom in to observe particular areas based on information from the enterprise to control large parts of the enterprise from a central control station.

An Enterprise Control Database (ECDB) acts as a single repository of enterprise information containing instantaneous access to engineering bill-of-material (EBOM) data for parts and assembly of parts as well as maintaining manufacturing bill-of-material (MBOM) which tracks the finished goods inventory as it is built. Factory service records are also captured and stored in the database as they occur. Control assemblies and control components are also stored in the ECDB. Diagnostic assemblies and diagnostic components are also stored with the control system configuration (processor, racks, networks and wiring diagrams).

A control component in accordance with a preferred embodiment is a machine part that either accepts inputs from the control system and/or generates outputs to the control system. A control assembly (descriptive class) is a configuration of control components and the defined set of states the control component can attain. The control assembly generates additional machine resource requirements and requests to the mechanical design system. A schematic of each control assembly is stored in the ECDB.

A control assembly is also responsible for performing one or more actions defined as a discrete action class. For example, a class action may be an input signal that requests an action in an external word, or an input signal that confirms completion of a particular task. A class action in accordance with a preferred embodiment can appear as a bar on a barchart. A class input, often referred to by old-time control engineers as a digital input or DI could be an input signal indicative of a state in the enterprise.

For example, when a heater reaches a threshold temperature, the process can proceed. Other examples include emergency stop, part present or a mode switch. Typically, class inputs are utilized as safeties, interlocks, cycle enablers or diagnostic inputs. A class output, digital output (DO) is an output signal to the enterprise to signal information. For example, turning on a cycle complete light. These entities readily lend themselves to implementation in an object-oriented abstraction as realizable classes for use in instantiating object instances of the classes. Examples of realizable classes in accordance with a preferred embodiment include PartPresent, ControlRobot, DumpSet, PinSet and SafeBulkHeadClampSet.

Figure 3:
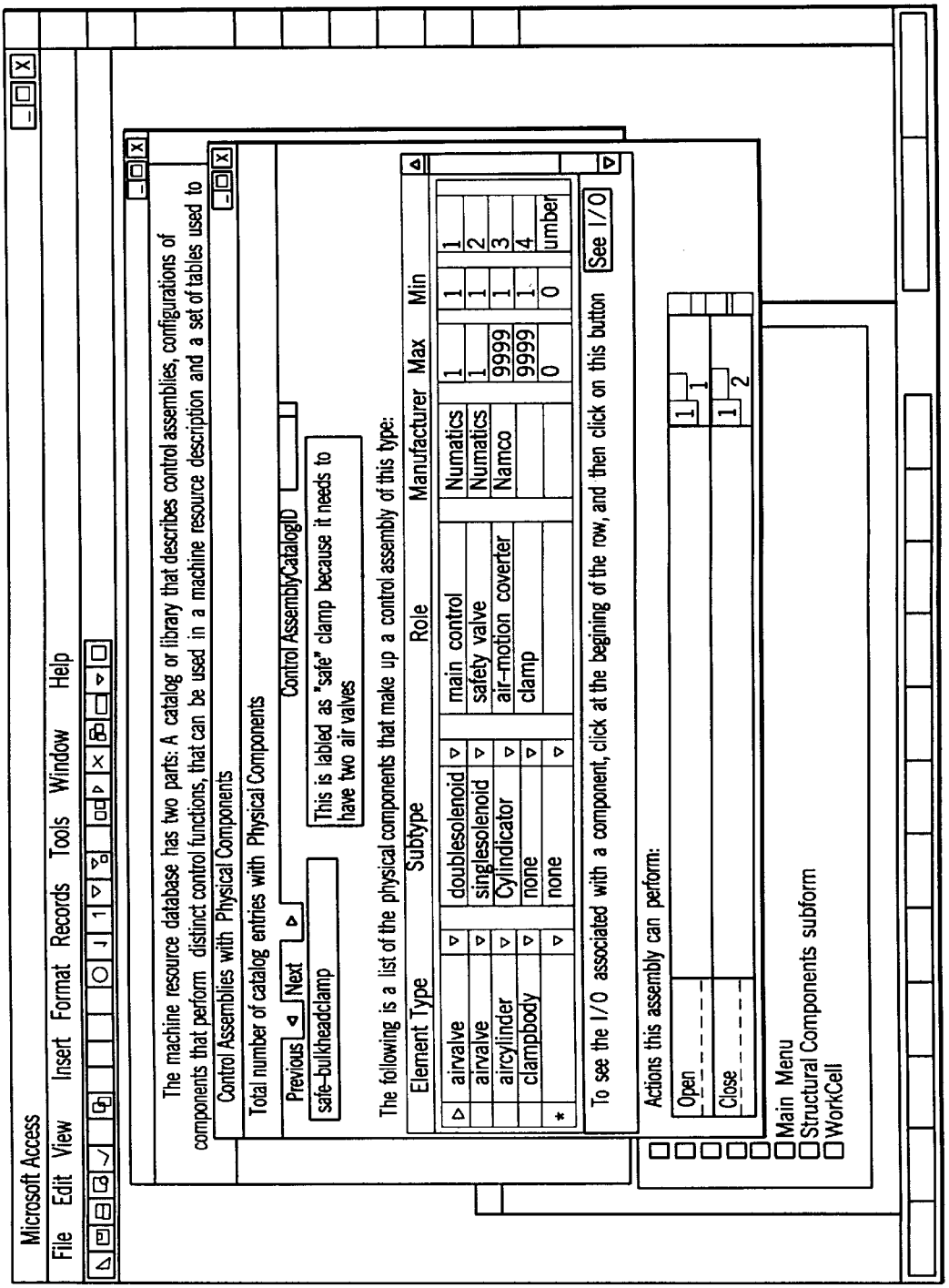
FIG. 3 illustrates a control assembly display from an enterprise control database in accordance with a preferred embodiment.

FIG. 3 illustrates a database entry for a safe-bulkheadclamp in accordance with a preferred embodiment. Each of the control valves, cylinders and other clamp information is stored in a single record completely defining the clamp and its characteristics to enable it to open and close on a target assembly effectively and safely. In addition, the database keeps track of how many catalog entries have incorporated this physical component into their design.

A diagnostic component in accordance with a preferred embodiment is an electrical, mechanical or pneumatic component that has no direct connection to the control system and is architected into the component for diagnostic purposes.

A diagnostic assembly (descriptive class) is a configuration of control components and diagnostic component in which the configuration is determined by the causal relationships that are useful for diagnostic purposes. Additional machine resource requirements may be required to generate requests to the mechanical design system.

Figure 4:
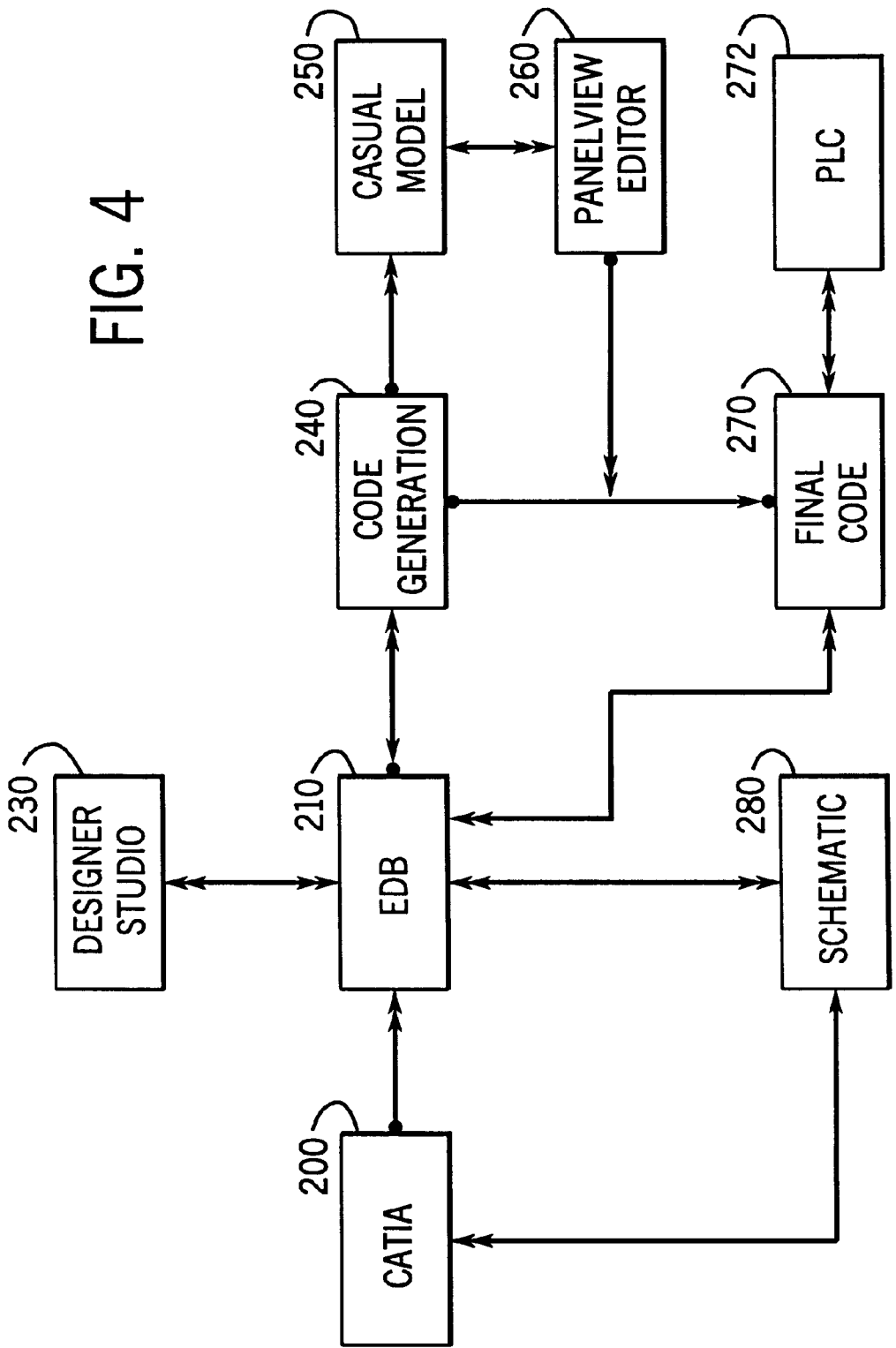
FIG. 4 is a block diagram depicting the logical flow of the enterprise control system in accordance with a preferred embodiment.

FIG. 4 is a block diagram of the enterprise system in accordance with a preferred embodiment. A CATIA design station 400 utilizes a CNEXT interface to transmit design information, activities (process steps) and resources (a description of the tooling machine) to the Enterprise Database (ECDB) 410. The design information is a picture, for example a door welding station, with robot welders, clamps, a PLC and a transport mechanism. The ECDB receives information from the CATIA CNEXT interface defining activities and resources that will be necessary to build the station.

The ECDB integrates information from the CATIA CAD package 400, Designer Studio 430, code generation 440, final code 470 and the causal model subsystem 450. The activities and information that come from the CATIA interface 400 are created by a mechanical tool designer and they omit key information that comes from the control designer.

The Designer Studio 430 completes the activity and resource information in the ECDB 410 utilizing a graphical user interface that is C++ based Java code. The key organizing concept throughout an enterprise system in accordance with a preferred embodiment is CONTROL ASSEMBLY. Control assembly refers to utilizing a component based software assembly just as hardware designers utilize chip assemblies in hardware design and manufacture. A template type building block architecture is enabled for designing and managing enterprises. Software and hardware components are cataloged in the ECDB 410 for maximal reuse of the components. The ECDB 410 is a relational database implemented in a Microsoft Access product in accordance with a preferred embodiment. One of ordinary skill in the art will readily comprehend that other databases (relational or network) could readily be substituted without undue experimentation.

Once the database is populated, then information from the database is utilized to construct a code generation data structure 440 in a tree format as described later in detail. The database is also utilized to create the causal model 450. The causal model 450 is utilized to enable system diagnostics. The causal model is a LISP knowledge base.

The causal model 450 and the code generation data structure 440 is utilized as input for the PanelView Editor to automatically generate the operator's interfacce. Old code modified to work with new interface. The PanelView Editor also generates control code in the form of ladder logic. The causal model 450 generates diagnostic ladder logic that is mixed with the control code from the code generation 440 to create the final code 470 for controlling and monitoring the enterprise. The ladder logic is downloaded to the PLC 472 for controlling the enterprise.

The relay ladder logic code for control and diagnostics are merged by multiplexor code. The PanelView Editor generates code that enables the user interface to display graphical depictions of what is happening in the process and also to display diagnostic output.

The EDCB is also used by the RSWire schematic processor 480 to create schematic depictions of the sensor environment and transmit the schematic results back to the CNEXT system in CATIA where the tool design was also performed. This architecture, in accordance with a preferred embodiment, facilitates the location of changes in the processing efficiently which streamlines location of modification locations in the stations and control logic downstream.

The output from the ECDB is also provided to a schematic detailing package (RSWire) which enables a control engineer to decide where each of the clamps on a welding machine should be and locates valves, pneumatic piping etc. on the schematic detailing. A control engineer can place the cylinders and the schematic is generated from this information for wiring, piping and/or HVAC layout. Components are predesigned that enable design of an enterprise wide control system in accordance with a preferred embodiment of the invention. Control assemblies are merely objects encapuslating data and functions for performing standard control functions. Another set of macros are architected in accordance with a preferred embodiment for wiring diagrams that are componentized.

What we do for simulation is to load the PLC code into a PLC simulator SOFTLOGIX 5 (A/B product). This is utilized to drive a CAD simulator. The PLC Simulator & CAD Simulator utilize information from the CATIA database and the ECDB in accordance with a preferred embodiment. Then, when the code has been debugged, it is downloaded to the PLC 472 for production testing and ultimately running the enterprise.

The final schematics generated by the schematic tool 480 are ultimately sent back to CATIA 400 utilizing the standard CNEXT interface. This feedback mechanism is necessary to synchronize the CATIA database with the ECDB 410. This feedback mechanism also facilitates the addition of geometry to the original CAD drawings.

The database design of the ECDB includes tables that map activities into information appearing in the tables that is imported from the existing CATIA drawings. The resource import table is called Structural Components. It is implemented in accordance with a preferred embodiment in an ACCESS database with a record of the following structure:

TABLE

StructuralComponents

Properties

Date Created: 3/6/98 11:18:49 AM
Def. Updatable: True
Last Updated: 3/30/98 2:14:37 PM
OrderByOn: True
RecordCount: 56

Columns

| Name | Type | Size |
|---|---|---|
| StructuralComponentID | Number (Long) | 4 |

AllowZeroLength: False
    Attributes: Fixed Size, Auto-Increment
    Collating Order: General
    ColumnHidden: False
    ColumnOrder: Default
    ColumnWidth: Default
    Ordinal Position: 1
    Required: False
    Source Field: StructuralComponentID
    Source Table: StructuralComponents

| ExtID | Text | 255 |
|---|---|---|

AllowZeroLength: False
    Attributes: Variable Length
    Collating Order: General
    ColumnHidden: False
    ColumnOrder: Default
    ColumnWidth: 8268
    Description: unique id for this spatial component
    DisplayControl: Text Box
    Ordinal Position: 2
    Required: False
    Source Field: ExtID
    Source Table: StructuralComponents

| Label | Text | 50 |
|---|---|---|

AllowZeroLength: False
    Attributes: Variable Length
    Collating Order: General
    ColumnHidden: False
    ColumnOrder: Default
    ColumnWidth: 1620
    Description: label to show on graphic renditions of this component
    DisplayControl: Text Box
    Ordinal Position: 3
    Required: False
    Source Field: Label
    Source Table: StructuralComponents

| Class | Text | 50 |
|---|---|---|

AllowZeroLength: False
    Attributes: Variable Length
    Collating Order: General
    ColumnHidden: False
    ColumnOrder: Default
    ColumnWidth: 1545
    Description: class of spatial components to which this instance belongs - determines what types of control components can be in this spatial component
    DisplayControl: Text Box
    Ordinal Position: 4
    Required: False
    Source Field: Class
    Source Table: StructuralComponents

| WorkCellID | Number (Long) | 4 |
|---|---|---|

AllowZeroLength: False
    Attributes: Fixed Size
    Bound Column: 1
    Caption: WorkCell
    Collating Order: General
    Column Count: 1
    Column Heads: False
    Column Widths: 1440
    ColumnHidden: False
    ColumnOrder: Default
    ColumnWidth: 1140
    Decimal Places: Auto
    DefaultValue: 0
    Description: workcell that this component is part of - either this field or the next one is mandatory
    DisplayControl: Combo Box
    Limit To List: False
    List Rows: 8
    List Width: 1440twip
    Ordinal Position: 5
    Required: False
    Row Source Type: Table/Query
    Row Source: SELECT DISTINCTROW [WorkCell].[WorkCellID] FROM [WorkCell];
    Source Field: WorkCellID
    Source Table: StructuralComponents

| PartOf | Text | 255 |
|---|---|---|

AllowZeroLength: False
    Attributes: Variable Length
    Collating Order: General
    ColumnHidden: False
    ColumnOrder: Default
    ColumnWidth: 5985
    Description: other spatial component that this component is part of - if this field is 0, it is a top level component
    DisplayControl: Text Box
    Ordinal Position: 6
    Required: True
    Source Field: PartOf
    Source Table: StructuralComponents Comment Memo AllowZeroLength: False
    Attributes: Variable Length
    Collating Order: General
    ColumnHidden: False
    ColumnOrder: Default
    ColumnWidth: Default
    Ordinal Position: 7
    Required: False
    Source Field: Comment
    Source Table: StructuralComponents

Relationships

Reference26
        StructuralComponentsControlAssemblyInstance
            StructuralComponentID StructuralComponentID
        Attributes: Not Enforced
        Attributes: One-To-Many
    Reference27
        StructuralComponents PCCInstanceElements
            StructuralComponentID StructuralComponentsID
        Attributes: Not Enforced
        Attributes: One-To-Many

Table Indexes

| Name | Number of Fields |
|---|---|
| PrimaryKey | 1 |

Clustered: False
    Distinct Count: 56
    Foreign: False
    Ignore Nulls: False
    Name: PrimaryKey
    Primary: True
    Required: True
    Unique: True
    Fields: StructuralComponentID, Ascending

| SpaceComponentID | 1 |
|---|---|

Clustered: False
    Distinct Count: 56
    Foreign: False
    Ignore Nulls: False
    Name: SpaceComponentID
    Primary: False TABLE-continued StructuralComponents

| | | |
|---|---|---|
| Required: | False | |
| Unique: | False | |
| Fields: | ExtID, Ascending | |
| StructuralComponentsID | | 1 |
| Clustered: | False | |
| Distinct Count: | 56 | |
| Foreign: | False | |
| Ignore Nulls: | False | |
| Name: | StructuralComponentsID | |
| Primary: | False | |
| Required: | False | |
| Unique: | False | |
| Fields: | StructuralComponentID, Ascending | |
| WorkCellID | | 1 |
| Clustered: | False | |
| Distinct Count: | 1 | |
| Foreign: | False | |
| Ignore Nulls: | False | |
| Name: | WorkCellID | |
| Primary: | False | |
| Required: | False | |
| Unique: | False | |
| Fields: | WorkCellID, Ascending | |

User Permissions

ACR
admin
ALA
ALA2
BJB
CPI

Group Permissions

Admins
Guests
LETTERS
MODIFY
READ ONLY
REPAIR
Users

TABLE

ControlAssemblyCatalog

Properties

Date Created: 10/22/97 1:25:38 PM
Def. Updatable: True
Description: CUnit stands for "control unit"
Last Updated: 3/30/98 1:45:32 PM
  These are the generic types of
  assemblies that are relevant for
  control. The description only
  specifies how to interact with
  assembly from a control standpoint;
  it doesn't say how the instance will
  be used.
OrderByOn: False
RecordCount:
Columns

| Name | Type | Size |
|---|---|---|
| ControlAssemblyCatalogID | Number (Long) | 4 |
| AllowZeroLength: | False | |
| Attributes: | Fixed Size, Auto-Increment | |
| Collating Order: | General | |
| ColumnHidden: | False | |
| ColumnOrder: | Default | |
| ColumnWidth: | 1092 | |
| Description: | unique identifier for the component structure | |

TABLE-continued

ControlAssemblyCatalog

| | |
|---|---|
| Ordinal Position: | 1 |
| Required: | False |
| Source Field: | ControlAssemblyCatalogID |
| Source Table: | ControlAssemblyCatalog |
| Label Text 25 | |
| AllowZeroLength: | False |
| Attributes: | Variable Length |
| Collating Order: | General |
| ColumnHidden: | False |
| ColumnOrder: | Default |
| ColumnWidth: | Default |
| Description: | human readeable name for the component structure |
| DisplayControl: | Text Box |
| Ordinal Position: | 2 |
| Required: | False |
| Source Field: | Label |
| Source Table: | ControlAssemblyCatalog |
| DecompositionType Text 50 | |
| AllowZeroLength: | False |
| Attributes: | Variable Length |
| Bound Column: | 1 |
| Collating Order: | General |
| Column Count: | 1 |
| Column Heads: | False |
| Column Widths: | 1440 |
| ColumnHidden: | False |
| ColumnOrder: | Default |
| ColumnWidth: | 1944 |
| Description: | whether this assembly can be broken down into discrete components or whether it is a single object like a robot or a PanelView. |
| DisplayControl: | Combo Box |
| Limit To List: | False |
| List Rows: | 8 |
| List Width: | 1440twip |
| Ordinal Position: | 3 |
| Required: | False |
| RowSourceType: | Value List |
| Row Source: | "Virtual";"Physical";"Programmable" |
| Source Field: | DecompositionType |
| Source Table: | ControlAssemblyCatalog |
| TemplateType Text | 50 |
| AllowZeroLength: | False |
| Attributes: | Variable Length |
| Collating Order: | General |
| ColumnHidden: | False |
| ColumnOrder: | Default |
| ColumnWidth: | 1890 |
| Description: | Polaris template type to use with this element |
| DisplayControl: | Text Box |
| Ordinal Position: | 4 |
| Required: | False |
| Source Field: | TemplateType |
| Source Table: | ControlAssemblyCatalog |
| Comment Memo | |
| AllowZeroLength: | True |
| Attributes: | Variable Length |
| Collating Order: | General |
| ColumnHidden: | False |
| ColumnOrder: | Default |
| ColumnWidth: | 6012 |
| Description: | a brief comment on the use of the control assembly - should fit into 2 or 3 lines |
| Ordinal Position: | 5 |
| Required: | False |
| Source Field: | Comment |
| Source Table: | ControlAssemblyCatalog |
| Explanation Memo | |
| AllowZeroLength: | False |
| Attributes: | Variable Length |
| Collating Order: | General |
| ColumnHidden: | False |
| ColumnOrder: | Default |

TABLE-continued

ControlAssemblyCatalog

| | |
|---|---|
| ColumnWidth: | Default |
| Description: | a longer comment about properties of the assembly |
| Ordinal Position: | 6 |
| Required: | False |
| Source Field: | Explanation |
| Source Table: | ControlAssemblyCatalog |

Relationships

Reference1
    ControlAssemblyCatalog    DCCElements
        ControlAssemblyCatalogID
        ControlAssemblyCatalogID
    Attributes:    Not Enforced
    Attributes:    One-To-Many
Reference11
    ControlAssemblyCatalog    DCCActions
        ControlAssemblyCatalogID
        ControlAssemblyCatalogID
    Attributes:    Not Enforced
    Attributes:    One-To-Many
Reference2
    ControlAssemblyCatalog    DCCElements
        ControlAssemblyCatalogID
        ControlAssemblyCatalogID
    Attributes:    Not Enforced
    Attributes:    One-To-Many
Reference6
    ControlAssemblyCatalogControlAssemblyInstances
        ControlAssemblyCatalogID
        ControlAssemblyCatalogID
    Attributes:    Not Enforced
    Attributes:    One-To-Many Table Indexes

| Name | Number of Fields |
|---|---|
| PrimaryKey | 1 |
|   Clustered: | False |
| Distinct Count: | 19 |
|   Foreign: | False |
|   Ignore Nulls: | False |
|   Name: | PrimaryKey |
|   Primary: | True |
|   Required: | True |
|   Unique: | True |
|   Fields: | ControlAssemblyCatalogID, Ascending |

User Permissions

ACR
  admin
  ALA
  ALA2
  BJB
  CPI

Group Permissions

Admins
  Guests
  LETTERS
  MODIFY
  READ ONLY
  REPAIR
  Users

Code Generation 240 is performed by a system which builds a SmallTalk tree that is organized via a template file. The organization and logic associated with this processing is presented in detail below in a section entitled Template Language. A template architecture facilitates descriptions of discrete part manufacture. Transfer Machine templates are types that are encapsulated with data and logic associated with the templates. Template is not an object but a specification for transfer machine. Information organized in a tree structure.

TM1—All transfer machines will have some level of indexes. Modular list of type indexers—conveyers, transfers, shuttles, . . .

TM2—Master control panel—push buttons etc.

TM2—Transfer Machine Tree for generating according to rules For Machines, batch (cookie)

Because of understanding of Discrete parts manufacture, a generic model results that allows the granularity and modularity to be architected and organized in a structure that works well for diagnostics. The architecture lends itself to adding diagnostics in a modular. Key to the diagnostics is the system provides a structured environment that lends itself to modular diagnostics which are tied to the individual components in a logical manner. This allows a designer to have diagnostics architected into the actual components.

Business Model utilizes a simulation to represent real world activities in a componentized fashion. Utilize a well defined interface (API) to obtain information &/or modify the real world. Export the interface as an OLE interface. They are defining the interface now. However, to utilize it today, they use Smalltalk and send strings in the OLE interface representative of Smalltalk commands.

Instead of commands to the existing system via scripts, there will be an architected API to the business model. Create an object of discrete axis made up of XYZ component. Builds a tree, builds an access model and sends commands to build the code. Sending commands instead of a text string that is interpreted. With the template library, a user can add components. Sometimes the new component will need some definition to be added on the fly.

The Causal Model Structure 250 is an expert system that relates generally to discrete event control systems that control the operation of an automated machine, and more particularly to a system and method for developing diagnostic rules by observing the behavior of the machine and for using the diagnostic rules to detect malfunctions in the behavior of the machine.

Discrete event control systems, such as an automated industrial control system, generally control a machine having a large number of components (e.g., sensors and actuators), which may malfunction due to transient errors and other hard or soft failures. Because of the immense number of possible failure points in the machine, attempts have been made to provide control systems that automatically diagnose the malfunction and pinpoint the failure point, thus reducing costly down-time of the industrial plant.

Known systems have approached the diagnostic problem with varying success. For example, the diagnostic engines of prior art systems often are based on state-machine models that can detect only certain hard failures. Thus, transient errors and the erroneous occurrence of events are not diagnosed and predictions of malfunctions are not feasible. Further, such diagnostic engines often must be explicitly programmed. Or, if the engine is capable of autonomously learning the behavior of a machine, the learning session often is based on data gathered while the machine is operating in one machine state, in a fixed environmental condition, and at the beginning of the life of the machine. Accordingly, real-time changes in the behavior of the machine, that may be due to environmental conditions or the natural wear and aging process, are often erroneously diagnosed as malfunctions. To be able to take the various operating conditions into account, the diagnostic engine must either undergo a lengthy reprogramming process or be subjected to a new learning session.

Prior art systems also generally are incapable of discerning the optimum state-machine model to use for developing the rules to diagnose the behavior of the machine. For example, the state-machine model will include a number of known sequential and temporal patterns that indicate the proper occurrences of the various discrete events associated with the manufacturing process. The diagnostic engine, however, may indiscriminately develop diagnostic rules based on these patterns. Thus, a particular rule may be based on a pattern corresponding to a known causal relationship between events, a pattern including a sequence of a large number of discrete events, or a pattern including a long time interval between discrete events. Each of these scenarios presents disadvantages and inefficiencies. In particular, restraining diagnostic rules to known causal relationships prevents the engine from selecting non-intuitive timing patterns that may produce simpler, more efficient rules. Moreover, a long sequential pattern necessitates the use of a larger amount of memory to store the occurrences of the multiple discrete events in the pattern and consumes more computing power, while a rule based on a long temporal pattern may result in a tardy diagnosis of a machine malfunction. Further, known diagnostic engines typically are not capable of determining the minimum number of patterns necessary to adequately diagnose the machine's behavior and predict malfunctions or of judging which patterns provide the most reliable indicators of the machine's health.

Accordingly, it would be desirable to develop a versatile diagnostic engine for discrete event control systems capable of discriminately developing diagnostic rules for diagnosing the behavior of an automated machine. The diagnostic engine would not be restricted by known causal relationships and, thus, could autonomously select and learn the optimum discrete event patterns for reliably diagnosing and predicting the behavior of the machine. Moreover, the diagnostic engine would be capable of automatically adapting to changed operating conditions of the machine, such as environmental variations, modifications to the machine, wear and aging of the machine, and different machine states.

The present invention comprises a system and method for developing diagnostic rules that are based on discrete event timing patterns that occur during operation of the machine. The system and method further evaluate the occurrences of the discrete events relative to the diagnostic rules to identify malfunctions in the behavior of the machine.

According to a first embodiment of the invention, a system and method for developing diagnostic rules for diagnosing the behavior of a machine is provided. The system and method include a plurality of control elements which cooperate to perform at least one discrete event process and which are configured to transition between at least two different states. Each state transition represents a discrete event in the process, and the occurrence of each discrete event is communicated to a main controller. The main controller is configured to detect a timing pattern in the occurrence of the discrete events, which includes a trigger event, a result event, and a time interval between the trigger and result events. A diagnostic rule is then defined based on a statistical analysis of repetitions of the timing pattern. The diagnostic rule is then updated in real time based on a detected change in the timing pattern.

According to one aspect of the invention, the statistical analysis includes calculating a mean time interval between the trigger and result events and a standard deviation from the mean time interval. A diagnostic rule is defined based on the statistical analysis if the timing statistics satisfy certain defined criteria. For example, a rule may be defined if the magnitude of the ratio of the standard deviation to the mean time interval is less than a predetermined maximum magnitude. Alternatively, the diagnostic rule may be defined if the duration of the mean time interval is less than a predetermined maximum duration.

In another aspect of the invention, a diagnostic rule may be replaced due to a detected change in the timing pattern. For example, the main processor may detect a change in which the result event follows a different trigger event. This change in effect creates a new timing pattern. If the standard deviation associated with the new timing pattern is smaller than the standard deviation associated with the original timing pattern, the main processor will replace the original diagnostic rule with the new rule.

Alternatively, a machine has a first machine state for performing a first discrete event process and a second machine state for performing a second discrete event process. The main processor looks for a timing pattern common to at least both machine states and then defines a diagnostic rule based on the common timing pattern.

In another embodiment, a plurality of control modules are coupled to a communication link to communicate the occurrences of the discrete events to a main processor. Each of the control modules is configured to detect state transitions of at least one of the control elements. In anther aspect, a method for diagnosing the behavior of a machine configured to perform a discrete event process is disclosed. A plurality of control elements are configured to transition between at least two states. The occurrence of each state transition, which represents a discrete event in the process, is communicated to a main processor via a communications link. The main processor is configured to detect in real time a timing pattern in the occurrences of the discrete events, including a trigger event, a result event, and a time interval between the trigger and result events. A diagnostic rule is then defined based on a real-time statistical analysis of repetitions of the timing patterns. Occurrences of the discrete events are evaluated in real time relative to the diagnostic rule to identify whether a malfunction in the machine's behavior is present.

Automated control systems, such as are used in manufacturing plants, are often used to control an industrial machine comprising a large number of sensors and actuators which cooperate to perform a dynamic process, such as a manufacturing or assembly process. As the automated system runs, the sensors and actuators (i.e., "control elements") transition between states in repetitive sequential, and oftentimes temporal, patterns. For example, in an automated system which controls a machine, such as an automated assembly line, a proximity sensor will transition between states, indicating the presence of an object (e.g., an empty bottle). Some time interval after this event, an actuator will transition between states, indicating, for instance, the initiation of an operation on the object (e.g., filling the bottle with a liquid). Next, a photodetector sensor will transition between states, indicating that the bottle is full. If the assembly line is functioning properly, the timing relationships between these discrete events will be quite regular. If, however, any component of the system malfunctions, the regular timing patterns will be disrupted. Accordingly, these regular timing patterns can provide reliable behavioral indicators useful for diagnosing the machine's health.

However, these timing patterns may vary over the life of the machine because of environmental factors, modifications of the machine, normal wear on the components, and other variables. Moreover, the timing patterns may vary depending on the state of the machine. For example, in the above-described scenario, the same assembly line may be used to fill both large bottles and small bottles. As another example, the conveyor speed may change from one state to the next. Accordingly, a variation in the duration of the time interval between initiating and completing the injection of the bottle with fluid will necessarily exist but will not be indicative of a malfunction. The present invention provides a system and method for diagnosing the machine's behavior which are capable of adapting to such operational changes. In accordance with this system and method, diagnostic rules are discriminately defined, selected, and updated based on the observation of the machine's discrete event timing patterns.

Figure 5A:
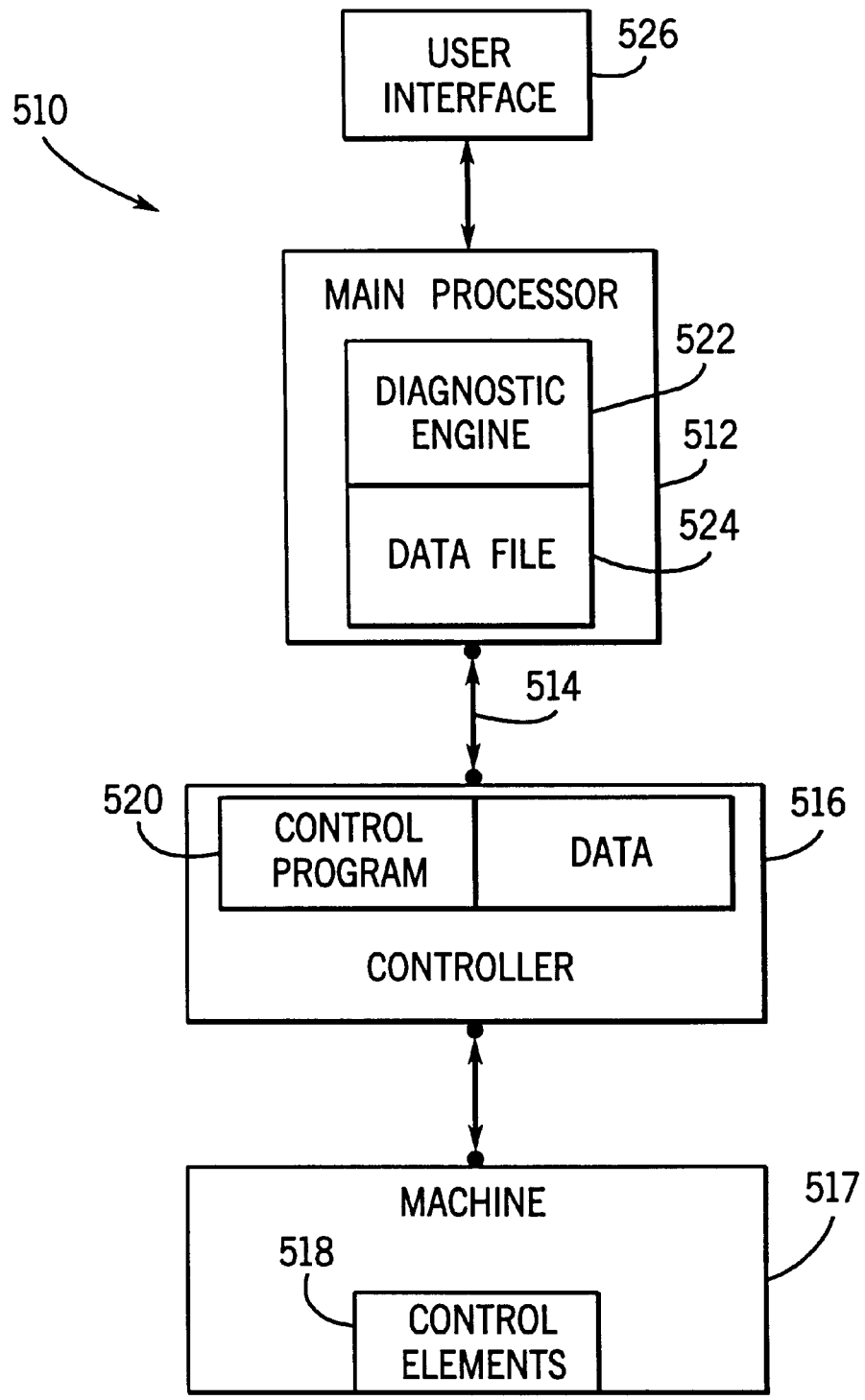
FIG. 5a is a block diagram schematic representing a system including a diagnostic engine for diagnosing the behavior of a machine controlled by a discrete event control system in accordance with a preferred embodiment of the present invention.

Referring now to FIG. 5a, a block diagram representation of a system 510 according to a preferred embodiment of the invention is illustrated. System 510 includes a main processor 512, a communication link 514, a controller 516, and a machine 517 which comprises a plurality of control elements 518. Control elements 18 include a plurality of sensors and actuators which cooperate to perform a dynamic, discrete event manufacturing process. A control program, which is stored in a memory 520 of controller 516 and executed by the controller's processor (not shown), governs the manufacturing process during which control elements 518 transition between states in a deterministic sequence as a result of the flow of materials or parts.

Each state change of a control element 518 is a discrete event that is detected by controller 516 and stored as data in its memory 520. For example, in the preferred embodiment, controller 516 is a programmable logic controller, such as a PLC-5 available from Allen-Bradley Company of Milwaukee, Wis., which is programmed to periodically scan the control elements 518 to determine their respective states. Controller 516 then compares the state of each element to the value of its state on the previous scan. A state change represents the occurrence of a discrete event, and a list of discrete events is accumulated in memory 520. Controller 516 reports the discrete events to main processor 512 via communication link 514, which comprises, for example, copper conductors, an RF link or other types of links suitable for conveying digital data.

In the preferred embodiment, main processor 512 is embodied in a general purpose personal computer and includes, for example, a microprocessor and a memory for storing a diagnostic engine 522 and a data file 524. Alternatively, main processor 512 may be incorporated within controller 516. System 510 further includes a user interface 526 which may include a display (e.g., the personal computer's CRT or LCD display, or a peripheral display device) and a separate display memory for providing for the output of text and graphics from main processor 512, a keyboard allowing for the entry of alphanumeric characters to processor 512, and a mouse that facilitates the manipulation of graphical icons which appear on the display.

The user interface 526 preferably resides on a software enabled display including a variety of control windows, data display windows, and dialogue boxes. For example, the control windows and dialogue boxes may include icons and text which aid in configuring system 510. The data display windows may be used to display the occurrences of discrete events in a graphical format. Further, existing and active rules may be displayed in either in a graphical or tabular format. Malfunctions may also be displayed graphically or, alternatively, symbolically or as a text message in a dialogue box.

Referring still to FIG. 5a and as is well known in the art, processor 512 may further include various driver and interface circuitry (not shown) to manage the flow of data on communication link 514. For example, the discrete event data reported from controller 516 is conveyed to data file 524 through the driver and interface circuitry. The discrete event data in file 524 may then be passed to diagnostic engine 522. The cognitive engine 522 preferably is a software program which can operate in either a learning mode or a diagnosing mode. During learning, engine 522 is configured to analyze the discrete event data in order to define diagnostic rules, and, during diagnosing, engine 522 evaluates the behavior of machine 517 relative to the diagnostic rules. The cognitive engine 522 may define rules and evaluate behavior in real-time or, alternatively, the discrete event data may be stored in the memory of processor 512, or written to a data storage disk (not shown), for off-line learning of diagnostic rules or evaluation of the machine's behavior by diagnostic engine 522.

Learning Diagnostic Rules

During a learning mode, diagnostic engine 522 observes the occurrences of the discrete events to find repetitive sequences of events which occur in a consistent timing pattern. Each timing pattern preferably consists of two discrete events (i.e., a trigger event and a result event) and a time interval between the two events, although diagnostic engine 522 is not prohibited from selecting timing patterns which include more than two discrete events. The diagnostic engine 522 then defines diagnostic rules based on a statistical analysis of the repetitive timing patterns, compares existing rules to newly defined rules to determine the optimum rules for evaluating the machine's behavior, and updates the existing rules by either updating the statistical analysis based on further repetitions of the timing pattern or replacing the existing rules with better diagnostic rules.

Figure 5B:
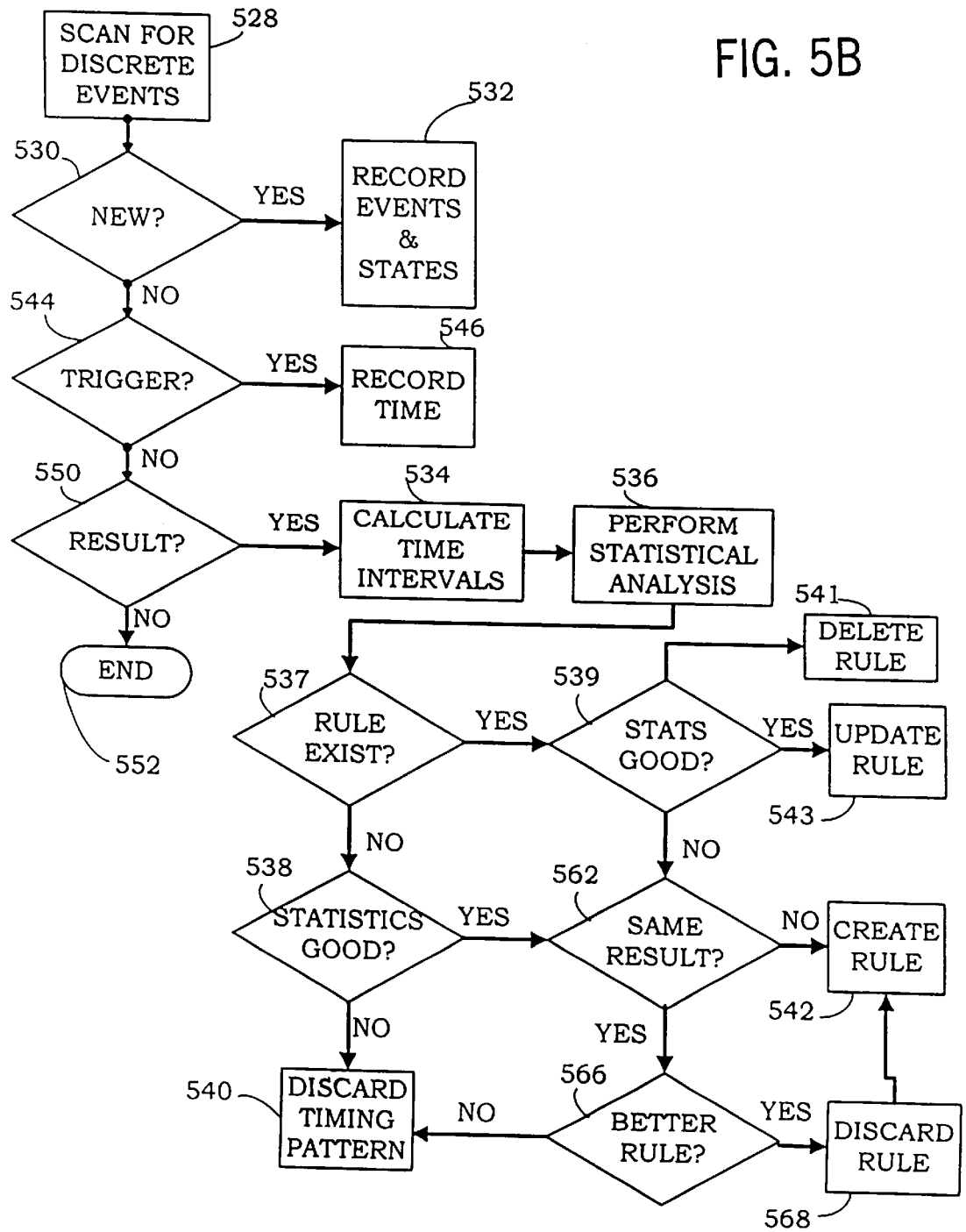
FIG. 5b is a flow chart representing exemplary steps for defining, updating and selecting the optimum diagnostic rules for the system of FIG. 5a while the diagnostic engine is in the learning mode.

The various steps involved in obtaining and analyzing the discrete event data for rule learning are illustrated in the flow chart of FIG. 5b. In the preferred embodiment, as discussed above, the scan is performed by controller 516 (block 528). However, in alternative embodiments the scan may be performed by other elements of system 510, such as main processor 512. In any event, and regardless of whether reported in real-time or read from memory or disk during an off-line analysis, the occurrences of discrete events are communicated to diagnostic engine 522, which then determines whether the discrete event has been previously detected (block 530) and whether the discrete event is a trigger event for any existing rules (block 544), is a potential or established result event for any rules (block 550), or is an event which has been eliminated as a candidate for a potential rule (block 552). The first time a discrete event is detected, it is recorded as an expected event in a file stored in memory of main processor 512. The state of control elements which never experience a discrete event (i.e., do not transition between states) are also stored in this file. During diagnosis, engine 522 may reference this file to identify malfunctions if the occurrence of a discrete event or a state of a control element has been detected that was not previously logged as an expected event.

Returning to FIG. 5b, if the detected discrete event is a trigger event of any existing rules, then the event's time of occurrence is recorded (block 546). Otherwise, if the discrete event can be a result event for any rules (block 550), then diagnostic engine 522 determines the timing interval between the discrete event and all possible trigger events (block 534). A statistical analysis is then performed (block 536) which involves incrementally calculating a mean time interval between trigger and result events and a standard deviation about the mean time interval as further repetitions of trigger/result timing patterns are detected.

Next, if a particular trigger/result timing pattern does not correspond to an existing rule (block 537), then the timing statistics of the pattern are evaluated to determine whether the timing pattern is adequate to define a new diagnostic rule (block 38). In the preferred embodiment, a minimum of three repetitions of the timing pattern must be observed before the timing statistics can be evaluated to provide the basis for a diagnostic rule, although clearly a greater number of repetitions would be desirable. Further, if a machine is capable of operating somewhat differently at some times than others (e.g., a conveyor system in which palates are randomly merged from two conveyor lines), the timing statistics will not be sufficient until diagnostic engine 522 has experienced the different operational situations.

Various criteria, or combinations of the criteria, may be used to evaluate the timing statistics. For example, a timing pattern having a mean time interval or a standard deviation that is longer than the cycle time of the manufacturing process will not provide the basis for a useful diagnostic tool. Further, examining the magnitude of the standard deviation and/or the ratio of the standard deviation to the mean time interval may reveal that a resulting diagnostic rule will not be sufficiently precise. If the evaluation criteria are not met (e.g., the mean time interval, the standard deviation, and/or their ratio are too large), then the timing pattern will be discarded as a candidate for a diagnostic rule (block 540), and the timing pattern's discrete events may even be tagged such that they are eliminated as potential candidates for any rules. If, however, the criteria are met and the pattern's result event is not already a result event in an existing rule (block 562), then a diagnostic rule will be defined using the timing statistics of that timing pattern (block 542), thus dictating the timing relationship between the trigger and result events.

As will be explained in more detail below, the diagnostic rules preferably are symmetric rules. That is, the trigger and result events each must occur within an error band about the mean time interval of the other. The error band, which may either be fixed or selectable by a user, is a multiple of the standard deviation and, preferably, is five times the standard deviation.

Once the diagnostic rules are defined, they are either retained or enter a rule competition, as will be explained in detail below. If the rules are retained, they may be updated continuously, including replacement, during the learning process based on the incremental accumulation of timing statistics from further repetitions of the timing patterns. As illustrated in FIG. 5b, if a timing pattern occurs that corresponds to an existing diagnostic rule (block 537), the accumulated timing statistics for the pattern are evaluated using the criteria discussed above (block 539). If the accumulated statistics for the rule no longer meet the evaluation criteria, then the rule may be discarded (block 541). If, however, the accumulated statistics are good, then the statistics of the rule are updated to reflect the further repetitions of the associated timing pattern (block 543).

The evaluation criteria applied in blocks 538 and 539 may also provide a basis for rating the merit of timing patterns and existing diagnostic rules. For example, rather than discarding an existing rule if the timing statistics do not meet the criteria, the rule may merely be deactivated. In such a case, the rule remains in existence and is a candidate for activation if its future accumulated timing statistics meet the evaluation criteria. Alternatively, if an existing rule's timing statistics fail to satisfy the evaluation criteria by a wide margin, then the rule may not only be discarded, but also tagged as a rule that should never be considered again. Likewise, if a timing pattern's statistics fail to satisfy the criteria by a wide margin, then future occurrences of the pattern, or even one or all of the discrete events associated with the pattern, may be ignored.

A detected break or inconsistency in a timing pattern also warrants removal of the timing pattern or the corresponding rule from further consideration. For example, a timing pattern or rule may be discarded either if its result event occurs without the prior occurrence of its corresponding trigger event (not shown); or if the rule's trigger event occurs a second time without the intervening occurrence of its corresponding result event (not shown); or if a machine state ends after a trigger event has occurred but before its corresponding result event occurs (not shown). Any of these exemplary breaks in a timing pattern indicates that a rule based on that timing pattern will not provide a consistently reliable indicator of the machine's behavior.

Rule Competition

To minimize memory requirements and optimize the computing efficiency of main processor 512, it is preferable to select only a minimum number of timing patterns. The selected timing patterns should also provide the most precise indicators of the machine's behavior. To achieve these goals, a rule competition procedure may be initiated in which an existing rule can be updated by replacing it with a better rule. The rule competition further allows diagnostic engine 522 to select diagnostic rules that may not necessarily have been intuitive from a knowledge of the machine's architecture.

FIG. 5b is a flowchart setting forth the detailed logic of cognitive analysis in accordance with a preferred embodiment. A timing pattern enters into competition with an existing rule if they both include the same result event (block 562). The statistics of the timing pattern are compared to the statistics of the existing rule to determine whether the existing rule indeed provides the most accurate and efficient diagnosis of the behavior of machine 517 (block 566). If the statistics of the timing pattern are better than the statistics of the existing rule, then the existing rule is updated, in effect, by discarding the existing rule (block 568) and creating a new rule based on the better timing pattern (block 542). In the preferred embodiment, the statistics which include the smallest standard deviation are deemed to provide the basis for the better rule. If, however, the magnitudes of the two standard deviations are close in value, then the mean time intervals are also compared. Although the above-described rule competition is presently preferred, diagnostic engine 522 may also be set to retain more than one rule for a given result event and may specify other criteria, or combination of criteria, for the competition.

State-Dependent Learning

The selection of the best diagnostic rules may also be affected by whether machine 517 is capable of running in more than one machine state. For example, machine 517 may be used to manufacture several different types of parts (e.g., a standard truck cab and an extended truck cab), and, thus, the details of the machine's operation will be somewhat different in each state. For instance, some control elements 518 may not be activated in one of the states, or, if active, the timing patterns may be different. Maintaining separate rule bases for each different state would be prohibitive in terms of the computational and memory requirements for main processor 512. On the other hand, defining a single set of rules that will apply to all machine states will be difficult in most situations. Therefore, it is preferable that the diagnostic engine 522 observe the operation of machine 517 in all states, and then define a maximum number of diagnostic rules based on timing patterns that are common to all states and a minimum number of rules based on timing patterns peculiar to a particular state. Further, each resulting rule is preferably tagged with code that indicates the state or states to which the rule applies.

Before defining a common diagnostic rule, the timing statistics of the common timing pattern are subjected to the same evaluation process as described above. If the statistics of the common timing pattern do not satisfy the evaluation criteria (e.g., the mean time interval, the standard deviation or their ratio are too large), however, then diagnostic engine 522 will attempt to discover a version of the common timing pattern that will produce an acceptable diagnostic rule. For example, if the time interval between the trigger and result events varies between states as a result of a change in conveyor speed and a measurement of conveyor speed is available, then a diagnostic rule can be defined having a mean time interval that is a function of the measured speed. As another example, if the manufacturing process can diverge into one of multiple courses of action and then resume a single course, forward or backward-looking diagnostic rules can be defined that diagnose the final and initial events of the individual courses of actions respectively, as will be explained below.

Symmetric and Forward and Backward-Looking Rules

In general, the diagnostic rules can be either symmetric rules, forward-looking rules, or backward-looking rules. In a symmetric rule, an event B always follows an event A and vice versa. The following timing pattern satisfies the requirements of a symmetric rule:

B - - - A - - - B

In a forward-looking rule, event A is always followed by event B, but not vice versa. Both of the following examples of timing patterns satisfy the test for a forward-looking rule:

B - - - A - - - B

B - - - B - - - B

In a backward-looking rule, event B is always preceded by event A, but not vice versa. Thus:

B - - - A - - - B

B - - - A - - - A - - - B

Preferably, the diagnostic rules are symmetric rules, and thus also satisfy the tests for forward and backward-looking rules. However, if a symmetric rule does not satisfy the evaluation criteria, a forward or backward-looking rule may be defined instead, and, in the preferred embodiment, the rule includes a code indicating whether the rule is a symmetric, forward-looking, or backward-looking rule. Backward and forward-looking rules have uses other than that discussed above. For example, if a control element experiences bounce, the element's change of state can still be the trigger event of a backward-looking rule.

Grouping of Control Elements

For machines having an extremely large number of control elements 518, the definition of diagnostic rules could involve extensive computation and large amounts of memory. Thus, in the preferred embodiment of the invention, diagnostic engine 522 can employ alternative strategies that prevent the amount of computation time and the amount of memory from becoming excessive. For example, control elements 518 may be divided into independent groups which have little or no interaction with other groups. Rules are then defined on a group basis, and the rules for each group include only those discrete events which correspond to elements 518 within that group.

In practice, however, groups of elements 518 usually do interact with one another, but only on a limited basis. Accordingly, some of the elements of one group can be selected to be visible to another group and are thus included in the rules for the latter group. Selecting the visible elements may be easily accomplished based on a knowledge of the architecture of the control system. Further, grouping of control elements 518 for diagnostic purposes is particularly suited for a control system which includes multiple distributed controllers 516. In such a distributed control system, each controller 516 is associated with a group of control elements 518, and, thus, the system architecture is easily discernible. In alternative embodiments, other strategies may be employed, such as performing the rule definition process in stages in which only certain groups of control elements 18 participate at a given time.

Diagnosis

Figure 5C:
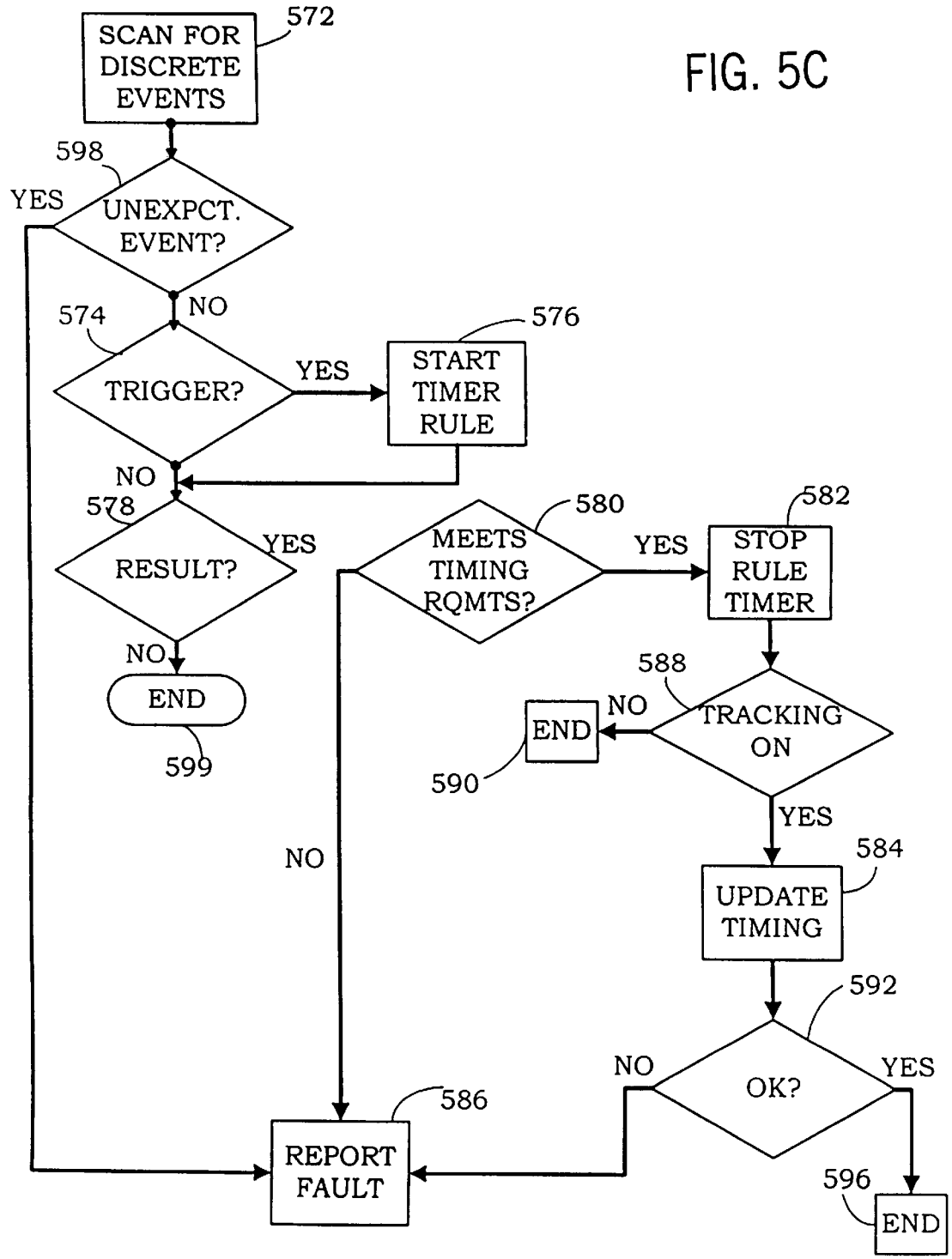
FIG. 5c is a flow chart representing exemplary steps for identifying a malfunction in the behavior of the machine and updating the timing statistics associated with the diagnostic rules while the diagnostic engine of FIG. 5a is in the diagnostic mode.

Once diagnostic rules are learned, diagnostic engine 522 may be set to the diagnostic mode in which incoming discrete events are evaluated relative to the diagnostic rules to identify existing or potential malfunctions in the behavior of machine 517. The evaluation of the discrete events may be performed in several alternative manners. For example, referring to FIG. 5c, the timing relationship between the trigger and result events may be evaluated relative to the timing statistics learned during the learning process (blocks 585, 582, 588, and 590). Accordingly, if, for instance, the result event does not occur within five learned standard deviations of the learned mean time interval and the corresponding rule is either a symmetric or forward-looking rule, then system 510 will identify that a malfunction in machine 517 has occurred (block 586).

Alternatively, and preferably, the timing statistics are incrementally updated in real time based on observing further repetitions of the timing patterns associated with the diagnostic rule. For example, in the preferred embodiment illustrated in FIG. 5c, if a scanned discrete event (block 572) is the trigger event for an active rule (block 574), a rule timer is started (block 576). If the result event for the triggered rule occurs (block 578) within five standard deviations of the mean time interval (block 580), then the timer is stopped (block 582) and the timing statistics are updated (blocks 588 and 584). If, however, a result event occurs and its corresponding rule has not been triggered (block 578), or if the result event does not occur within the allotted time interval (block 580), the system 510 identifies that a malfunction in machine 517 has occurred (block 586).

In a preferred embodiment, both the learned timing statistics and the updated timing statistics are retained as separate files in the memory of main processor 512. The learned timing statistics thus provide a baseline reference for evaluating the performance of machine 517, while the updated timing statistics, which may be regularly replaced (e.g., on a daily, weekly or monthly basis), provide a mechanism by which the diagnostic rules can autonomously adapt in real time to changed operating conditions. For example, in the preferred embodiment, occurrences of discrete events may be evaluated by determining whether a result event occurs after its trigger event within a multiple of the learned standard deviation of the updated mean time interval. Using the updated mean time interval in conjunction with the learned standard deviation ensures that system 510 does not interpret changes in the timing pattern caused by manufacturing variations, such as normal machine wear and aging, temperature or other environmental conditions, as machine malfunctions. In alternative applications, however, both the updated mean time interval and the updated standard deviation may be used or only the updated standard deviation may be used. As yet another alternative, the diagnostic rules may be updated by replacing the learned timing statistics with the updated timing statistics.

The diagnostic engine 522 preferably also tracks (block 588) the updated timing statistics against the learned timing statistics, although the tracking feature is optional (block 590). Accordingly, engine 522 can diagnose a large change or drift in the updated timing statistics relative to the learned statistics (block 592) as indicative of an existing or potential malfunction in the behavior of machine 517 (blocks 586, 596).

The criteria that engine 522 employs to identify malfunctions may vary depending on the type of diagnostic rule used. For example, symmetric and forward-looking rules can be used to identify a malfunction (a) when a result event occurs either too soon or too late after its trigger event, (b) when a trigger event reoccurs before its corresponding result event has ever occurred, or (c) when a machine state ends before a result event occurs for a rule that has been triggered. Symmetric and backward-looking rules can be used to identify a malfunction, for example, (a) when a trigger event occurs either too early or too late relative to its corresponding result event, (b) when a result event reoccurs without a corresponding reoccurrence of its trigger event, or (c) when a result event occurs during a particular machine state and its trigger event did not precede it while in that machine state. It should be understood that these types of malfunctions are offered by way of example only, and that one skilled in the art would recognize that other types of malfunctions may be readily diagnosed.

Upon detection of a malfunction, main processor 512 generates an error signal indicative of the malfunction and communicates it to user interface 526. User interface 526 preferably includes a display driver (not shown) which, in response to the error signal, communicates a display signal to the display screen which then provides visible indicia indicating that a malfunction has occurred. For example, alphanumeric characters may appear on the display screen stating that a particular discrete event has occurred at an improper time. Or, a user may provide a custom message to be displayed for a fault of a particular rule or rules. Alternatively, the display may provide a graphical representation of the faulted rule or rules which highlights the problem area, such as with a flashing or colored marker. In other embodiments, other types of displays or audio components for effectively communicating the occurrence of the malfunction, either alone or in combination, may be readily envisioned by those skilled in the art.

In addition to identifying timing errors, the present invention can identify malfunctions that are characterized by the occurrence of an unexpected event. For example, after having observed machine 517 in all operating states and conditions, diagnostic engine 522 may detect the occurrence of a discrete event that it has never seen before or that had never occurred while the machine was operating in the present machine state (i.e., the discrete event has not been recorded in the expected events file stored in memory of main processor 512) (block 598). This unexpected event may be indicative of a malfunction or of an unusual condition, such as the opening of a safety gate. In any event, diagnostic engine 522 will generate an error signal (block 86) that is translated into an error message that is displayed on the display screen of user interface 526.

Unexpected events also include detection of a control element which is in the wrong state. For example, in some machine states, a control element may never experience a discrete event and, thus, is always in one particular state. Accordingly, if engine 522 detects that the control element is in or has transitioned to the other state (block 598), the unexpected event will be diagnosed as a malfunction (block 586).

It should also be understood that some discrete events may not be either a trigger or a result event for any diagnostic rule (blocks 574 and 578). In such a case, and provided the discrete event is not an unexpected event (block 598), diagnostic engine 522 will simply ignore its occurrence (block 99).

Although the foregoing description has been provided for the presently preferred embodiment of the invention, the invention is not intended to be limited to any particular arrangement, but is defined by the appended claims. For example, either the rule definition process or the diagnostic process, or both, may be performed off-line using discrete event data that has been stored in memory. Or, the diagnostic rules initially may be defined by a user and then may be updated or replaced based on real-time observation of discrete events. Alternatively, a user may manually modify the diagnostic rules after the rules have been defined based on real-time observation. Further, the diagnostic rules may be based on other variations or types of statistical analyses of the repetitions of the timing patterns.

Designer Studio

Figure 6:
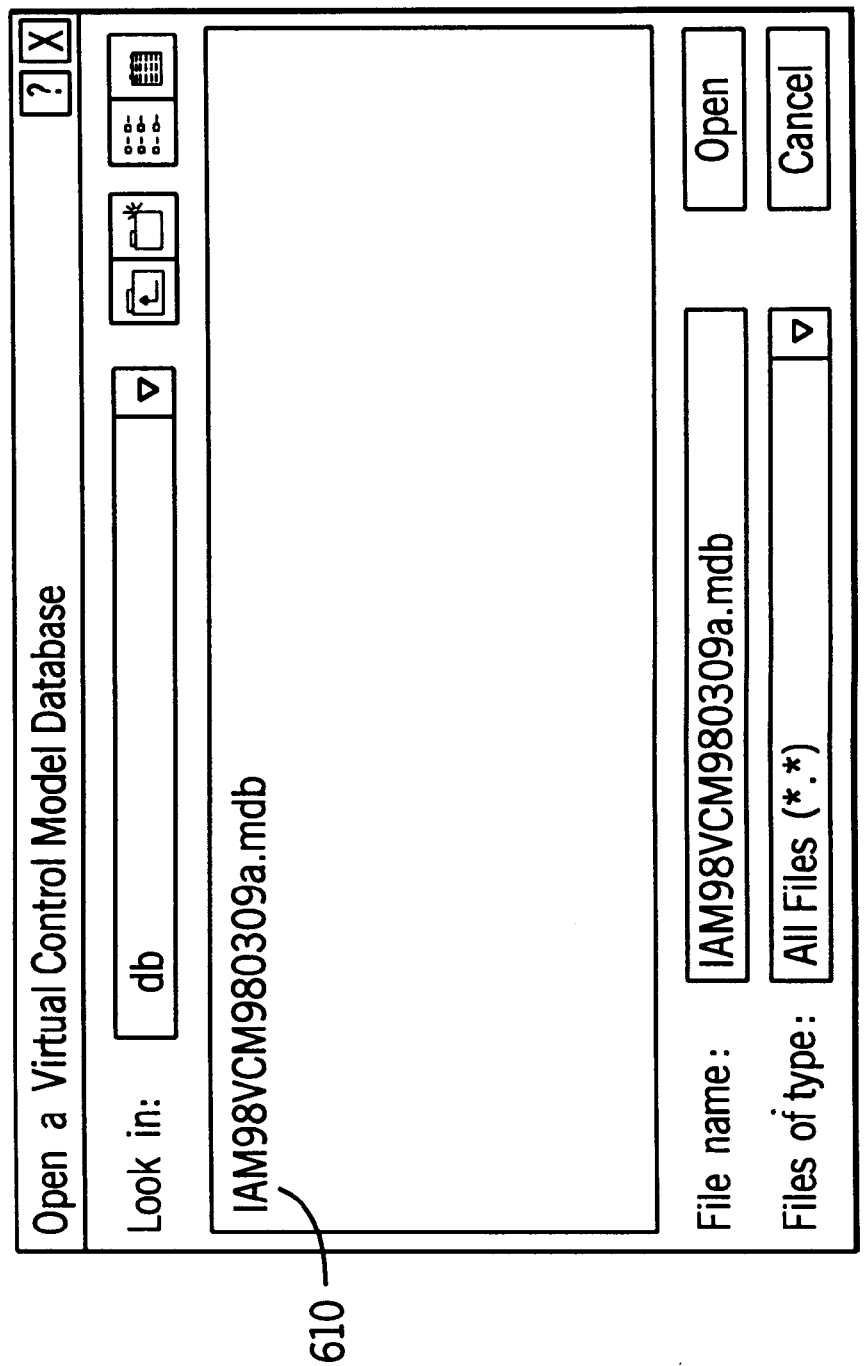
FIG. 6 illustrates the user display for opening a project in accordance with a preferred embodiment.
Figure 7:
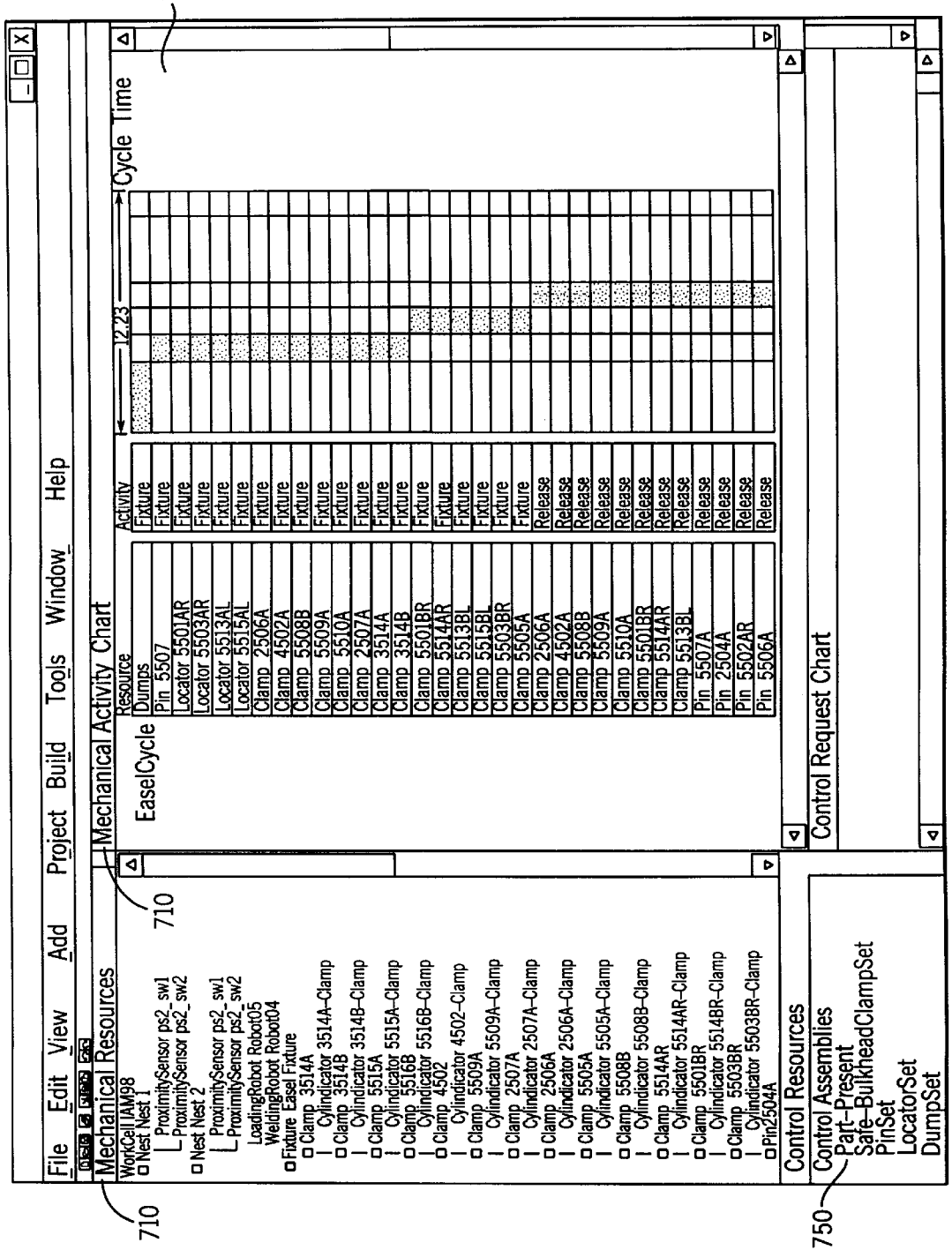
FIG. 7 is a Designer Studio window in accordance with a preferred embodiment.

The Designer Studio is a software toolset for integrating control system design, simulation, implementation and maintenance; and integrating the control system design with external product, process and machine (data) models. A user commences operation by opening a new or existing project. FIG. 6 illustrates the user display for opening a project in accordance with a preferred embodiment. All existing projects are listed in the window 610 for a user to select from. When the user selects a project 610 it opens a Designer Studio window. FIG. 7 is a Designer Studio window in accordance with a preferred embodiment. The first panel that is created when a project is opened is the Resources panel 710. In this panel, a filtered hierarchical list of the project resources is presented for further control definition. The timing diagram panel 720 is presented for sequencing workcell operations. It also joins the resources necessary to perform the operations at the appropriate times. The control resources window 730 provides an predictive list of control assemblies for a user to select from based on the resources 710 and the activities 720.

Figure 8:
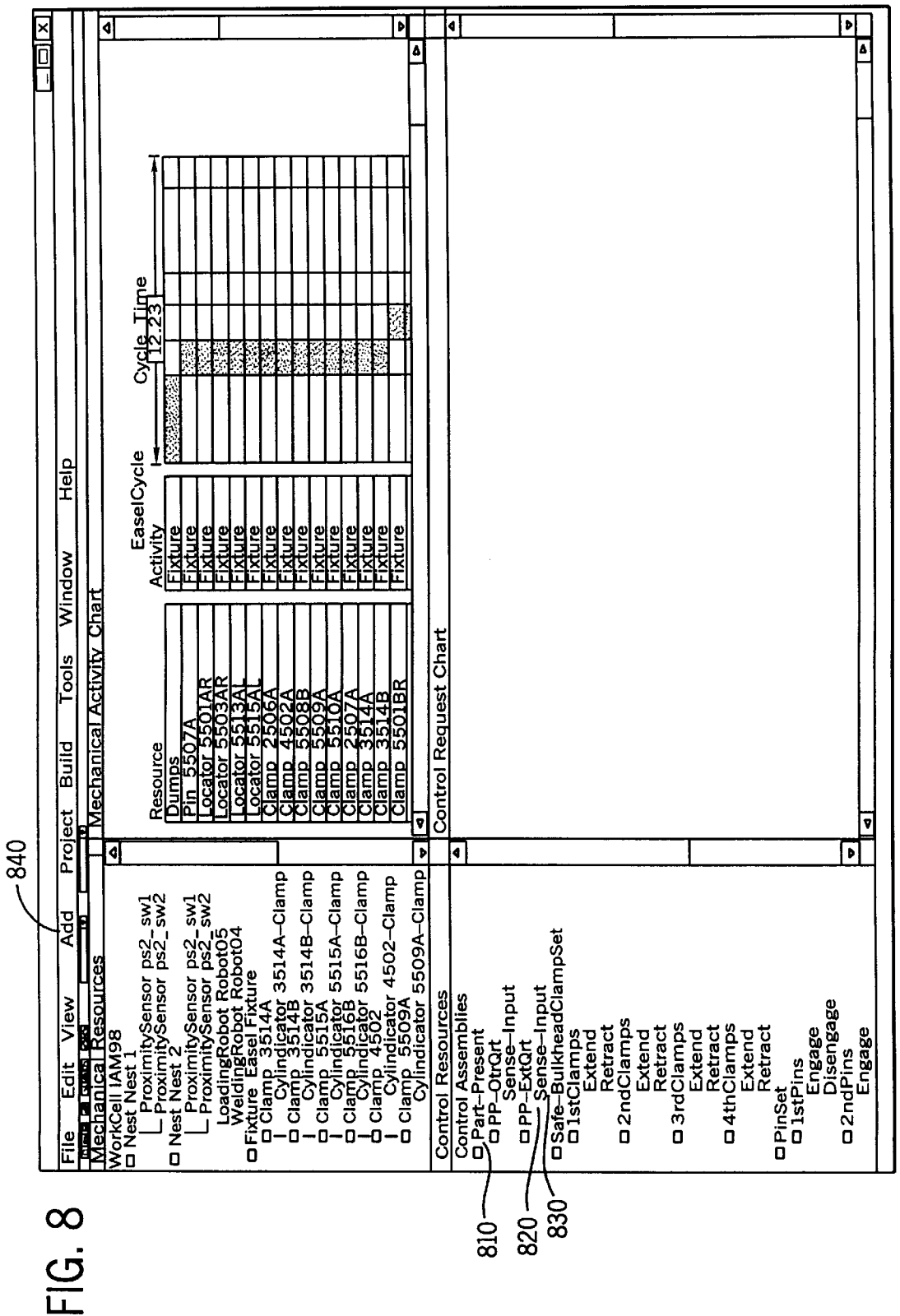
FIG. 8 is a Designer Studio display with control assemblies completed in accordance with a preferred embodiment.

FIG. 8 is a Designer Studio display with control assemblies completed in accordance with a preferred embodiment. A hierarchical list of the control assembly types 810, control assembly instances 820, and control assembly instance requests 830. One of the options that a user can exercise in the Designer Studio is the add operation 840 which invoked the add control assembly logic of the add operation. This prompts the user with an add control assembly dialog box. From the dialog box, a user can select a control assembly type and select the new button to go to the control assembly wizard FIG. 9.

Figure 9:
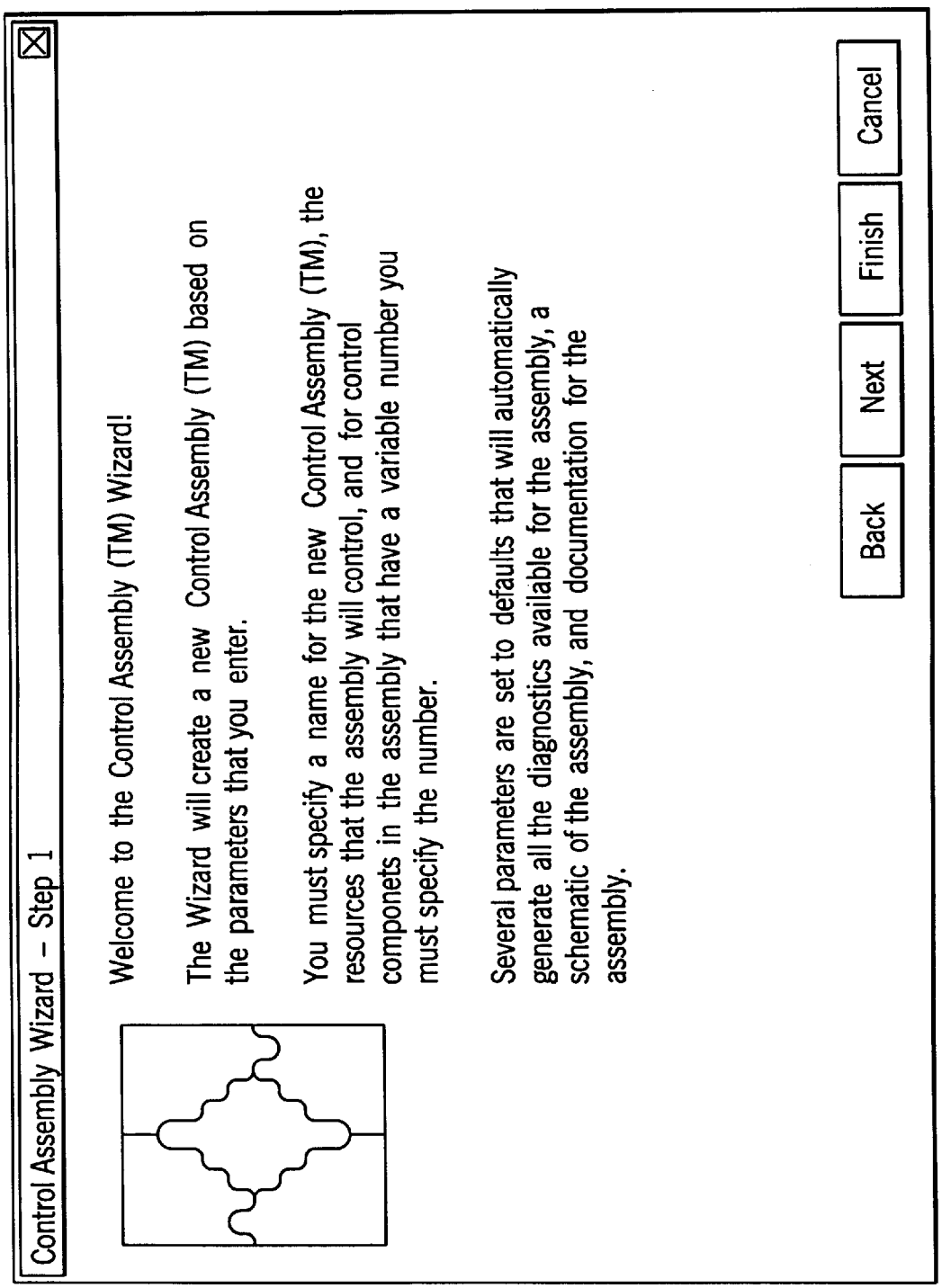
FIG. 9 is a control assembly wizard in accordance with a preferred embodiment.

FIG. 9 is a control assembly wizard in accordance with a preferred embodiment. The information in the display acclimates a user with the wizard experience.

Figure 10:
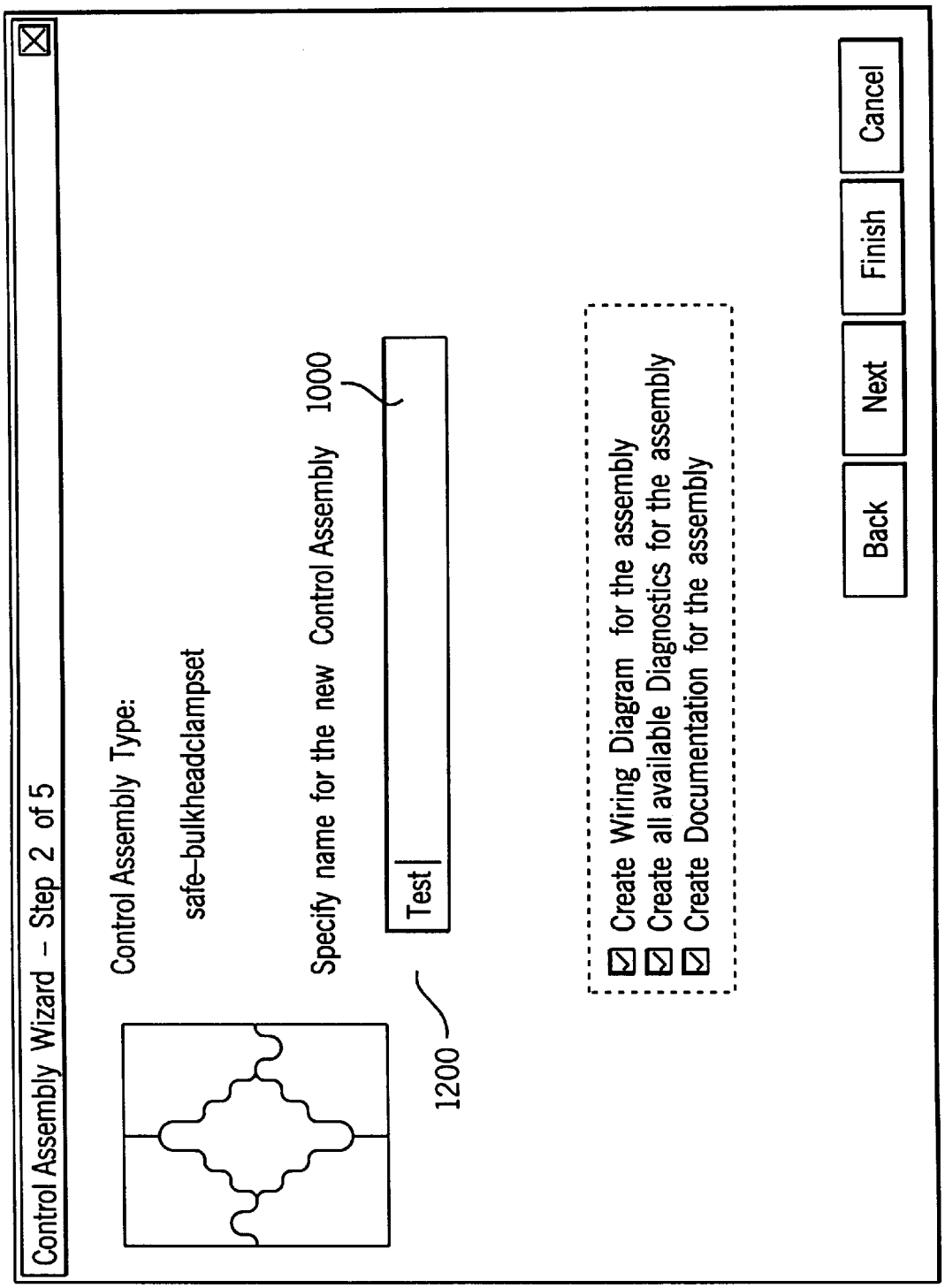
FIG. 10 is a control assembly wizard name operation in accordance with a preferred embodiment.

FIG. 10 is a control assembly wizard name operation in accordance with a preferred embodiment. The user must specify a name 1000 indicative of the new control assembly instance that will be generated utilizing this wizard. The user also has the option of selecting various options to initiate other processes to create wiring diagrams, diagnostics and documentation for the named instance of the control assembly.

Figure 11:
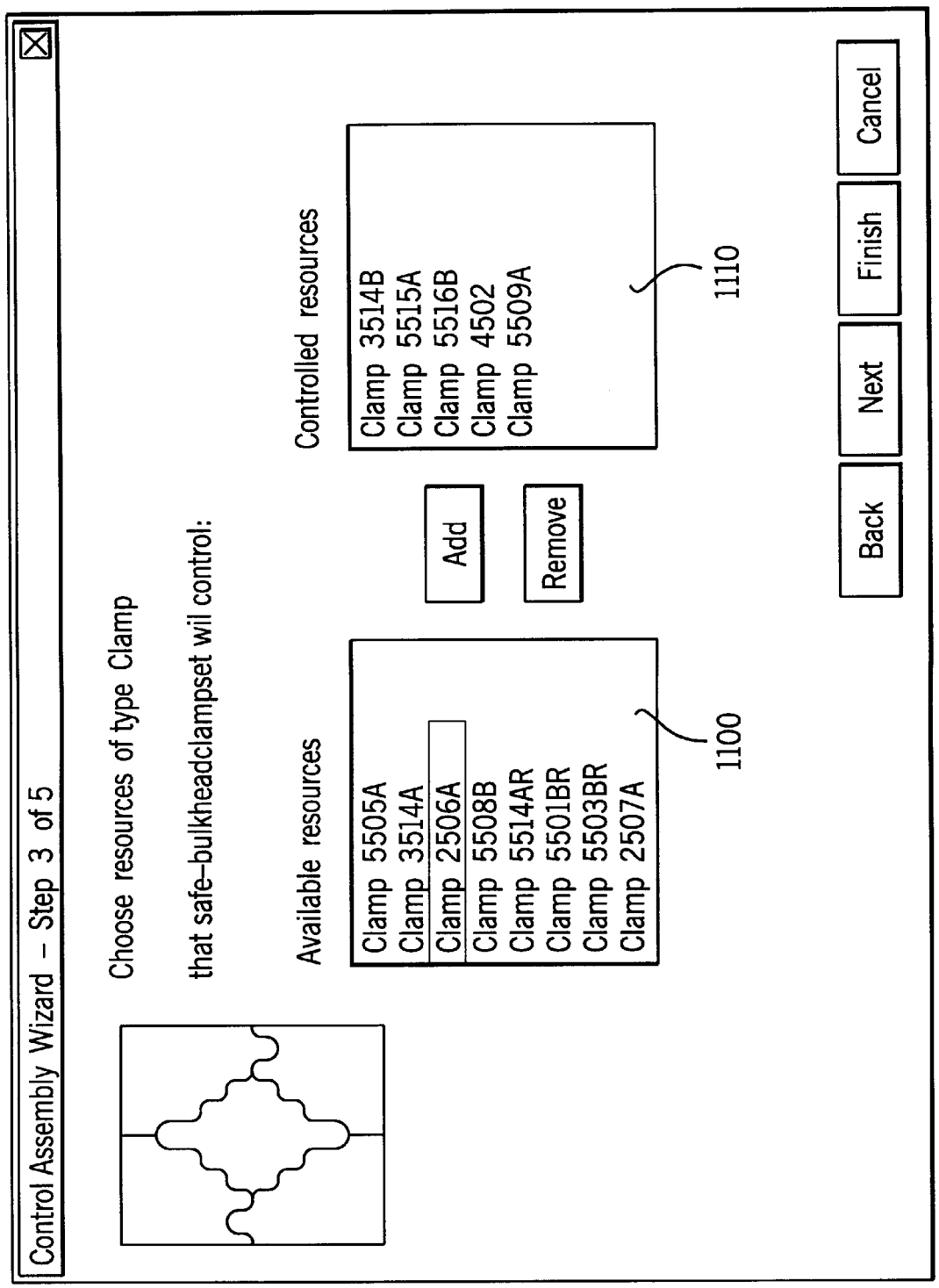
FIG. 11 is a control assembly wizard to select control resources in accordance with a preferred embodiment.

FIG. 11 is a control assembly wizard to select control resources in accordance with a preferred embodiment. The available resources of the appropriate type are presented to the user in a window 1100. A user selects resources that will be controlled by the named control assembly instance from window 1100 and presented back to a user in a window 1110. Selection logic is provided which is consistent with the activity timing diagram 720. When a particular resource is selected, all other resources that conflict with that selected resource are greyed out to prevent conflict selection.

Figure 12:
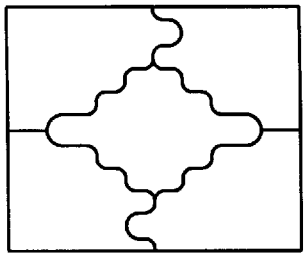
FIG. 12 is a control assembly wizard to label components associated with the control assembly in accordance with a preferred embodiment.

FIG. 12 is a control assembly wizard to label components associated with the control assembly in accordance with a preferred embodiment. Label comments 1200 are entered for each of the components at the user's discretion.

Figure 13:
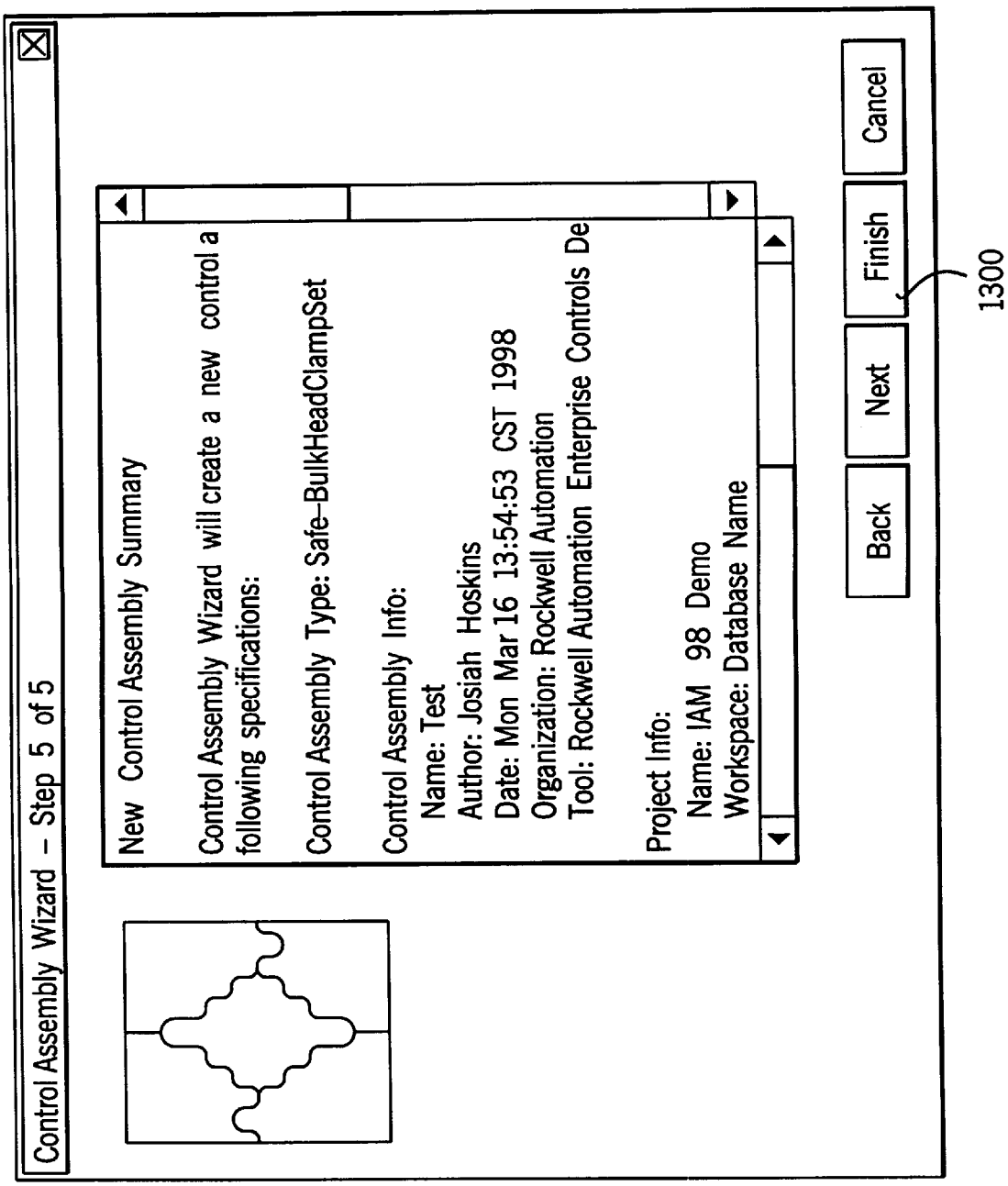
FIG. 13 is a control assembly wizard summary in accordance with a preferred embodiment.

FIG. 13 is a control assembly wizard summary in accordance with a preferred embodiment. When a user selects 1300 the wizard completion processing occurs and the control assembly is created conforming to the user's selections.

Figure 14:
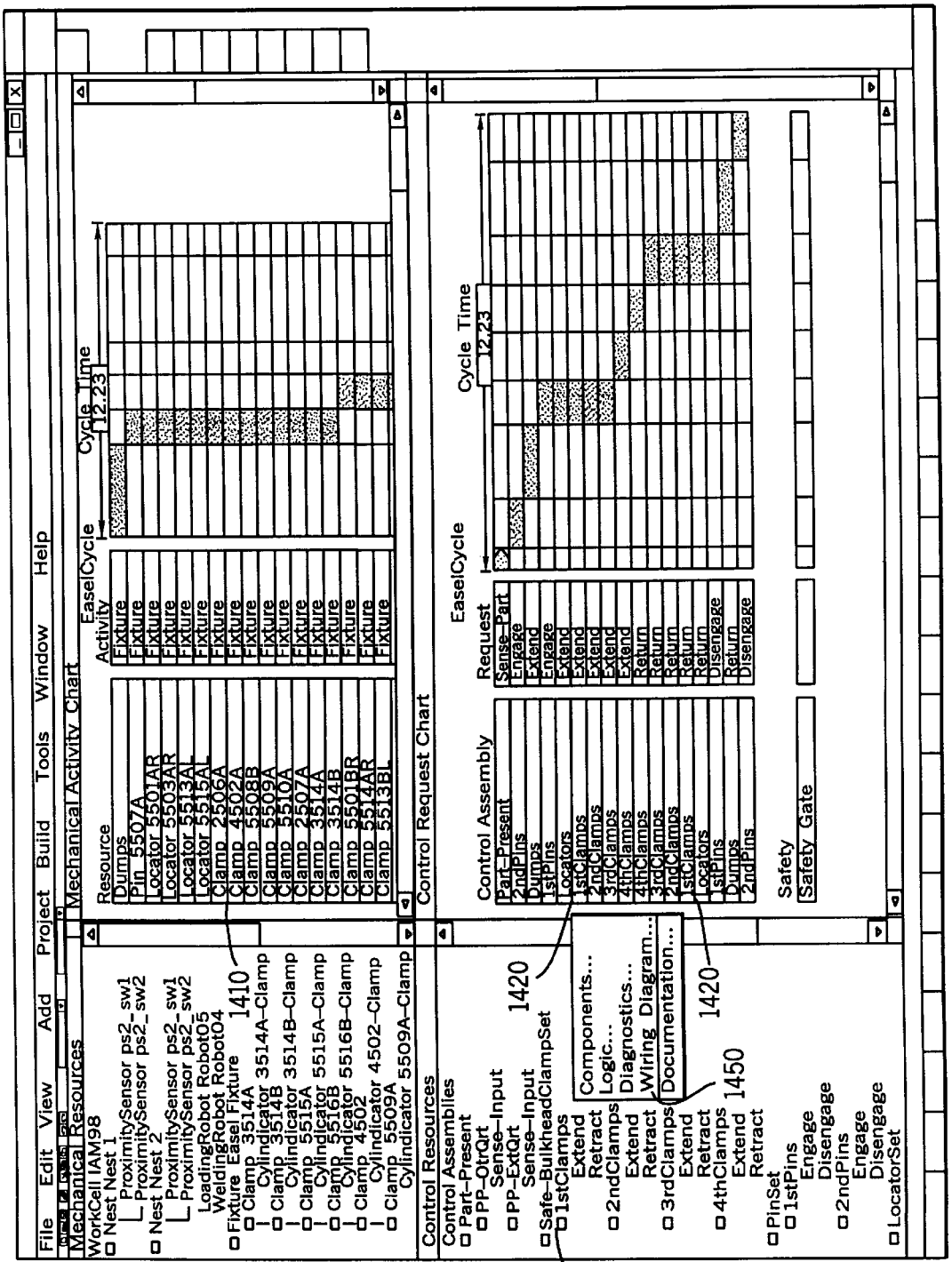
FIG. 14 is a Designer Studio display of a new control assembly integration in accordance with a preferred embodiment.

FIG. 14 is a Designer Studio display of a new control assembly integration in accordance with a preferred embodiment. The new control assembly instance 1400 is added into the Control Resources control assembly tree utilizing the selected type and the data model of that particular type combined with the user selected information from the wizard and that combined information is written into the ECDB. The selected resources that are under the control of the newly created control assembly named 1stClamps 1400 are the resources 1410 as shown in the Control Request Chart 1420 and 1430. The prescribed order of the mechanical operations for the resources 1410 refers to the time window that particular resources are utilized. The order of events from the prescribed order must be maintained in the Control request chart as illustrated by the placement of the Control Assembly's 1420 and 1430. Other intervening assemblies can occur, but the prescribed order is always maintained.

A popup window that details each of the types and instances of assemblies appears at label 1450. A Control Assembly type comprises the following information. A control component which is an entity that either sends a control signal, receives a control signal, or both sends and receives control signals. Examples of control components include a solenoid valve (receives), proximity sensor (sends), Robot interface (both), PanelView interface (both), pushbutton (sends), indicator light (receives) or a motor controller.

Logic refers to the control and fault states, the transitions between states that the control components can attain (i.e., the state space of the control assembly), the controller outputs which produce the transitions, and inputs to the controller determine the current state.

For example, an n-sensor PartPresent (input) has states such as Part Absent, Part Present, Part out of position, Transitions
Part Absent transititioning to a Part Present state.
Part Present transititioning to a Part out of position state.
Part out of position transititioning to a Part Absent state.
Part Absent transititioning to a Part Present state.
Part Absent transitioning to a Part out of position state.
Part out of position transititioning to a Part Present state.

There are also logic for Input only types, such as:
all n off (Part Absent);
all n on (Part Present);
k of n on (k<n, k>0) (Part out of position);

There are also logic for output only types, such as:
ClearToEnterLight (output) (e.g., sin-le light also could be multiple lights); which also has various states such as LightOn;
LightOff with Transitions, such as: LightOn transitioning to LightOff; and LightOff transitioning to LightOn.

There are also status based and causal based Diagnostics.
Status-based diagnostics—specifies the step(s) that the machine is currently walting to occur (if a fault occurs it specifies the step(s) that were waiting to occur at the time of the fault, i.e., the symptoms).

Causal model-based diagnostics—use a model of causal relationships to develop rules that relate machine status to root causes.

For example, consider that a human mechanic has incorrectly moved the mount location of a part present proximity sensor so that it is out of alignment. Then the Status-based diagnostics would place the following message in an internal diagnostic table that could be displayed: "waiting for part present sensor #2" (no automatic inference possible).

In another situation, a proximity sensor on a clamp cylinder could fail. Then, the status-based diagnostics would place the following information into an internal diagnostic table that could be displayed: determines that a machine is "waiting for clamp cylinder 2504A."

In a causal model-based diagnostic system the logic infers that the extend proximity sensor on cylinder 2504A has failed, or that cylinder 2504A is stuck and informs an operator accordingly. The causal model utilizes a set of rules and a tree structure of information to determine the probable root causes based on factual scenarios.

Schematic

A schematic (i.e., "wiring diagram") is a representation of the logical and functional connections among a set of control and mechanical components. The connections include electrical, pneumatic, and hydraulic. The preferred embodiment presents a view of each of these connection types and the bill of materials that make up the control and mechanical components of the control assembly type or instance.

Figure 15:
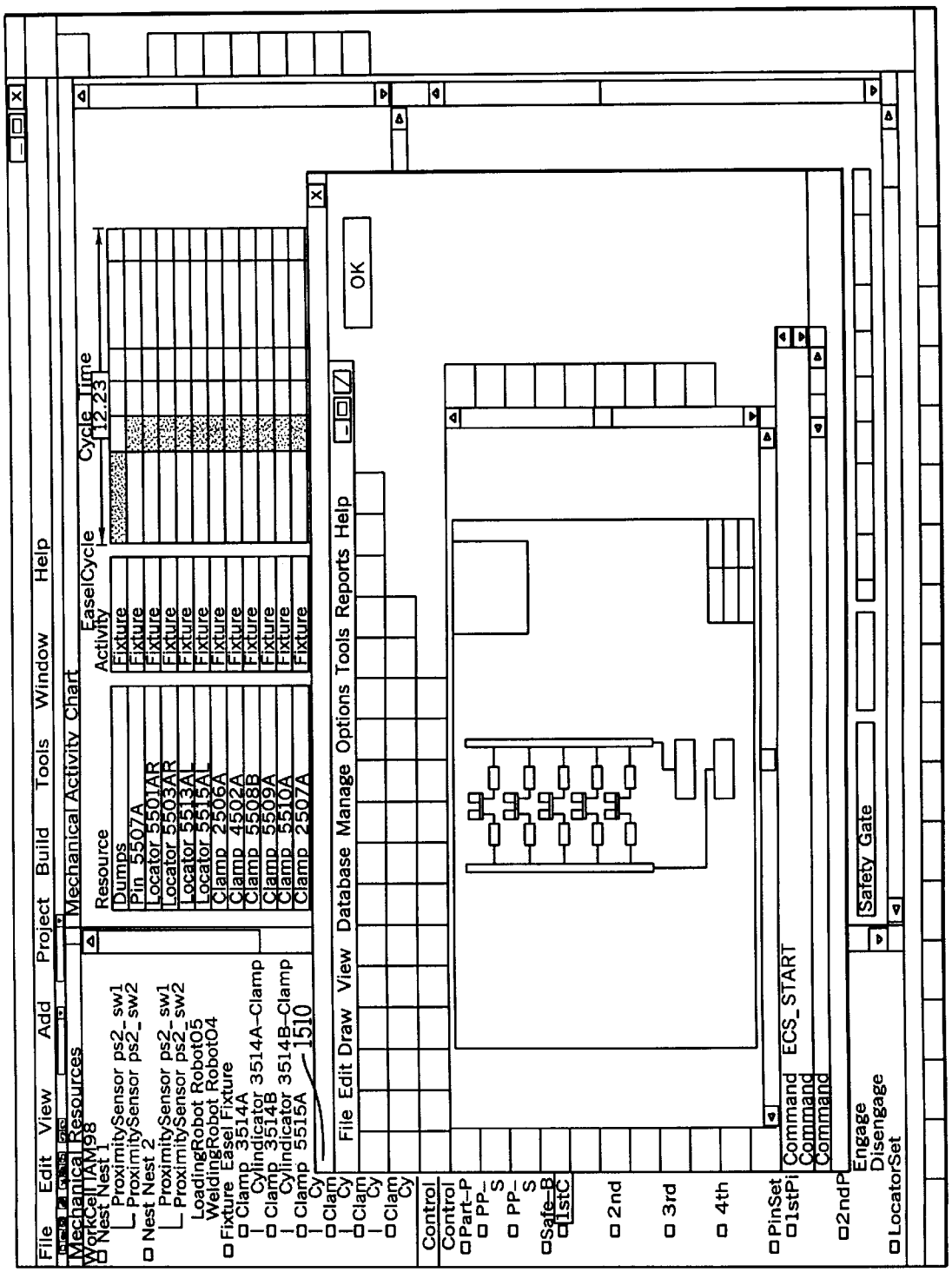
FIG. 15 is a schematic of a pneumatic system of a control environment in accordance with a preferred embodiment.

FIG. 15 is a schematic of a pneumatic system of a control environment in accordance with a preferred embodiment. RSWire is the application created and manufactured by the assignee. RSWire 1510 utilizes a computer aided design engine for creating, displaying, manipulating and storing schematics of electrical and hydraulic systems. Various views are all enabled withing the enterprise system in accordance with a preferred embodiment. System wide information, including detailed electrical, pneumatic and hydraulic information, is all stored in the ECDB.

Visualization

A visualization comprises entities within the control assembly that are useful to portray textually or graphically. For example, Control Components can be displayed as text or a graphical representation of the control component could be utilized. Logic can be displayed as LL, function blocks or in axis-like diagrams. Diagnostics can be displayed as status messages, causal messages and as indicators on a graphic display. The information includes a three dimensional depiction of a work cell.

One way to streamline any type of programming is to provide predefined language modules which can be used repetitively each time a specific function is required. Because of the similar types of tools and movements associated with different machine line stations, industrial control would appear to be an ideal industry for such language modules. For example, various stations in a single machine line could employ drilling tools having identical limiting motion and configuration parameters.

In this case the idea would be to design a ladder logic language module for a drill once, place the drill language module into a control library and thereafter, each time drill logic is required, download the drill language module into a control program. Similarly, language modules for other types of tools could be designed once and then used repetitively to reduce programming and debugging time. The module library could be expanded until virtually all tool movements are represented. Library components would be viewed as "black boxes" with predefined interfaces, in much the same way that integrated circuits are used in the electronics industry.

In addition, to make it easier to program in LL, a comprehensive module library would also facilitate automated LL programming using a programming editor. For example, an entire module library could be stored in the memory of an electronic editing apparatus. Using the apparatus, a user could designate all characteristics of a machine. Thereafter, using the designated characteristics, the apparatus could select language modules from the module library and assemble an LL program to control the machine.

The module library approach would work quite well for certain applications like small parts material handling or simple machining. The reason for this is that the LL logic required for these applications tends be very small and highly reusable because the I/O count is minimal and interactions between modules are simplistic.

Unfortunately, there are many areas of industrial control for which it is particularly difficult to provide reusable language modules due to relatively large and varying job specific I/O requirements and the complexity and variability of interaction between modules.

One area of industrial control that defies the predefined language module approach is sequential control. Sequential control is the synchronization of individual tool movements and other subordinate processes to achieve a precisely defined sequence of machining operations. While it may be easy to enumerate all of the possible sequences involving just a few simple tool movements, the number of possibilities increases rapidly as the number and complexity of the tool movements increases, to the point where any attempt to enumerate them all is futile.

For example, a typical machine station configuration may include five different tools, each of which performs six different movements for a total of thirty movements. In this case, each tool movement must be made dependent on the position of an associated tool. In many cases, movement of a tool must also be conditioned upon positions of all other tools at the station. In addition, tool movements at one station are often tied to tool movements at other stations or the completion of some portion of a cycle at some other station. Furthermore, tool movement may also be conditioned upon the states of manual controls.

Taking into account the large number of machine line tools, tool movements, manual control types, manual control configurations, and cross-station contingencies that are possible, the task of providing an all encompassing module library capable of synchronizing tool movements becomes impractical. Even if such a library could be fashioned, the task of choosing the correct module to synchronize station tools would probably be more difficult than programming required LL logic from scratch.

For these reasons, although attempts have been made at providing comprehensive language module libraries, none of the libraries has proven successful at providing comprehensive logic to synchronize tool movements. In addition, none of the libraries has made automated LL programming a reality. Thus, typically synchronization programming in LL is still done from scratch.

Therefore, in order to reduce programming time and associated costs, it would be advantageous to have amore flexible means of specifying control logic for controlling machine sequences. It would be advantageous if such a means enabled less skilled programmers to provide sequential control logic. Furthermore, it would be advantageous if reusable logic templates, comprising the basic components of a sequential control program, could be composed into a library of templates that would be employed to produce sequential control logic with consistent behavior and form. Moreover, it would be advantageous if such a library of templates could be accessed using a programming apparatus such as a personal computer, or the like, to further minimize programming time required to program machine sequential control in LL.

In accordance with a preferred embodiment, a programming apparatus is disclosed to construct a bar chart image or graphical depiction on a computer screen which resembles a bar chart programming tool. A bar chart is a conventional controller programming tool that consists of a graphical cycle representation illustrating all related tool movements in a cycle. Control engineers regularly generate bar charts on paper to visualize sequences of motion. The apparatus gleans information from the bar chart image and, using a template based programming language, constructs a template based machine model.

A template is a language module that includes some truly reusable machine logic and a section wherein other templates can be designated that are required to provide machine logic for job-specific control requirements. When compiled, the model provides complete LL logic for controlling sequenced tool movements.

Thus, one object of the present invention is to provide an apparatus that can reduce the time and cost associated with programming sequences of tool movements in cycles. Using the inventive apparatus, a user can quickly construct a bar chart image on a computer screen that contains all of the information necessary to sequence tool movements. The apparatus includes an editor that gleans all required information from the bar chart image, determines if additional templates are required to provide job specific logic and, where additional templates are required, creates required templates and populates existing templates with references to the new templates. Compilation is a simple process so that, after a bar chart image has been created, the apparatus itself can completely convert bar chart information into sequencing logic thus minimizing programming time and associated cost.

Another object of the present invention is to minimize the amount of training required before a user is competent in programming sequencing logic. Control engineers are already familiar with the process of constructing and using bar charts as an aid for cycle visualization. Because the inventive apparatus interfaces with a user via a bar chart image, control engineers should be comfortable using the present apparatus.

Yet another object is to provide a module library that includes logic that can be altered to accommodate job-specific requirements for sequencing cycle functions and making functions contingent upon various function conditions including function states in cycle, instantaneous states of other cycles, and instantaneous conditions of manual control devices. The present invention includes a "bucketing" means whereby certain conditions of related functions are placed in different groupings depending upon relationships between the functions and an associated function. Control logic including an output, is provided for each group indicating when all conditions in the group are true or when one or more are false. The outputs are mapped into the logic module associated with a function to provide synchronized automatic and manual function control that is conditioned as required, on the states of the related functions. In this way, function module logic is altered to accommodate job-specific requirements for a cycle.

IV. Template Language

In order to understand the template language concept, it is first necessary to understand that all machine attributes, including machine components, component physical and operational characteristics, and component movements, can generally be referred to as control-tasks and that there is a natural hierarchical relationship between various control-tasks. Any machine and associated industrial process can be subdivided into a network of separate, related control-tasks that form a hierarchy of control-tasks. For example, a single machine usually has specific control-tasks (i.e. indexers, stations, work-units, and movements . . . ). While the machine includes several different physical tools or control-tasks, one of its fundamental characteristics is that it includes a number of unique tools. There is a hierarchical relationship between the machine and its unique tools and every machine can be defined in part, by a list of its unique tools.

Figure 16:
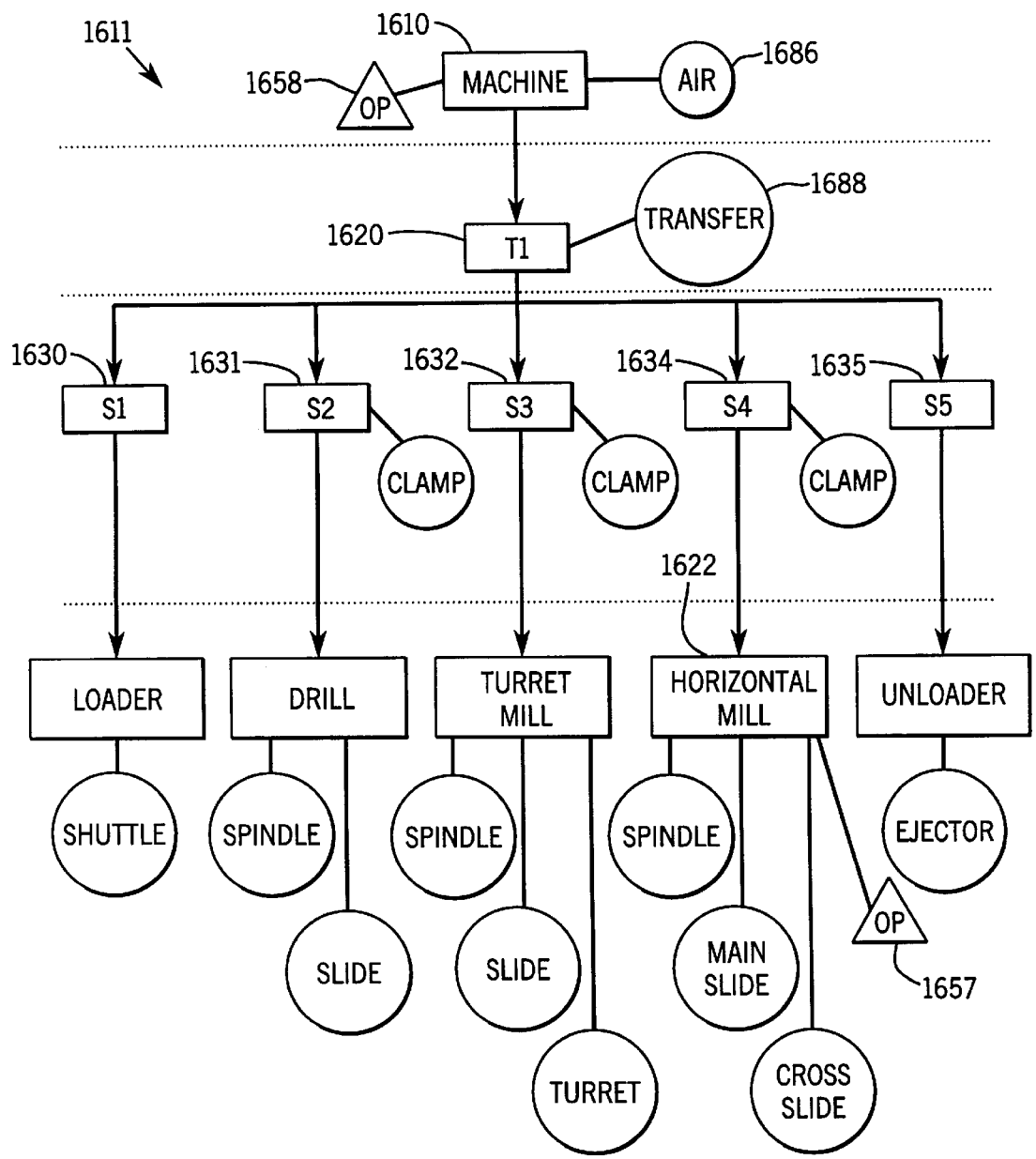
FIG. 16 illustrates the hierarchical relationship between a machine and an indexer in accordance with a preferred embodiment.

Referring to FIG. 16, a machine tree 1611 corresponds to machine 1610 is illustrated. In FIG. 16, direct connection between two elements signifies a parent/child relationship between two elements where the higher control-task in the tree is the parent and the lower control-task is the child. Where a parent/child relationship exists, the child control-task represents one fundamental characteristic of the parent control-task. In FIG. 16, the hierarchical relationship between the machine 1610 and the indexer 1620 is illustrated at the top portion of the machine tree 1611.

The most fundamental characteristic of indexer 1620 is that it includes five stations 1630–1635 and therefore, stations 1630–1635 can be hierarchically related to the indexer as illustrated. Each work-unit is hierarchically related to its associated station and one or more axes are hierarchically related to each work-unit.

In addition to the hierarchical relationship identified above, each machine tree 1611 component can also have a direct relationship to an axis. For example, all of the indexer 1620, stations and work-units in machine 1610 may require a pneumatic air source for operation. Where a machine-wide air requirement exists, the machine 1610, as opposed to one of its child components, should control an air valve to provide air to all machine components. Thus, in addition to its list of indexers, other fundamental characteristics of a machine as a whole are axes that are directly connected to the machine 1610. In FIG. 16, in addition to being directly connected to its indexer 1620, the machine 1610 is also connected to an air axis 1686 for opening an air valve.

Similarly, the indexer 1620 is connected to a transfer axis 1688 for controlling the transfer bar for all stations 1630–1635. Moreover, each of the stations 1631–1634 that includes a clamp is connected to a different clamp axis for controlling an associated clamp.

A third fundamental defining aspect of each tree component is whether or not the component requires a control panel. In the present example, the machine 1610 includes a main control panel 1658 for controlling the entire machine and therefore, a control panel 1658 is shown on the machine tree 1611 directly connected to the machine 1610. In addition, the horizontal mill 1622 includes a local control panel 1657 for controlling only the mill 1622. A control panel 1657 is shown directly attached to the horizontal mill in tree 1611.

Therefore, the entire industrial process shown can be viewed as a machine tree 1611 made up of the hierarchically-related components or control-tasks shown in FIG. 16. Each control-task can be entirely described by identifying its most fundamental characteristics, including control-tasks from the next hierarchical level, any directly-connected axis control-tasks and any directly-connected, control panel control-tasks. With this understanding of an industrial machine, template language can now be explained.

The template language guides a user to assemble from a set of programming units called modules a complete and correct machine tree 1611. Individual modules are identified with templates, which include truly reusable control logic so that, when a template-based machine tree is compiled, a complete control program for an industrial process is produced.

A template is a model program unit available for repeated use as a pattern for many modules based thereon. A template can be analogized to a data entry form wherein form identification can refer to either a blank instance of a master copy or a completed instance. In this description, the term "template" is used to mean the essence of a pattern as well as a completed instance of the pattern referred to also by the term "module".

The template language includes two types of language statements. A first statement type includes statements that are wholly independent of the underlying control language form. A second statement type includes underlying control language form itself, plus extensions to that form, making the form more flexible. Typically, the underlying language form will be completed in ladder logic. The second statement type is particularly useful where automated electronic editors are used to compile a template based machine tree, thus generating a control program in the underlying control language form. Each statement type will be explained separately.

Statements Independent of the Underlying Control Language Form

Referring again to FIG. 16, a typical set of templates used to provide a program for machine 1610 have a template type corresponding to each machine tree control-task type. For example, a template set for machine 1610 would include machine, indexer, station, workunit, axis and control panel templates. In addition, the set would include other more detailed templates to further define each of the aforementioned templates. A template is a model program unit available for repeated use as a pattern for many modules based thereon.

Figure 17:
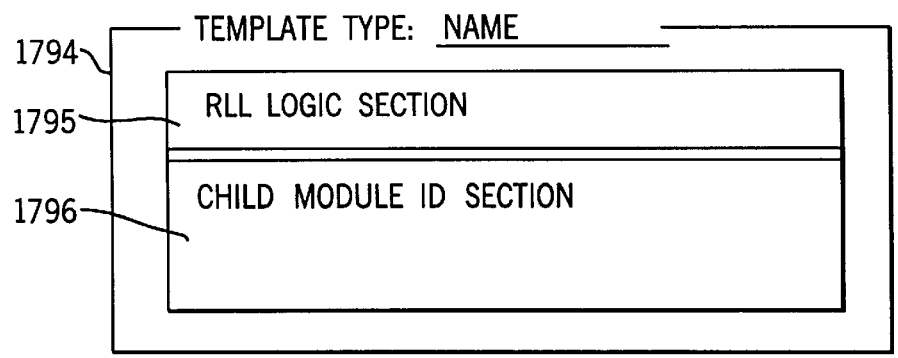
FIG. 17 illustrates a template in accordance with a preferred embodiment.

Referring to FIG. 17, a typical template includes a template type designation and may include a name field which must be filled each time a template is used so that the specific instance of the template can be differentiated from other modules, including other instances of the same template.

In addition, each template 1794 may include LL logic sections 1795 having one or more rungs of LL logic. The idea here is that for each specific template type 1794 used to represent a specific control-task type in a machine tree 1611, there will often be some logic, albeit in many cases minimal, that is always required for the specific control-task type. For example, for safety purposes, a master control panel will always include ON-OFF means for turning the machine on and off. Thus, every machine template will require ON-OFF LL logic and an LL logic section 1795 will provide the universally required logic.

Each template 1794 may also include child module specification sections 1796. The contents of the child module specification section 1796 represents one type of language statement that is wholly separate from the underlying control language form. In the child ID section 1796, the template provides an area where a user can define module specifications that designate other modules required to further define the designating module.

The relationship between a designating module and a designated module is a parent/child relationship wherein the designating module is the parent and the designated module is the child. For example, a machine module for machine tree 1611 would include a module specification designating an indexer module 1620. Similarly, in the present example, the machine module would include two separate module specifications to separately specify a "master control panel" module and an axis module named "air" which further detail the main control panel 1658 and the air axis 1686, respectively. The "master control panel", "air" and "T1" modules would all be child modules of the parent machine module.

Continuing, the indexer 1620 module would include a child module specification designating five separate station modules, one for each of the five stations, 1630–1635, as well as a module specification designating an axis module named "transfer" to control the transfer bar 1620.

The fourth station module 1634 would include a first module specification to a workunit module named "horizontal mill" and a second module specification to specify an axis module named "clamp". The clamp module would detail logic for controlling clamp 1644 by either including complete LL logic or designating other modules that would complete LL logic for clamp control.

The work unit module named "horizontal mill" would specify axis modules named "spindle", "main slide" and "cross slide" as well as a control panel module to define control panel 1657. Similarly, each of the other station and work-unit modules would specify other modules until every control-task in the entire industrial process has been completely defined and reflected in a template-based tree, mirroring machine tree 1611.

Figure 18:
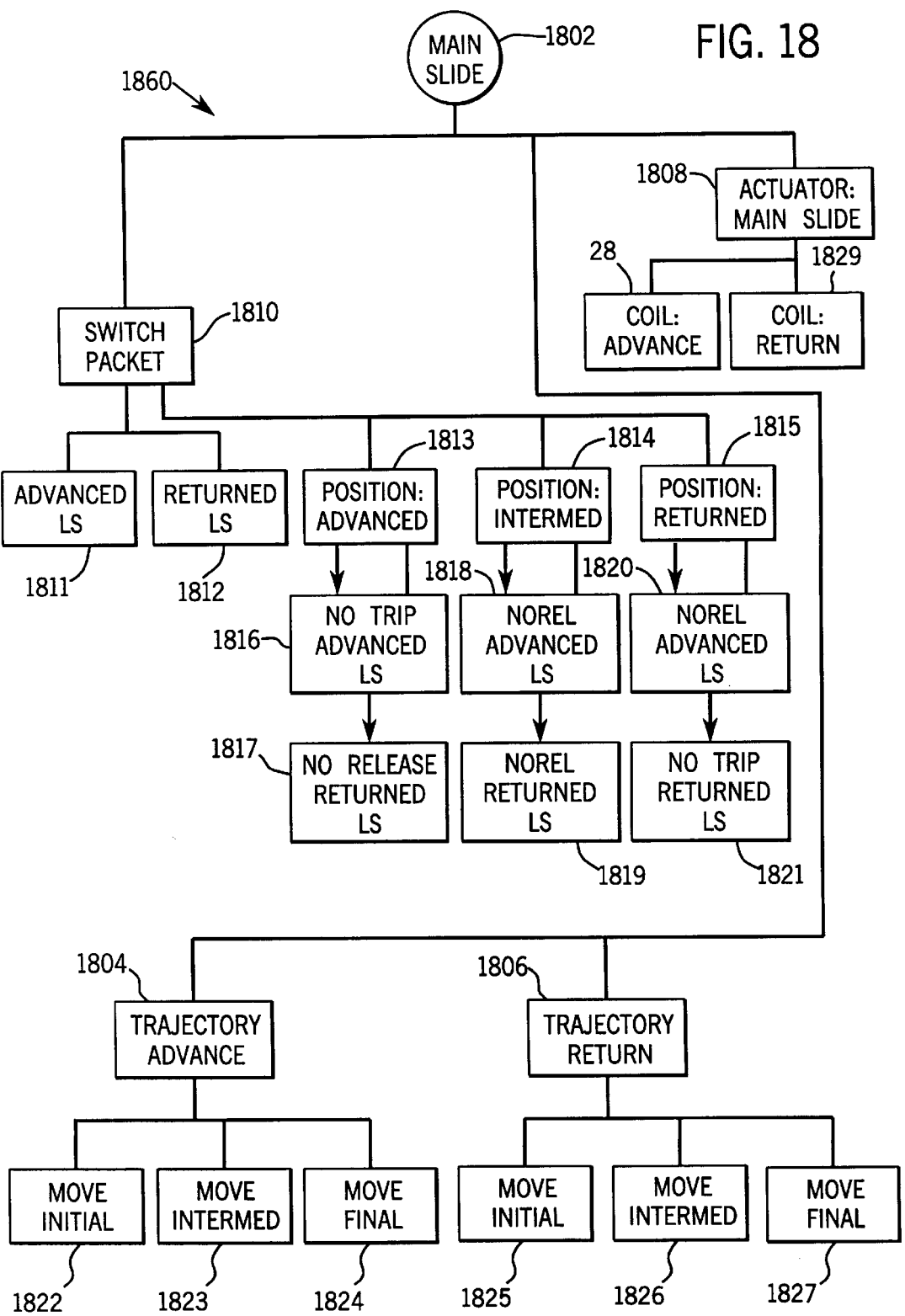
FIG. 18 illustrates a machine tree in accordance with a preferred embodiment.

Referring to FIG. 1800, the machine tree 1811 expands even further, each axis comprising a number of different control-tasks and corresponding modules. In FIG. 1800, only the main slide axis 1802 associated with the horizontal mill 1822 is shown. However, it should be understood that tree branches, like branch 1800 in FIG. 18, must be provided for each axis and each control panel. While the control panel branches will include modules based on templates that are different than the templates required to specify an axis, the process of populating modules with required lists to define parent modules is the same. FIG. 18 will be explained in detail below.

Moving down the machine tree, modules associated with lower tree control-tasks generally include an increasingly larger relative section of control logic. At the extreme, the final modules at the distal lower ends of the tree consist entirely of control logic and have no child specification sections. Surprisingly, only a few dozen templates are required to provide modules that completely describe an industrial process. When compiled, so that LL logic sections in child modules are plugged into their designating parent modules, a complete LL logic program can be provided.

The preferred template language includes different kinds of module specifications that can be used to accommodate different circumstances. For example, one type of module specification is a module "list" which allows zero or more component modules of a specific type (i.e. associated with a specific template). Referring again to FIG. 1600, an indexer module may include a module list called "station" which includes specifications to five modules, one for each of the five machine stations 1630–1635. In this way, a single module specification can reference five station modules. Each station module in the list must be assigned a unique job-specific name to ensure that it can be different from other modules designated in a common list specification. In the example here, the stations and, hence station modules, are referred to as 1630–1635.

Yet another kind of module specification is an "optional" module specification which results in either no instances or exactly one instance of the designated type. For example, a preferred indexer template includes an optional module specification for an indexer control panel. While it is not necessary to have an indexer control panel, where a machine line is unusually long, it is often advantageous to include an indexer control panel somewhere along the line to allow local indexer control. The optional module specification gives a programmer the option, based on job-specific requirements (i.e. the length of a machine line), to provide LL logic for an indexer control panel when one is desired. In the present example, the indexer does not include a control panel and, therefore, no module would be created.

Another module specification kind is a "renameable" module specification which results in a single named component module of a designated type, but will also allow a job-specific name to override the default name. Another kind of module specification is a "fixed" specification. Here, the template designated by the specification does not result in a child module. When compiled, fixed templates simply expand into the designating modules. Fixed specifications are not named.

Another kind of module specification is a "named" module specification which results in a single, named component module of the type identified in the specification. For example, for safety purposes, all machines require a master control panel. Thus, a preferred machine template includes a named module specification called "master control panel" which identifies a single instance of a master control panel template.

One final kind of module specification is a "choice" specification which makes a selection from a list of mutually exclusive module types based on job-specific information. For example, while a control panel requires some type of interactive device for a user to turn a machine on or off, a user may prefer either a push button or a selector switch. To this end, in a control panel template, a choice specification is provided which includes two fixed module specifications, one for a push button and another for a selector switch. Like a fixed module specification, the template associated with a chosen type is simply expanded when the machine tree is compiled (i.e. no module results from a choice specification).

A second type of language statement wholly separate from the standard LL rung form includes data definitions. Data definitions are common in programming language and should be familiar to a person of ordinary skill in the art. Therefore, data definitions will not be explained here in detail. Suffice it to say however, that in template language, data definitions are required to declare and reserve space for all PLC data table types such as inputs, outputs, timers, counters, etc., and allows the association of attributes with each declaration.

Extensions to the Underlying Control Language Form (LL)

While some logic is always the same for a specific machine tree control-task type, other logic is job-specific and distinct to an associated given module and would be extremely difficult to furnish in prewritten LL or other template sections. For example, one typical prerequisite for turning on a machine 1610 to begin an industrial process is that all local control panels (i.e. control panels other than the master control panel) be in remote mode often called "automatic". Remote mode means that a control panel forfeits control over the local machine section to an operator panel located higher up in the machine tree, for instance the master control panel. Local mode (e.g. "manual"), disables the parent operator panel and permits only local control of a section of the machine. Thus, one LL logic rung called "all child nodes remote" in a main control panel module should include a series of contacts, one contact for each local control panel. Each local control panel module would include a coil corresponding to its contact in the "all child nodes remote" rung. When the local control panel is in remote mode, the local panel module coil would be energized, thus closing the corresponding contact in the "all child nodes remote" rung. Thus, a coil at the end of the "all child nodes remote" rung would indicate when all local panels are in automatic or remote mode allowing the machine 1610 to be turned on.

Prior to designing a machine there is no way of knowing how many local control panels will be required. One machine may not require any local control panels while another machine may require ten or more local control panels. The number of local control panels required for a machine is job-specific. This means that prior to designing a machine 1610, there is no way to determine the number of contacts required in the "all child nodes remote" rung in a main control panel module. Unfortunately, standard LL rung forms do not allow for variable numbers of contacts and, therefore, cannot adjust to job-specific requirements. While a programmer could alter the form of an "all child nodes remote" rung while manually programming using templates, when the programmer is using automated editors there is presently no easy way to change rung form to accommodate job-specific parameters.

To overcome this limitation, the template language includes both macro instructions and a symbolic expression language that are extensions to the standard LL rung form itself. One macro instruction is an "AND list" instruction which provides a mechanism by which variable numbers of series contacts can be provided in an LL rung. The number of contacts can be tied to job specific requirements. For example, where four local control panels are required in an "all child nodes remote" rung, the "AND list" macro would provide four contacts, one for each local panel. In the alternative, where ten local panels are provided the "AND list" macro would provide ten contacts, one for each local panel.

The symbolic expression language is used with the macro instructions to designate macro operands. The symbolic expressions include single characters that may be concatenated with template-authored symbolic names (defined using Data Definition statements) to form reusable operand specifiers. These symbolic expressions may be used by placing them above LL instructions in an LL rung. A preferred set of symbols consists of three path specifiers and two separators.

Path specifiers indicate where relevant operand definitions can be found. Separators allow concatenation of more path information such as the name of a specific child module, data item, or attribute. A first path specifier is the symbol "$". Specifier "$" indicates the name of the module that the specifier appears in. For example, if specifier "$" appeared in the master control panel module, the specifier would provide a path to the master control panel module. In addition, the specifier would also provide partial paths to all main control panel child modules.

A second path specifier is symbol "#". Symbol "#" indicates the instance of a particular member of a list. A third path specifier is symbol "^" which may be followed by a template type name. Symbol "^" represents the first ancestor (i.e. parent, grandparent . . . ) module whose type matches the type designated after the symbol.

A first separator is symbol ".". Symbol "." indicates that the text following is the symbolic name of a child module or data definition within the program unit designated by the path specifier preceding the separator. A second separator is symbol "\" indicating that the text following it is the symbolic name of an attribute associated with the entity designated by the path specifier preceding the separator. For the purposes of this explanation, attributes will include module list names.

Figure 19:
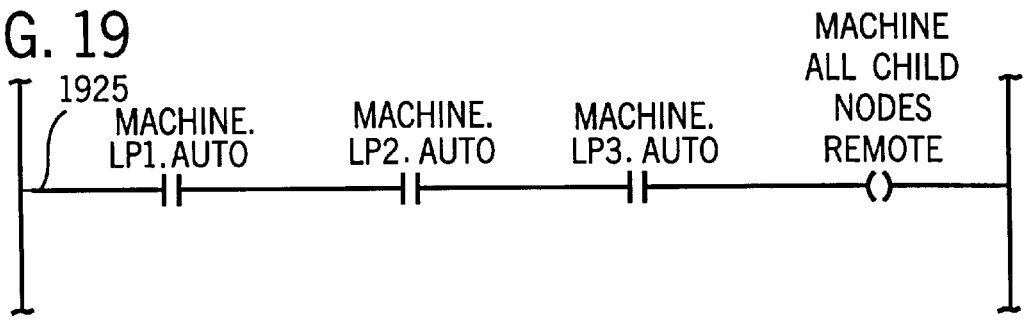
FIG. 19 illustrates a master control panel in accordance with a preferred embodiment.

Referring to FIG. 19, a standard "all child nodes remote" LL rung 1925 that might appear in master control panel logic is illustrated. The rung 1925 includes three contacts MACHINE.LP1.AUTO, MACHIINE.LP2.AUTO and MACHINE.LP3.AUTO and a single coil named MACHINE.ALL CHILD NODES REMOTE. Each of the three contacts "MACHINE.LP1.AUTO", MACHINE.LP2, AUTO", and "MACHINE.LP3.AUTO" corresponds to a separate local control panel (not shown).

Figure 20:
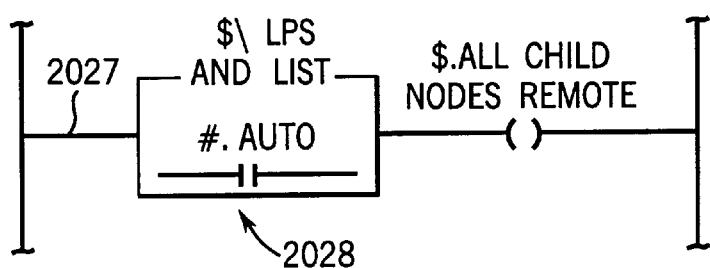
FIG. 20 illustrates the symbolic expression language in accordance with a preferred embodiment.

Referring also to FIG. 20, the symbolic expression language described above can be combined with an "AND list" macro to provide an LL rung 2027 that can expand into rung 1925 having three contacts when compiled. An AND list macro 2028 and a single "all child nodes remote" coil make up rung 2027. The "AND list" macro 2028 includes symbol "$" which specifies a path to the present module. The "\" symbol indicates that the symbolic name "LPS" that follows is an attribute associated with the present module. In this case "LPS" is a module list associated with the main control panel module. Thus, the expression "$\LPS" represents a module list in the main control panel module. The module list provides operands to the "AND list" macro. The "AND list" macro 2028 includes the condition "Auto" with the path specifier "#". Specifier "#" indicates that the "Auto" condition should be concatenated with the operands above the "AND list" command.

When compiled by an automated compiler (or by hand), the "AND list" macro 2028 expands into series contacts, one contact for each reference in the module list "LPS." For example, assuming the module list "LPS" included a job-specific membership of three instances name "LP1," "LP2" and "LP3," rung 2027 would expand into rung 1925. Similarly, if the module list "LPS" included a job-specific membership of ten instances, rung 2027 would expand into a rung having ten series contacts, each contact named for a different one of the ten instances in the list. Thus, using the symbolic expression language in conjunction with the "AND list" macro, the number of series contacts can vary, depending upon job-specific parameters.

Figure 21:
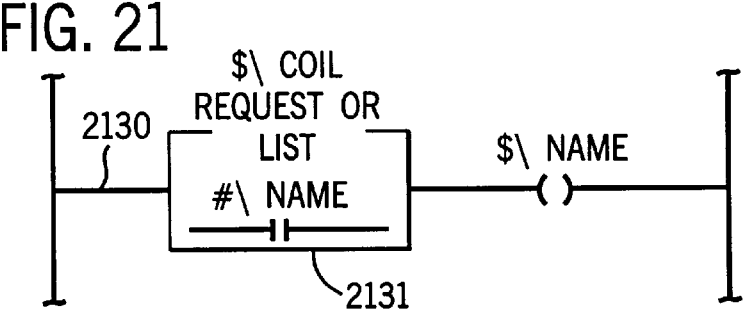
FIG. 21 illustrates an exemplary rung in accordance with a preferred embodiment.

A second macro instruction is an "OR list" instruction. The "OR list", like the "AND list", when combined with the symbolic expression language, provides for variable rung forms, depending upon job-specific parameters. However, instead of providing series contacts, the "OR list" macro provides variable numbers of parallel contacts. An exemplary rung 2130 including an OR list macro 2131 is illustrated in FIG. 21. "$\Coil Requests" specifies a module list named "Coil Requests" having a job-specific membership. Each instance in the "Coil Requests" list is to be concatenated with a coil request name and all instances are to be placed in parallel in rung 2130 when the rung 2130 is compiled. Therefore, if module list "Coil Requests" includes three job-specific instances, three parallel contacts (one contact named for each instance) will replace the "OR list" macro 2131 when compiled. If the module list "Coil Requests" includes ten job-specific instances, the "OR list" macro 2131 would be replaced by ten, uniquely named parallel contacts.

The "OR" and "AND list" macros are extremely powerful and add a level of flexibility to programming in the template language that cannot be provided using the standard LL rung form. Using the macros in conjunction with the symbolic expression language facilitates templates that refer to variable job-specific parameters and to data items defined in other modules by associated templates even before the job specific parameters and data items are defined.

In addition to the macros and symbolic expression language, there is one other type of extension to the standard LL rung form itself called pseudoinstructions. Pseudoinstructions take hree forms: XPC, XPO and OTX which correspond to standard IC (examine if closed), XIO (examine if open) and OTE (output enable) LL instructions. XPC and XPO stand for examine predicate closed and examine predicate open, respectively. OTX stands for output expansion.

One of the problems with any LL programming shortcut based on a modular library of LL logic components is that logic must be provided to accommodate all possible requirements. Therefore, in many cases logic that is not required in a specific application will be provided to cover general requirements. Moreover, sometimes logic required in general applications are not permitted in specific applications.

For example, typically there is less danger associated with movements in a cycle's second half than with movements in the first half and therefore, a reduced set of conditions may be provided for second half-cycle movements than for first half-cycle movements. The first half-cycle includes movements that shift the mill spindle toward or into a workpiece. The second half-cycle includes movements that shift the spindle out of and away from the workpiece. Prior to any axis movement there is typically a set of conditions that must be met to ensure a safe move. Therefore, a reduced set of conditions can apply to second half-cycle movements, the reduced set reflecting the reduced possibility of danger.

The preferred template set includes only one template type corresponding to axis movement. Therefore, the axis movement template must include logic for both the full set of conditions used in the case of a first half-cycle movement and the reduced set of conditions used in the case of a second half-cycle movement. Referring to FIG. 22, a required full set of conditions will show up in an LL logic rung 2234 as a full set 2233 of series-connected contacts C1–C5. When all of the conditions are met, all of the contacts C1–C5 are closed and an associated output coil OUT is energized, indicating that an associated axis movement can begin.

The reduced set of conditions corresponding to the second half-cycle shows up in LL logic as a branch 2235 parallel to the full set 2233 of contacts, the branch including a reduced set of contacts C6, C7; one contact for each condition in the reduced condition set. Thus, the axis movement template provides LL logic 2233, 2235 for movements in both the first and second half-cycles. While both the full and reduced logic sets may be applicable to movement in the second half-cycle, they are not both applicable to movements in the first half-cycle. In other words, if an axis movement module corresponds to a first half-cycle movement, branch 2235 including the reduced logic set is not permitted, but branch 2235 is required for a second half-cycle movement.

XPC and XPO pseudoinstructions are used to examine compile time constants representing configuration options such as the ones shown in FIG. 22. The effect of the evaluation will be either a short or an open circuit in the generated program, depending on evaluation result. For instance, the result of an XPC on a true condition is a short circuit while the result of an XPO on a true condition is an open circuit. In FIG. 22, an XPC contact 2236 identifying a second half-function is provided in series with the logic of branch 2235. The XPC contact 2236 shorts when rung 2234 is associated with a second half-cycle movement and is an open circuit when rung 2234 is associated with a first half-cycle movement. Therefore, upon compiling, the XPC contact 2236 leaves branch 2235 in rung 2234 when a corresponding movement is in a second half-cycle and removes branch 2235 when a corresponding movement is in the first half-cycle.

A side effect of the compile time evaluation of pseudo-instructions can be further optimization of the generated logic. For instance, an open circuit in series with other input instructions renders the other instructions unnecessary. A branch that is shorted renders parallel branches unnecessary. With the XPO and XPC instructions, unnecessary instructions can be removed from their associated circuits without changing the meaning of the circuit. Upon compilation, optimization can ripple recursively through a program, potentially causing entire rungs, including coils, to be discarded.

Template language allows expression and encapsulation of that, and only that, which is universally true of a particular machine component or operating characteristic. A side effect of this is that the granularity of some of the templates can be very fine. This means that the topology of some of the circuits after expansion can be very inefficient. For example, referring to FIG. 22, the redundant branch 2233 including contacts C1–C5 would be produced for second half functions. To rectify this, the OTX pseudoinstruction enables the template author to instruct the compiler to optimize certain circuits. When the compiler encounters an XIC or XIO instruction whose contact is an OTX coil, it will replace the instruction with an in-line expansion of the actual contents of the rung associated with the OTX coil.

For example, referring to FIG. 22-1, a first LL rung 2220 includes contacts A and B and an OTX coil C. A second LL rung 2222 includes contacts C and D and other "stuff" where contact C corresponds to the OTX coil C. When compiled, coils A and B corresponding to OTX coil C are expanded into the coil in branch 2222 yielding branch 2224 as shown in FIG. 22-2. This provides the template author with a large degree of control over the resulting topology of the generated circuits.

Figure 23:
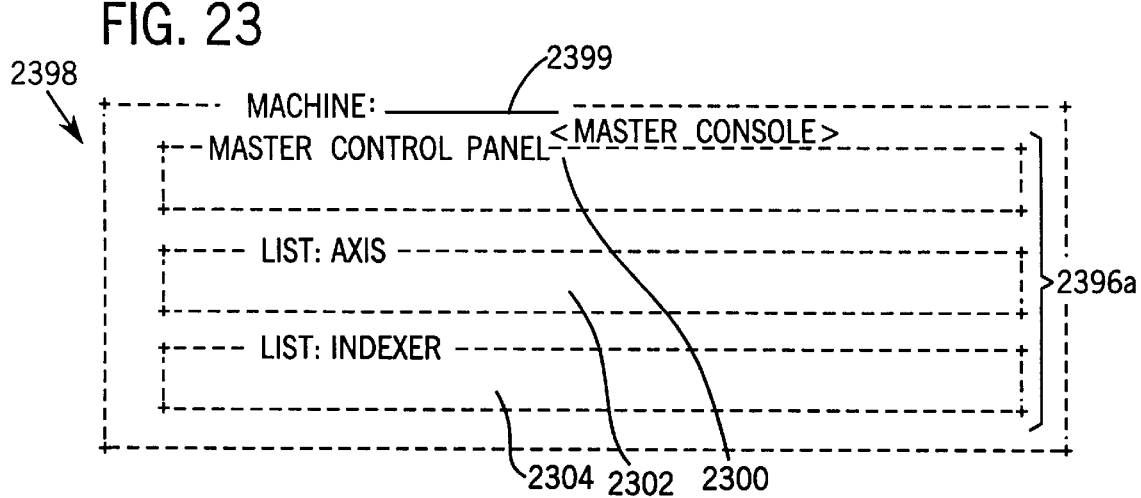
FIGS. 23–35 illustrate an exemplary set of templates in accordance with a preferred embodiment.

Referring now to FIGS. 23–35 an exemplary set of templates is provided which can be used to better understand template language generally. The preferred template group is a subset of a template set specifically designed for the metal-removal industry. Referring to FIG. 23, a machine template 2398 includes the template type designation "machine" and a blank name field 2399 that has to be filled in to identify a specific machine module. The machine template 2398 itself does not directly include LL logic and hence, has no LL logic section. Instead, the machine template has a child module specification section 2396a including several module specifications including a named module specification called "master control panel" 2300 and both axis- and indexer-list module specifications 2302, 2304, respectively. Because each machine must include at least one control panel for safety purposes, every machine template (and hence every machine module) must include a master control panel specification 2300.

Figure 24:
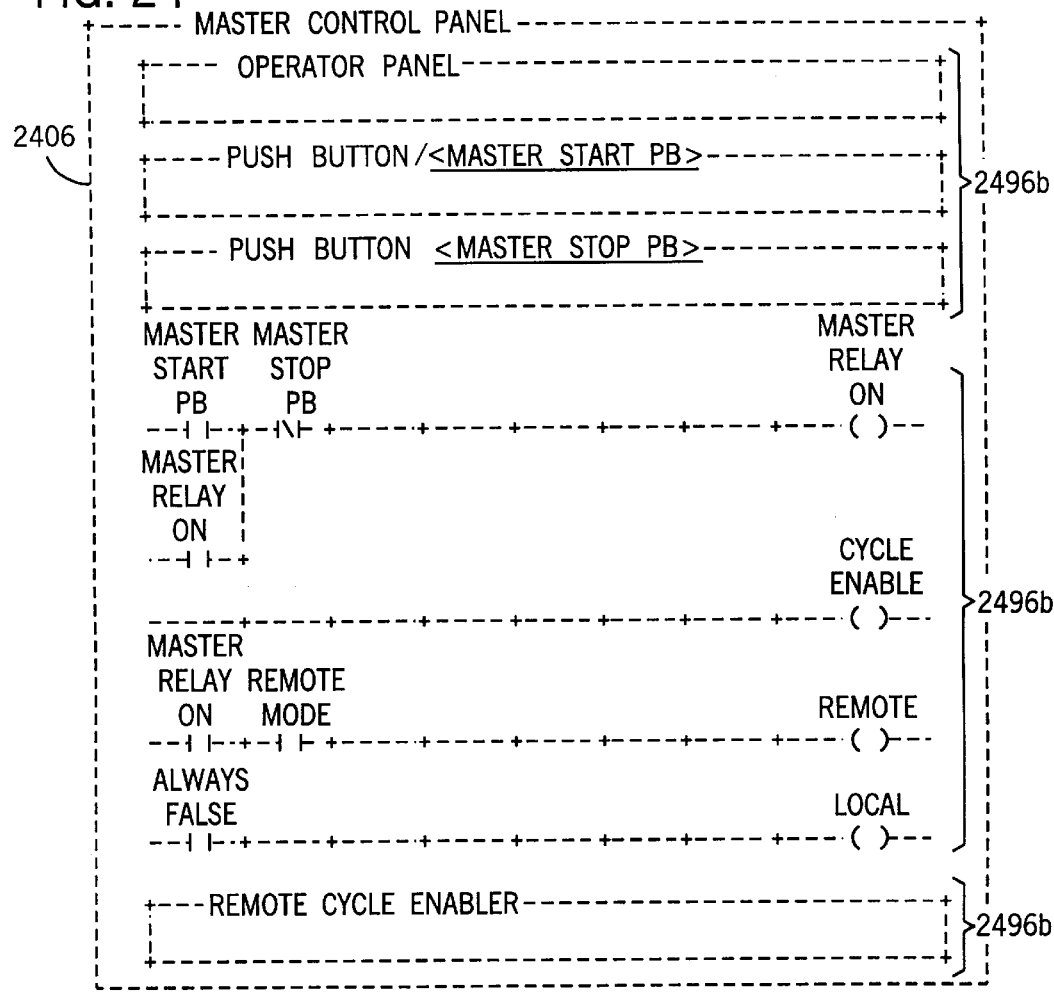

Referring to FIG. 24, a master control panel template 2406 includes an LL logic section 2494b required for start and stop push buttons. The logic in section 2494b is universally required for all master control panels. In addition, the master control panel template 2406 includes a child module specification section 2496b that references other modules using module specifications. The modules designated in the child module specification section 2496b may be required to completely provide LL logic to control the master control panel 2458. Whether or not modules must be designated in the child ID section 2496b depends on job specific requirements. Note that named module specification "remote cycle enabler" and fixed module specification "operator panel" are required attributes of any master control panel module.

Figure 25:
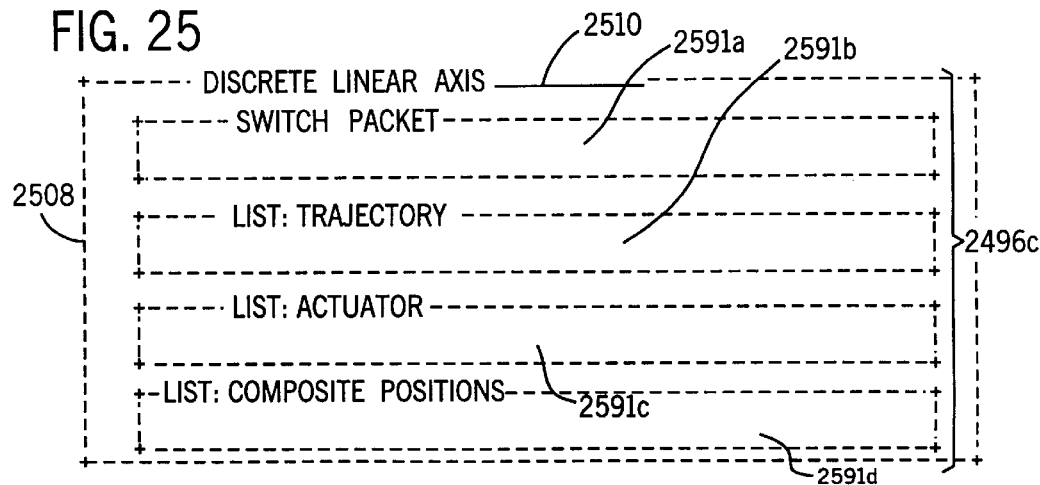

Referring again to FIG. 23, the module list named "axis" 2302 includes a list of all machine-wide axes. In the present example, the "air" axis is the only machine-wide axis and therefore, the axis-module list specification would include only a single specification called "air". Referring to FIG. 25, an axis template 2508 includes an axis template designation, a name field 2510, and a child module specification section 2596c having three separate module specifications for switch packet, trajectory and actuator, all of which have to be detailed to completely define an axis.

Figure 26:
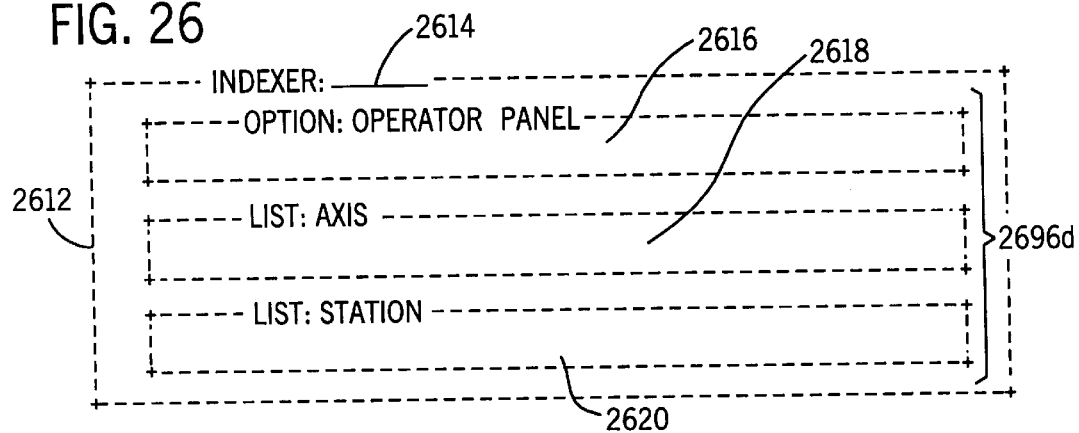

Referring again to FIG. 23, the indexer module list specification 2304 includes a list of indexer modules, one for each machine indexer. In the present example, there is only a single indexer T1 and, therefore, only one indexer entry, identifying indexer module T1, would appear in the indexer list specification. Referring to FIG. 26, an indexer module includes an indexer template designation, name field 2614, and a child module specification section 2696d. The module ID section 2696d includes an optional module specification 2616 for a control panel and two module list specifications, one for axis 2618 and another for station 2620. In the present example, because there is no indexer control panel, the optional control panel would not be designated. Because we have one indexer axis (i.e. "transfer"), there would be one specification in the axis module list specification 2618 named "transfer". In addition, because there are five stations, there would be five specifications in the station module list specification 2620. Each station designated in module list 2620 would identify a different station module corresponding to a different one of the five stations S1–S5.

Figure 27:
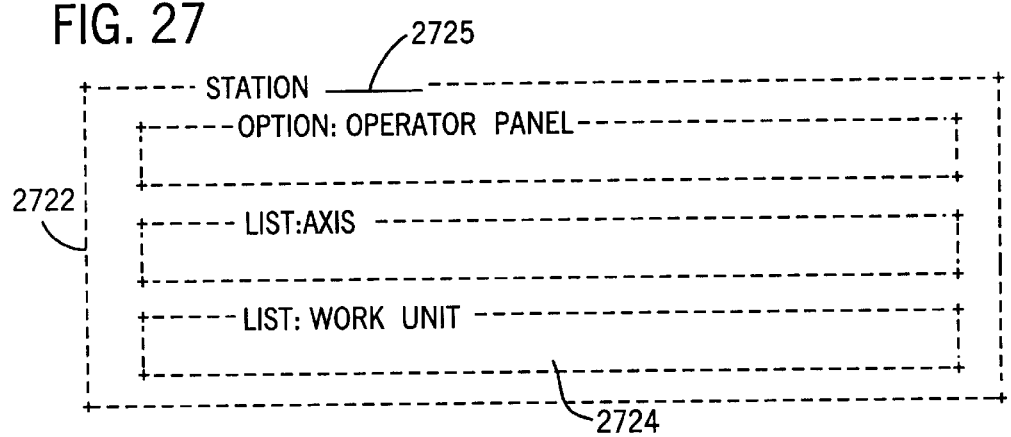

Referring now to FIG. 27, the station template 2722 is nearly identical to the indexer template 2712 of FIG. 27, except that, instead of having a station module list specification, the station template 2722 includes a work-unit module list specification 2724. In the present example, there would be five separate station modules like the one in FIG. 27, each module identified by a different name in the name field 2725 and corresponding to a like-named station in the station module list 2720 of the indexer module named "T1".

Figure 28:
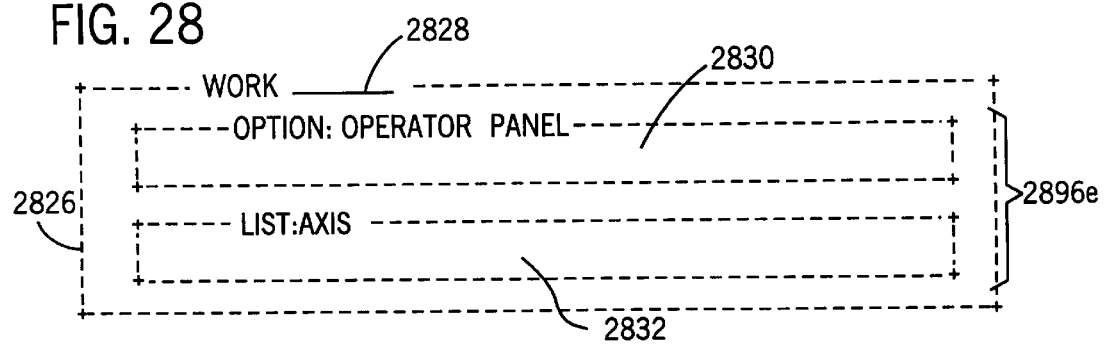

Referring now to FIG. 28, a work-unit template 2826 includes a work-unit designation, a name field 2828, and a child module specification section 2896e having only two module specifications, an optional operator panel module specification 2830, and an axis module list specification 2832 identifying all axes associated with a work-unit. In the present example, because the horizontal mill 2822 includes three axes (spindle, main slide, and cross slide), three separate specifications would be included in the axis module list specification 2832 identifying three separate and distinctly named axis templates. In addition, because the horizontal mill 2822 includes a local control panel 2857, the optional operator panel module specification would be designated.

The templates in FIGS. 37–43, represent all of the templates required to completely specify an axis. To specify an axis, it is necessary to define all positions associated with an axis and switches that indicate positions. The switches act as controller inputs for the axis. In addition, it is necessary to define possible axis-movement requests, herein referred to as trajectories. Moreover, it is also necessary to define actuators used to effect trajectories and how a controller will communicate with the actuators (i.e. coils and coil requests). Coils and coil requests act as controller outputs to the actuators.

Referring also to FIG. 18, a template-based tree branch 1800 for one axis, the main slide axis of the horizontal mill, is illustrated showing the hierarchical relationship between modules required to define the main slide axis. Referring also to FIG. 25, to accommodate all the information required to specify an axis, the axis template 2508 includes a child ID section 2596c having a named "switch package" module specification 2591a and sections 2591b and 2591c for trajectory and actuator module list specifications, respectively. Therefore, in module list specification 2591b, the trajectory list would only include two specifications, one for "advance" and one for "return". In FIG. 18, the "advance" and "return" trajectories are shown as child modules 1804 and 1806.

Figure 37:
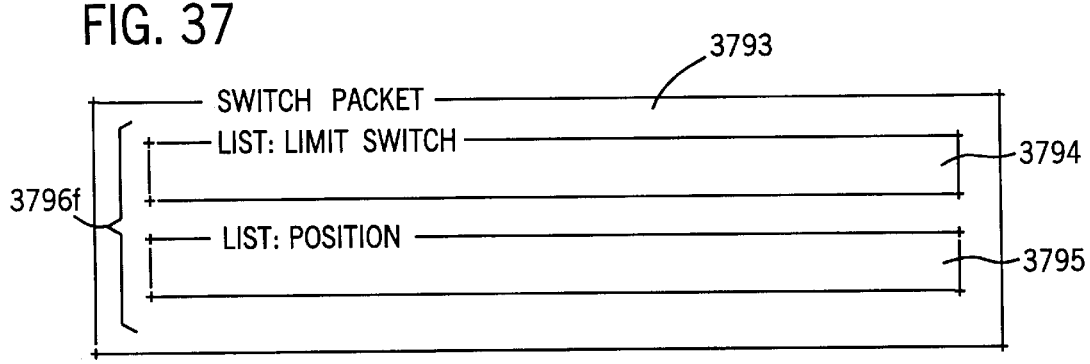
FIGS. 37–43, represent all of the templates required to completely specify an axis in accordance with a preferred embodiment.

Referring still to FIG. 25, the main slide subassembly includes only a single motor, which is the main slide actuator. Therefore, only one actuator "motor" will be designated in the actuator module list specification 2591c. In FIG. 18, the main slide actuator is shown as child module 1808. Switch package module 1810 is also a child module of main slide axis module 1802. Referring also to FIG. 37, the switch package template 3793 includes child ID section 3796f having two module list specifications 3794 and 3795. A "limit switch" module list specification 3794 is used to specify axis switches. The main slide axis includes advanced switch 3739 and returned switch. Thus, switch module list specification 3794 would specify two switches as switch package child modules named "advanced LS" and "returned LS."

Figure 38:
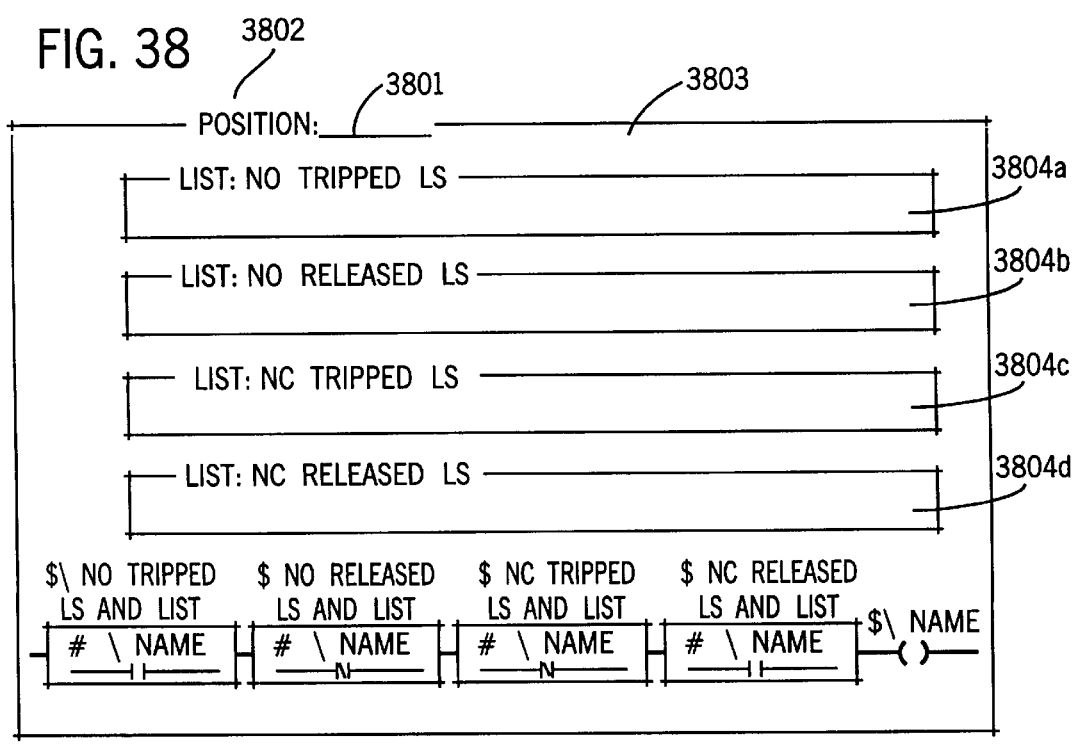

The two switches define three main slide positions named "advanced," "intermediate" and "returned." Therefore, position module list specification 3795 would specify three positions as switch package child modules named "advanced," "intermediate," and "returned." Referring to FIGS. 37 and 38, a position template 3803 is used to provide a position module for each position designated in position list section 3795. Each position template 3802 includes a name field 3801 for identifying the specific position modules (i.e. in the present case "advanced", "intermediate" and "returned"). In addition, each position template 3803 includes four separate module list specifications 3804*a*, 3804*b*, 3804*c* and 3804*d* corresponding to two possible types of limit switches and two possible states of each type of switch (i.e., normally open (NO) tripped, NO released, normally closed (NC) tripped, and NC released).

Each of the lists 3804*a*, 3804*b*, 3804*c* and 3804*d* is populated with switches from switch module list specification 3894 that are in a corresponding state (i.e., tripped or released). For example, when a main slide subassembly is in the advanced position, the advanced switch is tripped and the returned switch is released. Assuming both switches are wired normally open (NO), the advanced switch would be listed in the NO tripped LS module list specification 3804*a* while the returned switch would be listed in the NO released LS module list specification 3804*b* (in this case no switches would be listed in module list specifications 3804*c* and 3804*d*). Referring again to FIG. 18, the NO tripped advanced switch and NO released returned switch are shown as child modules 1816 and 1817 for the position module 1813 named "advanced."

Similarly, position templates for the "intermediate" and "returned" positions would be populated with appropriate switches. In FIG. 18 intermediate position module 1814 has two child modules, "NO released advanced LS" 1818 and "NO released returned LS" 1819 while returned position module 1815 has child modules "NO released advanced LS" 1820 and "NO tripped returned LS" 1821.

Figure 39:
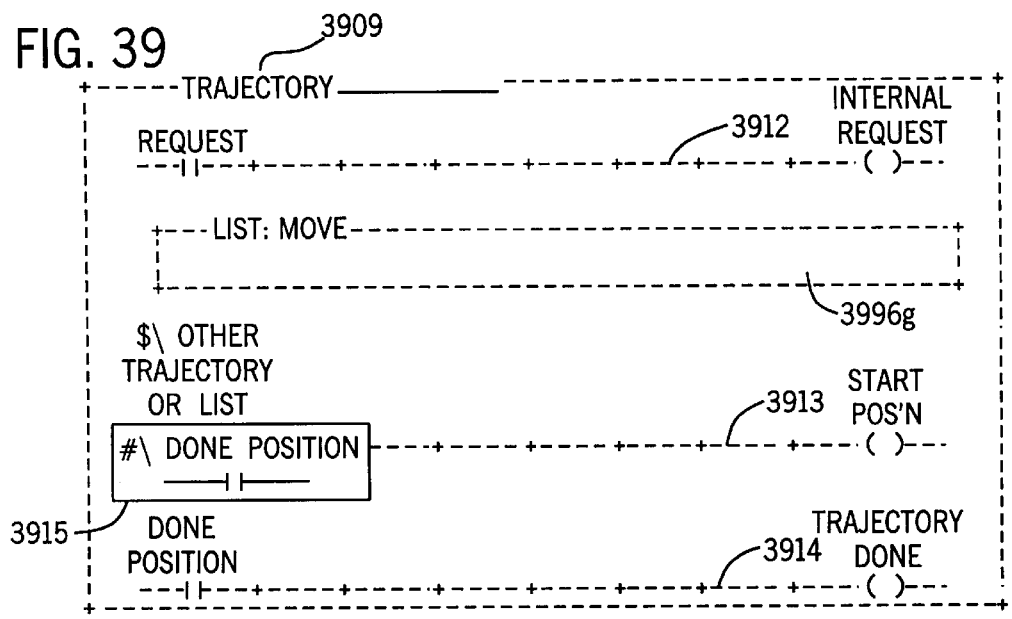

Referring to FIGS. 25 and 39, a trajectory template would have to be designated and populated for each axis trajectory (i.e., each movement request). For the horizontal mill main slide, there are two trajectories, "advance" and "return". Therefore, there would be two trajectory modules, one named "advance" and a second named "return" which are shown as child modules 1804 and 1806, respectively, in FIG. 18.

Each trajectory can be divided into various moves. A simple single speed linear trajectory includes three moves. An "initial" move begins trajectory motion followed by an "intermediate" move between two positions, the trajectory ending with a "final" move that stops the motion. Thus, referring still to FIG. 39, the trajectory template 3909 includes a child module specification section 3996*g* for a move module list specification.

Referring also to FIG. 18, the "advance" trajectory module 1804 includes "initial" 1822, "intermediate" 1823 and "final" 1824 move child modules. The "return" trajectory 1806 includes similar child modules 1825, 1826, 1827.

Figure 40:
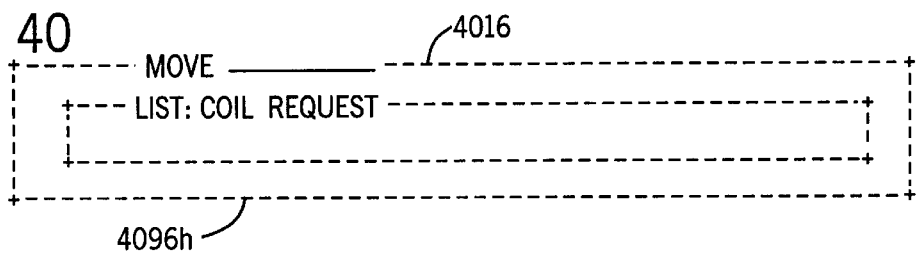
Figure 41:
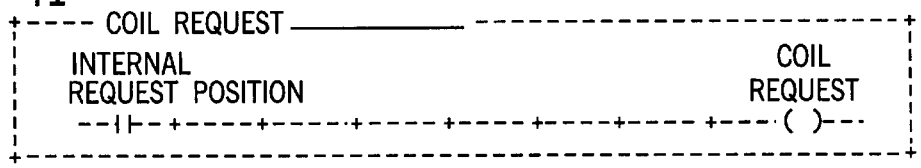

Referring to FIG. 40, a move module based on move template 4016 must be provided for each move in child module specification section 4096*h*. Each move template 4016 includes a child module specification section 4096*h* for a coil request module list specification. A coil request is a request to a specific coil to actuate an actuator (e.g. motor) when a specific position associated with a move has been reached. For example, on a two speed motor, one coil may drive the motor at one speed to facilitate one move. A second sequential move, however, may require excitement of two coils to activate two motors to achieve a greater speed once an intermediate position has been reached. Thus, a single move may require two or more different coil requests. A coil request module based on the coil request template shown in FIG. 41 must be provided for each coil request designated in the child module specification section 4096*h* of a move module.

Figure 42:
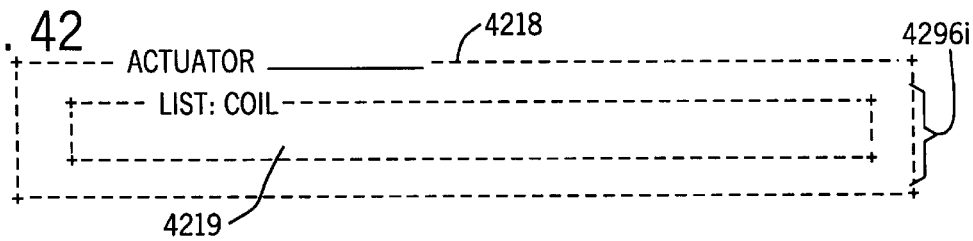
Figure 43:
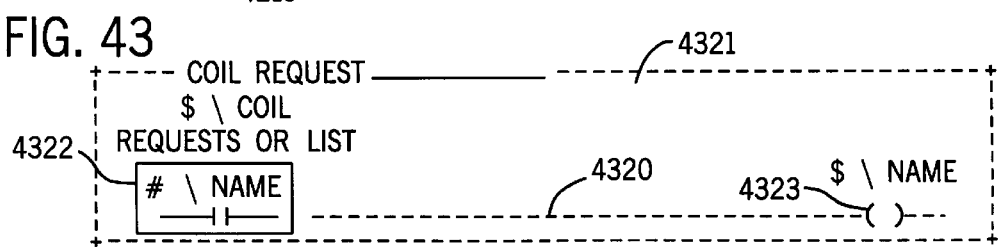

Referring to FIGS. 25 and 42, for each actuator designated in actuator module list specification 2591*c*, an actuator module based on actuator template 4218 must be provided. Each actuator module must be named to distinguish specific modules. The actuator template 4218 includes a child module specification section 4296*i* for designating a coil module list specification 4219. A coil is an output to drive a motor or the like. Referring also to FIG. 18, for the horizontal mill main slide there are only two coils, a "work" coil and a "home" coil shown as child modules 1828 and 1829. Referring to FIG. 43, a coil module based on coil template 1821 must be provided for each coil module designated in a specification 1819.

Once all the trajectories, actuator, limit switches, positions, moves, coil requests, and coils have been identified and associated module list specifications have been populated and required modules have been provided, the tree branch and corresponding LL logic required to completely control the axis has been designated. Modules based on all of the templates illustrated in FIGS. 37–43 are required to define each axis.

C. Function Contingencies

Using a complete template set it should be fairly easy for one skilled in the art to construct a complete template-based machine tree using the template set. However, at least one template-based programming aspect is not entirely intuitive based upon a perusal of the complete template set. This complex template programming aspect is how the function template 4936 in FIGS. 49A and 49B which controls function performance is to be used.

Function performance must be limited by the instantaneous characteristics of other functions in the same cycle. These instantaneous characteristics can be gleaned from a bar chart. For the purposes of referring to various functions in this explanation, where one function is observed from the perspective of another function, the function observed will be referred to as an observed function and the other function will be referred to as the observing function.

Four separate relationships exist between any two of the four functions, (or, more precisely, between the action of the observing function and the done condition of the observed function). A first relationship is a "stable/unstable" relationship. Stable simply means that an observed function does not start or stop during an observing function. A second relationship is a "cancel by other/cancel by me" relationship. Where an observed function is unstable from the perspective of an observing function, the state of the observed function is changed either by the observing function or by some other condition. When the observing function changes the observed function state, the observed function is said to be canceled by the observing function. From the perspective of the observing function, the second function is categorized as "canceled by me". When some condition other than the observing function changes the observed function state, from the observing function perspective, the observed function is "canceled by other".

A third relationship is a "my half-cycle/other half" relationship. "My half-cycle" means that an observed function starts before an observing function in the observing function's half of a cycle. "Other half" means that the observed function is either in the opposite half-cycle as the observing function or, if both observing and observed functions are in the same half-cycle, the observed function starts after the observing function.

The fourth relationship is a "position/latch" relationship. This relationship deals with the nature of the observed function itself. A function can have one of three different natures, position, latch or a combination of both. Functions of the position nature will end when a specific axis position is reached.

Referring now to FIG. 50, an attributes table 5031 is illustrated that includes an attributes column 5032, twelve "bucket" columns A–L, and a list of the possible function attributes described above. A user can employ this table 431 to categorize, from the perspective of an observing function, all other observed functions in a cycle into one of the twelve buckets A–L. For example when function B1 is the observing function, observed function B2 is a stable, other half, position function which places function B2 in bucket J. Similarly, with function B1 observing, observed functions B3 and B4 would be placed in bucket J.

With function B2 observing, observed function B1 is a stable, my half of cycle, position function which places function B1 in bucket I. With function B2 observing, both observed functions B3 and B4 go in bucket J. With function B3 observing, observed functions B1 and B2 are stable, other half, position functions placed in bucket J while observed function B4 is an unstable, canceled by me, other half, position function placed in bucket F. With function B4 observing, functions B1 and B2 go in bucket J while function B3 is a stable, my half-cycle, position function in bucket I. Note that with function B4 observing, function B3 is considered "stable" because the cutter clear position CCP, once achieved, is not reversed until after function B4 has been completed.

For every function B1–B4, there is an inverse function in an opposite half-cycle that is stable and is a position. For example, function B3 is the inverse of function B1 while function B2 is the inverse of function B4. Thus, all cycle functions can be divided into two groups, a first group being the inverse of the other. Gathering information about both function groups requires duplicative effort. Therefore, when defining a function by its relationships with other cycle functions, only a function corresponding to the first group, or, in the alternative, the second group, is required. When bucketing functions with function B1 observing, a user would work backwards through the cycle bucketing functions until a duplicative function is encountered. Working back, as explained above, observed function B4 would be placed in bucket J. Observed function B3, however, is the inverse of function B1 and therefore represents duplicative information. Here, because function B3 is the inverse of function B1, B3 could not possibly be performed during B1 and therefore, B3 need not be bucketed. As for function B2 information, that information is reflected in the bucketing of function B4 and is not needed.

Thus, for each function in a cycle, only one other function would be bucketed (i.e. B4 bucketed for B1, B3 for B4, B2 for B1, and B1 for B2). Obviously, the present example is extremely simple. However, one of ordinary skill in the art should easily be able to apply these teachings to bucket functions for complex cycles. In addition to instantaneous characteristics of other functions in the same cycle, commencement and continuance of a function is also contingent upon three other conditions. A first condition is that a function will not start in an automatic sequencing mode of operation unless it is in its start position. A second contingency is that a function will not start in a manual discrete stepping mode of operation until all required control buttons have been triggered by a user. A third contingency is that a function will not start in any operating mode unless prescribed safety requirements are met.

Referring again to FIG. 50, the attributes column 5032 includes attributes "my start position", "push button", and "safety" corresponding to each of the three contingencies identified above. Three additional bucket columns M–O are provided, each column corresponding to a different one of the three conditions. Each instance of a condition is bucketed into an appropriate column, M–O.

Figure 49A:
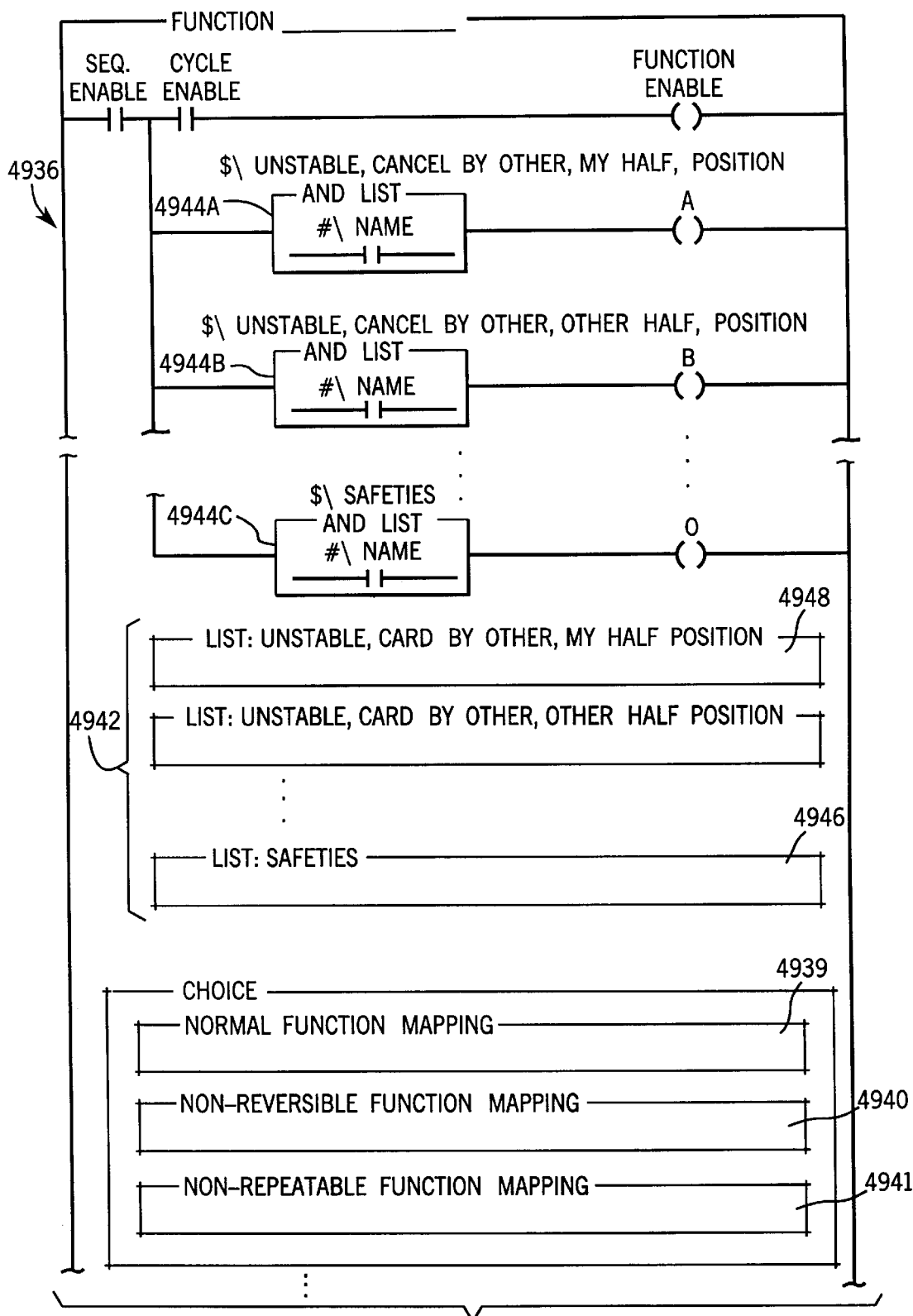
FIGS. 49A and 49B are ladder logic displays in accordance with a preferred embodiment.

Referring to FIGS. 49A and 50, after all functions and contingencies that must be bucketed have been bucketed according to attributes table 5031, they can be used to populate lists in a module list specification section 2342. The list specification section 2342 includes one module list specification for each bucket A–O in table 5031. Each module list should be populated with functions or other contingencies corresponding to the list name.

Referring to FIG. 49A, the function template 2336 also includes a plurality of "AND list" macros 234A–234O, one macro corresponding to each module list specification in section 2342. When expanded, each "AND list" macro 2344A–234O expands into a series-connected set of contacts, one contact for each member in an associated module list specification. The coils in series with the macro are excited only when each contact in the series is true. Thus, coil "A" will not be excited unless all functions bucketed and placed in the "unstable, canceled by other, my half, position" module list specification 2348 are true. Similarly, coil "O" will not be excited unless all safeties in safety module list specification 2346 are true.

In addition to the instantaneous characteristics of other functions in the same cycle and the other contingencies identified above, function performance may also depend on the physical characteristics of an axis. Physical characteristics of an axis or an industrial process can put additional constraints on the manner in which a function can safely be performed. Functions can be divided into three types based on the kinds of constraints placed on them.

A first function type is a normal function. Normal functions can be performed either in forward or reverse directions without damaging a workpiece or an associated machine's components. Performing a function in reverse means making the axis move in the opposite direction of the trajectory related to the function. This may produce the same effect as, but in terms of function logic is not the same as, performing the functions inverse function.

A second function type is a non-reversible function meaning that, after the function has been performed in whole or in part, in the forward direction, it cannot be reversed and performed in the other direction. An example of a non-reversible function is a transfer bar forward movement function which cannot be reversed once it has started forward as it might cause damage to workpieces or a fixture's axis components.

The third function type is a non-repeatable function. A non-repeatable function cannot be started forward a second time once it has been performed to completion. For example, where an axis device places a pin in a hole while performing a function, after the function is performed, the function cannot again be performed because the hole is already blocked by the first pin. Hence, the function is non-repeatable.

To accommodate the three separate function types (i.e. normal, non-reversible and non-repeating), template 2336 includes a choice module specification 438 having "normal function mapping" 2339, "non-reversible function mapping" 440 and "non-repeatable function mapping" 2341 specifications. Depending upon function types, a user would choose one of said specifications 2339–2341 and provide an associated mapping module.

The only other function characteristic that must be determined to completely define the function template 2336 is to specify in which half-cycle a function occurs, first or second. Cycle half specification is required for contact 2350 in FIG. 49B.

Figure 51:
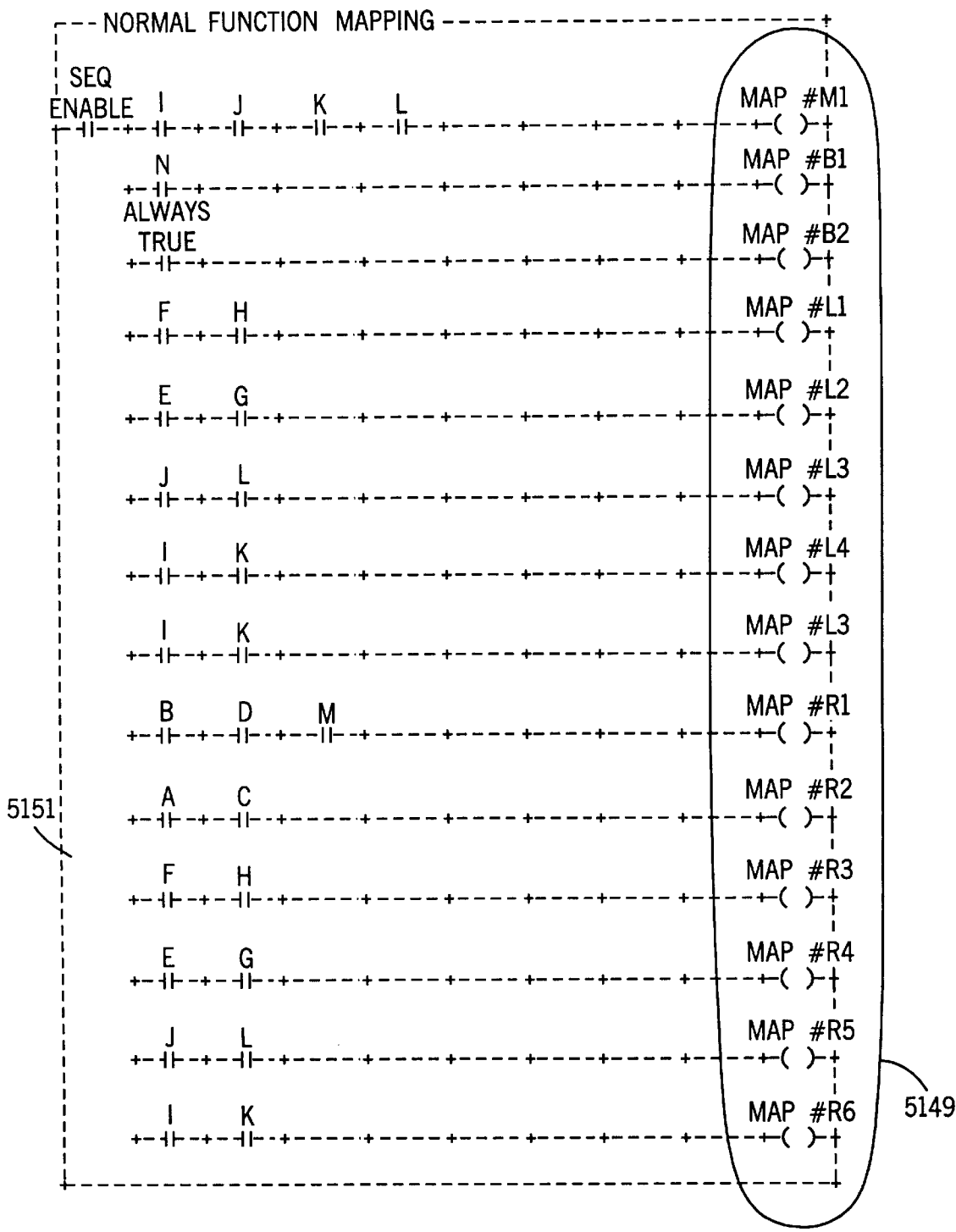
FIG. 51 is a ladder logic display in accordance with a preferred embodiment.

After all of the module specifications have been designated for the function template 49A, 49B, the user is done programming control of the specific function. Referring to FIGS. 49A and 51 when normal function mapping is chosen in template 5136, the bucketed functions and conditions from table 5031 are mapped into mapping coils 5149 according to a normal function mapping template 5151. Similarly, where the non-reversible or non-repeating mapping choices are made in template 2336, other mapping templates are used to map bucketed functions and conditions slightly differently. Thus, using a template set, function performance can be made contingent upon axis physical characteristics, instantaneous characteristics of functions sharing a cycle, the state of a cycle itself, the state of any control means associated with the function, and whether or not job-specific safeties associated with a function have been met.

D. Editors

In addition to providing truly reusable subsets of control logic, a template set makes automated programming possible wherein programming editors mirror the diagramming conventions which are already widely used in industrial control programming.

Figure 29:
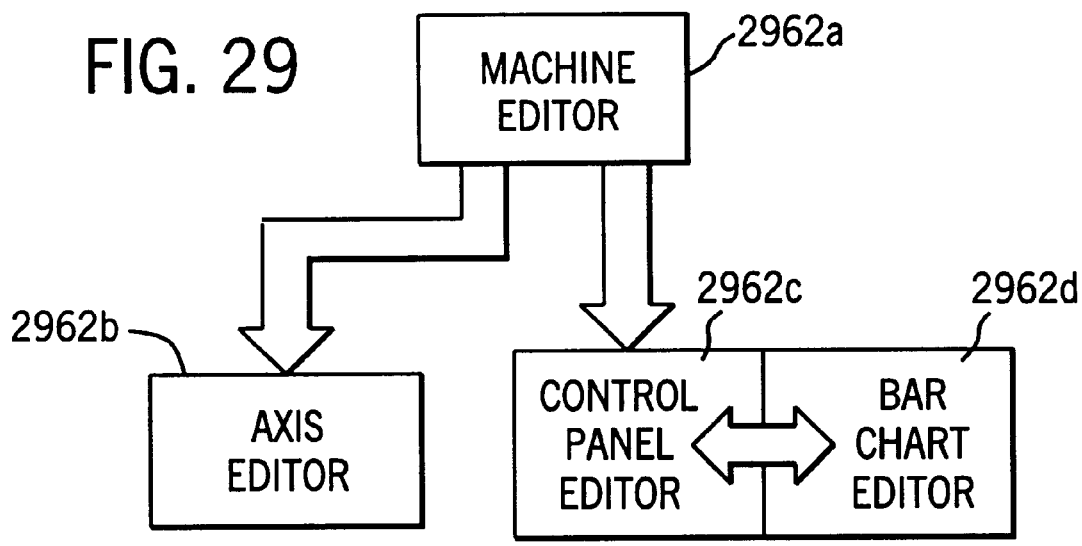

The editors allow a user to construct images that are similar to conventional diagrams and documentation. During image construction, the editors use information from the images to create modules and populate specifications in existing modules. After a user has used the editors to describe all aspects of a machine, all required modules have been populated and a complete template-based machine tree is formed in editor memory. Then, a computer is used to compile the machine tree and provide required LL control logic. Referring to FIG. 29, the four editors are referred to herein as a machine editor 2962a, an axis editor 2962b, a control panel editor 2962c, and a bar chart editor 2962d.

In addition to imitating traditional diagrams, each of the editors has been designed to incorporate conventional computer interface features that most programmers should already be comfortable using. Conventional features include an interactive computer terminal that presents programming options in pull down menu form and allows option selection using a mouse or other similar selection means.

1. Machine Editor

The machine editor 2962a allows a user to build a floor plan image directly on a computer monitor. During image construction, the machine editor 2962a constructs a template-based machine tree reflecting the floor plan image. In addition, while a user is constructing a template-based tree, the editor 2962a is simultaneously gleaning information from the tree and either creating new template-based modules or populating existing modules so as to provide a template-based tree specification.

The machine editor 2962a only facilitates construction of the floor plan and the portion of a machine tree corresponding thereto. The machine editor 2962a cannot specify specific aspects of an axis, an operator panel, or a sequence of events. Specification of these more detailed aspects of a machine are reserved for the axis 2962b, control panel 2962c, and bar chart 2962d editors, respectively. As depicted in FIG. 29, the machine editor 2962a accesses the other special editors when specific detail is required.

Figure 30:
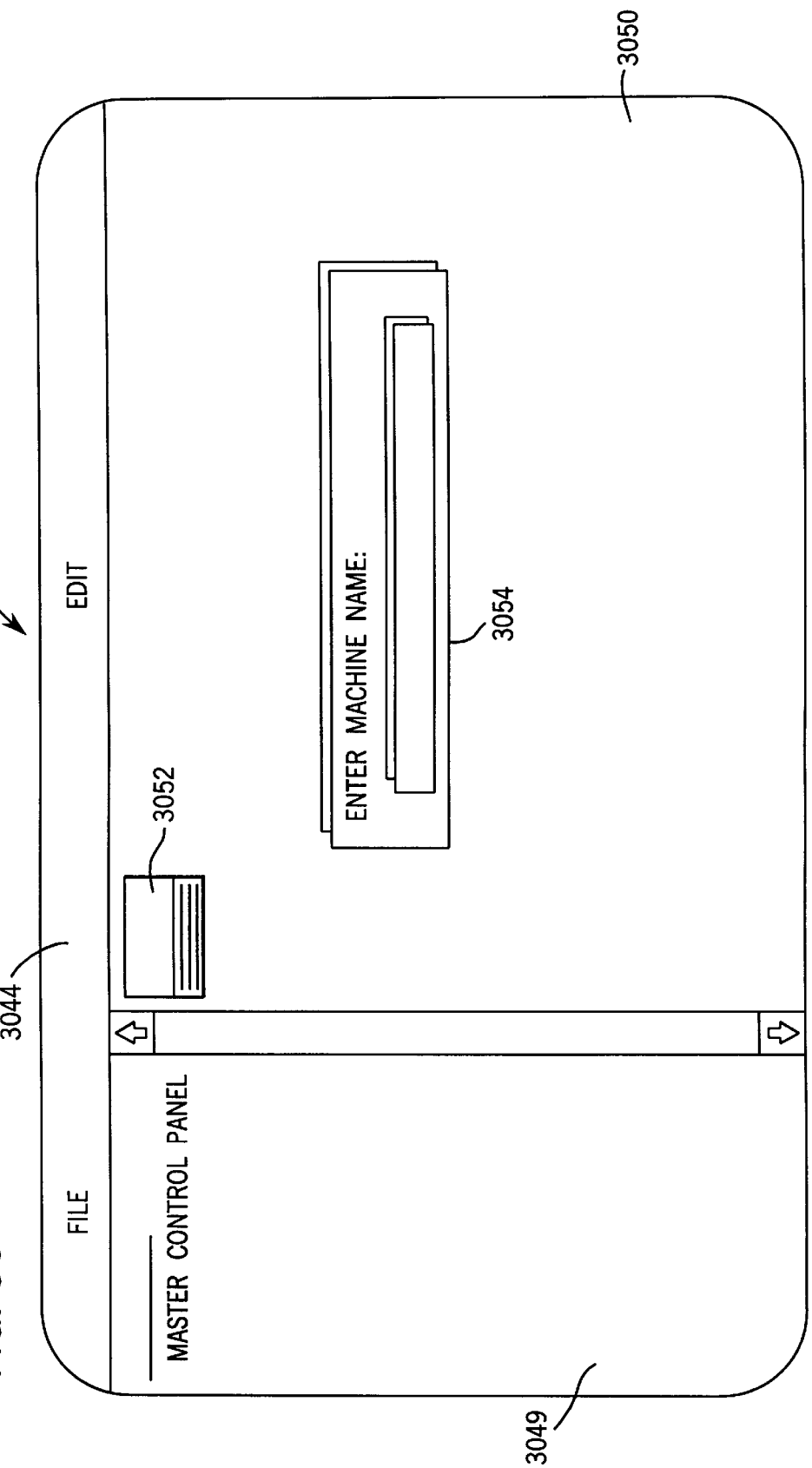

Referring now to FIG. 30, an initial machine editor image 3042 that is displayed on a monitor at the beginning of a programming session includes a menu bar 3044 at the top of the image 3042 and a split screen having a tree section 3049 and a floor plan section 3050. The tree section 3049 provides an area wherein the editor 2962a visually displays a template machine tree as a corresponding floor plan is constructed. The floor plan section 3050 is where the floor plan itself is constructed.

The menu bar 3044 includes two choices, FILE and EDIT. The FILE choice allows a user to store, retrieve, and delete files from memory. The FILE choice operates in a manner that should be familiar to an artisan of ordinary skill in the art and therefore will not be explained here in detail. The EDIT choice allows a user to simultaneously construct and edit both a floor plan in the floor plan section 3050 and a template-based tree in the tree section 3049.

Initially, a single icon 3052 corresponding to a main control panel appears in the upper left-hand corner of the floor plan section 3050 and both a machine module reference and a master control panel reference appear in the upper left-hand corner of the tree section 3049. The master control panel reference is below the machine module reference and indented to show a hierarchical parent-child relationship. These initial entries are provided to a user because they are always required as designated in the templates. Every template-based tree must begin with a machine module and every machine must have a master control panel for safety purposes. The machine module reference corresponds to the entire floor plan as constructed in the floor plan section 3050. The master control panel module corresponds to the control panel icon 3052.

Furthermore, to uniquely identify the machine, the editor 2962a initially provides a floating name box 3054 prompting the user to enter a machine name. The machine name is used by the editor 2962a to identify the correct machine module for a given industrial process. In the example above, the process is named "AB1" and therefore, the machine module name is AB1 and AB1 is eventually placed at the top of the tree representation in tree section 3049 (see FIG. 31).

After entering the machine name, a user can start building a floor plan by selecting the EDIT choice from menu bar 3044. When EDIT is selected, the editor 2962a provides a menu of possible programming options for further detailing whatever item in the floor plan section 3050 is selected. At the beginning of a programming session, there are only two possible items that can be selected, the machine itself or the master control panel. To select the master control panel, the user would click on the master control panel icon 3052. To select the machine, the user would click on an area of the floor plan section 3050 that does not include an icon. Typically, a user would wait until near the end of a programming session to detail the master control panel because he would know more about the machine at that time.

Figure 31:
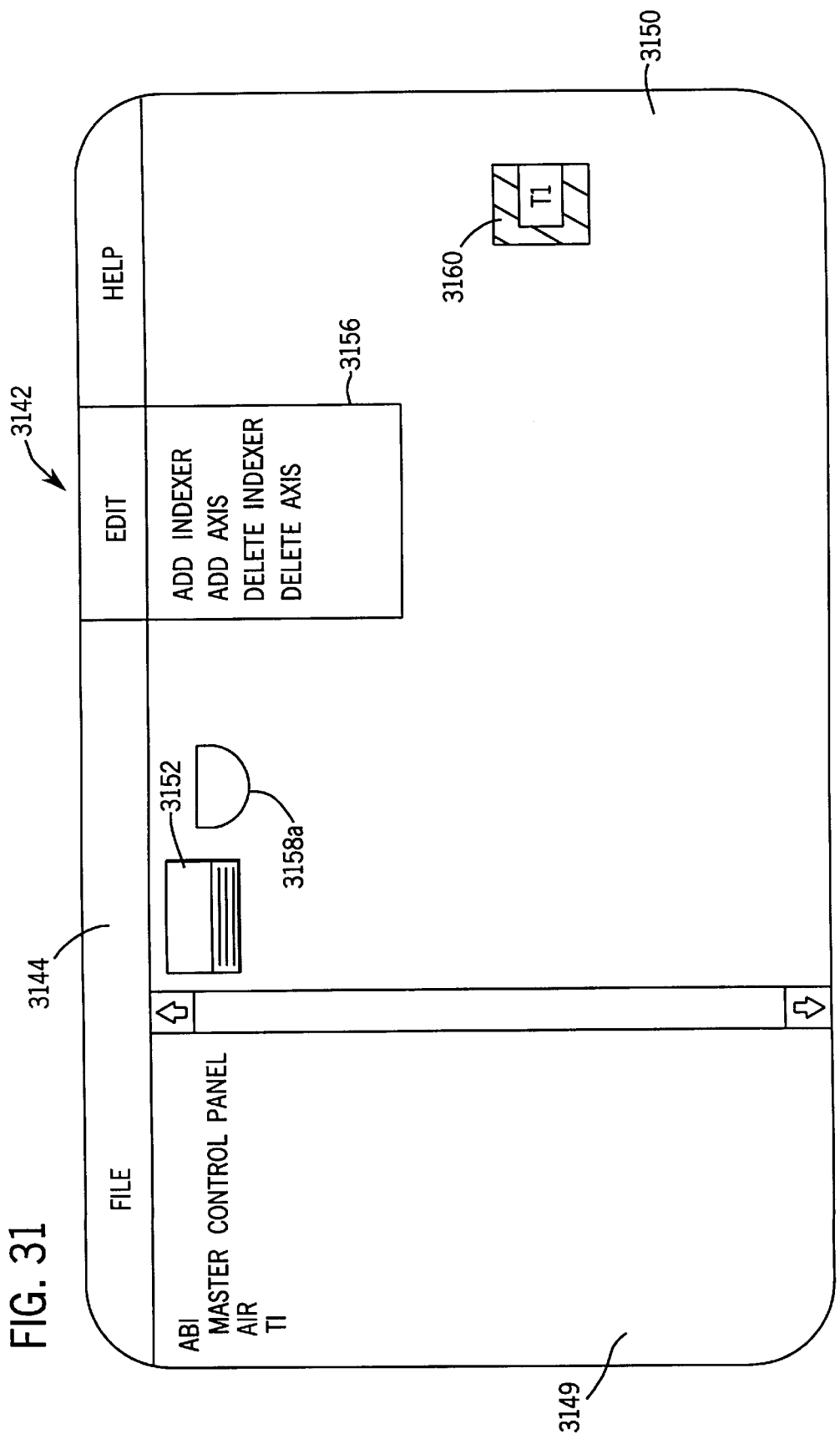

Referring now to FIG. 31, with the machine selected for editing and the EDIT choice chosen, a pull-down menu 3156 appears providing options for editing the machine module AB1. Referring also to FIG. 23, a machine template 2398 can only be edited by adding to or subtracting from the axis 2302 or indexer 2304 module list specification. Therefore, the pull-down menu 3156 includes the only four possible machine module options: ADD INDEXER, ADD AXIS, DELETE INDEXER, and DELETE AXIS. (Delete options are only provided after an axis or indexer has already been added.) Referring also to FIG. 16, in the present example, because the machine requires a single directly-connected axis, the user would select ADD AXIS from the menu 3156. Because each axis requires a unique name, after selecting ADD AXIS, the editor 2962*a* would request a name for the new axis using a floating name box (not shown).

In the present case, a user would enter "air" as the name of the axis. Then, the editor 2962*a* would provide an axis module reference named "air" below the AB1 module reference in the tree section 3149 and would also provide an air axis icon 3158*a* next to the master control panel icon 3152 in the floor plan section 3150. The "air" module reference, like the master control panel reference, will be indented from the AB1 module reference to show a parent/child relationship.

Figure 32:
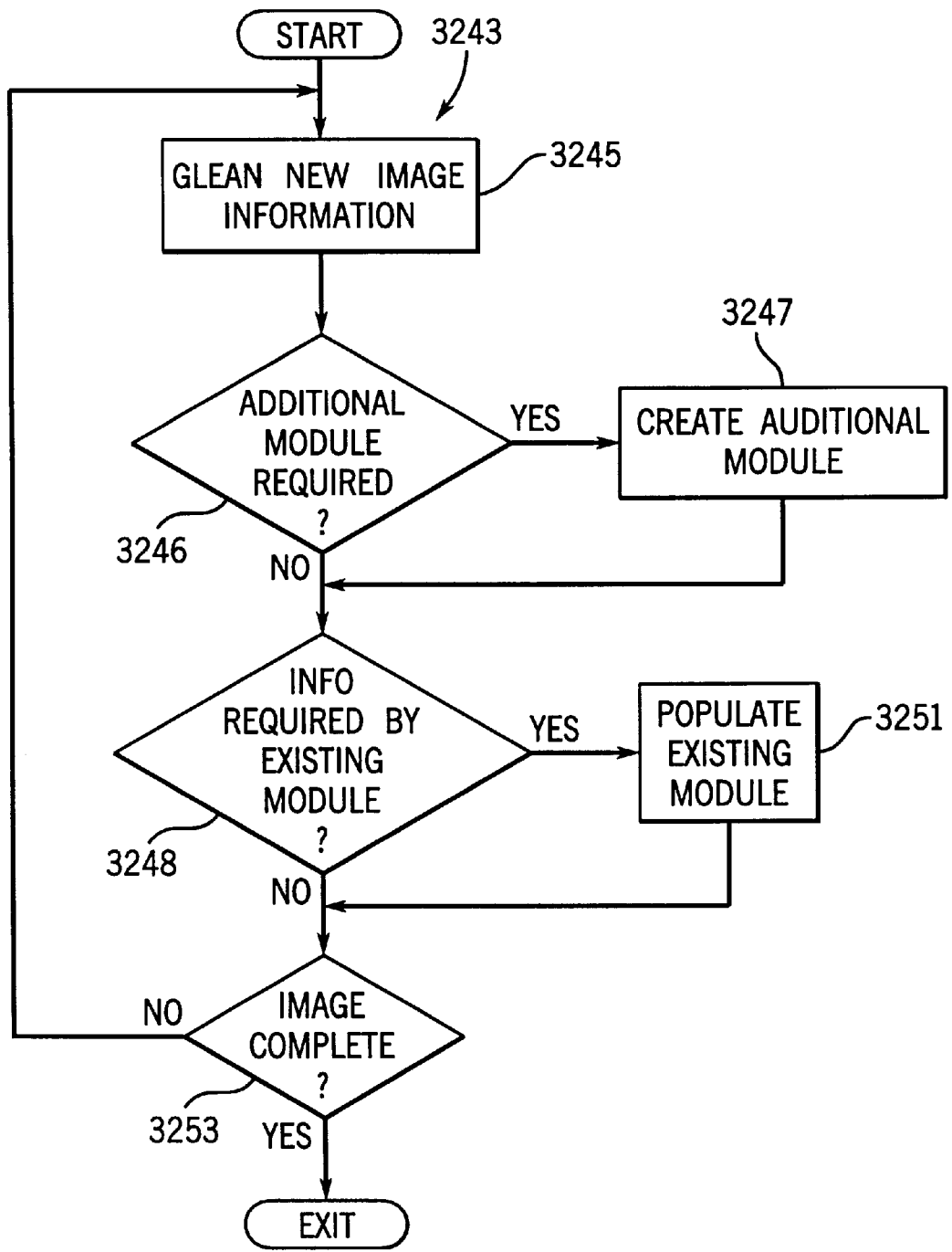

While the editor 2962*a* is forming the floor plan in floor plan section 3150, the editor 2962*a* is also creating modules and populating existing module specifications. Referring to FIG. 32, the method 3243 of creating and populating begins at process block 3245 where the editor 2962*a* gleans new image information from the image. Where an "air" axis image has been added to the floor plan and named, the editor 2962*a* would identify a new axis designated "air".

At decision block 3246 the editor 2962*a* determines if the new information requires an additional module. Where an additional module is required, at block 3247 the editor 2962*a* creates an additional module. Here, after the "air" axis has been named, the editor 2962*a* creates an axis module named "air". Next, at decision block 3248, the editor 2962*a* determines if the newly-gleaned information is required to populate an existing module. If so, at block 3251 the editor 2962*a* populates the existing module.

After the required modules have been created and existing modules populated, at block 3253 the editor 2962*a* determines if the image in section 3250 is complete. Typically image completion will be signaled when a user stores an image via the FILE option in menu bar 3144. When the image is complete, the editor 2962*a* exits process 3243. If the image is not complete, the editor 2962*a* cycles back to process block 3145 and continues to glean new image information used to create additional modules and populate existing modules.

After the "air" axis has been added to the floor plan and named, the user again selects EDIT from the menu bar 3144, this time selecting the ADD INDEXER choice to add an indexer T1. When ADD INDEXER is selected, because each indexer module requires a unique name, the editor 2962*a* would request an indexer name using another floating name box.

After entering "T1" to identify the indexer in the present example, the editor 2962*a* would provide a "T1" module reference below and indented from the AB1 module reference in the tree section 3149 and would also provide an indexer icon 3160 in the floor plan section 3150. Using the mouse the programmer could click on the indexer icon 3160 and drag it into a desired position suitable for building the desired floor plan. In FIG. 31, the indexer icon 3160 is shown in the right hand portion of the floor plan section 3150. Referring again to FIG. 32, each time new information is added to the floor plan image, the editor 2962*a* follows process 3243 to create new modules and populate existing ones.

If needed, a user can again select EDIT and add additional indexers and axes to provide a template-based machine tree and floor plan that corresponds to any machine configuration. For example, if a machine requires a source of pressurized coolant in addition to the air source, a coolant axis could be added to the machine module by again selecting ADD AXIS in the EDIT menu. In the present example, however, the machine includes only one axis ("air"), one indexer ("T1") and the required master control panel. Thus, at this point, fundamental characteristics (i.e. axis, indexers, and control panel) of the machine module have been identified.

Next, the user can further specify either the indexer "T1" or the "air" axis. To further specify the indexer T1, the user selects the indexer icon 3160 with the mouse and then again selects EDIT. Referring again to FIG. 26, the indexer template 2612 can be edited only by adding an operator panel, a station or an axis specification, or by deleting a station or axis specification. Therefore, referring to FIG. 33, in this case, the EDIT menu would provide five options: ADD STATION, ADD AXIS, ADD OPERATOR PANEL, DELETE STATION, and DELETE AXIS (delete options are only provided after station or axis has been added). At the indexer level an operator panel is optional and should only be provided when required to meet job specific characteristics.

As with the machine module, here, where an axis is to be added to the indexer T1, the user would select ADD AXIS and name the axis. The editor 2962*a* would then provide an axis module reference below the indexer module reference T1 and indented in the tree section 3149 and provide an axis icon in the floor plan section 3150. In the present example, the indexer T1 includes a "transfer" axis shown below the indexer "T1" reference in section 3149 and shown as transfer icon 3158*b* in section 3150 of FIG. 33. The transfer icon 3158*b* initially appears near the top of the floor plan section 3150 and is dragged down next to the indexer icon 3160 to signify the relationship therebetween.

To add a station to the indexer, the user selects ADD STATION and names the specific station. The editor 2962*a* then provides a station module reference in the tree section 3149 and a station icon in the floor plan section 3150 which can be dragged into its proper location next to the indexer icon 3160. Additional stations are selected in the same manner but must be provided different names.

Figure 33:
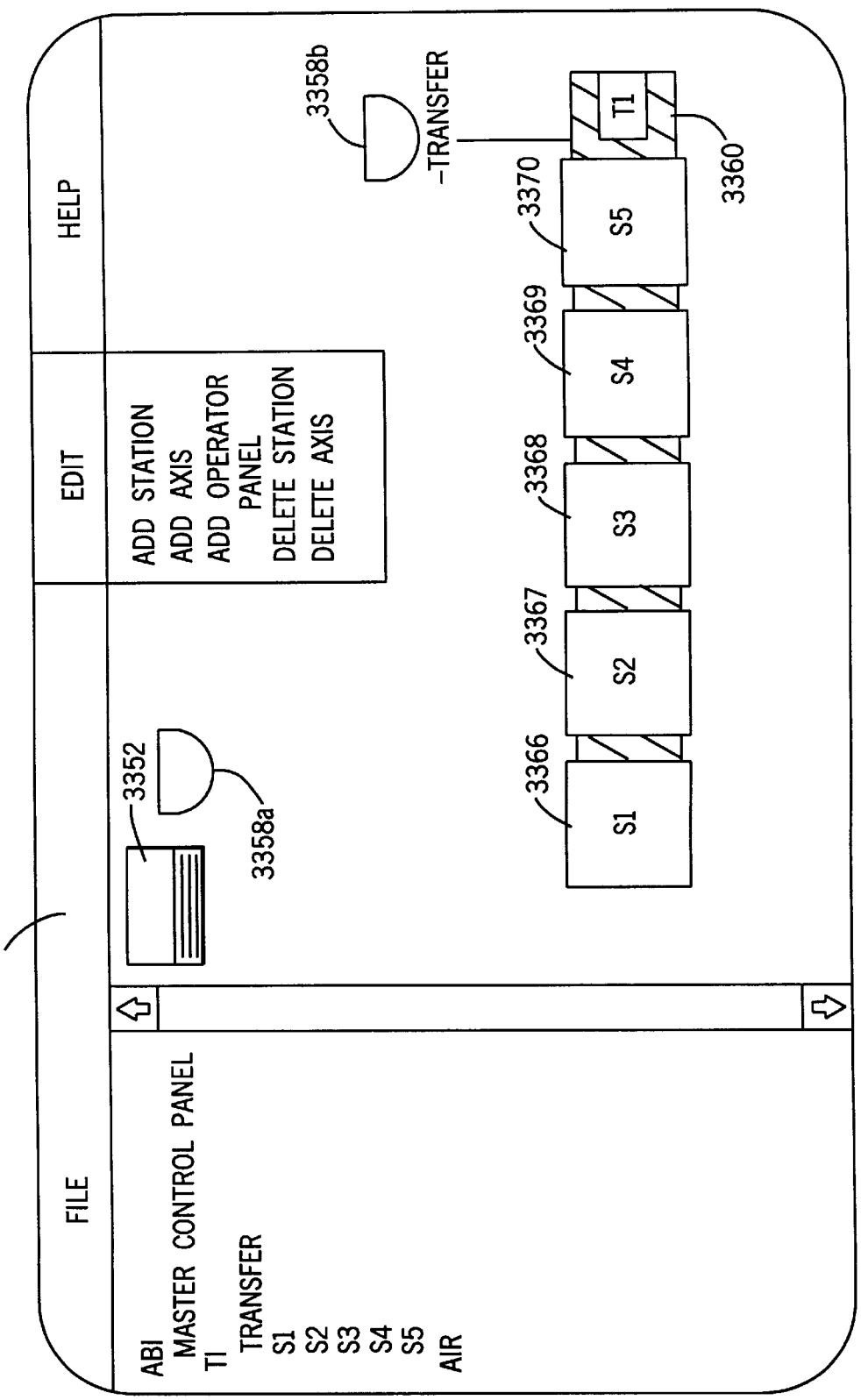

In the present example, because there are five separate stations, the user adds five separate stations to the floor plan, each of which is individually represented in both the tree 3149 and floor plan 3150 sections. In FIG. 33, all five stations, named S1–S5, are shown as five separate icons 3366, 3367, 3368, 3369 and 3370. The icons have been positioned to show machine component relationships.

This process of selecting and naming menu items to construct both the template-based machine tree and the floor plan continues until the floor plan is completely designated, from the machine level down to the axis level. A complete floor plan for the process is shown in FIG. 34 including icons representing the indexer, five stations, a work-unit named "LH" at the first station corresponding to a loader, a work-unit named "LV" at the second station corresponding to a drill, an LV unit at the third station corresponding to a turret drill, an LV unit at the fourth station corresponding to a horizontal mill, an "RH" at the fifth station corresponding to an unloader, an operator panel represented by icon 3400, a master control panel represented by icon 3452, and a separate icon for each axis.

In the tree section 3149, LH stands for "left horizontal" meaning the work-unit is positioned on the left hand side of its associated station and moves horizontally with respect to the station. Similarly, LV stands for "left vertical" meaning movement is along a vertical axis and RH stands for "right horizontal" meaning the work-unit is positioned on the right hand side of its associated station and moves horizontally with respect to the station. Despite the drill, turret drill, and horizontal mill all having the name LV, each is distinguishable because of their parent/child associations with different parent stations. Importantly, the parent/child associations are recognized by the compiler.

Figure 34:
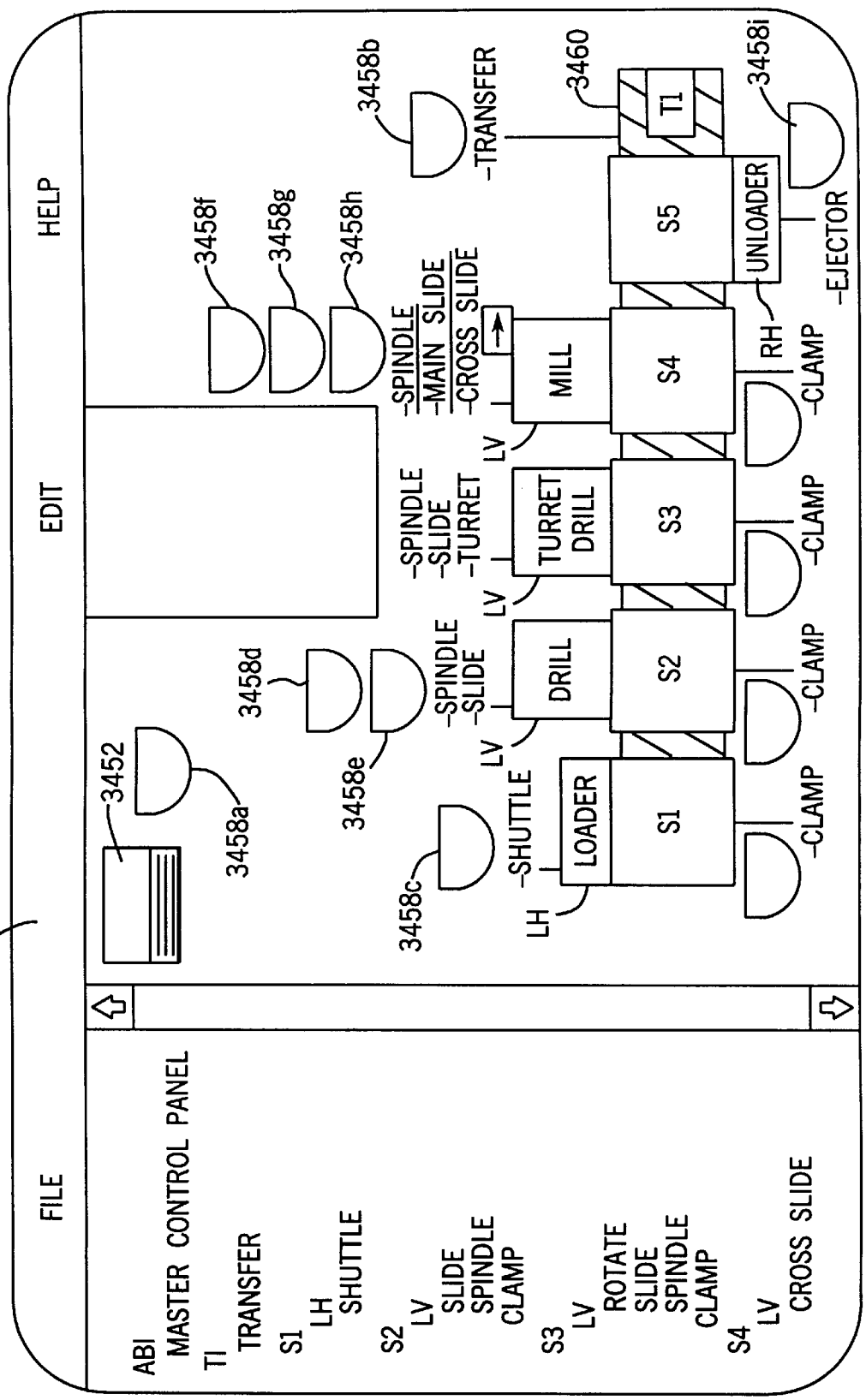

As in FIG. 16, the loader at station S1 in FIG. 34 includes a single axis named "shuttle" 3458c. Similarly, the drill at station S2 includes two axes named "spindle" 3458d and "slide" 3458e, and the turret drill at station S3 includes axes named "spindle", "slide" and "turret" (icons not shown). The mill includes axes named "spindle" 3458f, "main slide" 3458g and "cross slide" 3458h, and the unloader includes an axis named "ejector" 3458i.

When the floor plan is completed, the portion of the template-based machine tree in tree section 3149 is completely designated. Next, the special editors can be used to define the characteristics of each axis 3458a–3458i and the control panels, as well as define sequences of axis movement.

Referring to FIG. 34, the horizontal mill is represented in the floor plan image as the fourth station S4 and all other components connected thereto. Thus, station S4 includes a left vertical mill LV having a local control panel represented by icon 3400 and spindle, main slide and cross slide axis represented by axis icons 3458f, 3458g, 3458h.

2. Axis Editor

Referring again to FIG. 34, when an axis icon is selected, the machine editor 2962a switches editing control to the axis editor 2962b which allows a programmer to specify axis characteristics. Referring again to FIG. 29, the axis editor 2962b, like the machine editor 2962a, follows the same process for gleaning new image information to create new modules and populate existing modules. The only difference is that the axis editor 2962b and machine editor 2962a glean required information from different images and create and populate different module types.

Figure 35:
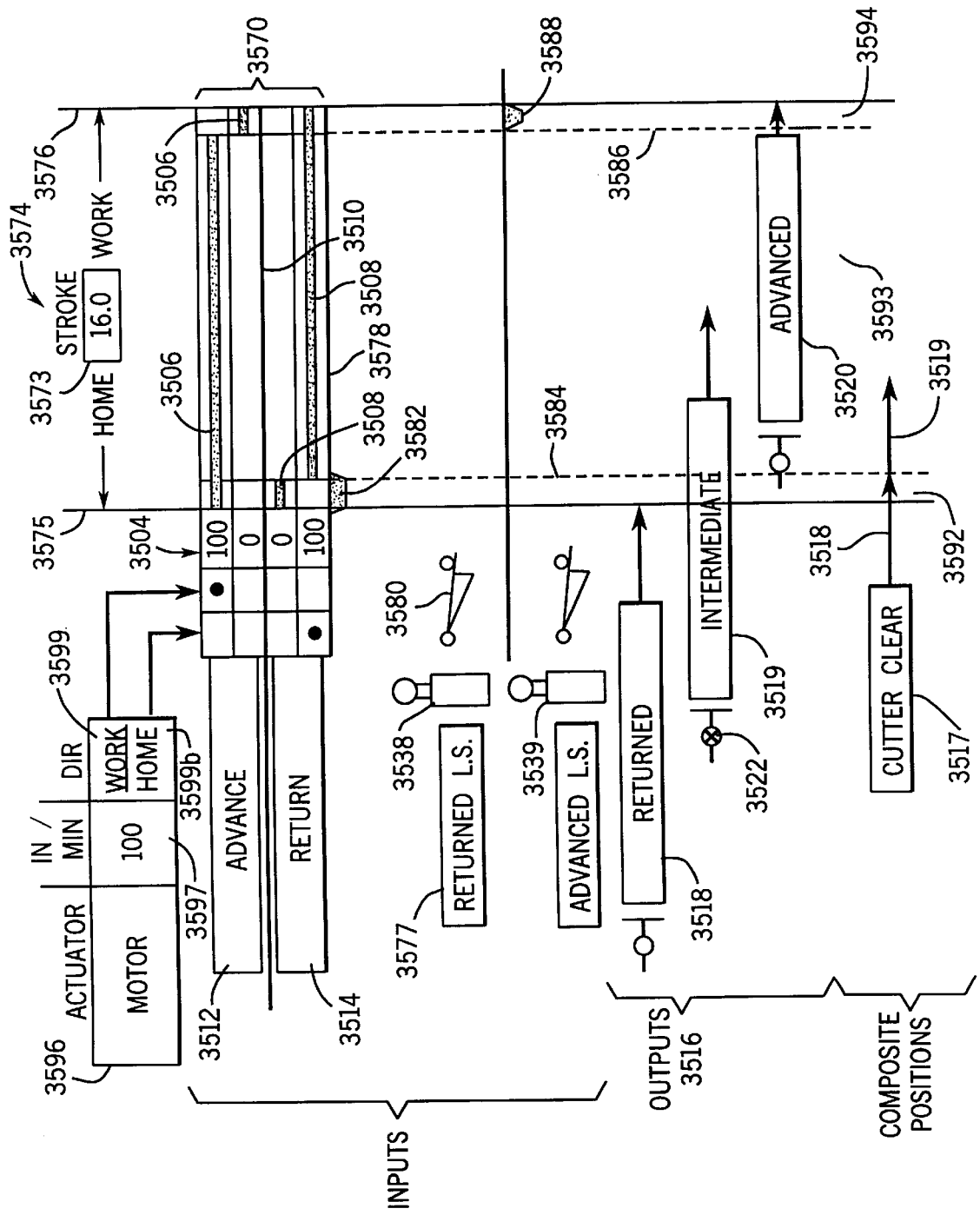
Figure 36:
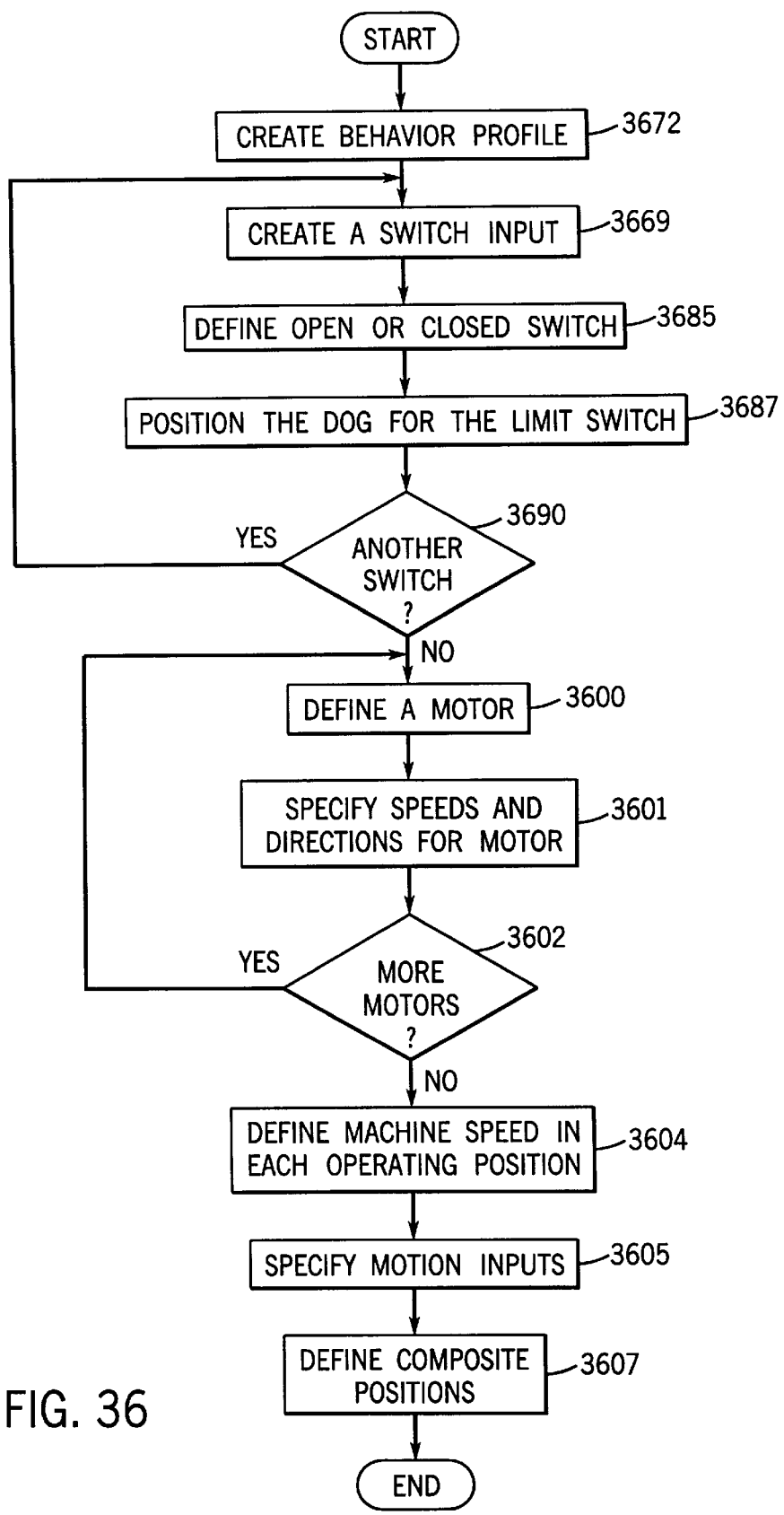
FIG. 36 is a flow chart of the process by which the user creates the control diagram in accordance with a preferred embodiment.

FIG. 35 depicts a control diagram 3574 for the main slide linear axis, as displayed on a programming monitor, along with additional information required to derive data for a template compiler. A flow chart of the process by which the user creates the control diagram is depicted in FIG. 36. Initially at process step 3572, the user constructs a behavior profile 3570 that is similar to the control metaphor for the desired machine cycle. The behavior profile 3570 is illustrated in the upper right portion of the display in FIG. 35 between lines 3575 and 3576 representing the extremes of the linear motion. The remainder of the display designates "physical attributes" of the axis, which attributes constitute the input and output signals required to operate the machine according to the behavior profile.

At the outset of defining the operation of the main slide axis, a blank behavior profile is displayed with only the outer lines 3575 and 3576 that correspond to the extremes of the linear movement of the main slide subassembly. An EDIT choice appears at the top of the profile in a menu bar which, when selected, provides a menu of items that can be used to define the axis. In particular, the menu will include switches, actuators, and work requests. A box 3573 in which the user enters the length of the machine stroke, i.e. the distance between positions D0 and D1 also appears. In the present example, the stroke distance is 16.0 inches and can be entered in the box 3573 by selecting the box 3573 and entering an appropriate stroke via a keyboard.

In FIG. 36 the user uses the edit menu to select a menu item on the terminal screen to define one of the limit switches, for example a switch for the fully returned position of the subassembly. After that selection, a limit symbol is displayed on a monitor and box 3577 appears to the left of the symbol within which the user enters the switch name, such as "returned LS". A schematic representation 3580 of the limit switch appears adjacent to its symbol to indicate whether the limit switch contacts close or open when struck, or tripped, by a subassembly dog. A dog symbol 3582 also appears on a horizontal line 3578 which represents the linear axis of movement. One end of the dog symbol 3582 initially abuts the LEFT vertical line 3575 and another vertical line 3584 appears at the other end of the dog symbol.

The graphical representation of the limit switch indicates when the limit switch is sending an active input signal to a programmable controller with respect to the positions of travel by the main slide subassembly. At step 3585, the user indicates whether the switch is normally opened or closed. This is accomplished by using a mouse or the keys on a keyboard to place the cursor over the schematic symbol 3580 and press the button to toggle the symbol open or closed. In a similar manner at step 3587, the user "grabs" the dog symbol 3582 to position the symbol along line 3578 to indicate positions on the axis where the dog trips the limit switch. The length of the dog symbol 3582 can be changed by using the cursor to grab one end of the symbol and stretch or contract the dog symbol. As the position and length of the dog symbol changes, so does the position of the vertical line 3584 which indicates the location along the linear axis at which the dog engages and disengages the corresponding limit switch. The dog symbol 3588 for the advanced limit switch also is created on the control diagram in this manner by the user again selecting the limit switch menu item at step 3590. Defining the other limit switch (i.e. "advanced LS") also creates an additional vertical line 3586 on the control diagram 3566.

The definition of the two limit switches divides the stroke length into three segments referred to as positions 3592, 3593, and 3594. The location and length of the dog symbols 3582, 3588 designate in which of these positions 3592–3594 the corresponding limit switch will be tripped by a carriage dog. In the present example, the returned limit switch is tripped by the dog when the subassembly is stopped in the "returned" position 3592. The advanced limit switch is tripped by the dog only when the subassembly is at the "advanced" position 3594. When neither the advanced nor returned LSs are tripped, the subassembly is in an "intermediate" position.

As the limit switches are employed to signal when subassembly motion should be stopped, the operational positions 3592–3594 relate to different sections of the control metaphor. Specifically, "returned" position 3592 corresponds to the stopped position at distance D0 and position 3593 corresponds to the subassembly moving between distances D0 and D1. Similarly, position 3594 corresponds to the fully advanced position when the subassembly is stopped at distance D1. The terms "position" and "operational position," as used herein, refer to physical locations at which the machine has different operating characteristics, for example movement speed and direction. A position may be a single physical location or a region of physical locations, such as the region between distance D0 and D1.

After defining the signals for the two limit switches, the user then specifies the number of actuators (motors) which are employed to drive the subassembly. A separate block 3596 is created each time the user selects an ADD ACTUATOR menu item from the program editor software at step 3590. This enables the user to specify the number of motors, in this case one for the main slide motor. Each block 3596 is subdivided into three boxes for actuator name, speed (IN/MIN) and direction. The blocks 3596 may be subdivided further depending upon the types of actuators, i.e. . . . . single speed-single direction, single speed-two direction, two speed-single direction, or two speed-two direction motors. In the present example, the main slide motor is a single-speed, two-direction device and thus its block 3596 has a single-speed box 3597 and two-direction boxes "work" 3599*a* and "home" 3599*b*. At step 3600, the user enters the speed of the slide motor in box 3597 but does not designate direction since both the advancing and retracting motions are provided by this actuator type. The editor software loops through steps 3600–3602 until information has been provided for each actuator selected.

Each time an actuator block 3596 is added, removed or edited, the graphical editor has a column for every direction and/or speed coil for the motors and a line which corresponds to all of the possible combinations of motor speeds going toward and away from the workpiece. The exemplary main slide motor can advance the subassembly toward a workpiece at 100 inches per minute. Similarly, the motor can be used to retract the subassembly from a workpiece at 100 inches per minute. A black dot in various matrix locations indicates which of the motors are energized and their direction to produce the speed listed in the right column of the matrix 3604.

When the matrix 3604 is formed, separate horizontal bars 3606 and 3608 are created across the behavior profile 3570 above and below the zero speed axis 3610. Each of the horizontal bars 3606 and 3608 is formed by individual segments within each of the operational positions 3592–3594. At step 3604, the user grabs the segments of the horizontal bars 3606 and 3608 in the behavior profile 3570 and positions the segments vertically to indicate the advancing and returning speed at which the subassembly is to move within each of the positions 3592–3594. For example, when an advance request is received, the subassembly is to move from the returned position 3592 through the intermediate position 3593 at a speed of 100 inches per minute. Upon the subassembly reaching the advanced position 3594 at distance D1, the speed goes to zero by stopping the motor. Thus, the portion of the behavior profile 3570 above the zero speed axis 3510 corresponds to moving the subassembly toward a workpiece. A similar representation in FIG. 35 is given for the speed of the subassembly away from the workpiece by locating the segments of horizontal bar 3608. Referring still to FIGS. 35 and 36, the user then provides the names of separate request signals that indicate when the subassembly is to advance toward the workpiece and when it is to return. These names are placed into boxes 3512 and 3514 as request signals to be used by the linear axis editor as described below. In the example these request signals have been named simply "advance" and "return".

Next, the user is afforded an opportunity at step 3607 to define composite position signals, which are signals energized when an axis is within a specified region defined using a subset of operational positions 3592–3594. A composite position definition label box CCP 3521 is added to section 3516 of diagram 3574 each time a user selects an ADD COMPOSITE POSITION menu item. For each composite position added a user must enter a name in the label box CCP' and must select one or more operational positions by clicking the mouse-controlled cursor in the vicinity of the intersection of an imaginary horizontal line, extending from the center of the label box CCP', and one of the operating position regions 3592, 3593 or 3594, each selection recorded by the axis editor as a graphical arrow 3518, 3519. In the example, a composite position named "cutter clear" 3517 is defined to be energized whenever the main slide subassembly is in either the "returned" or "intermediate" position.

As the user creates the control diagram 3574 of FIG. 35, the axis editor 2962*b* converts icons and images from the diagram 3574 into module specifications required to define an associated axis module. Referring again to FIG. 25, to completely define both physical and operating characteristics of an axis the editor 2962*b* must glean information from the axis diagram 3574 to populate the module specification named "switch package" 2591*a* and two module list specifications named "trajectory" 2591*b* and "actuator" 2591*c*.

Referring to FIGS. 25, 32 and 35, to define the axis module 2508 so as to correspond to control diagram 3574, while a user is constructing the diagram 3574, the editor 2962*b* identifies all limit switches, positions, composite positions, actuators, trajectories, and moves from the diagram 3574, one at a time, at block 3545.

Each time a user designates a limit switch, request, actuator, position or composite position, the editor 2962*b* identifies the designation and populates an appropriate module or creates a new module. In the main slide control diagram of FIG. 35, the editor 2962*b* would identify both the returned limit switch 3538' and advanced limit switch 3539', both the main slide advance 3512 and return 3514 requests, the main slide motor actuator 3596, the main slide positions including "returned", "intermediate", and "advanced" 3592, 3593 and 3594 respectively, the composite position "cutter clear" CCP' and various moves corresponding to both the return 3514 and advance 3512 trajectories. The advance trajectory 3512 would include an "initial" move corresponding to position 3592, an "intermediate" move corresponding to position 3593 and a "final" move, which slows the subassembly to zero speed, corresponding to position 3594.

At block 2251, after each of the axis designations, the editor 2962*b* populates corresponding lists, placing limit switches in the limit switch module list specification 3794, positions in the position module list specification 3795, trajectories in the trajectory module list specification 2591*b*, actuators in the actuator module list specification 2591*c*, composite positions in the composite position module list specification 2591*d* and moves in the associated move module lists 2596*g* in FIG. 25. In addition, for each list entry, the editor 2962*b* creates a new module at block 147. For example, referring to FIGS. 35 and 37, for the main slide control diagram 3574 the limit switch module list specification 3794 in FIG. 37 would include module references named "returned LS" 3538 and "advanced LS" 3539 while the positions list 3795 would include module references named "returned" 3592, "intermediate" 3593 and "advanced" 3594. Referring to FIGS. 35 and 25, the trajectory module list 2591*b* would include module references named "advance" and "return" corresponding to requests 3512 and 3514 respectively and the actuator module list specification 2591*c* would include a single module reference named "motor" of the type actuator corresponding to designation 3596. Referring to FIG. 39, the module list specification named "move" for the module of type trajectory named "advance" would include references to "initial," "intermediate" and "final" moves and the list named "move" for the module of type trajectory named "return" would also include references to "initial," "intermediate" and "final" moves. Each list entry would correspond to a different module.

Referring to FIG. 38 the position template 3803 includes four separate lists 3804*a*, 3804*b*, 3804*c* and 3804*d* corresponding to the two possible types of limit switches and the two possible states of each type of switch (i.e. normally open (NO) tripped, NO released, normally closed (NC) tripped, and NC released.) Referring also to FIG. 35, the editor 2962b correlates positions 3592, 3593 and 3594 with tripped and untripped switches and switch type (i.e. NO or NC) to populate each of the module list specifications 3804a–3804b of FIG. 38 with switches in conditions that correspond to a position.

For example, referring again to FIG. 35, when the subassembly is in the returned position the "returned LS" 3538 is tripped and the "advanced LS" 3539 is released. Assuming both the returned 3538 and advanced 3539 switches are normally open (NO), the returned position 3592 would include one normally open and tripped returned LS 3538 and one normally open and released advanced LS 3539. Recognizing this, the editor 2962b would populate the NO tripped LS module list specification 3804a with the returned LS 3538 and would populate the NO released LS module list specification 3804b with the advanced LS 3539. The other two list specifications 3804c and 3804d in the position template 3803 would be left empty.

Referring to FIGS. 35 and 38, axis editor 2962b creates a composite position module based on template 3803a for each composite position in section 3516 of diagram 3574. The editor provides each module a name 3801 corresponding to the name in label box CCP' and provides a "selected positions" module list specification 3804e corresponding to the names of the selected operational positions 3518 and 3519. The single rung in template 3803a generates a simple logic circuit that energizes a signal whose name corresponds to module name 3801a whenever any one of the positions in the selected positions module list specification 3804e is energized.

Referring to FIGS. 25 and 39 the editor 2962b creates a trajectory module based on trajectory template 3909 for every trajectory referenced in the trajectory module list specification 2591b.

The second rung 3913 determines if the trajectory associated with the specific module is at its start position. This is done by using an OR list macro as explained above. The OR list macro and associated logic 3915 determines if any other trajectories are done. Where any other trajectory is done, it is assumed that the present trajectory is at its start position. The third rung 3914 simply checks if the trajectory associated with the module is completed and is used by other trajectory modules to determine if they are at their start positions. The start and done status of each trajectory is used by the bar chart editor 2962d as described in more detail below.

Referring now to FIG. 40, a move module based on move template 4016 is provided by the editor 2962b for each potential move designated in a trajectory module. Each move template 4016 includes a unique module list named "coil request". The editor provides a coil request module based on the coil request template shown in FIG. 41 for each coil request referenced in a move module 4016.

Referring to FIG. 42 the editor 2962b creates an actuator module based on actuator template 4218 for each actuator module referenced in the axis template 108. Each actuator module 4218 includes a module list 4219 called coil wherever a list of uniquely named coils are provided for the actuator associated with the parent actuator template 4218.

Because the axis editor gleans information from diagram 3574 while a user is constructing the diagram and simultaneously constructs the portion of the template-based machine tree corresponding to the axis being designated, by the time diagram 3574 is completed, all of the information required to provide LL logic to specify the axis is complete. This process must be repeated for each axis on the floor plan 3150.

3. Control Panel and Bar Chart Editors

Referring again to FIG. 34, at this point the only icons on the floor plan image that have not been completely defined are the main control panel 3452 and horizontal mill control panel 3400. In addition, while all of the separate axes for each machine element have been designated at this point, none of the axis movements have been linked together.

To specify a control panel, a user must designate mode selection, manual control, and indicator devices. In addition, for each manual control device and each indicator device, the user must designate both the cycle and the specific function in the cycle to which the device relates. To this end, with reference to FIG. 29, although the control panel 2962c and bar chart 2962d editors are separate, they must be used together. Initially, the control panel editor 2962c is used to identify modes of operation, mode selector switches corresponding to the modes of operation, and various cycles that are controllable via the control panel. Then, the bar chart editor 2962d is used to define the different functions and their temporal relationships that make up each cycle that is controllable via the control panel. Finally, after the cycles are completely defined, the control panel editor 2962c is again used to identify manual control devices, including lights, buttons and switches, that correspond to desired functions in the defined cycles.

To define the horizontal mill control panel, a user selects icon 3400 in FIG. 34. When icon 3400 is selected, editing control passes in FIG. 29 from the machine editor 2962a to the control panel editor 2962c. Referring yet again to FIG. 32, the control panel 2962c and bar chart 2962d editors, like editors 2962a and 2962b, follow process 3243 in FIG. 32 to glean information from screen images to create new modules and populate existing modules during image construction. There is one exception to this general rule and that is that the bar chart editor must also perform a bucketing step using the attributes table 5031 of FIG. 50 after a cycle has been defined to populate function lists in the module list specification sections of associated function modules. This will be described below.

Figure 44:
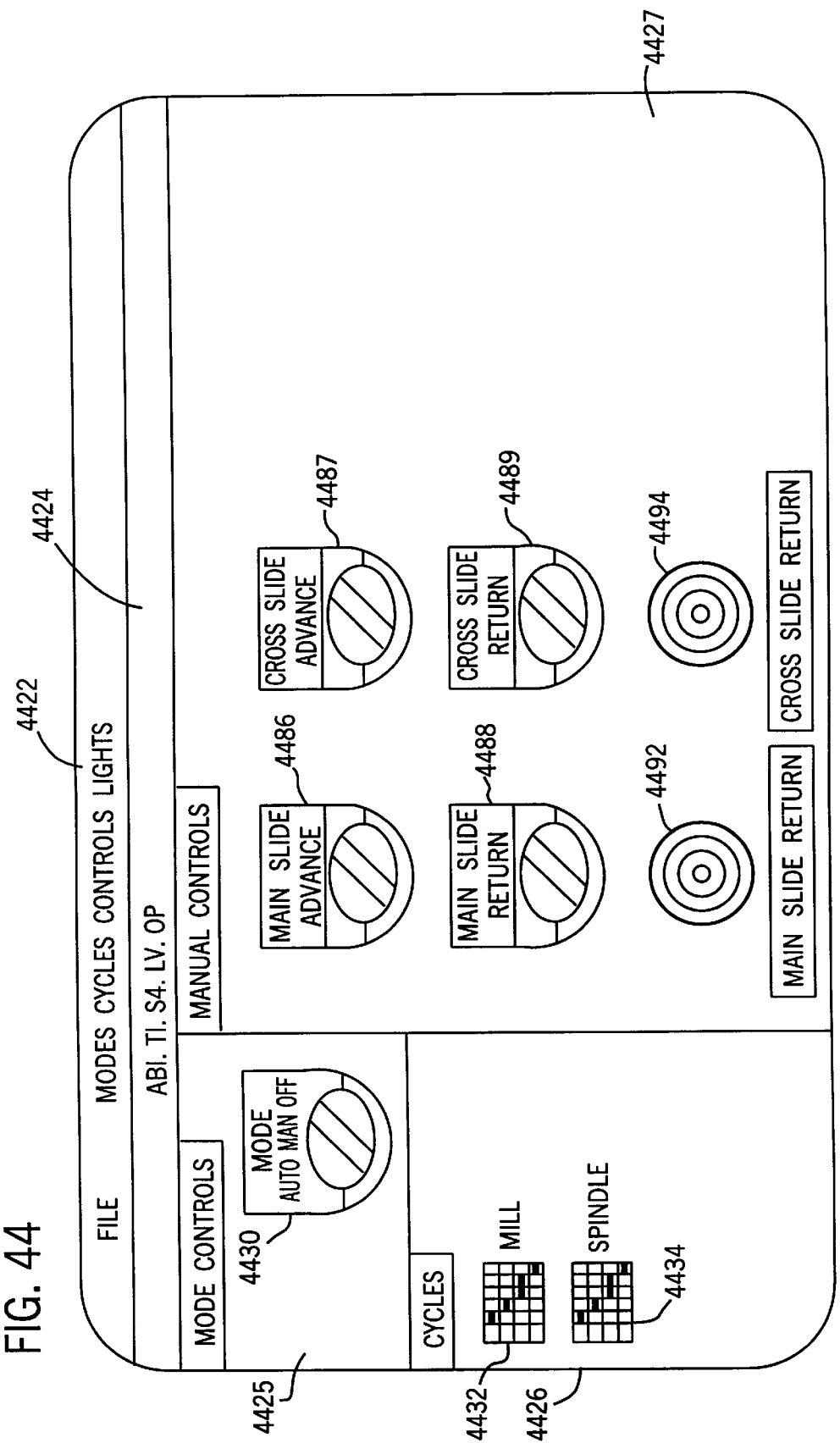
FIG. 44 illustrates a control panel editor in accordance with a preferred embodiment.

Referring now to FIG. 44, the initial display for a preferred control panel editor 2962c includes a menu bar 4422, a name field 4424, and three specification fields: MODE CONTROLS, CYCLES, and MANUAL CONTROLS referred to by numerals 4425–4427, respectively. The menu bar 4422 includes five options, a conventional FILE option and MODES, CYCLES, CONTROLS and LIGHTS options that can be used to add or delete modes of operation, cycles, specific controls, or lights respectively.

Because all control panels have at least local and remote modes of operation, the control panel editor 2962c initially designates a single three-pole selector switch represented in the MODE CONTROLS field 4425 by icon 4430 which can be used to choose either a remote mode (AUTO), local mode (MAN), or an off state (OFF). If desired, a user can use the MODES option in menu bar 4422 to pull down a mode menu for creating other modes (tool change or service modes). If a third mode is designated via the modes menu, the icon 4430 is automatically altered to show a four-pole selector switch in the MODE CONTROLS field 4425.

Other than icon 4430, initially there are no other designations in fields 4425, 4426 and 4427. Because manual controls have to be related to some cycle function, prior to designating manual controls, machine cycles have to be defined. To this end, a user can choose the CYCLES option from menu bar 4422 to pull down a cycles menu to designate required cycles. When a single cycle is added, the editor 2962c prompts the user to name the cycle. When a cycle is added, an icon including a user-assigned name is placed in the CYCLES field 4426. In the present example, the horizontal mill control panel includes only two cycles, a mill cycle including movements of the main slide and cross slide subassemblies, and a spindle cycle for turning on and off spindle. Therefore, two cycle icons 4432 and 4434 corresponding to mill and spindle cycles are referenced in field 4426.

To define each cycle, the user separately selects each of the cycle icons 4432, 4434 to enter the bar chart editor 2962d two different times. Referring to FIG. 45, a bar chart image 4536 that would be constructed for the mill cycle using the bar chart editor 2962d is depicted. It should be readily apparent that the bar chart image 4536 constructed using the bar chart editor 2962d is very similar to a conventional chart. The similarity between a conventional bar chart and image 4536 is meant to make it easy for a user trained in the use of conventional diagrams to use the bar chart editor 2962d.

When a user enters the bar chart editor 2962d, the initial image only includes basic required bar chart designations. Required designations include the cycle time box 4538, first sequence 4540, second sequence 4541 and whole cycle 4542 icons, interlocking yield 4544 and stop 4545 symbols corresponding to icons 4540, 4541 and 4542 and REQUESTS 4546 LABELS 4547 and LATCH 4548 headings.

The editor 2962d also provides a menu bar (not shown) including a REQUESTS option which allows a user to add or delete requests from the bar chart and a LABELS option allowing a user to label specific locations in the bar chart. To construct the bar chart image 4536, a user selects an ADD REQUESTS option from a pull down request menu. Thereafter, the editor 2962d provides a complete listing of every possible request associated with the horizontal mill. For example, possible requests for the horizontal mill would include: cross slide advance, cross slide return, main slide advance, main slide return, spindle run, and spindle not run. In addition, other possible requests would include whole cycle, reset, first sequence, and second sequence requests to any other cycle, exclusive of the cycle depicted on the bar chart, defined subordinate to the horizontal mill in the machine tree (in this case, the spindle cycle 4434 identified in the cycle field 4426 of FIG. 44).

The bar chart editor 2962d gleans the axis request options directly from the axis images for the horizontal mill that were constructed using the axis editor 2962a. For example, referring again to FIG. 35, main slide advance and return requests were designated in boxes 3512 and 3514. The cross slide advance and return requests would have been designated when the user constructed an axis image like the one in FIG. 35 for the cross slide subassembly axis. The spindle requests would have been designated when the user constructed an axis image for the spindle axis.

To specify a mill cycle, a user selects requests from the request menu for main slide advance, cross slide advance, main slide return and cross slide return. Each time a request is selected, the editor provides a request box 4550, 4551, 4552 or 4553 in FIG. 45 under the REQUESTS heading. In addition, referring also to FIG. 46, the editor 2962d provides two blank sequence boxes to the right thereof under the CYCLE TIME designation 4638, the sequence boxes divided by the LATCH designation indicating division between first and second sequences. Thus, there are two separate columns 4656, 4658 next to the request boxes 4650–4653, a first sequence column 4656 and a second sequence column 4658.

With all of the requests selected, the user begins to order the sequence of requests by selecting the box in the first sequence column 4656 corresponding to the first request in the cycle. In the present example, the sequence of requests is main slide advance, cross slide advance, main slide return and cross slide return. Therefore, the user would first select the box in the first sequence column corresponding to the main slide advance request in box 4650. The editor 2962d would respond by placing a bar 4660 adjacent request box 4650 in the first sequence column 4656.

Next, the user would select the box in the second sequence column corresponding to the first request in the second sequence. In the present example, the first request in the second sequence is main slide return. The user would select the box in the second sequence column 4658 corresponding to the main slide return. The editor 2962d then places a function bar 4662 in the selected box. At this point, the beginning requests in the first and second sequences have been identified.

Next the user must select the second requests in the first and second sequences. In the present example, the second request in the first sequence is the cross slide advance request in request box 4651. To place a function bar for the cross slide advance request, the user selects box 4651 and drags a ghost image (not shown) of the box into first sequencing column 4656. To place the cross slide advance request after the main slide advance request, the user drags the ghost image until it is clearly in the second half of the first sequence column 4656. The user then releases the ghost image. To place the cross slide advance request in front of the main slide advance request, the user would release the ghost in the first half of the first sequence column 4656. The ghost image is depicted as a cross hair to aid the user in this process.

Referring again to FIG. 45, when the ghost image is released, the editor 2962d divides the first sequence column into first and second columns 4564, 4565 using a vertical "done" line 4569 and provides a bar 4567 corresponding to the cross slide advance request in box 4551. In addition, the editor 2962d shortens bar 4560 so that bar 4560 ends where bar 4567 begins, indicating that functions related to bars 4560 and 4567 do not overlap. In other words, the function related to bar 4560 is done at done line 4569.

A function bar for the cross slide return request may be placed in the second sequence in a similar fashion, but closer inspection reveals that correct placement of the cross slice return function bar requires another technique.

In this case, the cross slide return action is expected to start as soon as the main slide reaches the intermediate cutter clear position CCP, and is expected to continue in parallel with the remainder of the main slide return action until both actions are complete. So, referring again to FIGS. 45 and 46, before a function bar for the cross slide return request can be correctly placed, it is necessary to indicate on bar chart 4636 an intermediate "done" line bisecting the extent of the main slide return function bar 4662 that represents the achievement of the cutter clear position CCP.

A bar chart editor 2962d, although capable of gleaning information from its functions about intermediate positions, is not capable of determining which of many such positions are needed on the display 4536, while displaying all such positions is clumsy and detracts from the overall usefulness of the display. In the preferred embodiment, a user is required to assist the editor 2962d by choosing, on a function by function basis, which intermediate positions in each function need to be indicated on the display 4536. This is done through a function dialog that is activated by clicking between the end triangles of a function bar with the mouse-controlled cursor.

Referring again to FIGS. 45, 46 a nd 35, a user first selects the b ar 4562 associated with the main slide return request. A function dialog gleans information about outputs 3516 and composite positions fro m a control diagram 3574 of the main slide axis captured by an axis editor 2962b. The function dialog presents this information to a user in a list of "positions" traversed by the main slide return trajectory—initial, intermediate, and final-in chronological order of traversal. A user may select one or more intermediate, positions f or display. In this case, a user indicates that the composite position "cutter clear" CCP' is needed on the display . The bar chart editor 2962d then creates a vertical line 4570, bisecting the main slide return function bar 4662, and splitting the second seque nce column 4658 into columns 4572 and 4573.

With reference to FIG. 45, a user can select a box at the intersection of the row containing the cross slide return request box 4553 and the newly created column 4573. The bar chart editor 2962d then creates the cross slide return function bar 4574 in the selected box such that the leftmost end of bar 4574 meets the intermediate position line 4570 and the rightmost end of bar 4574 meets the vertical line 4576.

Initially, all functions provided on a bar chart image 4536 using the editor 2962d are assumed to be normal functions (i.e. can be performed in either forward or reverse directions and can be repetitively performed during manual operation in a single cycle). However, the preferred editor 2962d allows a user to specify non-reversible or non-repeatable functions. This is accomplished by again activating the function dialog by clicking between the end triangles of a function bar and making the appropriate selection in the function type section of the dialog. For example, by clicking bar 4567 and selecting "non-repeatable" in the function type section of the function dialog (not shown), the function associated with bar 4567 can be made non-repeatable. Similarly, a bar can be made non-reversible by activating the function dialog and selecting "non-reversible" in the function type section. A non-repeatable function is designated by a bar having the number "1" adjacent its leftmost triangle. In FIG. 45, bar 4567 is so designated. Similarly, a ">" appearing adjacent to the leftmost triangle indicates a non-reversible function (see bar 4562). This information is gleaned by the editor 2962d for choosing function mapping in function modules (see FIG. 49A).

Referring to FIG. 45, as a user creates different functions on the bar chart image 4536, the editor 2962d creates additional stop and yield icons corresponding to various image elements. In particular, at the beginning of each separate function 4560, 4567, 4562, 4574 the editor 2962d provides both a stop 4545 and a yield 4544 icon above the bar chart grid. The stop 4545 and yield 4544 icons allow a user to condition functions on the completion of other functions, cycles or other system input sequences. For example, to limit the possibility of spindle damage, it may be desired to make performance of the cross slide advance request contingent upon the horizontal mill spindle being in an "on" state. Either of the stop 4545 or yield 4544 symbols can be used for this purpose.

Figure 47:
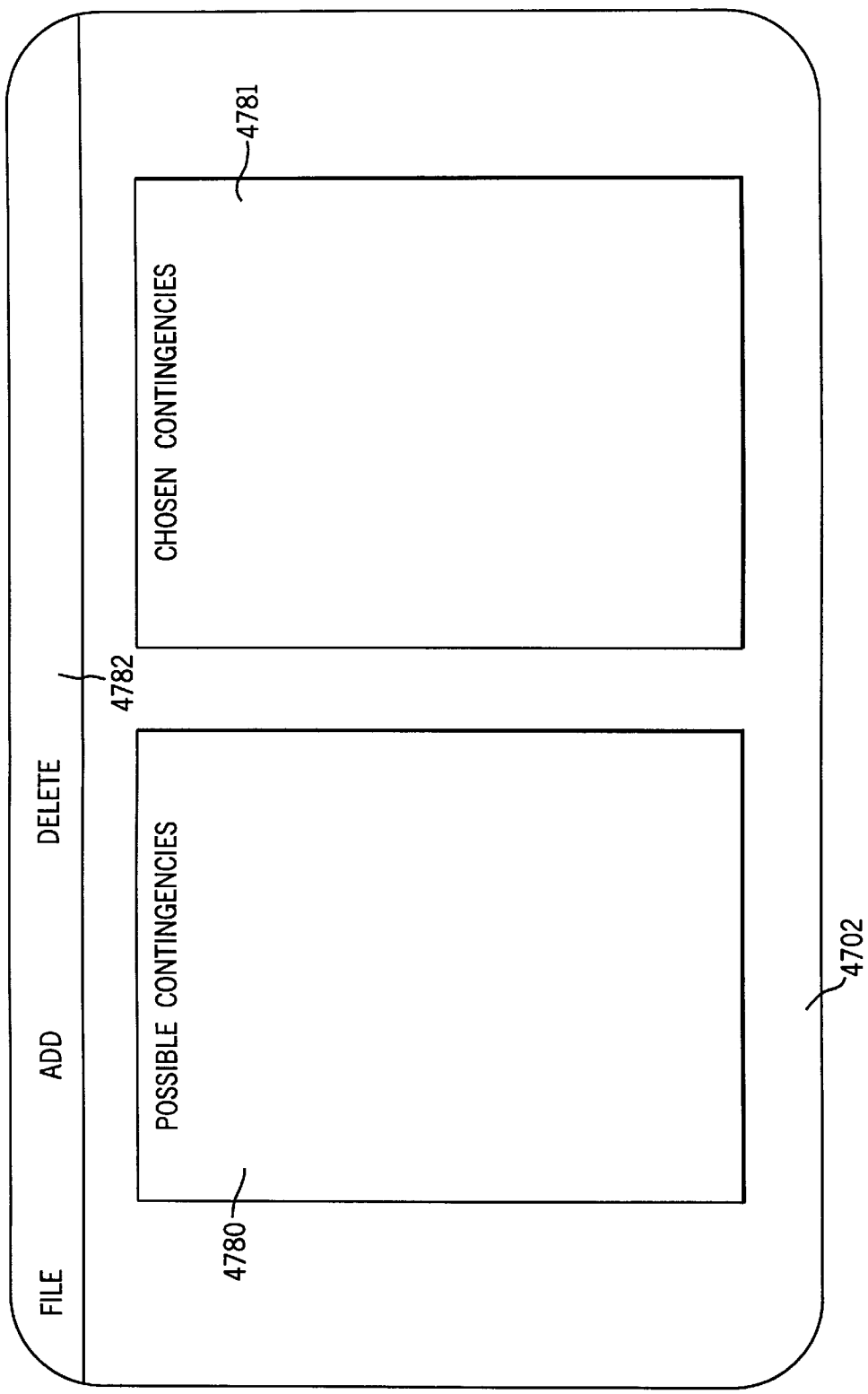
FIG. 47 is a contingency screen in accordance with a preferred embodiment.

To define contingencies for the cross slide advance request in request box 4551, a user may select yield icon 4544 which would provide a contingency screen 4574 allowing a user to add or remove contingencies from a contingency list. Referring also to FIG. 47, one embodiment of a contingency screen would include two separate fields, one field 4780 listing all possible machine contingencies. The other field, a CHOSEN CONTINGENCY field 4781, would list selected contingencies. In addition, the screen 4702 would include a menu bar 4782 allowing a user to add and delete contingencies to and from the CHOSEN CONTINGENCY field 4781. To make the cross slide advance contingent upon a spindle on state, the user selects a spindle on contingence from field 4780. The editor then adds the "spindle on" contingency to field 4781. Once a complete contingency list has been formed, the user saves the list and performance of the cross slide advance of FIG. 45 is then conditioned upon all contingencies in the list associated with yield icon 4544 being completed.

The stop symbols 4545 are similar to the yield symbols in that a list of contingencies can be formed which must be satisfied prior to continuing a sequence. However, whereas yield symbols 4544 apply only to functions beginning at the yield icon, a stop symbol 4545 applies to all functions beginning at or after the stop icon but before the end of an associated half-cycle sequence. For example, contingencies referenced in a contingency list associated with stop symbol 4545" must be met at line 4576 and at line 4569.

In addition to contingencies on functions, sometimes it is necessary to put contingencies on the performance of the first and second sequences of a cycle. This kind of contingency affects the performance of a sequence independently of the contingencies on the functions making up that sequence. In other words, these are contingencies on "cycling" a cycle.

Contingencies specified using a stop sign 4545 are conditions needed in order to initiate and continue performance of the first sequence of the cycle. In contrast, contingencies specified using a yield symbol 4544 are conditions needed only to initiate performance of the first sequence of the cycle, but are not required thereafter.

For example, a user may select yield icon 4544 associated with first sequence request 4540 causing the bar chart editor to provide a contingency screen 4574 for the first sequence. By placing a "spindle on" condition in the CHOSEN CONTINGENCY field 4781, the user makes initiation of the first sequence conditional upon the spindle being in an "on" state. This contingency is in addition to a similar, but different, contingency placed on the cross slide advance request, which is a function performed as a part of the first sequence.

Both the function and first sequence contingencies apply the same "spindle on" condition, but the meanings are different and, what's more, complementary. Sequence contingencies are used to avoid initiating, continuing, or resuming performance of a sequence of operations that have little or no hope of being completed successfully or safely. In this case, if the spindle state is not "on" when a first sequence request is made, there is little or no hope that the spindle will be "on" when the cross slide advance request requires it to be so. Specifically, the first sequence contingency avoids advancing the main slide when it is already known that the cross-slide cannot advance. This avoids unnecessary machine activity that wastes time, energy, and may require the attention of a machine operator to undo before that cycle can be restarted. Sequence contingencies specified using a stop symbol also prevent unintended "spontaneous" resumption of sequence performance and, therefore, any requested functions that may have stopped due to a related function contingency, should a required condition that was lost suddenly be rectified.

Similarly, second sequence contingencies may be specified using stop and yield symbols associated with a second sequence request icon 4541, while sequence contingencies may be specified common to both sequences using stop and yield symbols associated with whole cycle request icon 4542.

Referring again to FIG. 51, preferably, after a complete cycle has been defined using the bar chart editor 2962*d*, the editor 2962*d* gleans information for each individual function from the bar chart image 4536 and assigns buckets, start positions, and safeties to each function according to FIG. 50 attributes table 5031. Every start position is uniquely named and placed in a bucket M while every safety designated using icons 4544 or 4545 is placed in a bucket O.

Figure 52:
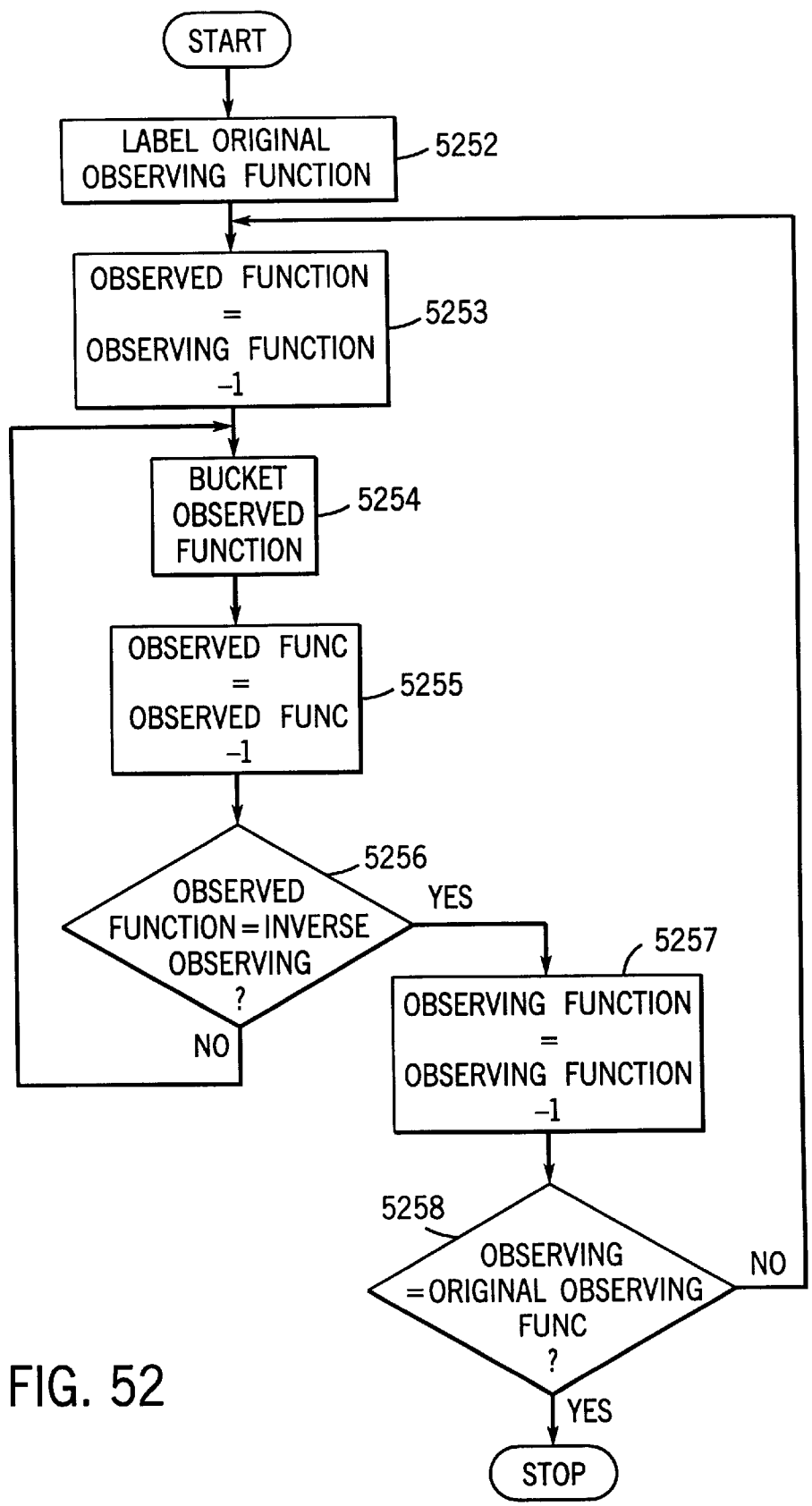
FIG. 52 is a flowchart of observed functional processing in accordance with a preferred embodiment.

Referring to FIG. 52, to assign buckets for all functions, the editor 2962*d* starts with the first function in a bar chart, labels that function an original observing function at block 5252, and works backward to bucket all other cycle functions until it reaches the inverse of the observing function. Referring also to FIG. 45, to assign buckets for functions 4560, 4567, 4562 and 4574, the editor 2962*d* would first label function 4560 the observing function. Then at block 4553, the editor 2962*d* would label the function prior to function 4560, in this case function 4574, as the observed function. At block 4554, the editor 2962*d* assigns the observed function 4574 to a bucket of the observing function 4560 according to the attributes table 5031 illustrated in FIG. 50. The bucketing process is explained below with reference to FIG. 53.

Figure 53:
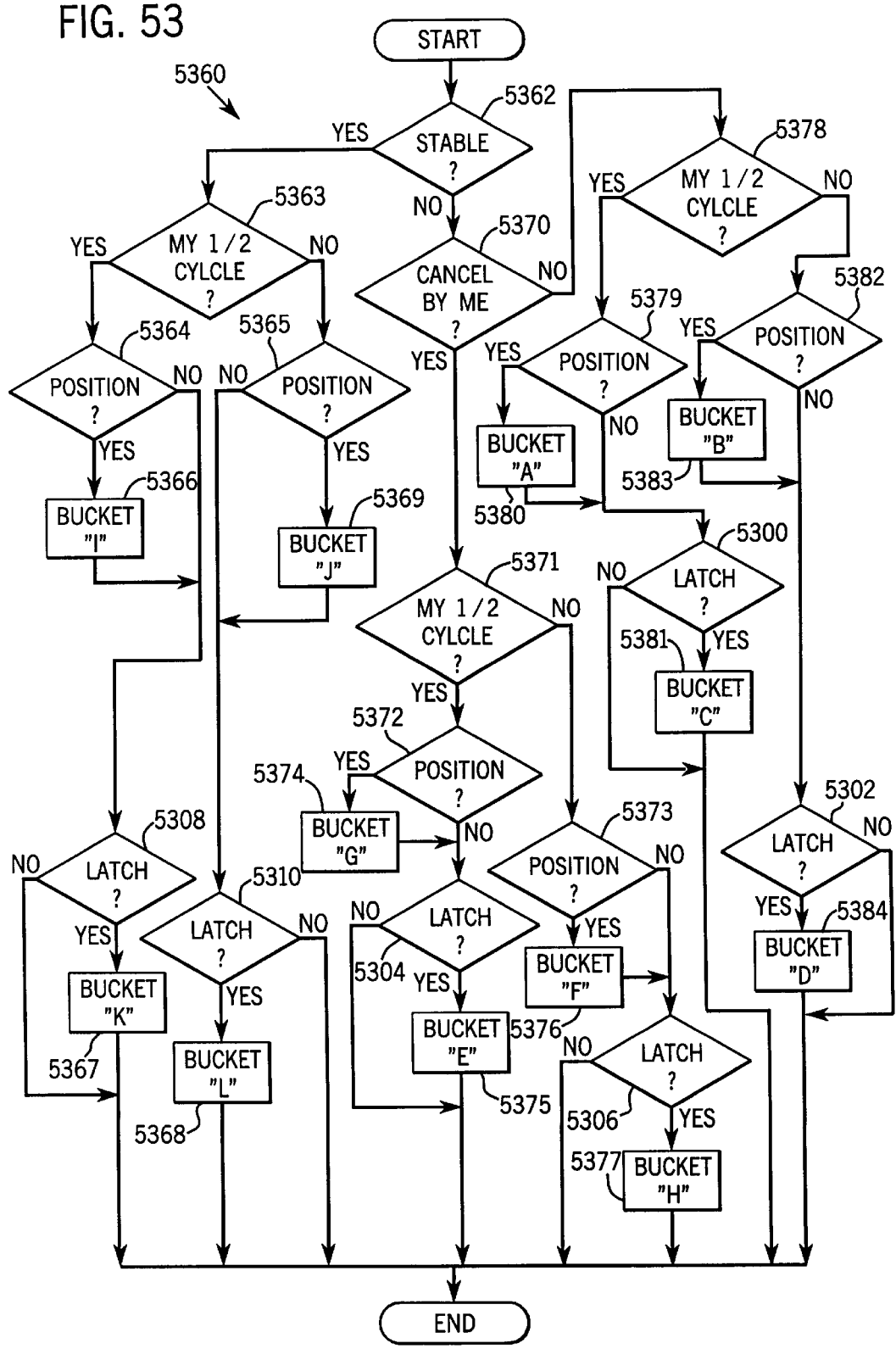
FIG. 53 is a flowchart of bucket processing in accordance with a preferred embodiment.

In FIG. 52, at block 5255, the editor 2962*d* labels the function prior to the instantaneous observed function as the next observed function. In FIG. 53, function 5362 would be labeled the observed function. At decision block 5256 the editor 2962*d* determines if the observed function 5362 is the inverse of the observing function 5360. Where the observing function 5362 is not the inverse, the editor 2962*d* returns to block 5254 and buckets the observed function. The editor 2962*d* repetitively cycles through blocks 5254–5256 until the observed function is the inverse of the observing function.

In a preferred embodiment, the observed function 5362 is the inverse of observing function 5360 and therefore, at decision block 5256, the editor 2962*d* branches to block 5257 and labels the function prior to the instantaneous observing function as the observing function. In the present case, function 4574 would be labeled the observing function. At decision block 5258, the editor 2962*d* determines if the observing function is the original observing function. If this condition is met, the editor 2962*d* stops the bucketing process. If the observing function is not the original observing function, the editor 2962*d* passes control back up to block 5253 and begins the process over again. Thus, the editor 2962*d* assigns to buckets all of the needed required functions for every function in a cycle.

Referring now to FIG. 53, the bucketing process of block 5254 is illustrated as process 5360. To bucket an observed function, the editor 2962*d* first determines whether or not the observed function is stable relative to the observing function at decision block 5362.

Where the observed function is not stable, the editor 2962*d* determines if the observed function is canceled by the observing function or canceled by some other function at decision block 5370. Where the next function is canceled by some other function, the editor 2962*d* next determines whether or not the observed function is in the same half-cycle as the observing function at block 5378. Where the observed function is in the same half-cycle as the observing function, at decision block 5379 the editor 2962*d* determines whether or not the observed function incorporates a position or a latch. Where the observed function incorporates a position, at block 5380 the editor 2962*d* buckets the observed function as type A. Referring also to FIG. 49*a*, assigning a function to a bucket entails placing a unique name for the function in the appropriate list in the module list specification section 2342 of the function template 2336 associated with the observing function. In this case, where a function is placed in bucket A, the function is unstable, is canceled by the observing function, is in the same half-cycle as the observing function and incorporates a position and therefore would be placed in module list specification. Similarly, as other functions are assigned to buckets, they are placed in other lists in the module list specification section 2342.

After blocks 5379 and 5380, at block 6000 the editor 2962*d* determines if the observed function incorporates a latch. Note that a function can incorporate both a latch and a position. Where the observed function is not stable, is canceled by a function other than the observing function, is in the same half-cycle as the observing function and incorporates a latch, at block 5381 the editor 2962*d* assigns the observed function to bucket C.

Referring again to decision block 5378, where the observed function is not stable, is canceled by a function other than the observing function, and is not in the same half-cycle as the observing function, the editor 2962*d* passes control to decision block 5382 to determine whether or not the observed function incorporates a position. Where the observed function incorporates a position, the editor 2962*d* assigns the observed function to bucket B at block 5383. At blocks 6002 and 5384, where the observed function incorporates a latch, the editor 2962*d* assigns the observed function to bucket D.

Referring again to decision block 5370 where the observed function is not stable but is canceled by the observing function, the editor 2962*d* passes control to decision block 5371 and determines whether or not the function is in the same half-cycle as the observing function. Where the observed function is in the same half-cycle as the observing function, the editor 2962*d* determines whether or not the observed function incorporates a position or a latch at decision block 5372. Where the observed function incorporates a position, the editor 2962*d* assigns the observed function to bucket G at block 5374. Where the observed function incorporates a latch, the editor 2962*d* assigns the function to bucket E at blocks 6004 and 5375.

Referring again to decision block 5371, where the observed function is not stable, is canceled by the observing function, and is in the half-cycle opposite the observing function, the editor 2962*d* passes control to decision block 5373 to determine whether or not the observed function is a position. Where the observed function incorporates a position, the editor 2962*d* assigns the function to the F bucket at block 5376 and where the observed function incorporates a latch the editor 2962*d* assigns the function to bucket H at blocks 6006 and 5377.

Referring once again to decision block 5362, where the observed function is stable, the editor 2962*d* determines whether or not the observed function is in the same half-cycle as the observing function at decision block 5363. Where the observed function is in the same half-cycle as the observing function the editor 2962*d* determines whether or not the observed function incorporates a position at block 5364. Where the observed function incorporates a position, the editor 2962*d* assigns the function to bucket I at block 5366. Where the observed function incorporates a latch the editor 2962*d* assigns the function to bucket K at blocks 6008 and 5367.

Referring again to decision block 5363, where the observed function is stable and is in the half cycle opposite the observing function the editor 2962*d* determines whether or not the observed function incorporates a position at block 5365. Where the observed function incorporates a position, the editor 2962*d* assigns the function to bucket J at block 5369. Where the observed function incorporates a latch the editor 2962*d* assigns the function to bucket L at blocks 6010 and 5368.

Figure 49B:
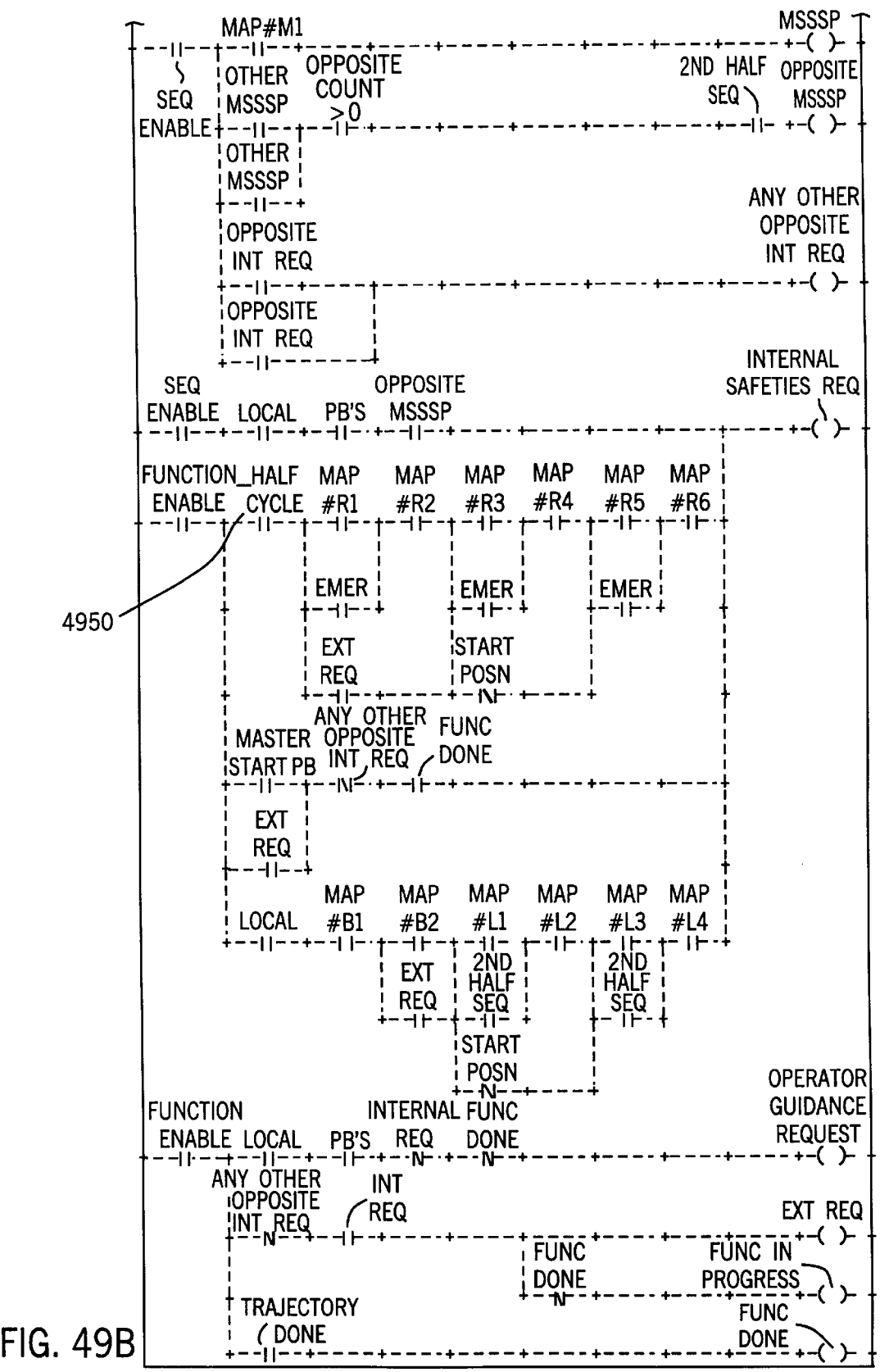

After all of the necessary functions in a cycle have been assigned to buckets and added to appropriate lists by the editor 2962*d*, the editor also gleans from the control diagram 4536 in FIG. 45 which half-cycle the function is in. Referring to FIG. 49B, this information is used to label contact 4950. In addition, this information is used at compile time with the XPO and XPC pseudoinstructions as explained above.

After a user completes the bar chart for the mill cycle including request designation, proper bar sequencing and proper contingency designations, the user must then go back to the control panel editor 2962*c* and select the next cycle to be defined. Referring to FIG. 44, in the present example the user selects the spindle icon 4434 and reenters the bar chart editor 2962*d* to define the spindle cycle. The spindle cycle would include two requests, a "spindle on" request and a "spindle off" request. The spindle on request would constitute the first sequence and the spindle off request would constitute the second sequence. As with the mill cycle, the user would construct a complete bar chart like the one in FIG. 45, including requests, bars and contingencies for the spindle cycle. During construction, the editor 2962*d* would continue to glean information required to populate modules and create new modules and to assign buckets as described above.

After complete bar charts have been constructed for each cycle identified in CYCLE field 4426, if desired, the user can then define manual control devices and tie those devices to specific requests in the bar charts.

In accordance with the example, it will be assumed that a user requires four separate manual push buttons on the horizontal mill control panel, one button each for the main and cross slide advance requests and one button each for the main and cross slide return requests. While buttons could be included for the spindle on and spindle off requests, for the purposes of this explanation it will be assumed that the y are not needed. To define a push button for the main slide advance request , the user selects the CONTROLS option from menu bar 4422 which would provide a complete list of all requests associated with the cycles identified in the CYCLE field 4426. In the horizontal mill example, t he request list includes "main slide advance", "main slide return", "cross slide advance", "cross slide return" , "spindle on", "spindle off", and "whole cycle", "first sequence" and "second sequence" requests for both the mill and spindle cycles. To designate a main slide advance button the user selects the main slide advance request from the list. The editor 2962*c* then provides a button icon 4486 labeled "main slide advance".

In a similar fashion, the user selects the CONTROLS option three more times, each time selecting a different possible request, the three selected requests being "cross slide advance", "main slide return" and "cross slide return". Each time a different request is selected, the editor 2962*c* provides a new icon 4487, 4488, 4489 labeled accordingly. At this point all of the manual control buttons have been defined and associated with different requests.

To define indicator lights, the user selects the LIGHTS option from bar 4422. The editor 2962*c* provides a list of possible limiting positions associated with the requests in the mill and spindle cycles. The user selects a limiting position and then the editor 2962*c* provides an associated light icon. In FIG. 44, two light icons are illustrated, one 4492 for the main slide return and another 4494 for the cross slide return.

As with the machine 2962*a* and axis 2962*b* editors, while a user is constructing a control panel image and corresponding bar chart images using the control panel 2962*c* and bar chart 2962*d* editors, the editors 2962*c* and 2962*d* are simultaneously gleaning information from the images to further develop the template-based machine tree according to the process shown in FIG. 32. Thus, additional modules are created and existing modules are populated until all required images have been completed.

With all of the modes, manual control and indicator light devices defined and all of the cycles corresponding to the horizontal mill defined, the editors have all the information required to provide LL logic to control the horizontal mill. To provide information required for all of the machine components, the user would step through editing with the axis 2962*b*, control panel 2962*c*, and bar chart 2962*d* editors for all machine components.

Figure 48:
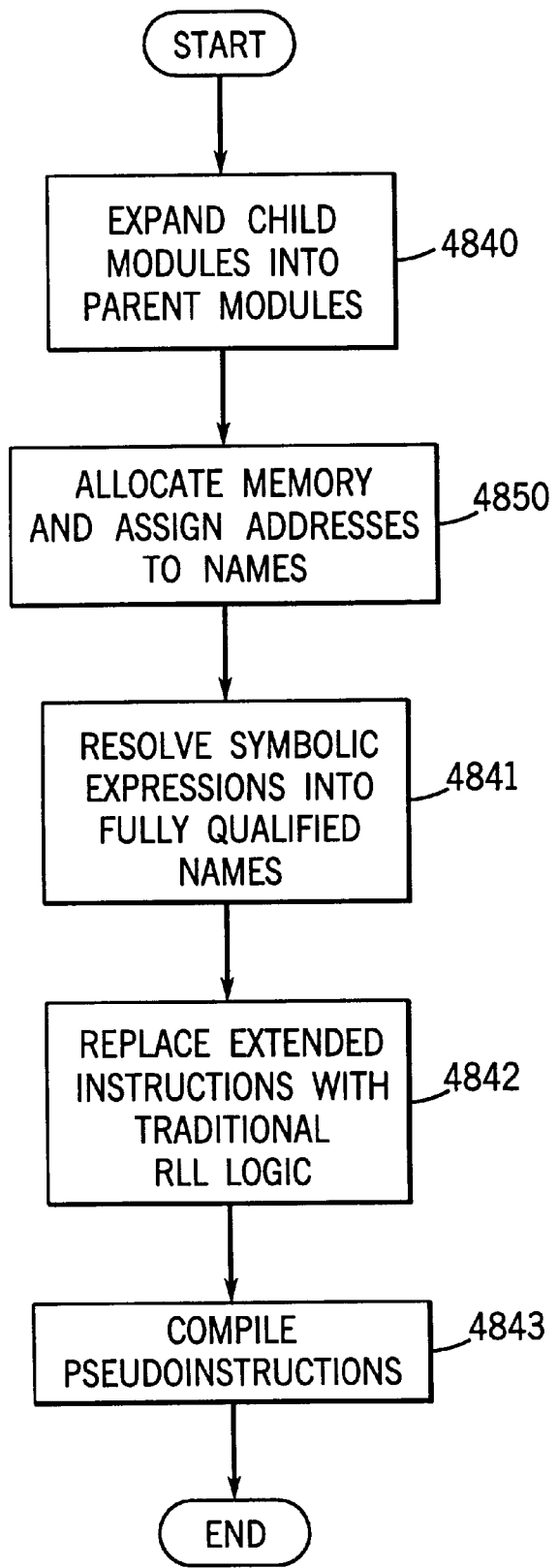
FIG. 48 is a flowchart detailing the logic associated with compilation in accordance with a preferred embodiment.

After all required physical and operational characteristics of machine components are completely defined using the editors described above, the user would instruct the programming terminal to compile the entire template tree. Compilation is relatively simple and is depicted in FIG. 48. Initially, at block 4840, the compiler expands all child modules into specifications in parent modules. For example, referring again to FIGS. 23 and 24, the master control panel module 2406 is placed in the machine module 2398 where the master control panel is referenced at 2300. Similarly, all axis modules (herein the module name "air") are expanded into the machine module 2398 in place of the module list specification named Axis 2302 and all indexer modules (herein the module named "T1") are expanded into the machine module 2398 in place of the module list specification named Indexer 2304. The compiler works its way through the entire template-based machine tree, including portions provided by the axis 2962*b*, control panel 2962*c* and bar chart 2962*d* editors until all child modules have been expanded into their referencing parent modules.

In FIG. 48, at block 4850 the compiler allocates programmable controller memory for the modules and assigns memory addresses to fully qualified names defined by data definition statements in the modules. Next, at process block 4841, the compiler resolves the symbolic expressions into fully-qualified names. For example, a symbolic expression for a push button of a master control panel may be "$.MasterStartPB". In the present example, this symbolic expression would expand into the fully qualified name "AB1.MasterControlPanel. MasterStartPB". Similarly, the left horizontal work-unit of the fourth station in the present example would have the fully qualified name "AB1.T1.S4.LH" wherein LH stands for "left horizontal", S4 for "the fourth station", T1 for "the transfer" and AB1 for "the machine" generally.

After all the symbolic expressions have been expanded into fully qualified names, at block 4842 the extended instructions such as AND and OR lists are replaced with LL logic. Thus an AND list macro corresponding to a list including ten entries will be replaced by a ten contact series set of LL instructions, each contact corresponding to a different list entry. Similarly, OR list macros would be replaced with a set of LL instructions expanded in parallel.

Next, at block 4843 the compiler would compile pseudo-instructions XPC, XPO and OTX, removing LL logic from some LL rungs and expanding logic in others depending on job specific requirements. After block 4843, all that remains is a control program consisting entirely of conventional LL logic that can be used by a programmable logic controller to control the industrial process of a machine.

It should be appreciated by those of ordinary skill in the art that the description herein is given only by way of example and that various modifications and additions might be made, while still coming within the scope of the invention. In particular, while the present template-based language has been developed for use in LL programming, other template-based languages could be developed for use with other industrial controller programming languages such as state diagram programming. The important aspect of the present language is not that it relates to LL, but rather the realization that extensions to normal programming language logic itself in conjunction with extensions that are separate from the language logic can be used to provide truly reusable programming logic that can be tailored to job-specific requirements. In addition, while the exemplary template set detailed above was specifically designed for the metal removal industry, it is anticipated that other template sets that account for industry specific idiosyncrasies will be developed for other industries, and the present invention is meant to cover all other such template sets.

Moreover, while the description above described how computer editors can act as interfaces to facilitate programming, it is contemplated that a user could construct a template-based machine tree and compile a program without the use of a computer editor. In other words, using a template set, a user could designate and populate modules by hand and then compile the modules as in FIG. 48.

Furthermore, while preferred editors are described herein, any type of computer editor could be used to aid a user in programming using the template language. The important aspect of any editor is that the editor allow the user to input information from which the editor can glean a subset of information required to designate and populate required modules. In addition, while the present invention is described in the context of four editors, the inventive template language could be used with more special editors provided for specific applications or in the alternative, one editor could be used separately to provide LL logic for a single portion of a machine tree.

Visualization of Schematics

The Designer Studio also utilizes the ECDB to ascertain typed connections (electrical, pneumatic, network, . . . ) within a control assembly or interfacing from/to a Control Assembly. This visualization enables a user to clearly see disparities between the connections improving the integrity of the resultant system.

Bill of Materials

The system also supports detailed bill of material information visualization. Controlled Resources contain properties of the resource controlled by the control assembly that place requirements (i.e., add constraints) on the structure of the assembly that facilitate more precise renderings of the enterprise control system.

For example, a clamp 1 controlled resource has a safety constraint which requires a failing clamp to always fail in the open position.

Requests or Conditions

A request for an operation (optionally with confirmation) or request for a status of the external world determines how to handle complicated actions (initialization, robot protocols, . . . ). For example, to determine if a part is present, control logic must be defined to SensePart with a request status returned to unambiguously determine if a part has been sensed or not.

The placement of the timing chart and the control request bar chart in proximal position facilitates an optimal user experience. Automatic ordering of control commands based on the prescribed order from a timing diagram is a unique and powerful feature in accordance with a preferred embodiment.

EC Integration with External Data Models (Re)Use resources created within the mechanical modeling environment to determine the Mechanical Resources that need to be controlled.

Transform the process description (i.e., sequence of activities that the resources perform) to a timing diagram.

EC Control System Design

Provides catalog of reusable control sub-system components: Control Assembly™ Type (see below for what is in a control assembly)

Allows user to create Control Assemblies™ that correspond to frequently used control subsystem design patterns.

Allows user to sequence the Requests of Control Assembly Instances (i.e., Request/Timing Diagram)

Allows user to connect the Control Assembly Instances electrically, pneumatically, and hydraulically (i.e., "control system-wide schematic")

Allows user to configure exceptional behavior (e.g., manual emergency power recovery).

Allows user to layout HMI

EC Simulation

Visualization the LL execution

Visualization the current step(s) the machine is waiting on

Visualization the "control process", i.e., animate the Timing Diagram

Use generated code via SoftLogix to animate in 3-D the workcell machines that simulate the process and the subsequent creation of the product Note: in EC all these simulations run off the same data model.

EC Control System Implementation

Bill of materials (from RS Wire Schematics)

Make control system bill of materials and control system process available to the Machine and Process designers (i.e., export to CNext)

Code generation

Diagnostics Generation

HMI (Visualization) Generation

EC Control System Maintenance

Diagnostics

Keeping control system design consistent with Product, Process, and Machine Design Password protect to provide restricted access to LL and the capability to record and changes that are made to the LL that must be reengineered into the design.

In an enterprise control system in accordance with a preferred embodiment a user must first abstract enterprise activities that are utilized to assemble parts into their basic steps. No machine or control resources are necessary for this definition process. An example in accordance with a preferred embodiment will be utilized to illustrate this process. To weld a part of a car door assembly together, a part must be loaded, the second part of the door must be loaded (clamped), the first welding operation is performed and the second welding operation is performed. Finally, the welded door assembly is unloaded and transported to its next station.

Conversion of CATIA Activities Data to/from Timing Diagrams

Overview

Rockwell Automation and Dassault Systemes are collaborating on a set of tools to design and implement production machinery. This collaboration involves storing both structural information and process information in Dassault's CNext product line. Dassault Systemes uses a different model to store process information in CNext than is used in Rockwell Automation's Control Designer Studio. In order to exchange data between Dassault and Rockwell, a Data Interchange File Format has been negotiated. Each company is responsible for converting between its own data stores and the Data Interchange File Format. This document describes the conversion between the Data Interchange File Format and Rockwell's Virtual Control Model database.

Data Interchange Format

The Data Interchange File Format consists of a text file containing only ASCII text divided into lines. Each line is either blank, or it contains one of the keywords (Activities, ActivityResources, ActivityPredecessors, ActivityAttributes, StructuralComponents) or it contains a series of comma-separated data fields appropriate to the preceding keyword. The document defining the fields and their formats follows:

---

StructuralComponents

StructuralComponentID,PartOf,WorkcellID,Label,Class
string,string,string,string,string
12345,0,1,Es1,Support
23456,12345,1,Clampset1,Clampset
Activities ActivityID,ParentActivityID,ActivityLabel,ActivityType,ActivityDuration
string,string,string,string,numeric
ActivityResources ActivityID,StructuralComponentID
string,string
ActivityPredecessors ActivityID,PredecessorActivityID
string,string
ActivityAttributes ActivityID,AttributeKey,AttributeValue
string,string,string

---

(a blank line ends one table and begins another)
(there may be as many sections as needed, and the same table may appear several times in a file)

Importing into Virtual Control Model

In the interests of modularity, the function of importing data from this text file into the Rockwell VCM has been split into 2 steps. In the first step, the text file is parsed and an intermediate text stream of SQL statements is created. In the second step, the stream of SQL statements is executed against the VCM database.

Parsing the Input File

The file parsing tool is a Perl script which implements a state machine with the 2 states READ_TABLE_NAME and READ_DATA. It begins in state READ_TABLE_NAME, in which it reads lines of input (ignoring blank lines) until it finds one of the valid keywords. When it finds a keyword, it sets up the expected names and types of data to follow and switches to state READ_DATA. If what it finds is not a valid keyword, it exits after logging an error.

In the READ_DATA state the tool reads successive lines of data, checks for the expected number of fields, and emits one SQL statement for each line re ad. The SQL statements are all INSERT statements, each inserting one row of data into the correspondingly-named t able in the VCM database. When the tool reads a blank line, it changes state to READ_TABLE_NAME. End of file terminates the tool.

ODBC Tool

The tool that executes SQL statements against a database is a Perl script employing the Win32::ODBC extension. It is invoked from the command line with an argument specifying the name of the ODBC data source to be opened. Then i t reads its standard input for SQL statements, each of which is executed in turn, and the success or failure of each statement is checked. If any statement fails, the entire process terminates and an error message is logged. After all statements have been executed, the data source is closed and the process terminates.

Conversion to Timing Diagrams

After execution of the preceding processing, the data from the Interchange File resides in a set of intermediate tables in the VCM database. Further processing is required to convert them to the format used by Rockwell's tools to display Timing Diagrams to the user. All of this processing is carried out in a single tool, because it is interrelated, with later steps depending on the results of earlier steps. The processing begins with establishment of an ODBC connection to the VCM data source. An SQL query is executed to Find all top level Activities (usually only one).

Timing Diagram creation

A Timing Diagram is created for the specified Activity, using the Create a Timing Diagram query.

Edge creation

Every Timing Diagram has at least one Edge, the left Edge. The Create an Edge query is executed to create the left Edge.

Request creation

The Find all Requests on this Timing Diagram query is executed to identify Activities that will map to Requests. Then the Create a CNextRequest query is used for each of the Requests. For each Request, running a Count subsidiary Activities query determines if this Request requires a subsidiary Timing Diagram. If it does, BarChart creation, Edge creation, and Request creation are called recursively. This will go on until there are no more subsidiary Activities detected. After a subsidiary Timing Diagram has been created, it is necessary to execute Update SubBarChartID in CNextRequest.

Associating Requests with Edges

After all the Activities on a Timing Diagram have been created, they must be organized by relating them to Edges. As many Edges will be created as are needed to organize all the Requests on the Timing Diagram. The processing begins with executing Find all Requests on left Edge of Timing Diagram. Then, for each Request found, Update LeftEdge of Requests with no Predecessors is executed. At this point Create an Edge can be executed to create the new right Edge. Following this a loop is executed, where each iteration begins with executing Find all Requests for next Edge and continues by executing Update LeftEdge of other Requests and Create an Edge if any Requests were found. The loop terminates when no more Requests can be found.

SQL Queries

All of the database processing is carried out by executing SQL statements under control of a script or program. This guarantees portability of the processing between different database servers. The queries are described in the following sections. The words beginning with $ are variables that are substituted into the queries before they are executed. Most of the queries are self-explanatory, but the more complex ones are accompanied by textual clarification.

Find all top level Activities
SELECT * FROM Activities WHERE ParentActivityID= '0'

Create a Timing Diagram
INSERT INTO BarCharts
(BarChartID, BarChartStrng, BarChartDescr, ModeID)
 VALUES ($BarChartID, '$barChartStrng', 'From CATIA', 1)

Create an Edge
INSERT INTO Edges (EdgeID, EdgeNum, BarChartID)
 VALUES ($EdgeID, $edgecount, $BarChartID)

Find all Requests on this Timing Diagram
SELECT * FROM Activities WHERE ParentActivityID= '$ParentActivityID'

Activities give rise to both BarCharts and CNextRequests, depending on their position in the hierarchy. A top level (parentless) Activity is always a BarChart, and a lower level Activity is always a Request, but if the lower level Activity has children, it will give rise to a subsidiary BarChart as well as a Request.

---

Create a CNextRequest

INSERT INTO CNextRequests
(RequestID, LeftEdge, BarChartID, RequestOrder, Activity,
 Resources, SubBarChartID)
 VALUES ($RequestID, 0, $BarChartID, 0, '$activityID', NULL, 0)

Count subsidiary Activities

SELECT COUNT(*) AS ChildCount FROM Activities
 WHERE ParentActivityID = '$activityID'
Update SubBarChartID in CNextRequest UPDATE CnextRequests
 SET SubBarChartID = $newBarChartID
 WHERE RequestID = $RequestID
Find all Requests on left Edge of Timing Diagram SELECT * FROM Activities
 WHERE Activities.ParentActivityID = '$ParentActivityID'
 AND NOT EXISTS (SELECT * FROM ActivityPredecessors
  WHERE Activities.ActivityID =
  ActivityPredecessors.ActivityID)
This query may be paraphrased as "select those Activities belonging to this BarChart and lacking a predecessor Activity".
Update LeftEdge of Requests with no Predecessors UPDATE CnextRequests
 SET LeftEdge = $edgeID
 WHERE CNextRequests.Activity = '$ActivityID'
Find all Requests for next Edge SELECT R2.RequestID
 FROM CNextRequests AS R1, CNextRequests AS R2,
 ActivityPredecessors AS AP1
 WHERE R1.LeftEdge $oldEdge

---

-continued

AND AP1.PredecessorActivityID = R1.Activity
 AND R2.Activity = AP1.ActivityID
This query may be paraphrased as "select those Requests whose predecessor Activity mapped to a Request linked to the preceding Edge".
Update LeftEdge of other Requests UPDATE CnextRequests
 SET LeftEdge = $edgeID
 WHERE CNextRequests.RequestID = $RequestID
Select BarChart for export SELECT * FROM [BarCharts] WHERE BarChartID = $BarChartID
Create Ordered Edge List SELECT * FROM Edges
 WHERE BarChartID = $BarChartID
 ORDER BY Edges.EdgeNum
Select Requests for export SELECT * FROM Requests
 WHERE Requests.LeftEdge = $EdgeID
 ORDER BY Requests.RequestOrder
Lookup Request Attributes SELECT ControlAssemblyInstances.Label AS InstanceLabel,
  DCCActions.Label AS ActionLabel,
  DCCElementsTimes.Time
 FROM Requests,
  ControlAssemblyInstances AS Cai,
  DCCActions,
  DCCElementsTimes
 WHERE Requests.RequestID = $RequestID
AND Requests.ControlAssemblyInstanceID =
Cai.ControlAssemblyInstanceID
  AND DCCActions.DCCActionsID =
Requests.DCCActionsID
  AND DCCElementsTimes.DCCActionsID =
Requests.DCCActionsID

---

The first step in designing a control system utilizing an enterprise system in accordance with a preferred embodiment is presented below. The example from an actual car manufacturing station for a rear quarter panel assembly is utilized to assist one of ordinary skill in the art to make and use a preferred embodiment without undue experimentation.

A control engineer initiates the Rockwell Automation Enterprise Controls Designer Studio in accordance with a preferred embodiment to initiate the process. The engineer creates a new project by selecting the new project and gives it an appropriate name, like NEWPROJECT. This activity causes the system to load the machine resources that require control to be loaded from the existing CAD database. A process description is also loaded from the existing CAD database.

Data conversion to/from the ECDB

One of the key tasks in creating an Enterprise Control Database (ECDB) is the creation of a uniform set of data structures and a set of mapping procedures to take data from disparate sources and import it into the ECDB. Some of these data sources include structural information (CAD models, etc.) and process information. In accordance with a preferred embodiment moves data into the ECDB and creates a Data Interchange File Format (DIFF) file, and then use tools that can populate a set of database tables from information in the DIFF.

The ECDB also supports the export of data in a variety of formats than can then be used to generate input to a variety of design analysis and synthesis tools, such as Rockwell Automation's Control Designer Studio or Dassault's CNext process modeling system.

The Data Interchange File Format consists of a text file containing only ASCII text divided into lines. Each line is either blank, contains one of the keywords, or contains a series of comma-separated value (CSV) data fields appropriate to the preceding keyword. Because of the flexibility of CSV, the number of fields and their formats will grow over time to allow very rich structure.

The currently supported table keywords are: (Activities, ActivityResources, ActivityPredecessors, ActivityAttributes, StructuralComponents). These tables are defined below, where the $n^{th}$ element of the "ColumnValues" list is the storage format of the table column whose name is the $n^{th}$ element of the "ColumnNames" list. The table definitions follow:

Table=StructuralComponents
   ColumnNames=StructuralComponentID,PartOf, WorkcellID,Labe 1,Class
   Columnvalues=string,string,string,string,string
Table=Activities
   ColumnNames=ActivityID,ParentActivityID, ActivityLabel,Activity Type,ActivityDuration
   ColumnValues=string,string,string,string,numeric
Table=ActivityResources
   ColumnNames=ActivityID,StructuralComponentID
   ColumnValues=string,string
Table=ActivityPredecessors
   ColumnNames=ActivityID,PredecessorActivityID
   ColumnValues=string,string
Table=ActivityAttributes
   Column Names=ActivityID,AttributeKey,AttributeValue
   ColumnValues=string,string,string This file format supports an arbitrary number of database tables. The format is to be interpreted as follows:

A blank line ends one table and begins another

The first non-blank line after a blank line denotes the table name

Subsequent non-blank lines denote data in CSV format

There may be as many sections as needed, and the same, table may appear several times in a file. An example DIFF is shown below, with keywords highlighted in bold:

StructuralComponents
   12345,0,1,Esl,Support
   23456,12345,1,Clampset1,Clampset
Activities
   12345,4367,Load,,45
ActivityResources
   12345,23456
ActivityPredecessors
   Clampset1,Clampset2
ActivityAttributes This file format is illustrative only. Extensions (via additional columns) can be added to particular database tables, and new tables added, to support such concepts as Interlocks (triggering events) and Safeties (enabling events).

In the interests of modularity, the function of importing data from the DIFF into the ECDB has been split into two steps. In the first step, the DIFF file is parsed and an intermediate text stream of SQL statements is created. In the second step, the stream of SQL statements is executed against the ECDB database.

Step 1: Parsing the DIFF and generating SQL

The file parsing tool has been implemented as a Perl script which implements a state machine with the two states READ_TABLE_NAME and READ_DATA. Execution of the Perl script begins with the program in state READ_TABLE_NAME, in which it reads lines of input (ignoring blank lines) until it finds a keyword. If the keyword is not a member of the valid keywords, the program logs an error and exits. Otherwise, after finding a valid keyword, the script program initializes a number of variables that define the expected names and types of data to follow. The program then switches to state READ_DATA.

In the READ_DATA state the tool reads successive lines of data, checks for the expected number of fields, and emits one SQL statement for each line that has been read from the DIFF. The SQL statements are all INSERT statements, each inserting one row of data into the correspondingly-named table in the ECDB.

When the Perl script program reads a blank line, it changes its state back to READ_TABLE_NAME.

Reading an End of File (EOF) terminates execution.

Step 2: Executing the stream of SQL statements against the ECDB

The tool that executes SQL statements against a database is a Perl script employing the Win32::ODBC extension. It is invoked from the command line with an argument specifying the name of the ODBC data source to be opened. Then it reads its standard input for SQL statements, each of which is executed in turn, and the success or failure of each statement is checked. If any statement fails, the entire process terminates and an error message is logged. After all statements have been executed, the data source is closed and the process terminates. The standard input stream for this program is usually the standard output of the Perl program of Step 1 above.

For each SQL query attempted, the program checks the return status. If the return status is an error state, the program returns the error text and terminates. Otherwise, the program terminates when all SQL statements have been successfully executed against the ECDB.

At this point, the data has been successfully placed in the Enterprise Database in a canonical format, and can now be accessed by a variety of tools. In general, data translation is required from the ECDB internal format to a format that is acceptable to a specific tool. For example, Rockwell's Designer Studio program uses a format called Timing Diagrams to denote the activities performed by resources and bar charts to denote the requests made to the resources.

Conversion from ECDB to Timing Diagrams

The processing required for exporting data from the ECDB in a format compatible with Rockwell's tools to display Timing Diagrams to the user is described. All of this processing is carried out utilizing a single tool that processes the results of earlier steps. The processing begins with establishment of an ODBC connection to the ECDB data source. A SQL query is executed to Find all top level Activities (usually there is only one).

Timing Diagram creation

A Timing Diagram is created for the specified Activity, using the Create a Timing Diagram query. Code in Perl is shown below for converting information from CATIA process description to a timing diagram for use by the ECDB.

```
# prepare connection to Machine Resource DB
$db = new Win32::ODBC("VCM") || die $!;
# prepare connection to Machine Resource DB
$db = new Win32::ODBC("VCM") || die $!;
=head2 mainline
#for each parentless Activity CreateBarChart recursively
=cut
my $query = "SELECT * FROM Activities WHERE
Activities.ParentActivityID = '0'";
my(@rows) = ();
```

```
-continued if (! $db->Sql($query))
{
    # read the entire set of rows
    while ($db->FetchRow())
    {
        # store result as a list of hashes
        push @rows, {$db->DataHash()};
    }
}
else
{
    ReportSQLError($query);
}
# iterate through the array of rows, with no further DB access
my $row;
for each $row (@rows)
{
    &CreateBarChart($row->{"ActivityLabel"}, $row-
>{"ActivityID"});
}
$db->Close();
# end of mainline
#for each parentless Activity CreateBarChart recursively
=cut
my $query = "SELECT * FROM Activities WHERE
Activities.ParentActivityID = '0' ";
my(@rows) = ();
if (! $db->Sql($query))
{
    # read the entire set of rows
    while ($db->FetchRow())
    {
        # store result as a list of hashes
        push @rows, {$db->DataHash()};
    }
}
else
{
    ReportSQLError($query);
}
# iterate through the array of rows, with no further DB access
my $row;
foreach $row (@rows)
{
    &CreateBarChart($row->{"ActivityLabel"}, $row-
>{"ActivityID"});
}
$db->Close();
# end of mainline
```

Edge creation

Every Timing Diagram has at least one Edge, the left Edge. The Create an Edge query is executed to create the left Edge. A summary of the steps in the actual execution code follows:
1. CreateBarChart
2. CreateEdge
3. for each Activity with this parent
4. CreateCNextRequest
5. find Activities with this parent with no ActivityPredecessors
6. AssignLeftEdge
7. CreateEdge
8. while any unassigned Activities with this parent remain
9. for each ActivityPredecessor pointing to any Activity on previous edge
10. AssignEdge
11. CreateEdge
12. return BarChartID Request creation The Find all Requests on this Timing Diagram query is executed to identify Activities that will map to Requests. Then the Create a CNextRequest query is used for each of the Requests. For each Request, running a Count subsidiary Activities query determines if this Request requires a subsidiary Timing Diagram. If it does, BarChart creation, Edge creation, and Request creation are called recursively. This will go on until there are no more subsidiary Activities detected. After a subsidiary Timing Diagram has been created, it is necessary to execute Update SubBarChartID in CNextRequest.

Associating Requests with Edges

After all the Requests on a Timing Diagram have been created, they must be organized by relating them to Edges. As many Edges will be created as are needed to organize all the Requests on the Timing Diagram. The processing begins with executing Find all Requests on left Edge of Timing Diagram. Then, for each Request found, Update LeftEdge of Requests with no Predecessors is executed. At this point Create an Edge can be executed to create the new right Edge. Following this a loop is executed, where each iteration begins with executing Find all Requests for next Edge and continues by executing Update LeftEdge of other Requests and Create an Edge if any Requests were found. The loop terminates when no more Requests can be found.

Export of Timing Diagrams

SQL Queries

All of the database processing is carried out by executing SQL statements under control of a script or program. This guarantees portability of the processing between different database servers. The queries are described in the following sections. The words beginning with $ are variables that are substituted into the queries before they are executed. Most of the queries are self-explanatory, but the more complex ones are accompanied by textual clarification.

Find all top level Activities
SELECT * FROM Activities WHERE ParentActivityID= '0'

Create a Timing Diagram
INSERT INTO BarCharts
(BarChartID, BarChartStrng, BarC hartDescr, ModeID)
VALUES ($BarChartID, '$barChartStrng', 'From CATIA', 1)

Create an Edge
INSERT INTO Edges (EdgeID, EdgeNum, BarChartID)
VALUES ($EdgeID, $edgeCount, $BarChartID)

Find all Requests on this Timing Diagram
SELECT * FROM Activities WHERE ParentActivityID= '$ParentActivityID'

Activities give rise to both BarCharts and CNextRequests, depending on their position in the hierarchy. A top level (parentless) Activity is always a BarChart, and a lower level Activity is always a Request, but if the lower level Activity has children, it will give rise to a subsidiary BarChart as well as a Request.

Create a CNextRequest
INSERT INTO CNextRequests
(RequestID, LeftEdge, BarChartID, RequestOrder, Activity, Resources, SubBarChartID)
VALUES ($RequestID, 0, $BarChartID, 0, '$activityID', NULL, 0)

Count subsidiary Activities
SELECT COUNT(*) AS ChildCount FROM Activities WHERE ParentActivityID='$activityID'

Update SubBarChartID in CNextRequest
UPDATE CnextRequests
SET SubBarChartID=$newBarChartID
WHERE RequestID=$RequestID Find all Requests on left Edge of Timing Diagram
SELECT * FROM Activities

```
WHERE      Activities.     ParentActivityID=
   '$ParentActivityID'
AND NOT EXISTS (SELECT * FROM ActivityPrede-
   cessors
   WHERE             Activities.ActivityID=
      ActivityPredecessors.ActivityID)
```
This query may be paraphrased as "select those Activities belonging to this BarChart and lacking a predecessor Activity".

```
Update LeftEdge of Requests with no Predecessors
UPDATE CnextRequests
SET LeftEdge=$edgeID
WHERE CNextRequests.Activity='$ActivityID'
Find all Requests for next Edge
SELECT R2.RequestID
FROM CNextRequests AS R1, CNextRequests AS R2,
ActivityPredecessors AS AP1
WHERE R1.LeftEdge=$oldEdge
   AND AP1. PredecessorActivityID=R1.Activity
   AND R2.Activity=AP1.ActivityID
```
This query may be paraphrased as "select those Requests whose predecessor Activity mapped to a Request linked to the preceding Edge."

```
Update LeftEdge of other Requests
UPDATE CnextRequests
SET LeftEdge=$edgeID
WHERE CNextRequests.RequestID=$RequestID
Select BarChart for export
SELECT * FROM [BarCharts] WHERE BarChartID=
$BarChartID
Create Ordered Edge List
SELECT * FROM Edges
WHERE BarChartID=$BarChartID
ORDER BY Edges.EdgeNum
Select Requests for export
SELECT * FROM Requests
WHERE Requests.LeftEdge=$EdgeID
ORDER BY Requests.RequestOrder
Lookup Request Attributes
SELECT ControlAssemblyInstances.Label AS
InstanceLabel,
   DCCActions.Label AS ActionLabel,
   DCCElementsTimes.Time
FROM Requests,
   ControlAssemblyInstances AS Cai,
   DCCActions,
   DCCElementsTimes
WHERE Requests.RequestID=$RequestID AND
   Requests.ControlAssemblyInstanceID=
   Cai.ControlAssemblyInstanceID
   AND         DCCActions.DCCActionsID=
      Requests.DCCActionsID
   AND DCCElementsTimes.DCCActionsID=
      Requests.DCCActionsID
```

Enterprise Controls

Enterprise Controls (EC) is a single unifying construct for integrating control system design, simulation, implementation, and maintenance processes (via an integrated object model), and integrating control system design and deployment with external product, process, and machine data models (via an integrated enterprise-wide customer data model). The Designer Studio software provides enterprise control in accordance with a preferred embodiment.

This EC Designer Studio incorporates software from various new software including Enterprise Controls Designer Studio, a transfer machine model, status based diagnostics and code generation engine, a PanelBuilder software comprising: a layout editor and a layout compiler, RSWire (schematics), RSLadder (display and monitor LL), RS SoftLogix 5 (simulator), RS Linx (communications gateway/router), PERL Scripting and a relational database such as Microsoft Access.

Figure 55:
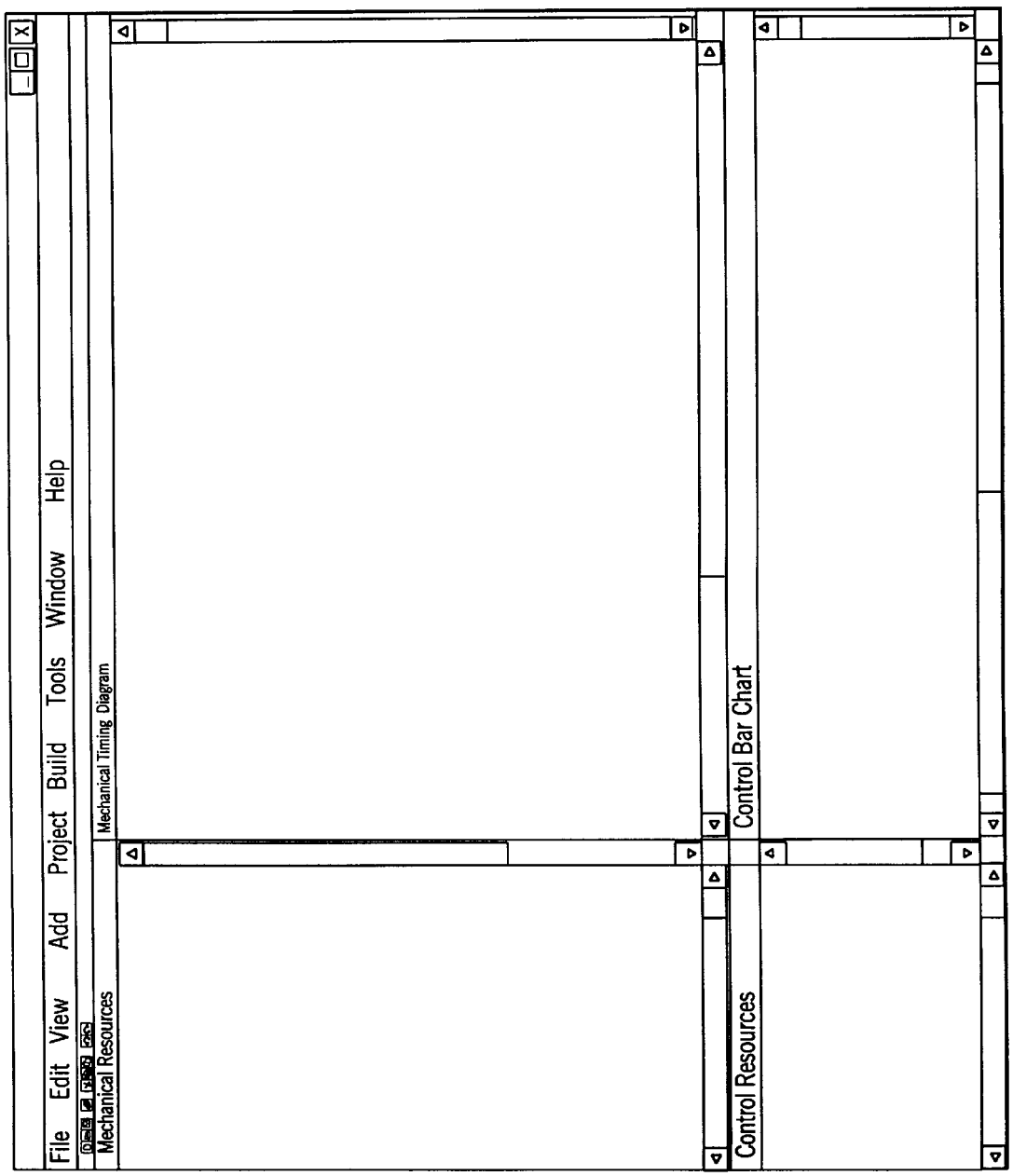
FIG. 55 is the initial display for the Designer Studio in accordance with a preferred embodiment.

The EC Designer Studio utilizes Java 1.1, Visual J++ 6.0 and Microsoft Application Foundation Classes (version 2.5). FIG. 54 is a splash screen in accordance with a preferred embodiment. FIG. 55 is the initial display for the Designer Studio in accordance with a preferred embodiment.

The Designer Studio integrates with External Data Models such as Mechanical Resources panel which utilizes resources created within the mechanical modeling environment to provide the resources that need to be controlled. The data models can be based on "BIG" CAD (Unigraphics, SDRC, or CATIA) or "little" CAD (e.g., AutoCAD)) to determine the Resources (Mechanical, Robotic, and Operator). An important part in accordance with a preferred embodiment is a mechanism that determines which elements are to be controlled.

The Designer Studio also integrates a Mechanical Timing Diagram panel which can take on different dimensions based on the particular model which is employed. For example, when CATIA is utilized, the sequence of activities that the resources perform in their process representation of choice are transformed into a Mechanical Timing Diagram in accordance with a preferred embodiment. If AutoCad is utilized, then the Designer Studio must create a Mechanical Timing Diagram. This process is well suited for processes that use mechanical timing diagrams to describe their sequence of operations. One of ordinary skill in the art will readily comprehend that real control system design is done in small "chunks" that can be "rationalized" one at a time. In accordance with a preferred embodiment, these chunks will be referred to as Control Assemblies.

Figure 56:
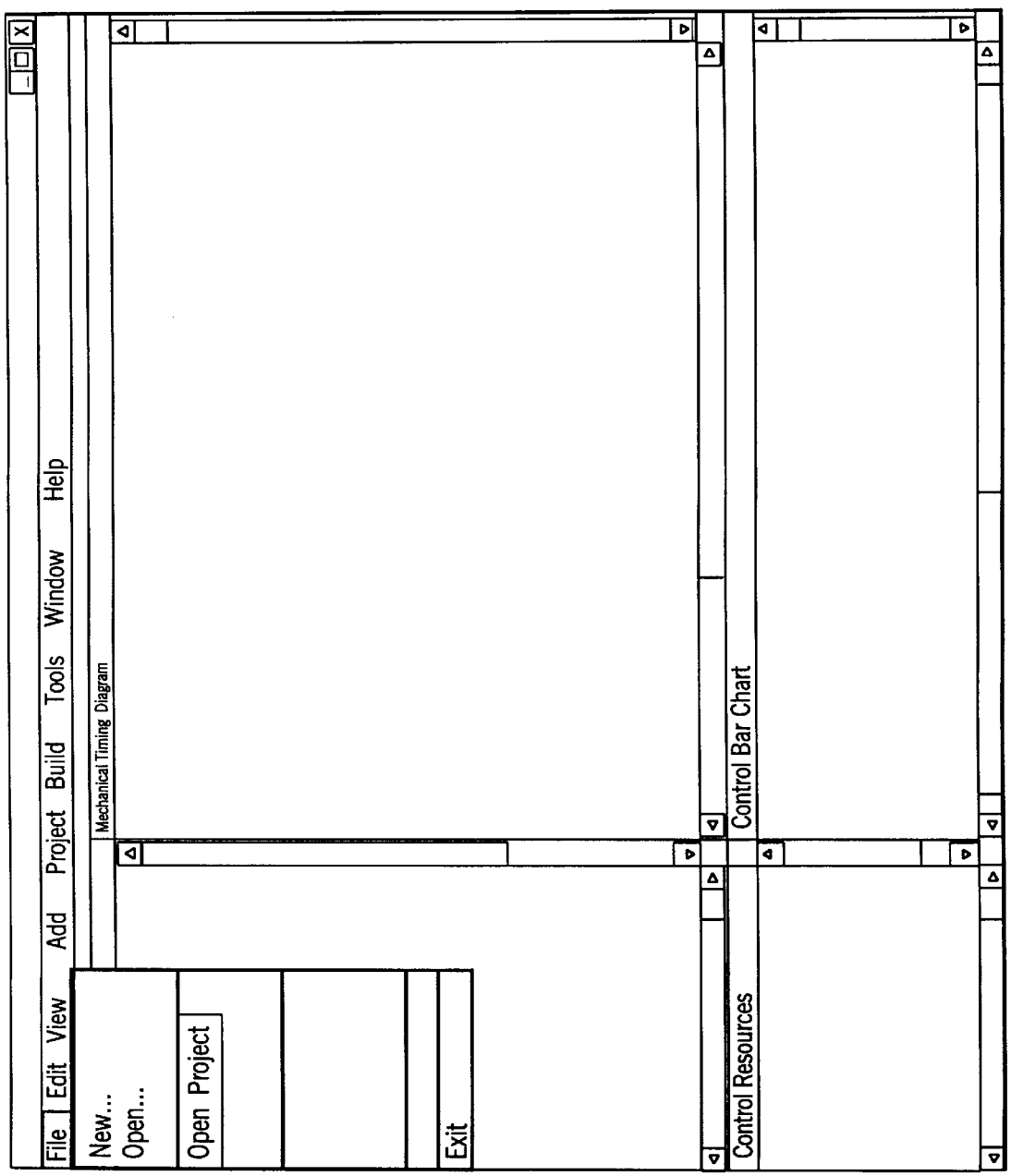
FIG. 56 illustrates a menu that is utilized to open a project in accordance with a preferred embodiment.
Figure 57:
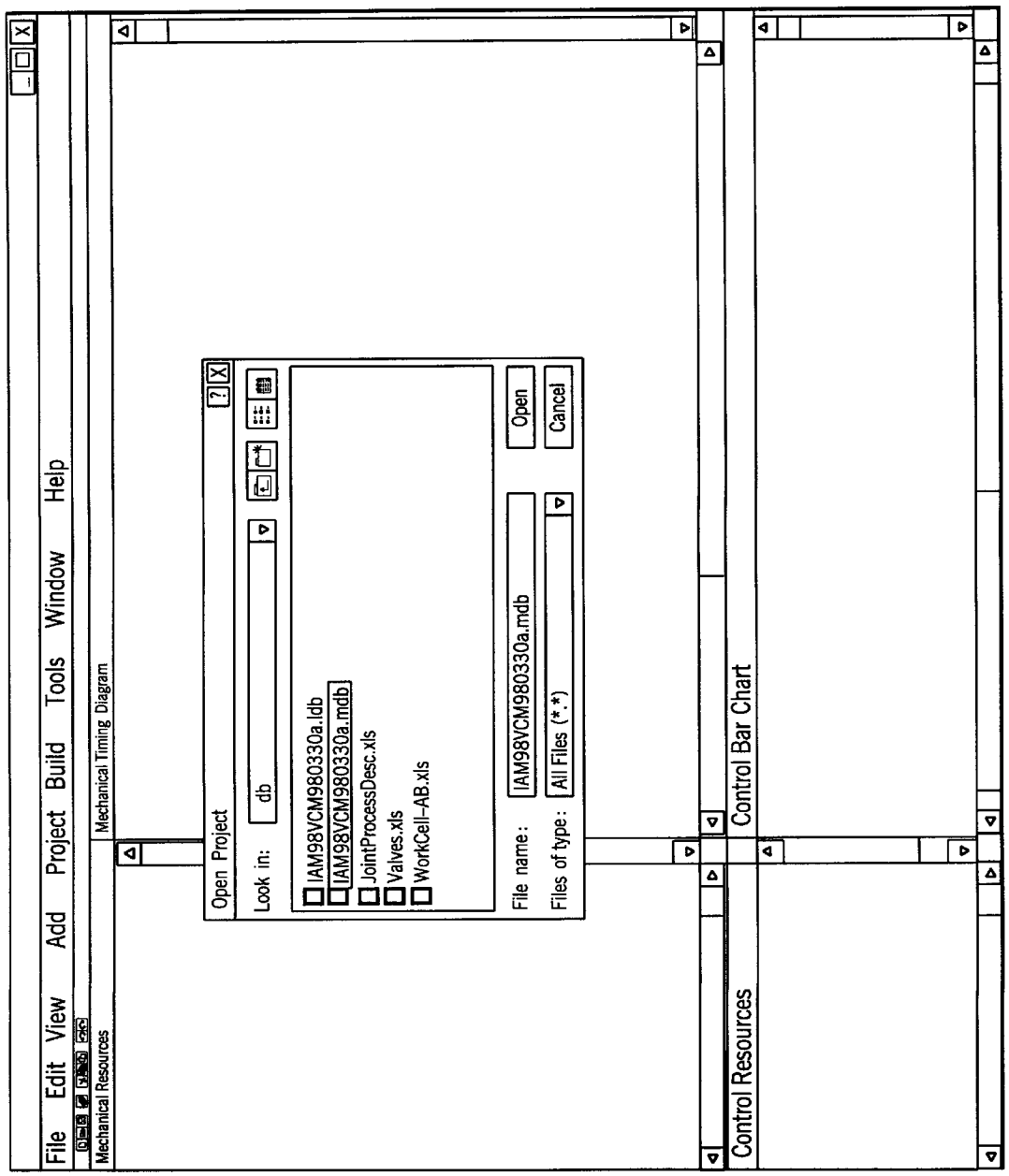
FIG. 57 illustrates a display menu that is utilized to select an existing project to load in accordance with a preferred embodiment.
Figure 58:
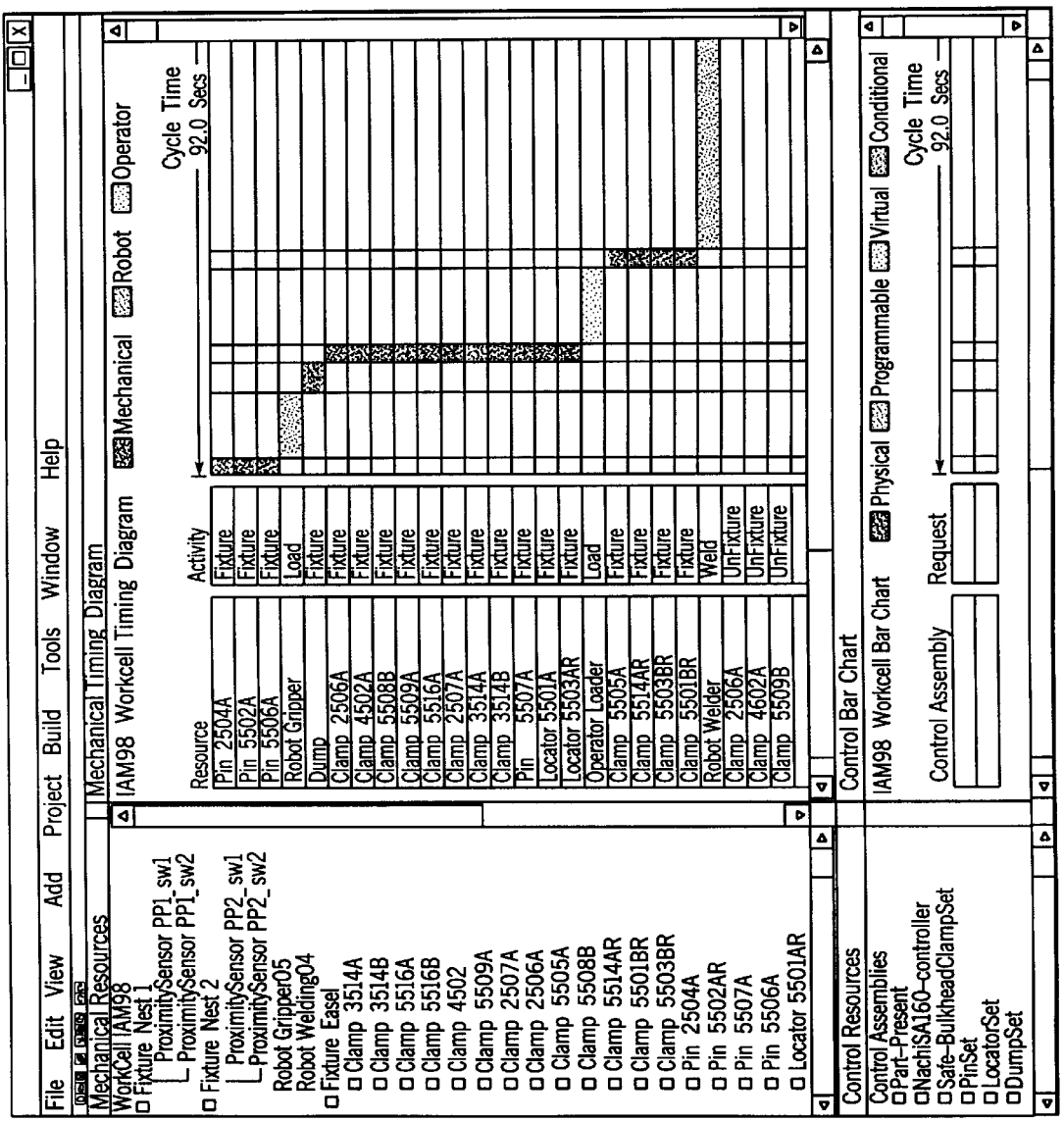
FIG. 58 illustrates an Open Project dialog in accordance with a preferred embodiment.

FIG. 56 illustrates a menu that is utilized to open a project in accordance with a preferred embodiment. FIG. 57 illustrates a display menu that is utilized to select an existing project to load in accordance with a preferred embodiment. FIG. 58 Illustrates an Open Project dialog in accordance with a preferred embodiment. A user interacts with this display to open a database and read a Mechanical Resources 5810 from the CAD database and transform the process description into a Mechanical Timing Diagram 5820.

One panel 5810 contains a hierarchical tree of the Resources for the IAM98 Workcell read from the CATIA CAD system and filtered to highlight control information. A second panel 5820 contains a Mechanical Timing Diagram that performs the sequencing of the activities (or operations) that the resources perform. A third panel (Control Resources) 5800 contains the Control Assembly Types that are selected by the EC Designer Studio to be necessary for controlling the Mechanical Resources in the final panel Control Bar Chart 5830 that is populated automatically by the system as control assemblies are created.

EC Control System Design

Control Engineers work on "small", manageable "chunks" of the control system. These chunks or control subsystems are referred to as Control Assemblies as shown in panel 5800. Control Assemblies are created as a first step in defining the enterprise control in accordance with a preferred embodiment. A control engineer creates Control Assemblies (i.e., small chunks of the control system) to control the mechanical resources "that require control" (i.e., resources that have activities in the Mechanical Timing Diagram).

For example a user can create a Control Assembly of type SafeBulkHeadClampSet 5840 in order to control clamps 2506A, 4502A, 5508B, 5509A, 5516A, and 5516B. Note that SafeBulkHeadClampSet was one of the Control Assembly Types predicted by the EC Designer Studio to be useful to the user to control some of the resources in the Mechanical Timing Diagram as evidenced by its name appearing in the Control Resources window 5800.

Figure 59:
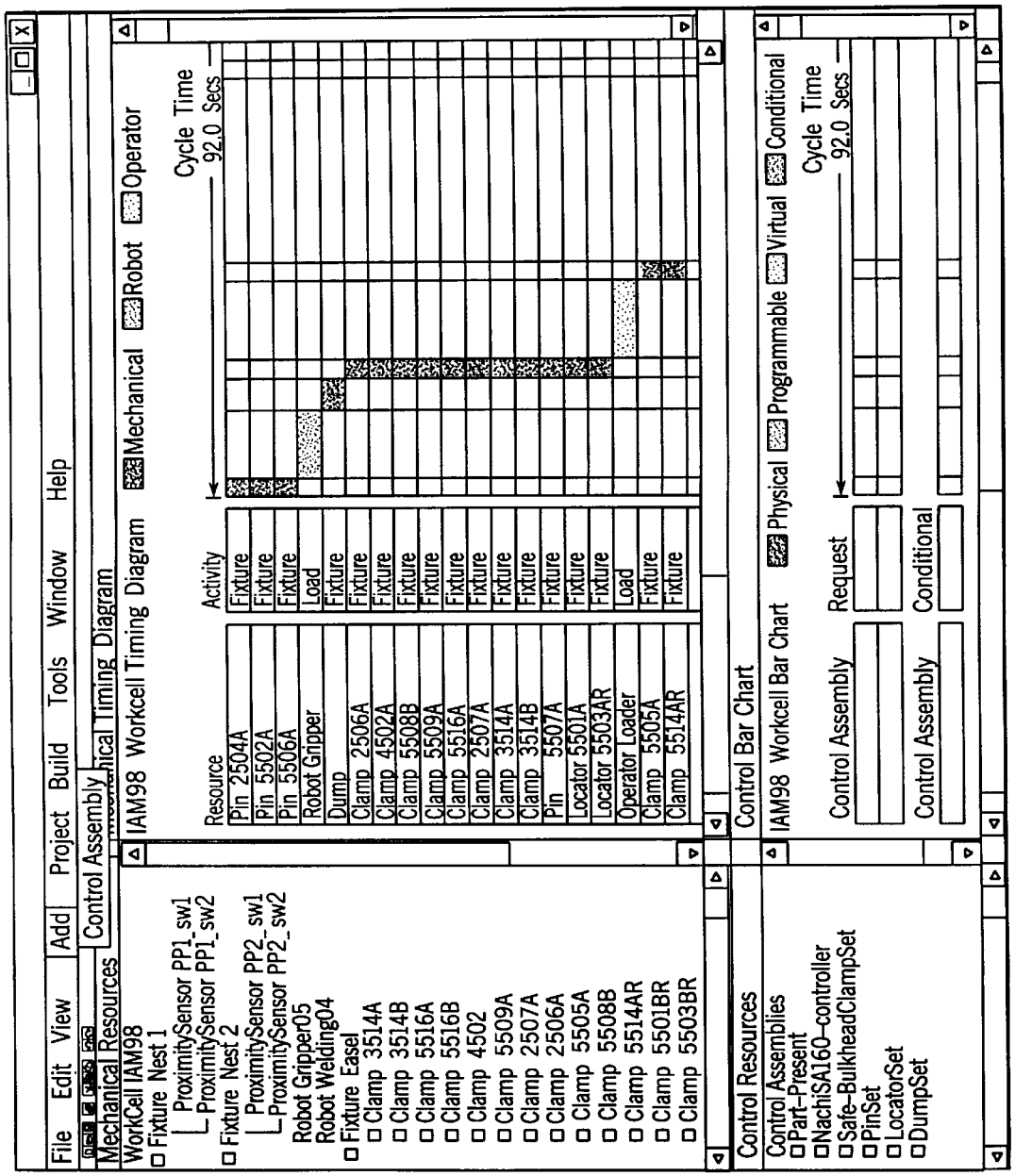
FIG. 59 ilustrates a menu display for facilitating an "Add Control Assembly" dialog 5900 in accordance with a preferred embodiment.
Figure 60:
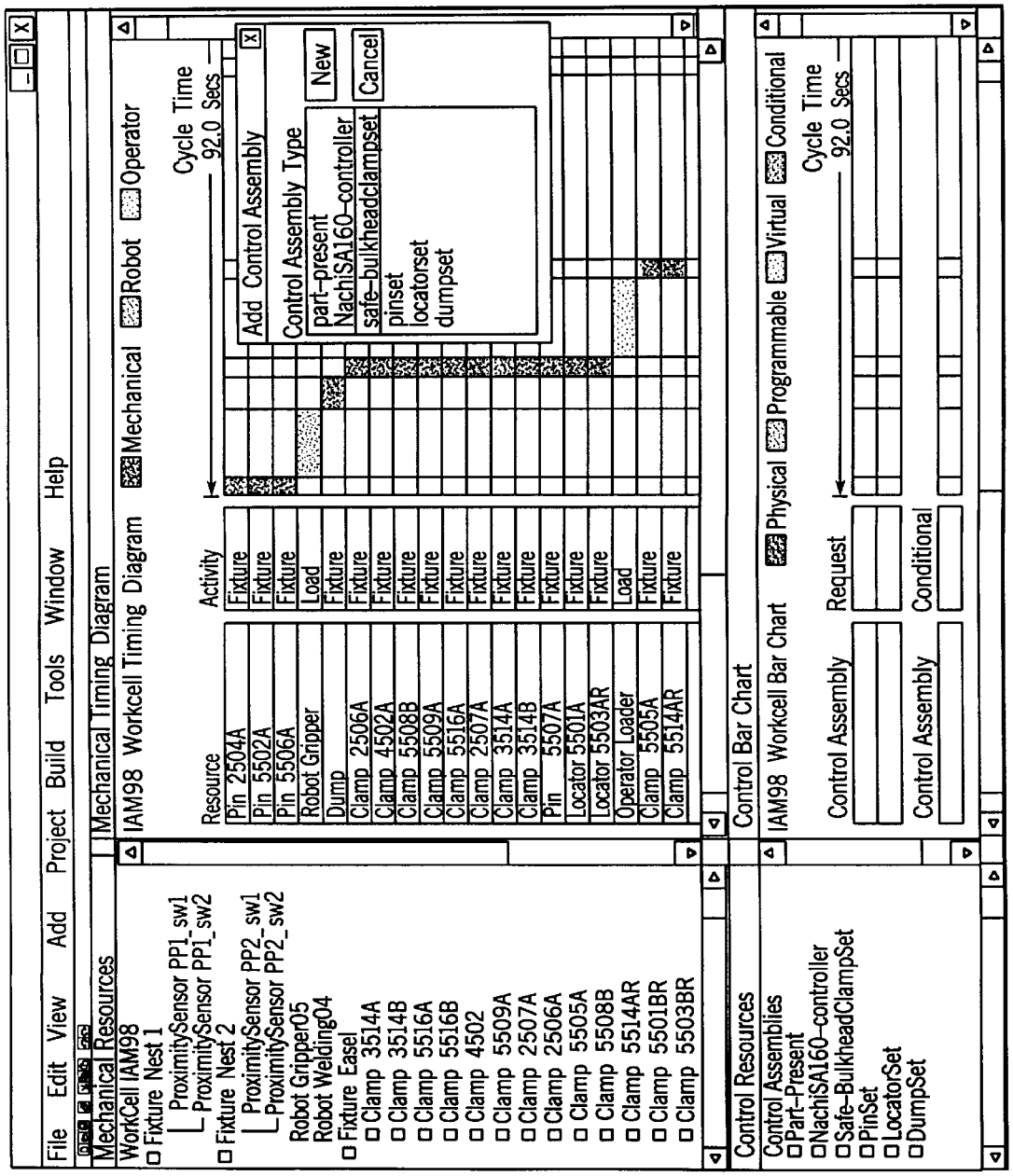
FIG. 60 illustrates the first menu in an "Add Control Assembly" dialog in accordance with a preferred embodiment.
Figure 61:
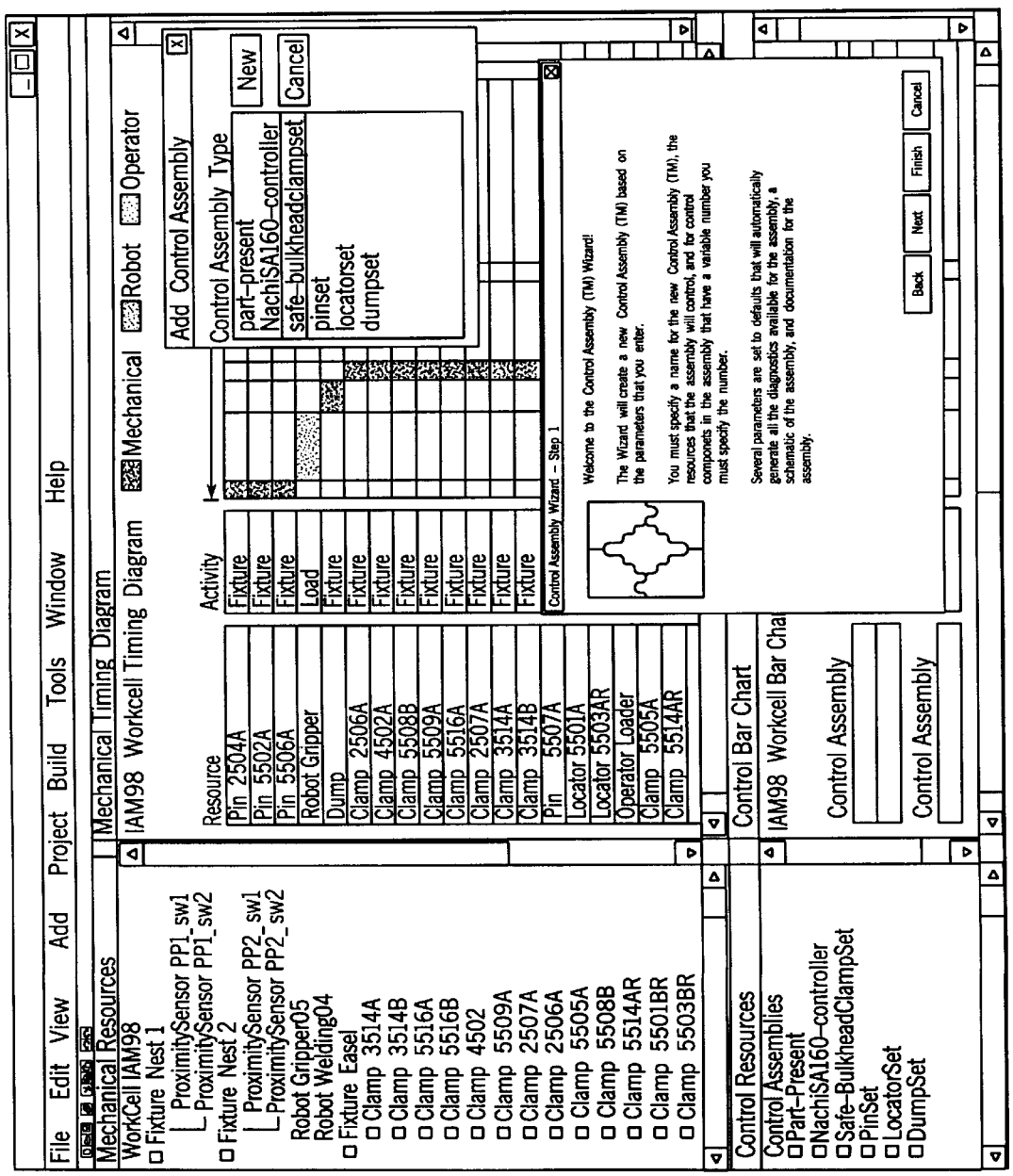
FIGS. 61 to 67 illustrate a user experience with a wizard in accordance with a preferred embodiment.

These clamps perform the activities fixture (close) and release (open) in parallel on the Mechanical Timing Diagram. FIG. 59 Illustrates a menu display for facilitating an "Add Control Assembly" dialog 5900 in accordance with a preferred embodiment. FIG. 60 illustrates the first menu in an "Add Control Assembly" dialog in accordance with a preferred embodiment. The Add Control Assembly dialog provides a catalog of reusable control sub-system components: Control Assembly Types (see below for the specification of a Control Assembly. In accordance with the example, the Control Assembly Type selected is a safe-bulkheadclampset 6000. After selecting the Type the user will click the New button. This user event initiates the Control Assembly Wizard shown in FIG. 61 at 6100.

Figure 62:
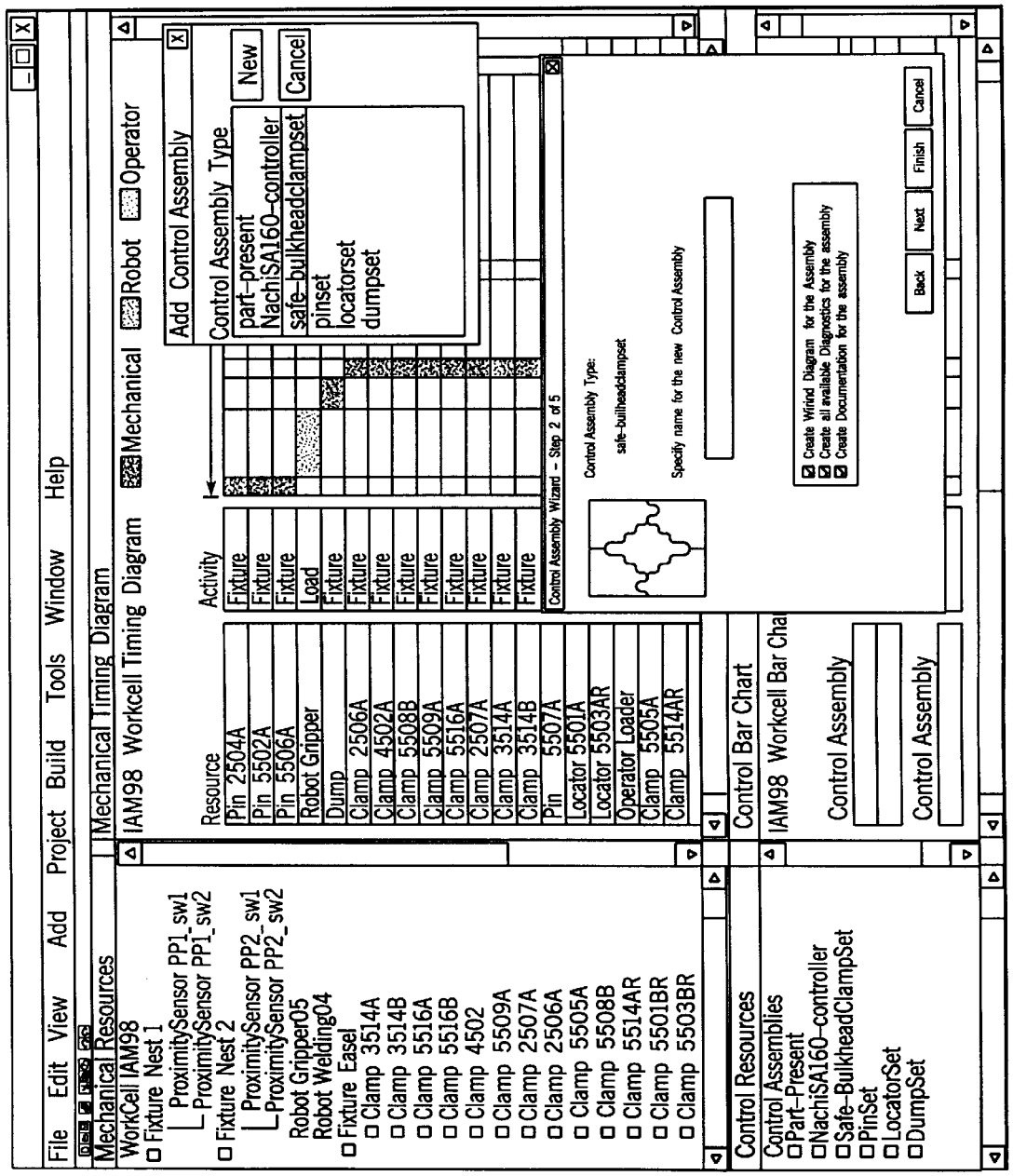

The Control Assembly Wizard allows a user to create a Control Assembly corresponding to frequently used control subsystem design patterns and allows the user to actuate properties of that Control Assembly. FIGS. 61 to 67 illustrate a user experience with a wizard in accordance with a preferred embodiment. FIG. 62 illustrates a wizard display in which a control assembly has been selected in accordance with a preferred embodiment. The user must specify a name for the new Control Assembly of Type safe-bulkheadclampset as reflected at 6200.

Figure 63:
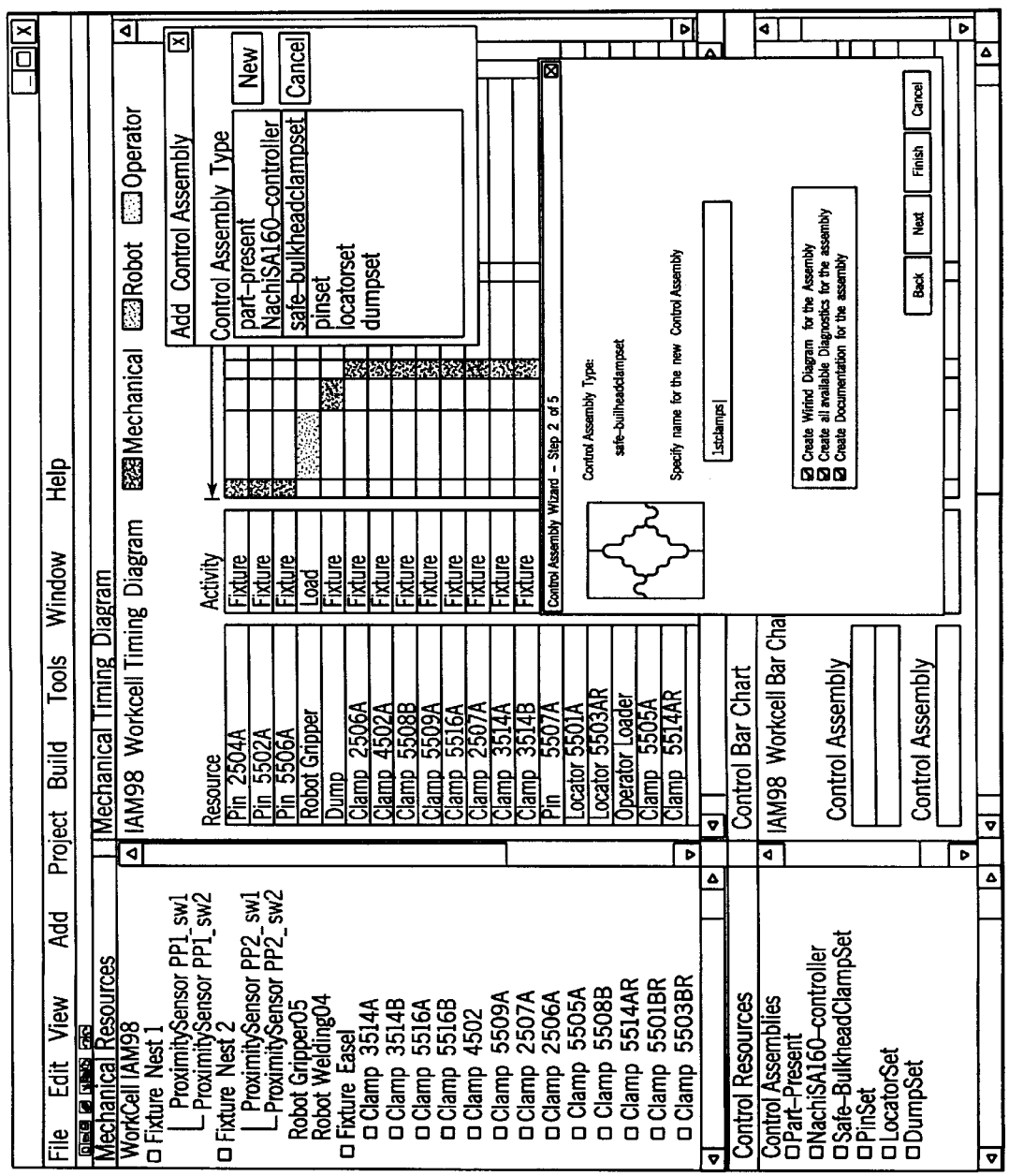

In FIG. 63, the user specifies the name of the new control assembly in accordance with a preferred embodiment. In the example, the name of the new Control Assembly is 1stclamps. The Control Assembly Type is a reusable component containing a number of user selectable properties (or parameters). 1stclamps is a specific instance of the component for which the user will set the properties. The Control Assembly Wizard defaults are set to automatically create a schematic (i.e., wiring diagram or WD) for the assembly and all the available diagnostics (defined by the Type) for the assembly are preselected. Finally, the documentation format is defaulted to HTML format.

An important feature of the system is the built in diagnostics and documentation that are architected into each component. This feature allows a control engineer to receive a predefined set of diagnostics that are carefully tailored to the characteristics of each component and build diagnostics right into the control system automatically. Moreover, as the system is simulated and ultimately brought into production, the diagnostics are available for integration and analysis from the beginning of the process through the life of the system. Thus, when a failure occurs in the system, there are built-in controls that facilitate immediate identification of the failure and remedy.

Figure 64:
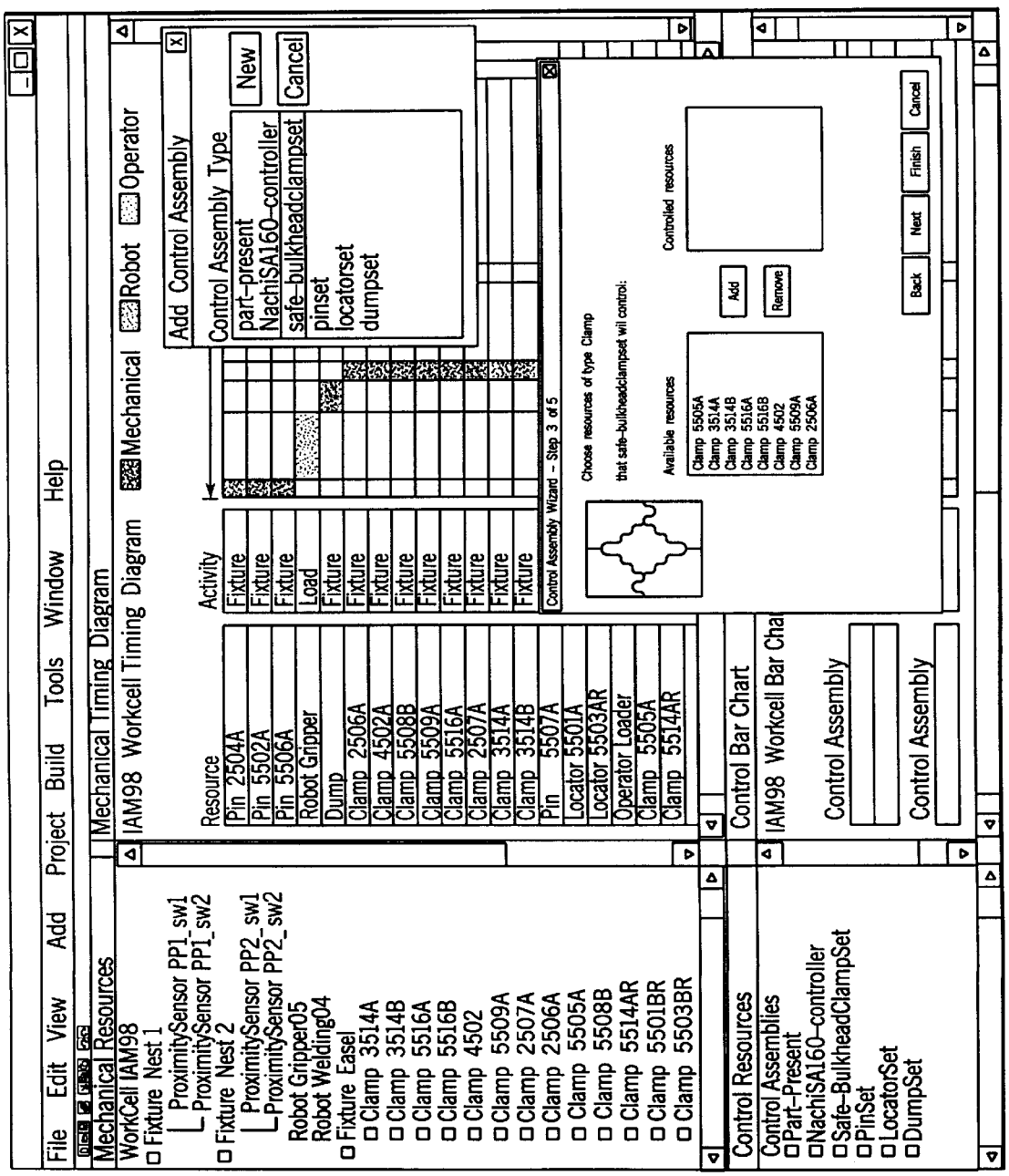

FIG. 64 illustrates a resource selection display in accordance with a preferred embodiment. A user is presented with a list of available resources 6400 from the Mechanical Timing Diagram that match the type of resource that the control assembly type 6410 can control and are not previously bound to other control assemblies.

Figure 65:
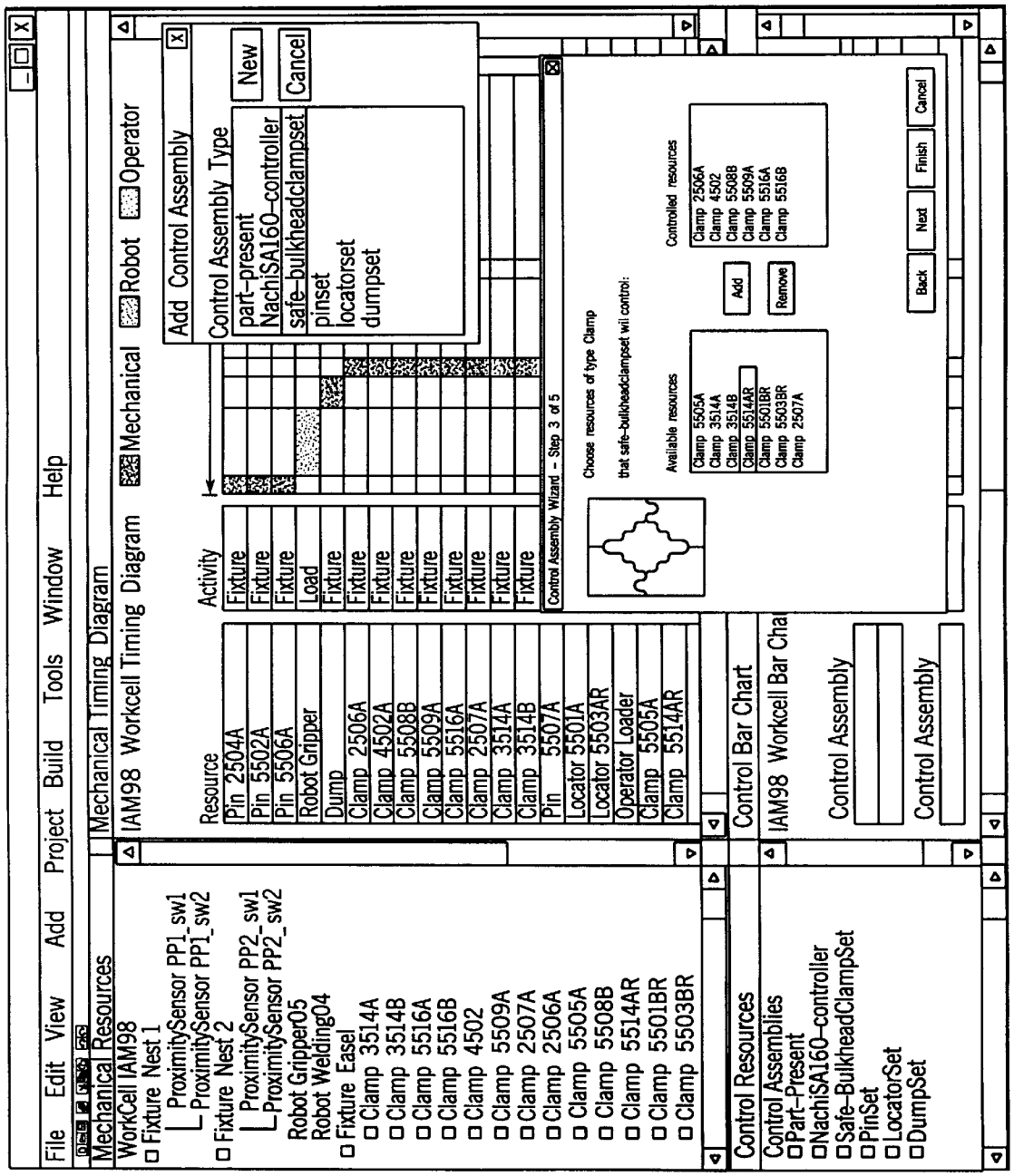

FIG. 65 illustrates a selected set of controlled resources in accordance with a preferred embodiment. The selected resources are shown in box 6510 as they are selected from available resources shown at 6500. The user adds resources from the available list 6500 to the controlled resources list 6510 of the resources that will be controlled by the control assembly 1stclamps of type safe-bulkheadclampset 6520.

Figure 66:
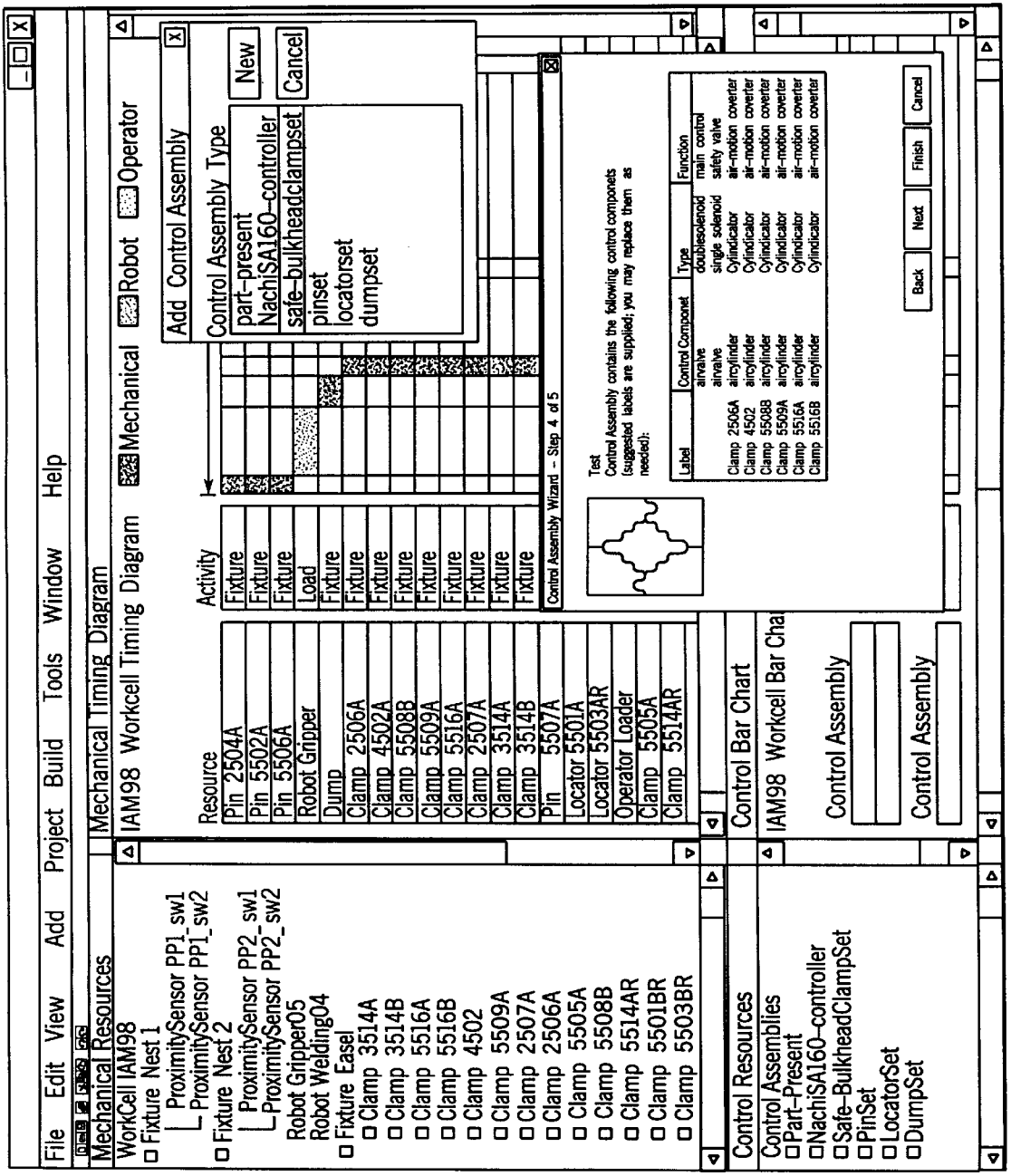

FIG. 66 informs the user of the control components that will make up the control assembly based on the resources chosen to be controlled in accordance with a preferred embodiment. The control components 6600 and their labels 6610 are provided to assist the user in designing a control strategy.

Figure 67:
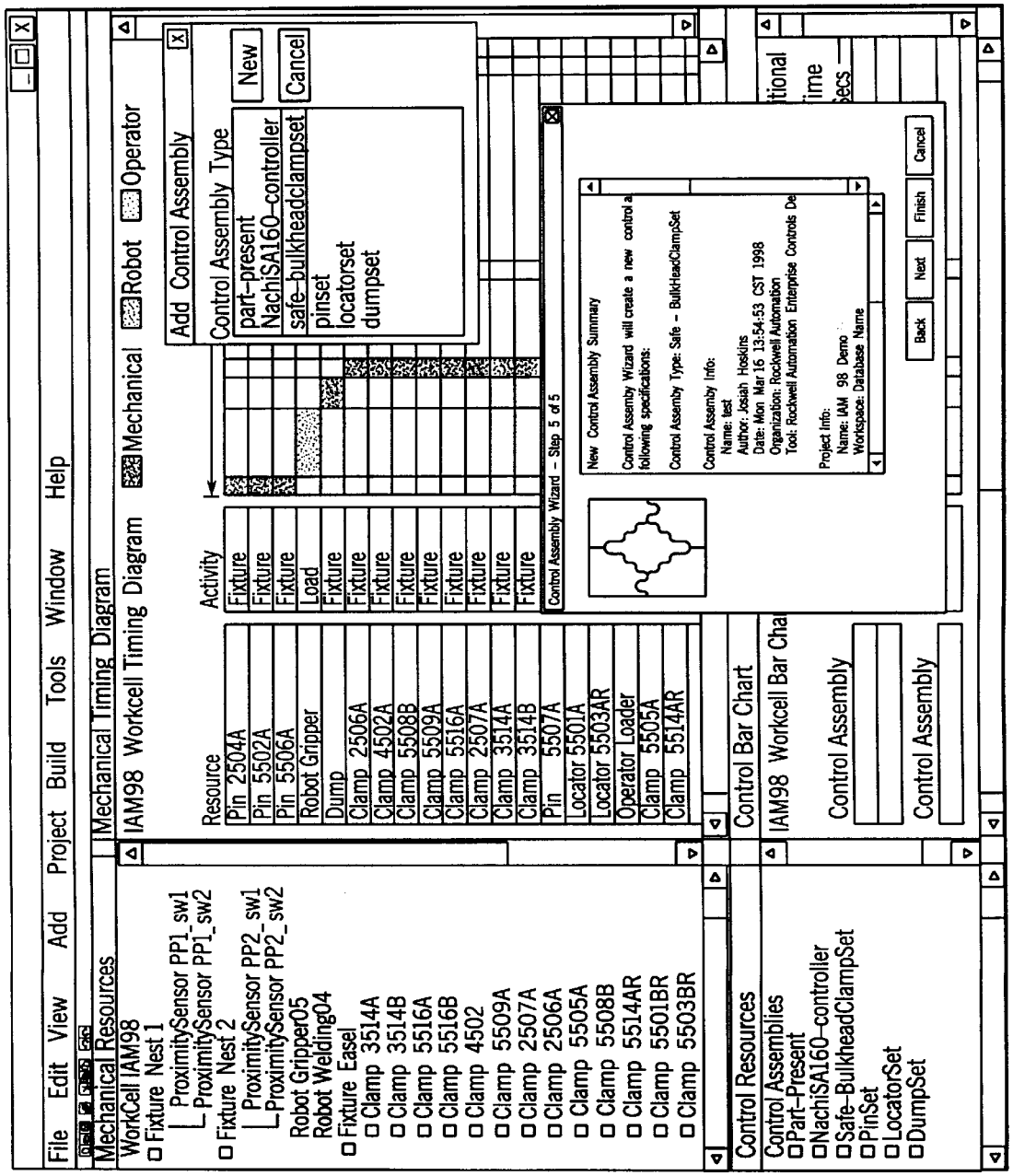

FIG. 67 illustrates the final step in defining control assemblies in accordance with a preferred embodiment. The display window 6700 presents a specification of the control assembly that will be created if a user selects the Finish button.

Figure 68:
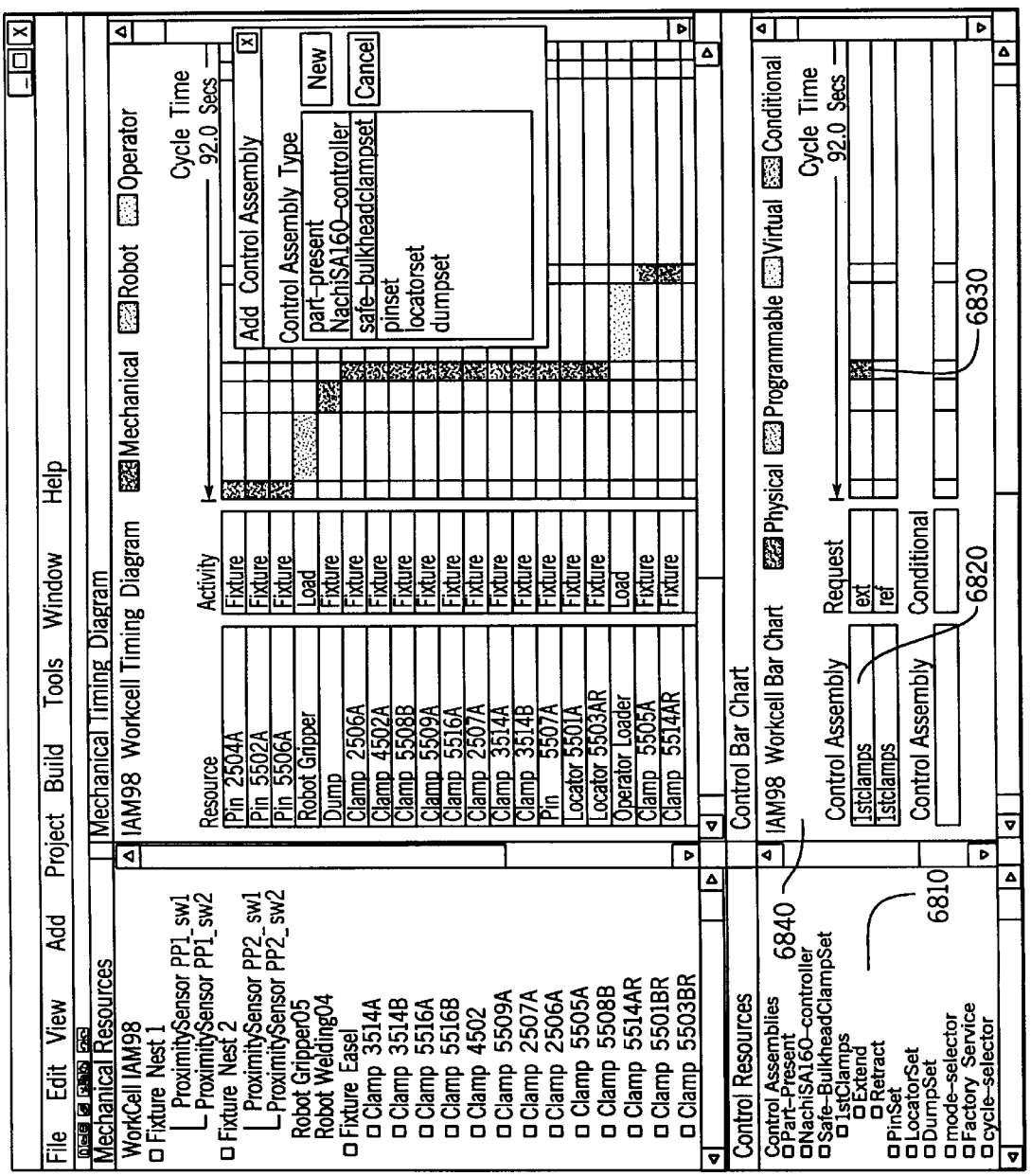
FIG. 68 illustrates the processing that occurs when a user presses the finish button in accordance with a preferred embodiment.

FIG. 68 illustrates the processing that occurs when a user presses the finish button in accordance with a preferred embodiment. First, the Control Assembly 1stClamps is added to the Control Resources hierarchical tree panel in the ECDB. The parent of 1stClamps is the Control Assembly Type Safe-BulkHeadClampSet. The children of 1stClamps 6810 are the requests or conditionals that determine the behavior of 1stClamps. In this case 1stClamps has two requests: extend and retract 6810.

The requests (extend and retract) 6810 corresponding to the activities (fixture and release) of the clamps controlled by 1stClamps are automatically added to the Control Bar Chart panel 6840. The bars 6830 denote the time period during which the extend and retract requests occur. The Control Bar Chart panel 6840 shows the sequence of requests made by the Control Assembly 1stClamps. The Control Bar Chart 6840 is a control system-wide tool that shows the sequence of Control Assembly requests.

There are relationships between the control assembly 1stClamps 6810, the Mechanical Resources it controls, the Activities these resources perform, and the requests made by 1stClamps to these resources to initiate their activities.

Figure 69:
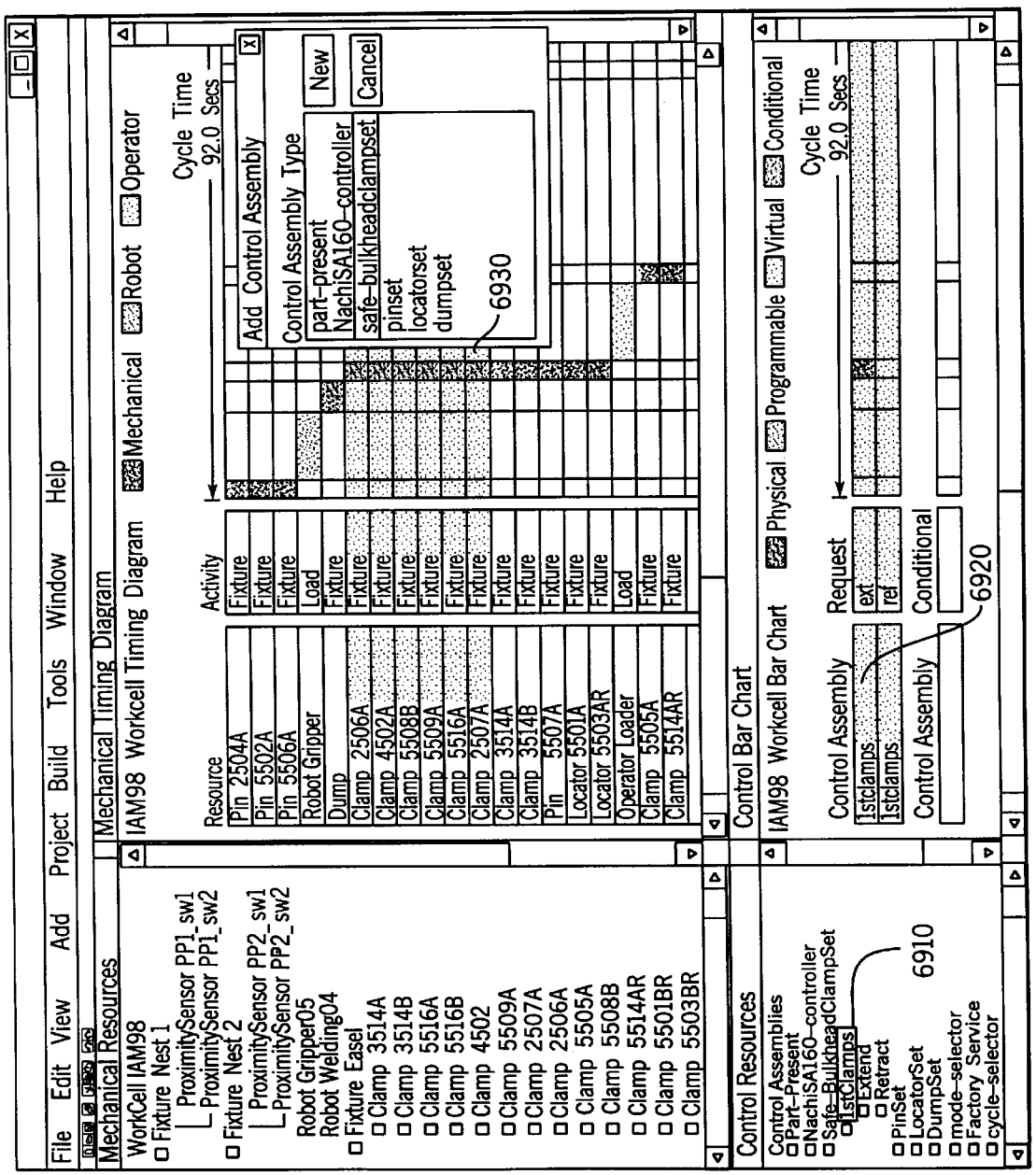
FIG. 69 illustrates the selection processing associated with a particular control assembly in accordance with a preferred embodiment.

FIG. 69 illustrates the selection processing associated with a particular control assembly in accordance with a preferred embodiment. To see these relationships a user selects 1stClamps 6910 in the Control Resources panel. This action highlights 6940 the clamps that 1stClamps controls in the Mechanical Resources panel, the activities 6930 that these resources perform in the Mechanical Timing Diagram panel, and the requests made by 1stClamps to these resources to actuate their activities in the Control Bar Chart panel 6920.

Using the scrollbars we can arrange the Mechanical Timing Diagram and the Control Bar Chart to see the sequencing relationship between the Timing Diagram of the Mechanical Resource activities and the requests of the 1stClamps control assembly. The activities of the clamps controlled by 1stClamps and the requests of 1stClamps occur in the same columns (i.e., during the same time period of the cycle).

Figure 70:
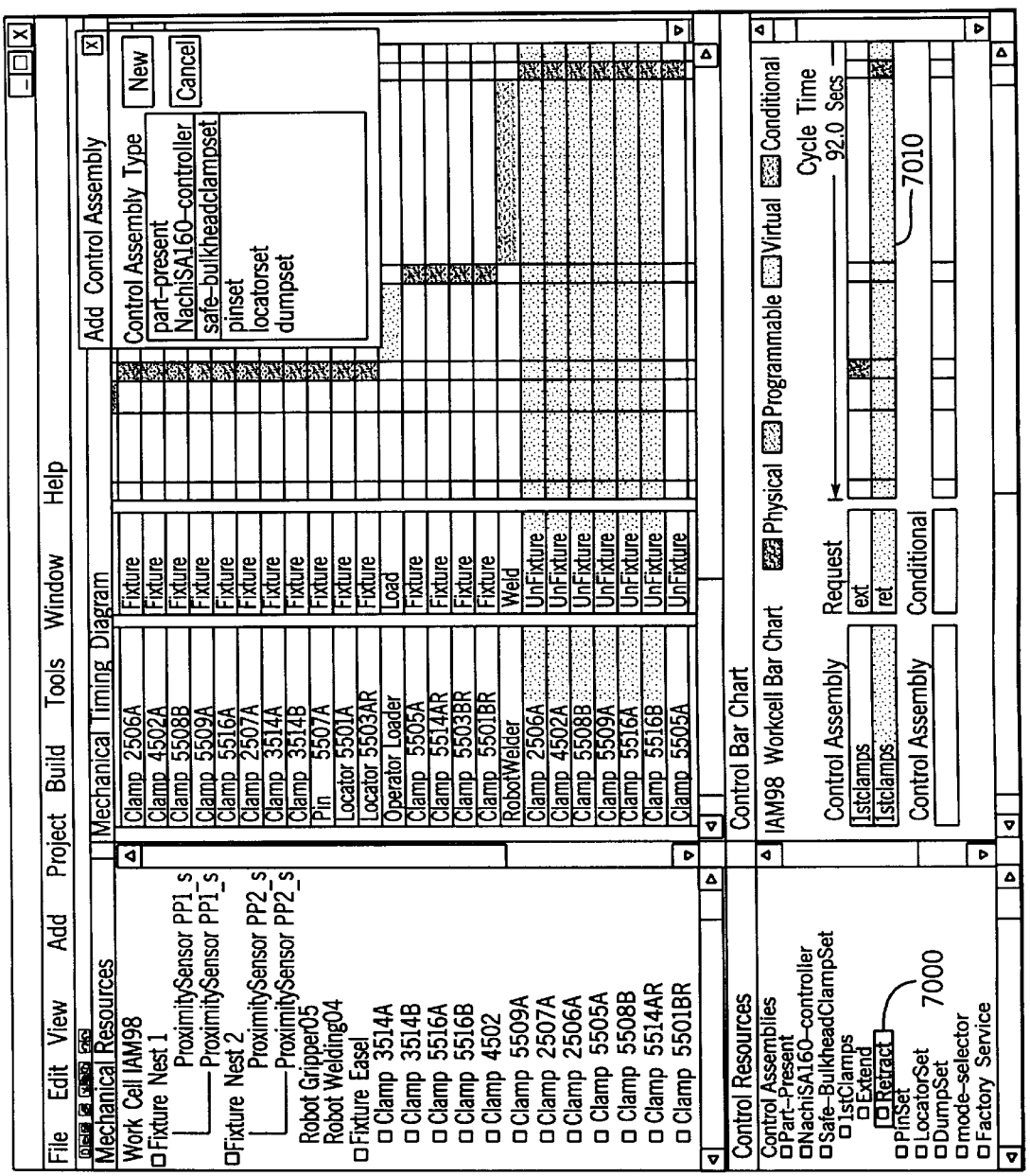
FIG. 70 illustrates the processing of a control assembly in accordance with a preferred embodiment.
Figure 71:
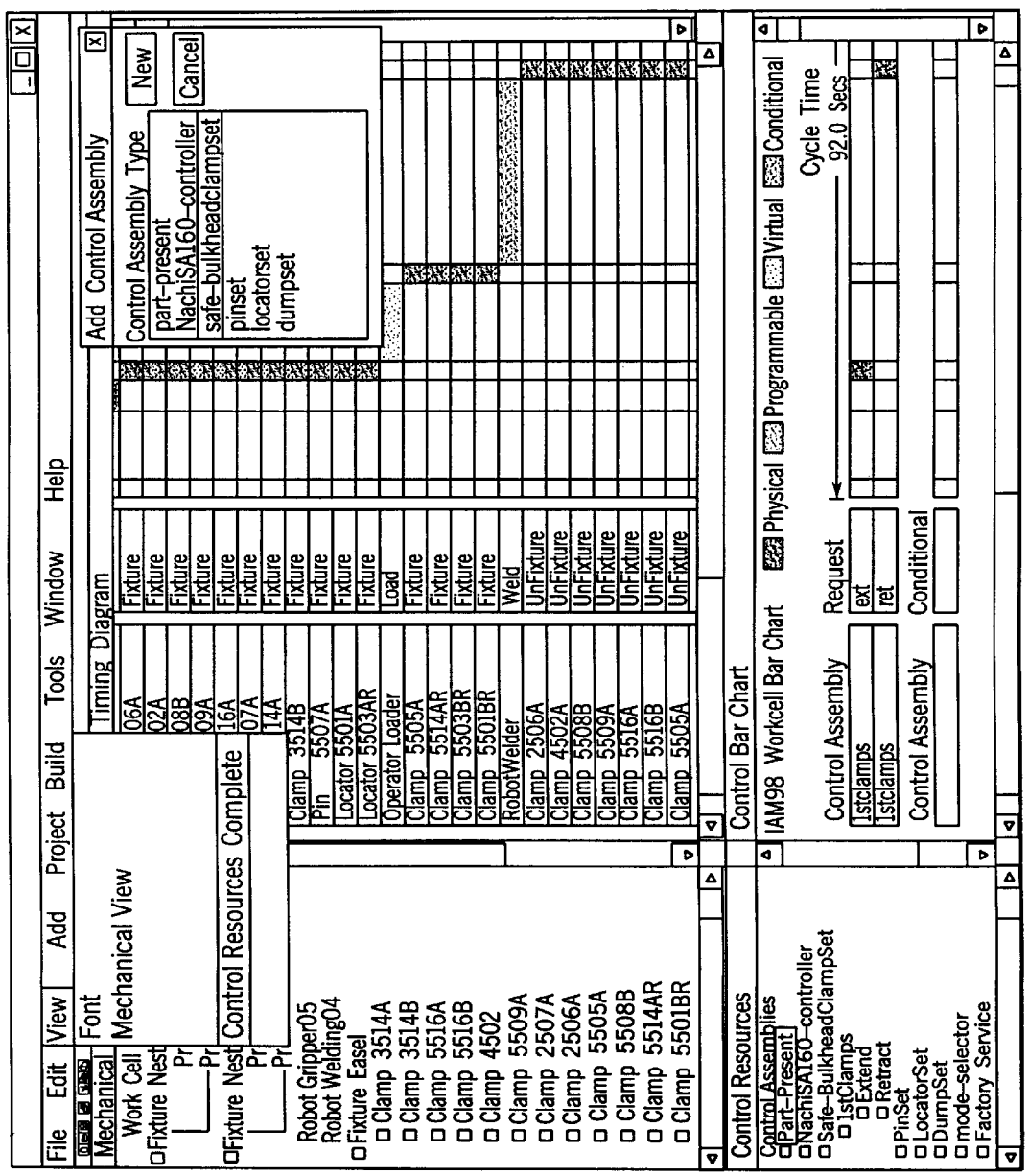
FIGS. 71 to 79 provide additional displays in accordance with a preferred embodiment.
Figure 72:
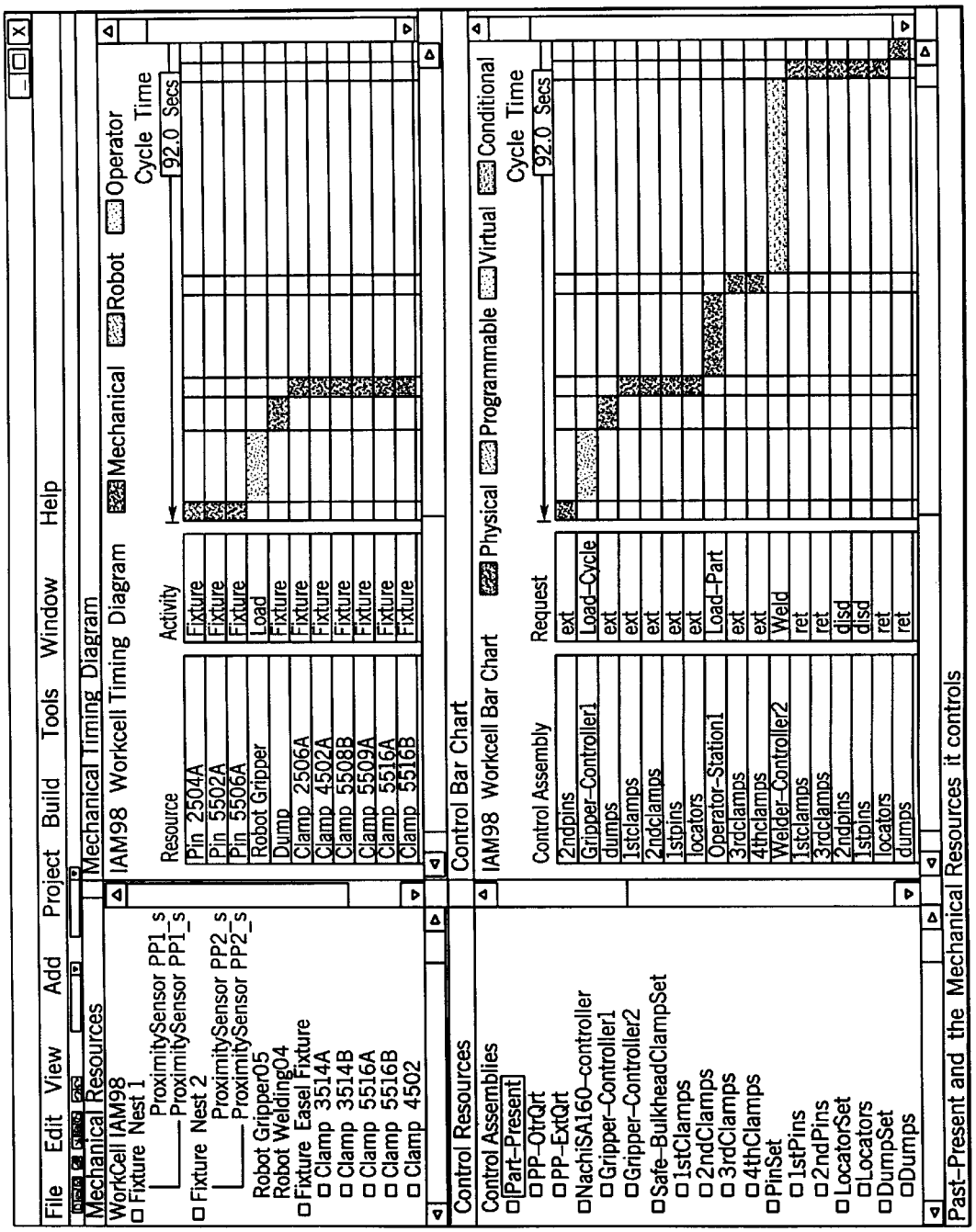
Figure 73:
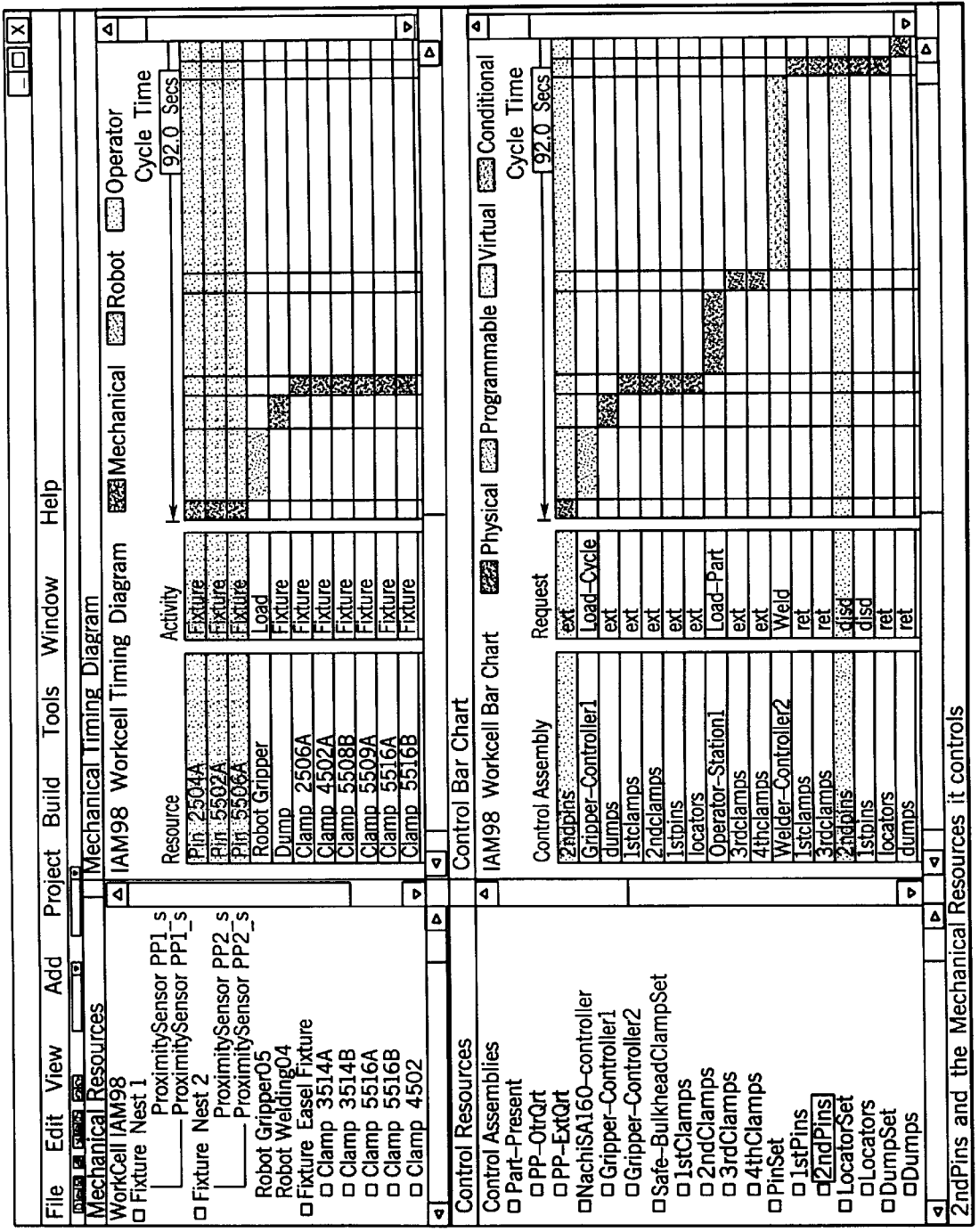
Figure 74:
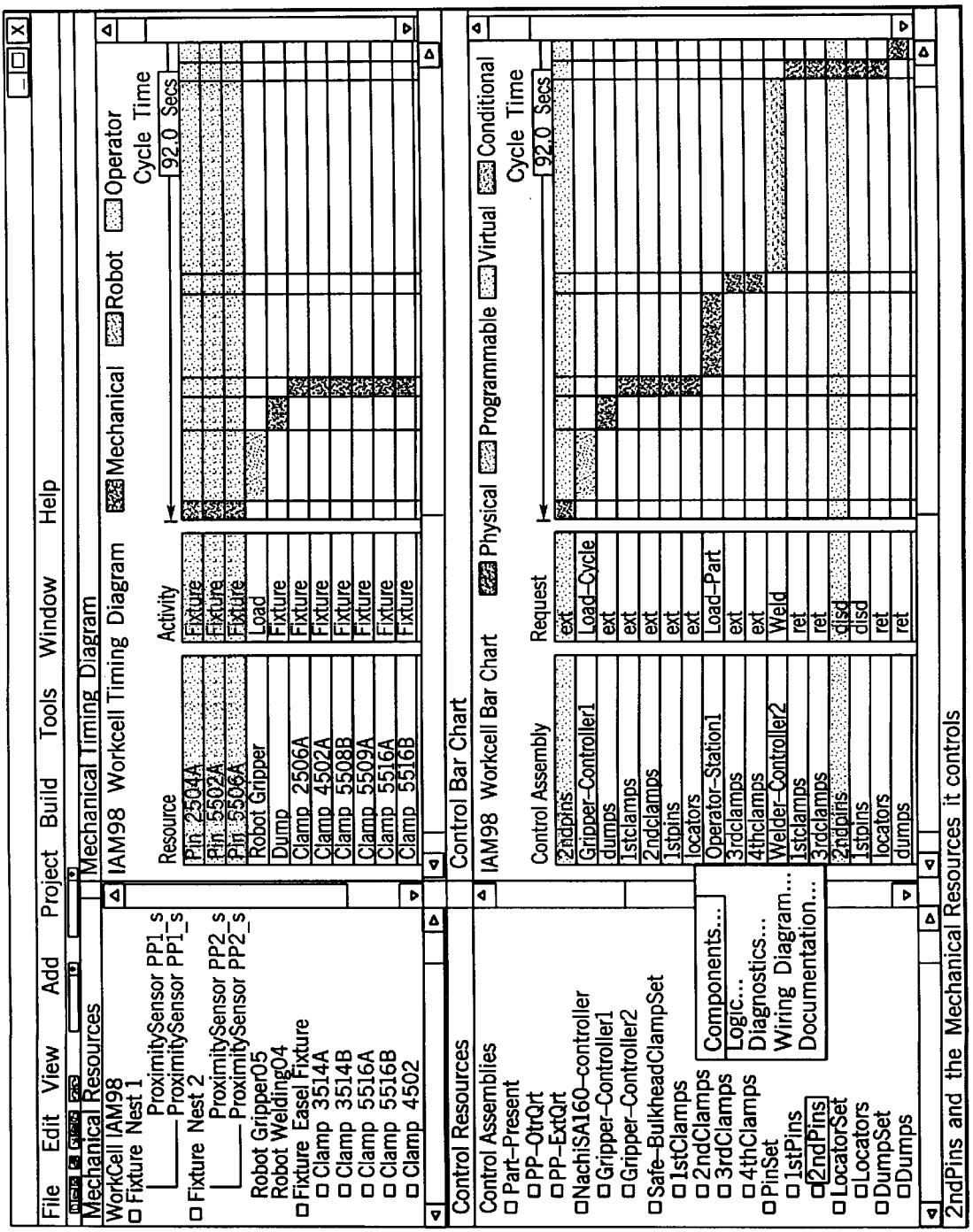
Figure 75:
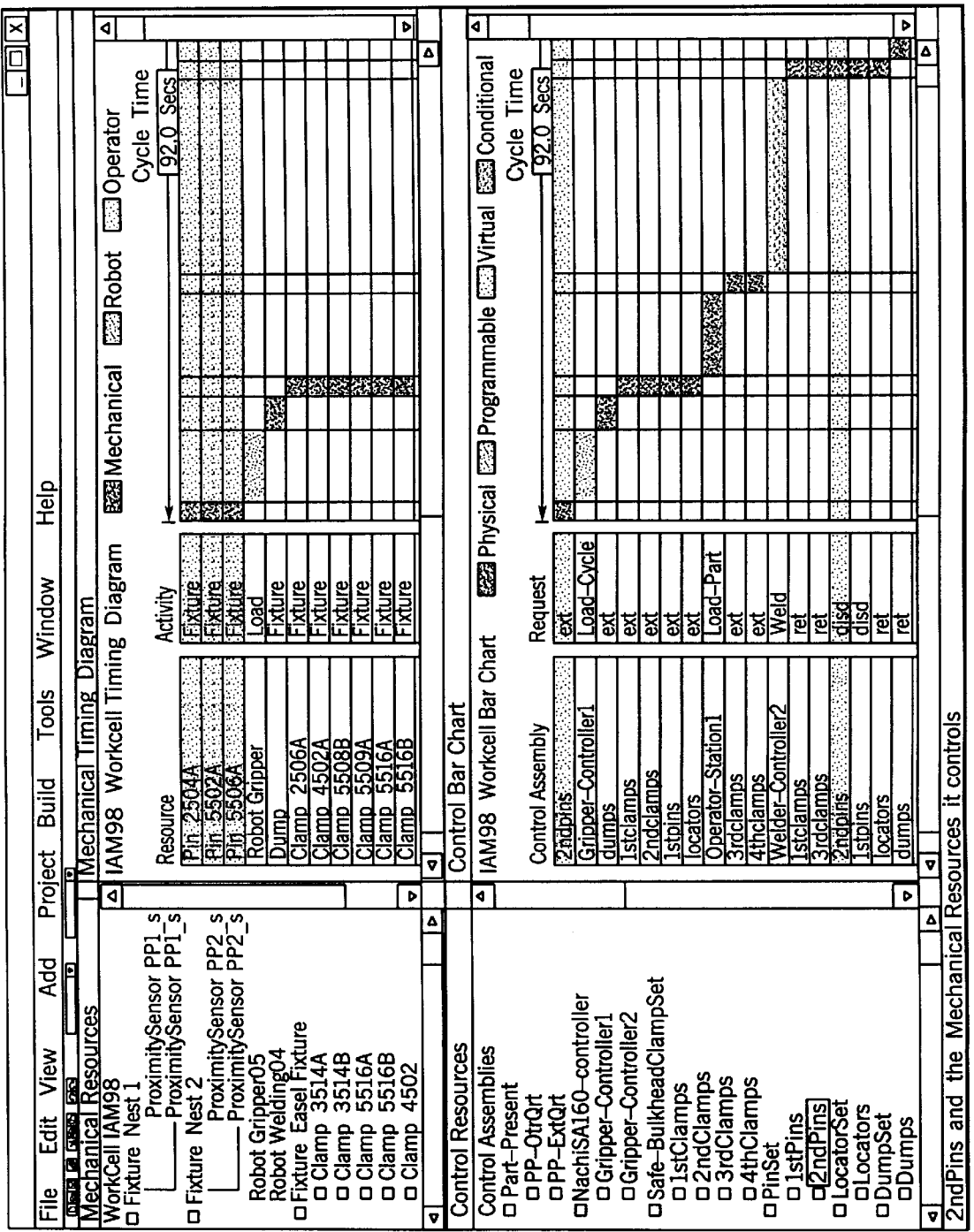
Figure 76:
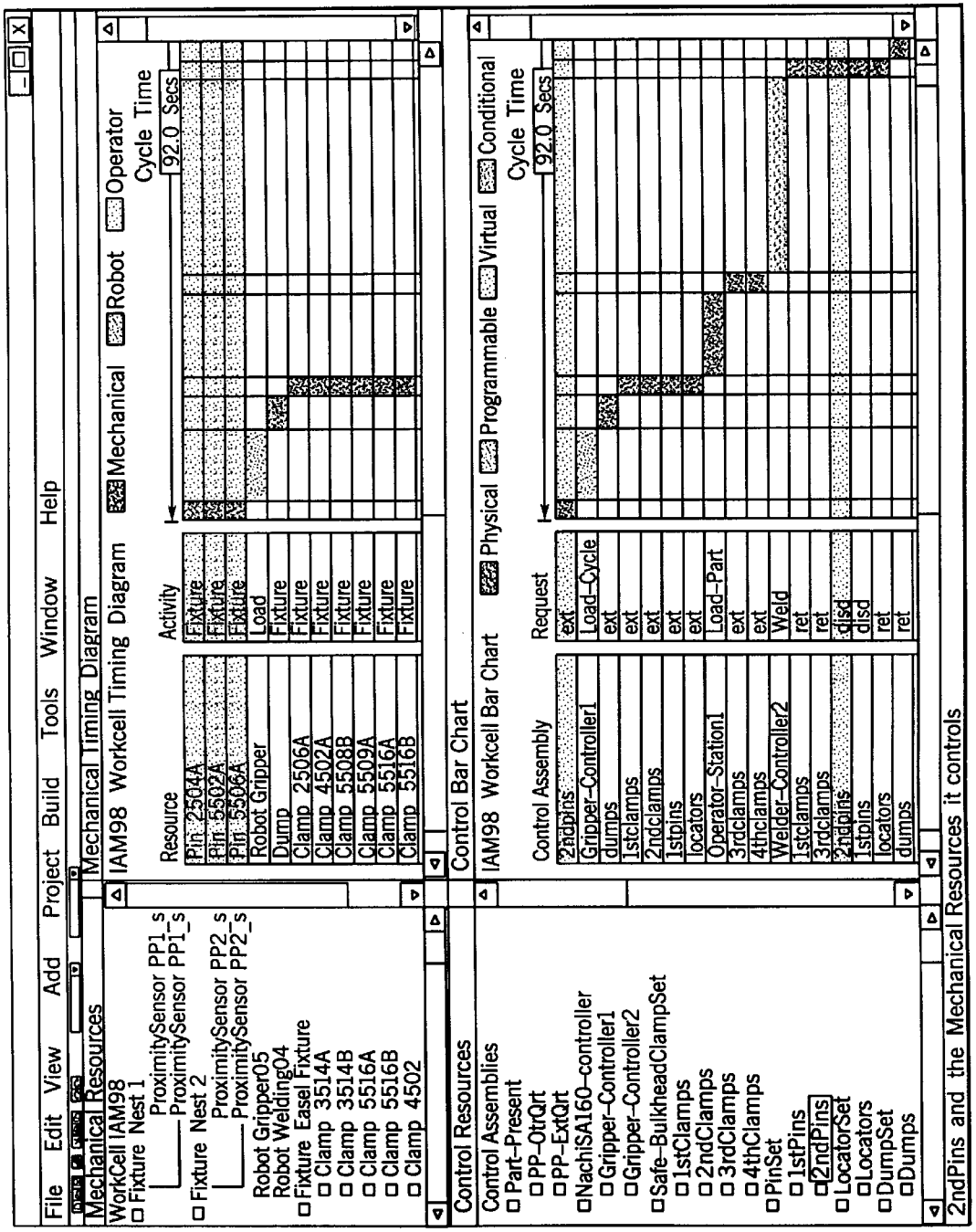
Figure 77:
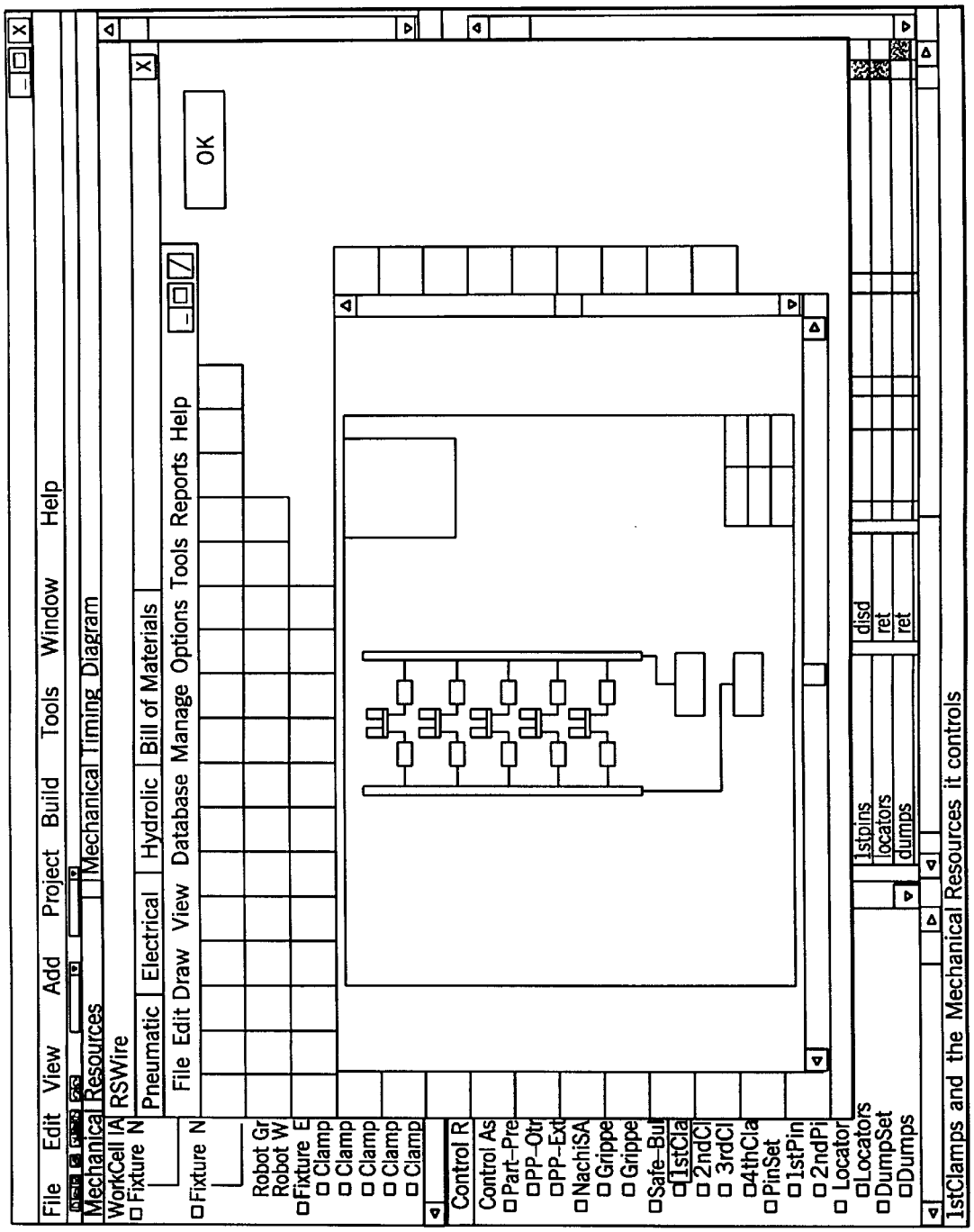
Figure 78:
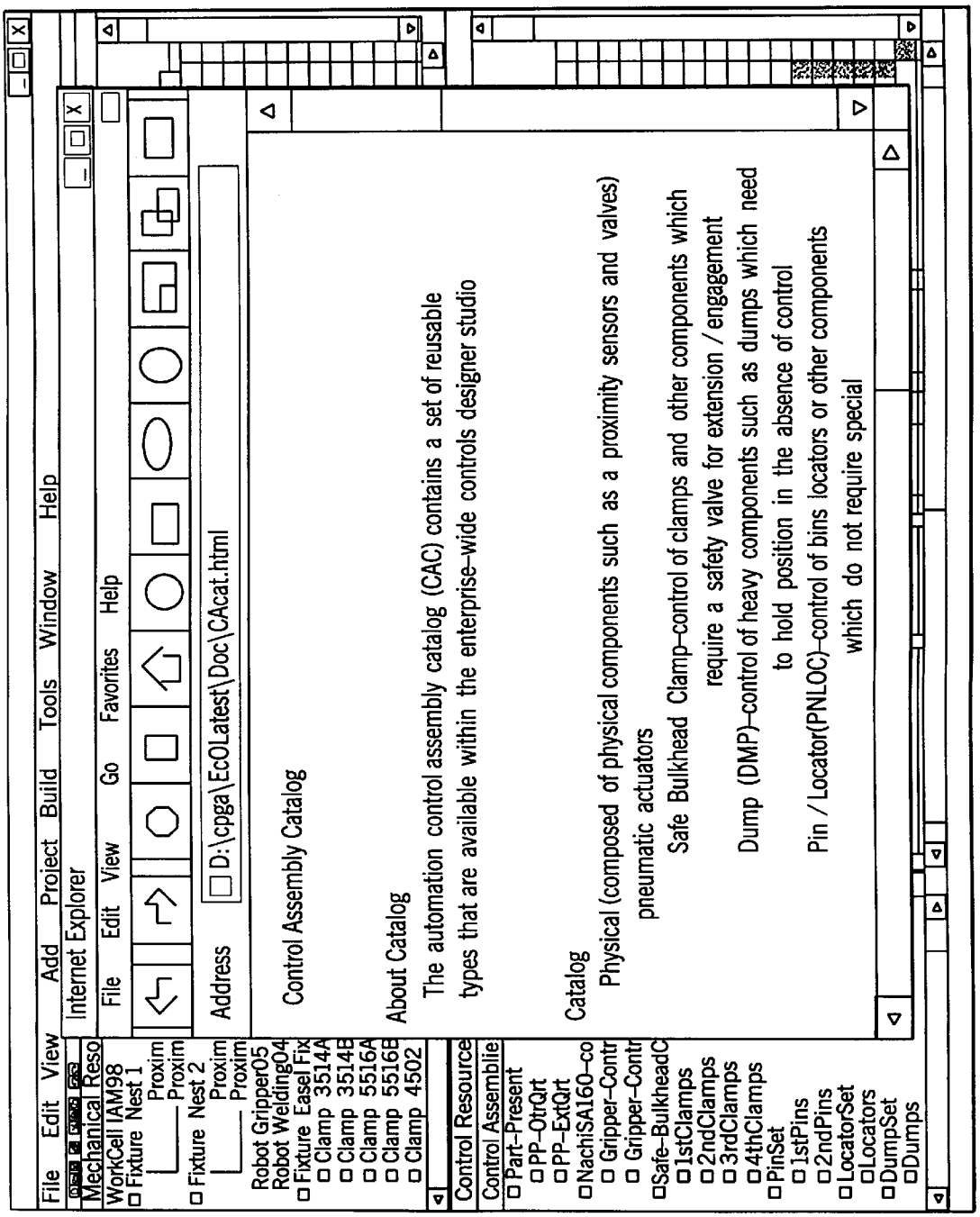
Figure 79:
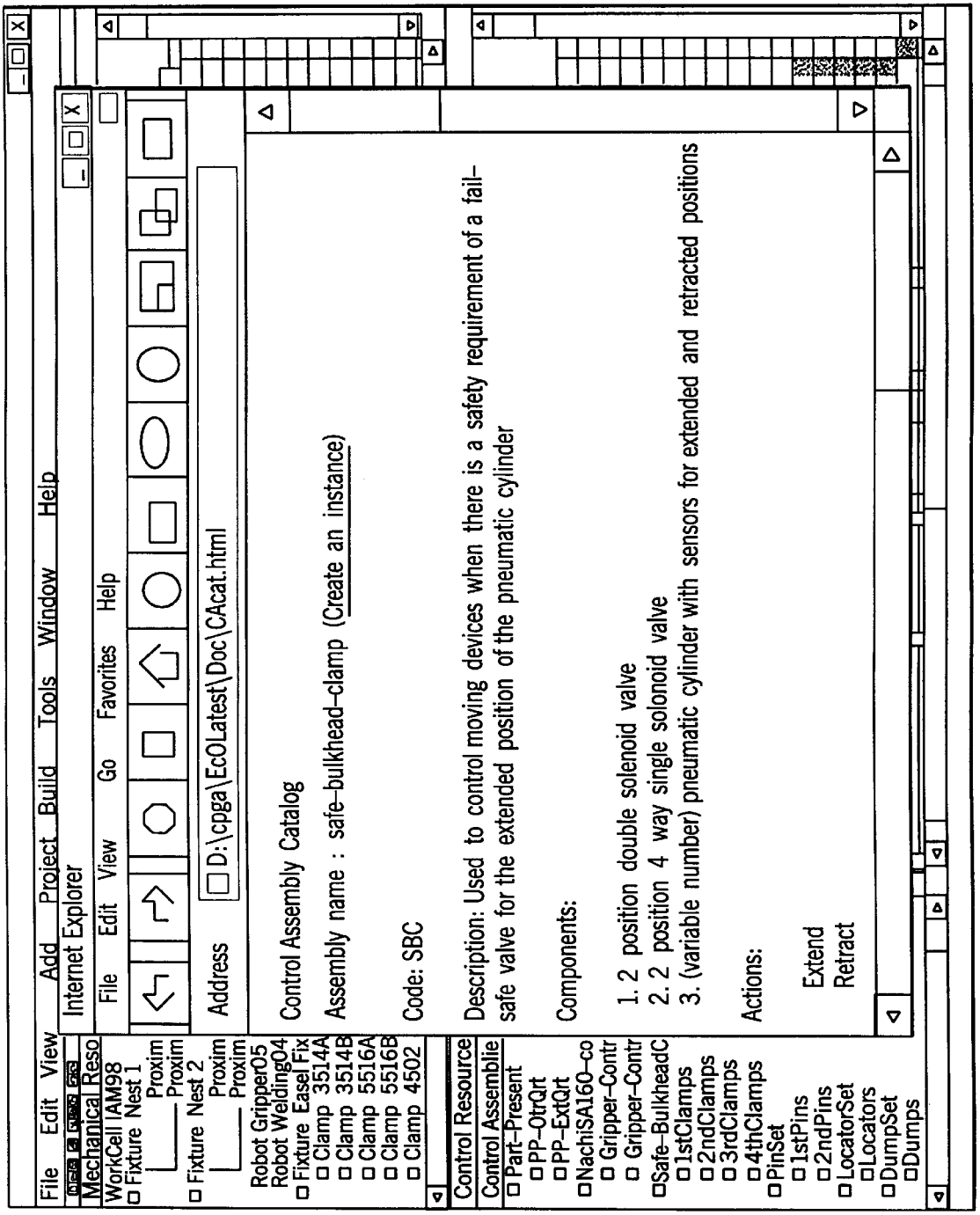

FIG. 70 illustrates the processing of a control assembly in accordance with a preferred embodiment. When a user clicks the mouse on the retract 7000 request of 1stClamps the user can see the activities 7010 controlled by the request. FIGS. 71 to 79 provide additional displays in accordance with a preferred embodiment.

Schematic Tool: Allows user to add the control system-wide schematic components such as factory services, rack layouts, . . . and to connect the Control Assembly Instances electrically, pneumatically, and hydraulically via a control system-wide tool e.g., RSWire adapted to work off an integrated data model that allows a local (i.e., Control Assembly) schematic environment and a control system-wide tool that connects Control Assemblies and adds the additional schematics necessary to complete the Control System-wide design (e.g., Factory Services, Rack Layouts, . . . ) HMI Tool: Allows the user to combine the viewable entities in the control assemblies to layouts to monitor and control the process EC Simulation Visualization of the PLC LL execution is enabled by using RSLogix. Visualization of a current step(s) the machine is waiting on Visualization the "control process", i.e., animate the Bar Chart. Use generated code via SoftLogix to animate in 3-D visualization of the the workcell machines in order to simulate the process and the subsequent creation of the product Note: in EC all these simulations run off the same data model.

EC Control System Implementation

Bill of materials (from RS Wire Schematics)

Make control system bill of materials and control system process available to the Machine and Process designers (i.e., export to CNext)

Code generation Tool

Diagnostics Generation Tool

HMI (Visualization) Generation Tool

EC Control System Maintenance

Diagnostics

Keeping control system design consistent with Product, Process, and Machine Design Password protect to provide restricted access to RLL and the capability to record and changes that are made to the RLL that must be reengineered into the design.

A Control Assembly Component is a deployable control subsystem that exposes an interface (to Control System-wide tools) that is a composition of the following parts using a common object (or data) model and is easily configurable by setting properties.

1) Control Components
    a) Definition: a control component is an entity that either sends a control signal, receives a control signal, or both sends and receives control signals.

These components control the flow of the motive forces (electrical, pneumatic, and hydraulic) that cause mechanical operations to occur.

b) Examples: solenoid valve (receives), proximity sensor (sends), Robot interface (both), PanelView interface (both), pushbutton (sends), indicator light (receives), motor controller (both), . . .
  2) Mechanical Components
    a) Definition: a mechanical component that is required to implement or deploy the control subsystem (e.g., pneumatic hoses, check valves, . . . )
  3) Logic
    a) Definition: the logic specifies the control and fault states, the transitions between states that the control components can attain (i.e., the restricted state space of the control assembly), the controller outputs which produce the transitions, and inputs to the controller determine the current state.

The following examples identify three types of logic groupings: input only, output only, and input/output.

b) Examples:
      i) n-sensor PartPresent (input)
        (1) States
    (a) Part Absent
    (b) Part Present
    (c) Part out of position
    (2) Transitions
    (a) Part Absent=>Part Present
    (b) Part Present=>Part out of position
    (c) Part out of position=>Part Absent
    (d) Part Absent=>Part Present
    (e) Part Absent=>Part out of position
    (f) Part out of position=>Part Present
    (3) Outputs
    (a) None
    (4) Inputs
    (a) all n off (Part Absent)
    (b) all n on (Part Present)
    (c) k of n on (k<n, k>0) (Part out of position)
    ii) ClearToEnterLight (output) (e.g., single light also could be multiple lights)
      (1) States
    (a) LightOn
    (b) LightOff
    (2) Transitions
    (a) LightOn=>LightOff
    (b) LightOff=>LightOn
    (3) Outputs
    (a) LightOnSignal (LightOff=>Lighton)
    (b) Not LightOnSignal (LightOn=>LightOff)
    iii) SafeBulkHeadClamp (both)
      (1) States
    (a) Retracted
    (b) Extended
    (c) Between
    (2) Transitions
    (a) Retracted=>Between
    (b) Between=>Extended
    (c) Extended=>Between
    (d) Between=>Retracted
    (3) Outputs
    (a) Extend (both valves opened=4 outputs high)
    (b) Retract (main valve closed=2 outputs high)
    (4) Inputs
    (a) Retracted (retract proximity sensors on for all cylinders)
    (b) Extended (extend proximity sensors off for all cylinders)
    (c) Between ( one or more sets of proximity sensors both off)
    (d) Fault 1 (one set of proximity sensors both on)
    (e) Fault 2 (one or more of the set of sensors disagrees with the others for a nominally significant time period).
  4) Diagnostics
    a) Definition: Status-based diagnostics—specifies the step (s) that the machine is currently waiting to occur (if a fault occurs it specifies the step(s) that were waiting to occur at the time of the fault, i.e., the symptoms).

Note: this information is available for both well behavior and fault behavior.

b) Definition2: Causal model-based diagnostics—use a model of causal relationships to develop rules that relate machine status to root causes.

c) Examples:
  i) Consider that a human mechanic has incorrectly moved the mount location of a part present proximity sensor causing a misalignment.
    (1) Status-based: determines that the machine is "waiting for part present sensor #2" (no automatic inference possible)
  ii) Consider that the proximity sensor on a clamp cylinder has failed
    (1) Status-based: determines that machine is "waiting for clamp cylinder 2504A"
    (2) Causal model-based: logic infers that the extend proximity sensor on cylinder 2504A has failed, or that cylinder 2504A is stuck.
5) Schematics
a) Definition: a schematic is a representation of the electrical, pneumatic, and hydraulic interface to the control assembly.
b) Examples:
  i) Ielectrical
  ii) Ipneumatic
  iii) Ihydraulic
  iv) . . .
6) Visualization
a) Definition: entities within the control assembly that are useful to portray textually or graphically.
b) Examples:
  i) Control Components (textually or graphically)
  ii) Logic (graphically: RLL, Function Blocks, Axis-like diagrams, state diagrams . . . ) what ever conveys the logic to the user.
  iii) Diagnostics
    (1) Status messages
    (2) Causal messages
  iv) Schematics
    (1) Typed connections (electrical, pneumatic, network, . . . ) within Control Assembly and to and from the Control Assembly (i.e., the interface to the Control Assembly.
    (2) Bill of Materials (to deploy the control assembly)
    (3) . . .
  v) Controlled Resources
  vi) Requests
7) Controlled Resources
a) Definition: properties of the resource controlled by the control assembly that place requirements (i.e., add constraints) on the structure of the assembly
b) Example
  i) Clamp 1
    (1) Safety constraint: if lose power clamp must fail open
8) Requests or Conditions
a) Definition: request an operation (optionally with confirmation) or request a status of the external world (color code)
  i) Request Action Request Status
  ii) Request Action
  iii) Request Status
  iv) Note: how to handle complicated actions (initialization, robot protocols, . . . )
b) Examples:
  i) PartPresent
    (1) SensePart (Request Status)
  ii) ClearToEnterLight
    (1) TurnOn (Request Action)
    (2) TurnOff (Request Action)
  iii) SafeBulkHeadClamp
    (1) Extend
    (2) Retract
  iv) SafetyGate
    (1) SenseSafe (Request Status)
9) Documentation Control Bar Chart panel: Allows user to sequence the Requests of Control Assembly Instances via a control system-wide tool called a Control Bar Chart.

Schematic Tool: Allows user to add the control system-wide schematic components such as factory services, rack layouts, . . . and to connect the Control Assembly Instances electrically, pneumatically, and hydraulically via a control system-wide tool e.g., RSWire adapted to work off an integrated data model that allows a local (i.e., Control Assembly) schematic environment and a control system-wide tool that connects Control Assemblies and adds the additional schematics necessary to complete the Control System-wide design (e.g., Factory Services, Rack Layouts, . . . )

HMI Tool: Allows the user to combine the viewable entities in the control assemblies to layouts to monitor and control the process EC Simulation Visualization of the LL execution is facilitated through the use of RSLogix (RSLadder is better)

Visualization the current step(s) the machine is waiting on

Visualization the "control process", i.e., animate the Bar Chart

Use generated code via SoftLogix to animate in 3-D visualization of the the workcell machines in order to simulate the process and the subsequent creation of the product Note: in EC all these simulations run off the same data model.

EC Control System Implementation

Bill of materials (from RS Wire Schematics)

Make control system bill of materials and control system process available to the Machine and Process designers (i.e., export to CNext)

Code generation Tool

Diagnostics Generation Tool

HMI (Visualization) Generation Tool

EC Control System Maintenance

Diagnostics

Keeping control system design consistent with Product, Process, and Machine Design Password protect to provide restricted access to LL and the capability to record and changes that are made to the LL that must be reengineered into the design.

Figure 80:
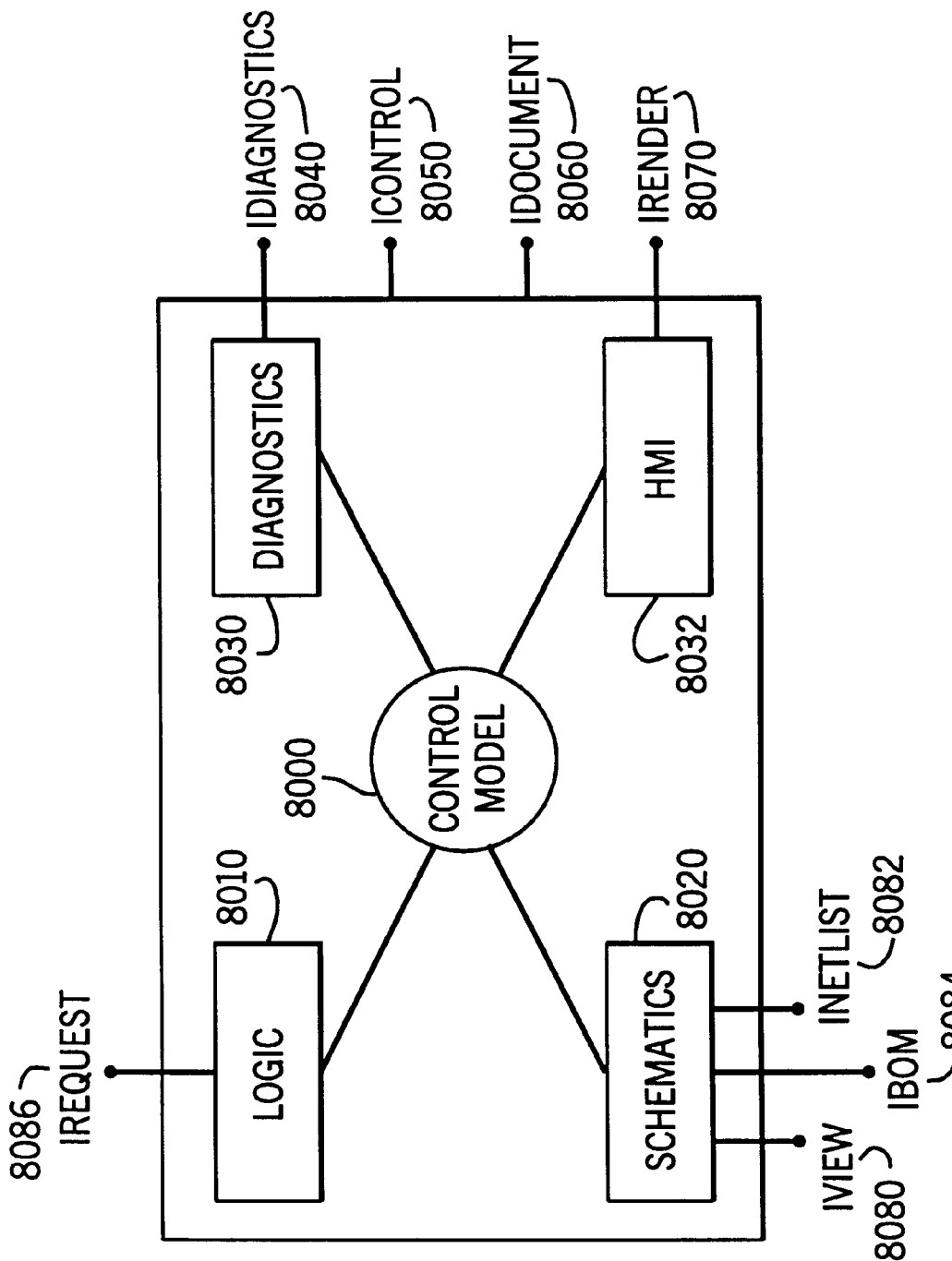
FIG. 80 is a block diagram of a control assembly in accordance with a preferred embodiment.

Definition: a Control Assembly Component is a deployable control subsystem that exposes an interface (to Control System-wide tools) that is a composition of the following parts using a common object (or data) model and is easily configurable by setting properties. FIG. 80 is a block diagram of a control assembly in accordance with a preferred embodiment. The boxed region designates the control assembly component which is a container. The control assembly component is a composition of a logic class 8010, a diagnostics class 8030, schematics class 8020, Human Machine Interface (HMI) class 8032 and a control model 8000. The control model 8000 which contains the common fields and methods (logic) for a control assembly class. The logic 8010 is a class that contains the fields and methods that are unique to the logic portions of a control assembly type.

The diagnostics class 8030 is a class that contains the fields and methods that are unique to the diagnostics portions of a control assembly type. The schematics class 8020 is a class that contains the fields and methods that are unique to the schematics portions of a control assembly type. The HMI class 8032 is a class that contains the fields and methods that are unique to the user interface portions of a control assembly type.

The IRequest interface 8086 specifies the external behavior methods (logic) for controlling a controlled resource. For example, the message that invokes the logic for opening and closing a clamp. The IView interface 8080 specifies the external behavior methods (logic) for viewing schematics (electrical, hydraulic and pneumatic). The IBOM interface 8084 specifies the external behavior methods (logic) for retrieving the Bill-Of-Materials (BOM) for a control assembly component. The INetlist interface 8082 specifies the external behavior methods (logic) for retrieving the electrical, pneumatic and hydraulic connections between the control and mechanical devices within a control assembly component.

The IRender interface 8070 specifies the external behavior method (logic) for retrieving viewable elements and their properties and generating a user interface. The IDocument interface 8060 specifies the external behavior method (logic) for producing documentation of the control assembly component. The IControl interface 8050 specifies the external behavior method (logic) for retrieving the resources that the control assembly component is capable of controlling. The IDiagnostics interface 8040 specifies the external behavior method (logic) for selecting diagnostics that are instantiated for a control component.

10) Control Components
   a) Definition: a control component is an entity that either sends a control signal, receives a control signal, or both sends and receives control signals.

These components control the flow of the motive forces (electrical, pneumatic, and hydraulic) that cause mechanical operations to occur.
   b) Examples: solenoid valve (receives), proximity sensor (sends), Robot interface (both), PanelView interface (both), pushbutton (sends), indicator light (receives), motor controller (both), . . .

11) Mechanical Components
   a) Definition: a mechanical component that is required to implement or deploy the control subsystem (e.g., pneumatic hoses, check valves, . . . )

12) Logic
   a) Definition: the logic specifies the control and fault states, the transitions between states that the control components can attain (i.e., the restricted state space of the control assembly), the controller outputs which produce the transitions, and inputs to the controller determine the current state. The following examples identify three types of logic groupings: input only, output only, and input/output.
   b) Examples:
      i) n-sensor PartPresent (input)
         (1) States
            (a) Part Absent
            (b) Part Present
            (c) Part out of position
         (2) Transitions
            (a) Part Absent=>Part Present
            (b) Part Present=>Part out of position
            (c) Part out of position=>Part Absent
            (d) Part Absent=>Part Present
            (e) Part Absent=>Part out of position
            (f) Part out of position=>Part Present
         (3) Outputs
            (a) None
         (4) Inputs
            (a) all n off (Part Absent)
            (b) all n on (Part Present)
            (c) k of n on (k<n, k>O) (Part out of position)
      ii) ClearToEnterLight (output) (e.g., single light also could be multiple lights)
         (1) States
            (a) LightOn
            (b) LightOff
         (2) Transitions
            (a) LightOn=>LightOff
            (b) LightOff=>LightOn
         (3) Outputs
            (a) LightOnSignal (Lightoff=>Lighton)
            (b) Not LightOnSignal (LightOn=>LightOff)
      iii) SafeBulkHeadClamp (both)
         (1) States
            (a) Retracted
            (b) Extended
            (c) Between
         (2) Transitions
            (a) Retracted=>Between
            (b) Between=>Extended
            (c) Extended=>Between
            (d) Between=>Retracted
         (3) Outputs
            (a) Extend (both valves opened=4 outputs high)
            (b) Retract (main valve closed=2 outputs high)
         (4) Inputs
            (a) Retracted (retract proximity sensors on for all cylinders)
            (b) Extended (extend proximity sensors off for all cylinders)
            (c) Between ( one or more sets of proximity sensors both off
            (d) Fault 1 (one set of proximity sensors both on)
            (e) Fault 2 (one or more of the set of sensors disagrees with the others for a nominally significant time period).

13) Diagnostics
   a) Definition: Status-based diagnostics—specifies the step (s) that the machine is currently waiting to occur (if a fault occurs it specifies the step(s) that were waiting to occur at the time of the fault, i.e., the symptoms). Note: this information is available for both well behavior and fault behavior.
   b) Definition2: Causal model-based diagnostics—use a model of causal relationships to develop rules that relate machine status to root causes.
   c) Examples:
      i) Consider that a human mechanic has incorrectly moved the mount location of a part present proximity sensor causing a misalignment.
         (1) Status-based: determines that the machine is "waiting for part present sensor #2" (no automatic inference possible)
      ii) Consider that the proximity sensor on a clamp cylinder has failed
         (1) Status-based: determines that machine is "waiting for clamp cylinder 2504A"
         (2) Causal model-based: logic infers that the extend proximity sensor on cylinder 2504A has failed, or that cylinder 2504A is stuck.

14) Schematics
   a) Definition: a schematic is a representation of the electrical, pneumatic, and hydraulic interface to the control assembly.
   b) Examples:
      i) Ielectrical
      ii) Ipneumatic
      iii) Ihydraulic
      iv) . . .
15) Visualization
   a) Definition: entities within the control assembly that are useful to portray textually or graphically.
   b) Examples:
      i) Control Components (textually or graphically)
      ii) Logic (graphically: LL, Function Blocks, Axis-like diagrams, state diagrams . . . ) what ever conveys the logic to the user.
      iii) Diagnostics
         (1) Status messages
         (2) Causal messages
      iv) Schematics
         (1) Typed connections (electrical, pneumatic, network, . . . ) within Control Assembly and to and from the Control Assembly (i.e., the interface to the Control Assembly.
         (2) Bill of Materials (to deploy the control assembly)
         (3) . . .
      v) Controlled Resources
      vi) Requests
16) Controlled Resources
   a) Definition: properties of the resource controlled by the control assembly that place requirements (i.e., add constraints) on the structure of the assembly
   b) Example
      i) Clamp 1
         (1) Safety constraint: if lose power clamp must fail open
17) Requests or Conditions
   a) Definition: request an operation (optionally with confirmation) or request a status of the external world (color code)
      i) Request Action Request Status
      ii) Request Action
      iii) Request Status
      iv) Note: how to handle complicated actions (initialization, robot protocols, . . . )
   b) Examples:
      i) PartPresent
         (1) SensePart (Request Status)
      ii) ClearToEnterLight
         (1) TurnOn (Request Action)
         (2) TurnOff (Request Action)
      iii) SafeBulkHeadClamp
         (1) Extend
         (2) Retract
      iv) SafetyGate
         (1) SenseSafe (Request Status)
18) Documentation While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A method for controlling an enterprise, including a computer with one or more components for controlling one or more aspects of an industrial environment, comprising the steps of:
   (a) creating a database of components, each of the components containing control and resource information pertaining to enterprise resources utilized in the enterprise;
   (b) assigning resources necessary for an enterprise control system from the database of components;
   (c) assigning resources times to perform activities; and
   (d) integrating the resources, times and activities utilizing the database to control and display information pertaining to the enterprise.

2. A method as recited in claim 1, including the step of matching a control assembly to resources to perform activities.

3. A method as recited in claim 2, including the step of connecting the control assembly to one or more electrical or pneumatic devices.

4. A method as recited in claim 2, including the step of sequencing the control assembly by time.

5. A method as recited in claim 2, including the step of generating a visual depiction of at least one control assembly.

6. A method as recited in claim 5, including the step of integrating a set of control assemblies and their associated visual depictions into an enterprise control system.

7. A method as recited in claim 6, including the step of storing the set of control assemblies and their associated visual depictions in a database for use in depicting and managing an enterprise.

8. A system for controlling an enterprise, including a computer with one or more components for controlling one or more aspects of an industrial environment, comprising:
   (a) a database of components, each of the components containing control and resource information pertaining to enterprise resources utilized in the industrial environment;
   (b) a first code segment that assigns resources necessary for an enterprise control system from the database of components;
   (c) a second code segment that assigns resources times to perform activities; and
   (d) an enterprise system that integrates the resources, times and activities utilizing the database to control and display information pertaining to the enterprise.

9. A system as recited in claim 8, including a database component that matches a control assembly to resources to perform an activity.

10. A system as recited in claim 8, including a database component that connects the control assembly to one or more electrical or pneumatic devices.

11. A system as recited in claim 8, including a database component that sequences the control assembly by time.

12. A system as recited in claim 8, including a display component that generates a visual depiction of at least one control assembly.

13. A system as recited in claim 8, including a database component that integrates the control assemblies and their associated visual depictions into an enterprise control system.

14. A system as recited in claim 13, including a database component that stores the control assemblies and their associated visual depictions in the database for use in depicting and managing an enterprise.

15. A computer program embodied on a computer-readable medium for controlling an enterprise, comprising:
   (a) a database code segment with a plurality of components, each of the components containing control and resource information pertaining to enterprise resources utilized in the enterprise;
   (b) a code segment that assigns resources necessary for an enterprise control system from the database of components;
   (c) the database code segment assigning resources times to perform activities; and
   (d) an enterprise system control code segment that integrates the resources, times and activities utilizing the database to control and display information pertaining to the enterprise.

16. The computer program embodied on a computer-readable medium as recited in claim 15, including a database component that matches a control assembly to resources to perform the activities.

17. A computer program as recited in claim 15, including a database component that connects the control assembly to one or more electrical or pneumatic devices.

18. A computer program as recited in claim 15, including a display component that generates a visual depiction of at least one control assembly.

19. A computer program as recited in claim 15, including a database component that integrates at least one control assembly and its associated visual depiction into an enterprise control system.

20. A computer program as recited in claim 19, including a database component that stores the control assemblies and their associated visual depictions in the database for use in depicting and managing an enterprise.

* * * * *